(12) United States Patent
Silverstein

(10) Patent No.: US 10,262,641 B2
(45) Date of Patent: Apr. 16, 2019

(54) MUSIC COMPOSITION AND GENERATION INSTRUMENTS AND MUSIC LEARNING SYSTEMS EMPLOYING AUTOMATED MUSIC COMPOSITION ENGINES DRIVEN BY GRAPHICAL ICON BASED MUSICAL EXPERIENCE DESCRIPTORS

(71) Applicant: Amper Music, Inc., New York, NY (US)

(72) Inventor: Andrew H. Silverstein, New York, NY (US)

(73) Assignee: AMPER MUSIC, INC., New York, NJ (US)

( * ) Notice: Subject to any disclaimer, the term of this patent is extended or adjusted under 35 U.S.C. 154(b) by 45 days.

(21) Appl. No.: 15/489,672

(22) Filed: Apr. 17, 2017

(65) Prior Publication Data
US 2017/0263225 A1 Sep. 14, 2017

Related U.S. Application Data

(63) Continuation of application No. 14/869,911, filed on Sep. 29, 2015, now Pat. No. 9,721,551.

(51) Int. Cl.
*G10H 1/00* (2006.01)
*G06N 20/00* (2019.01)
(Continued)

(52) U.S. Cl.
CPC ........... *G10H 1/0025* (2013.01); *G06N 7/005* (2013.01); *G06N 20/00* (2019.01); *G06N 99/005* (2013.01); *G10H 1/00* (2013.01); *G10H 1/368* (2013.01); *G10L 25/15* (2013.01); *G10H 2210/021* (2013.01); *G10H 2210/066* (2013.01); *G10H 2210/105* (2013.01); *G10H 2210/111* (2013.01);
(Continued)

(58) Field of Classification Search
CPC ........ G10H 1/0025; G10H 1/00; G10H 1/368; G06N 7/005
USPC .............................................. 84/609
See application file for complete search history.

(56) References Cited

U.S. PATENT DOCUMENTS 4,108,035 A 8/1978 Alonso
4,178,822 A 12/1979 Alonso
(Continued)

FOREIGN PATENT DOCUMENTS

AU 2002355066 B2 1/2003
IN 419KOLNP2006 A 9/2007
(Continued)

OTHER PUBLICATIONS

"Affective Key Characteristics", from Christian Schubart's "Ideen zu einer Aesthetik der Tonkunst" (1806), translated by Rita Steblin in A History of Key Characteristics in the 18th and Early 19th Centuries, UMI Research Press (1983), and republished at http://www.wmich.edu/mus-theo/courses/keys.html, 3 Pages.
(Continued)

*Primary Examiner* — David S Warren
(74) *Attorney, Agent, or Firm* — Thomas J. Perkowski, ESQ., PC

(57) ABSTRACT

A toy musical instrument having a compact housing supporting an automated music composition and generation engine that is driven by icon-based musical experience descriptors and musical style descriptors, selected by a child or adult during a video scoring process.

9 Claims, 105 Drawing Sheets

AUTOMATED MUSIC COMPOSITION AND GENERATION PROCESS

A: SYSTEM USER ACCESSES THE AUTOMATED MUSIC COMPOSITION AND GENERATION SYSTEM OF THE PRESENT INVENTION, AND THEN SELECTS A VIDEO, PODCAST, SLIDESHOW, IMAGE OR EVENT MARKER TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION ENGINE OF THE SYSTEM

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS SCORED ON SELECTED MEDIA OR EVENT MARKERS

D: SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE

E: THE SYSTEM COMBINES THE ACCEPTED COMPOSED MUSIC WITH THE SELECTED MEDIA OR EVENT MARKER SO AS TO CREATE A VIDEO FILE FOR DISTRIBUTION AND DISPLAY

(51) Int. Cl.
   *G06N 7/00*    (2006.01)
   *G06N 99/00*   (2019.01)
   *G10L 25/15*   (2013.01)
   *G10H 1/36*    (2006.01)

(52) U.S. Cl.
   CPC . *G10H 2210/115* (2013.01); *G10H 2210/341* (2013.01); *G10H 2220/101* (2013.01); *G10H 2240/081* (2013.01); *G10H 2240/085* (2013.01); *G10H 2240/131* (2013.01); *G10H 2240/305* (2013.01); *G10H 2250/311* (2013.01)

(56) References Cited

U.S. PATENT DOCUMENTS

| | | | |
|---|---|---|---|
| 4,279,185 A | 7/1981 | Alonso | |
| 4,345,500 A | 8/1982 | Alonso | |
| 4,399,731 A | 8/1983 | Aoki | |
| 4,554,855 A | 11/1985 | Alonso | |
| 4,680,479 A | 7/1987 | Alonso | |
| 4,704,933 A | 11/1987 | Kurakake | |
| 4,731,847 A | 3/1988 | Lybrook | |
| 4,771,671 A | 9/1988 | Hoff | |
| 4,926,737 A | 5/1990 | Minamitaka | |
| 4,982,643 A | 1/1991 | Minamitaka | |
| 5,099,740 A | 3/1992 | Minamitaka | |
| 5,208,416 A | 5/1993 | Hayakawa | |
| 5,315,057 A | 5/1994 | Land | |
| 5,375,501 A | 12/1994 | Okuda | |
| 5,393,926 A | 2/1995 | Johnson | |
| 5,451,709 A | 9/1995 | Minamitaka | |
| 5,453,569 A | 9/1995 | Saito | |
| 5,492,049 A * | 2/1996 | Aoki | G10H 1/0033 84/611 |
| 5,496,962 A | 3/1996 | Meier | |
| 5,679,913 A | 10/1997 | Bruti | |
| 5,696,343 A | 12/1997 | Nakata | |
| 5,723,802 A | 3/1998 | Johnson | |
| 5,736,663 A | 4/1998 | Aoki | |
| 5,736,666 A | 4/1998 | Goodman | |
| 5,753,843 A | 5/1998 | Fay | |
| 5,877,445 A * | 3/1999 | Hufford | G06F 17/30017 707/E17.009 |
| 5,883,326 A | 3/1999 | Goodman | |
| 6,028,262 A | 2/2000 | Minamitaka | |
| 6,051,770 A | 4/2000 | Milburn | |
| 6,072,480 A * | 6/2000 | Gorbet | G06F 17/30017 707/E17.009 |
| 6,075,193 A | 6/2000 | Aoki | |
| 6,084,169 A * | 7/2000 | Hasegawa | G10H 1/0025 84/477 R |
| 6,103,964 A | 8/2000 | Kay | |
| 6,162,982 A | 12/2000 | Aoki | |
| 6,175,072 B1 | 1/2001 | Aoki | |
| 6,252,152 B1 | 6/2001 | Aoki | |
| 6,291,756 B1 | 9/2001 | Urbanek | |
| 6,337,433 B1 | 1/2002 | Nishimoto | |
| 6,363,350 B1 | 3/2002 | Lafe | |
| 6,385,581 B1 | 5/2002 | Stephenson | |
| 6,392,133 B1 | 5/2002 | Georges | |
| 6,395,970 B2 | 5/2002 | Aoki | |
| 6,506,969 B1 | 1/2003 | Baron | |
| 6,545,209 B1 * | 4/2003 | Flannery | G06F 17/30017 707/E17.009 |
| 6,576,828 B2 | 6/2003 | Aoki | |
| 6,606,596 B1 | 8/2003 | Zirngibl | |
| 6,700,048 B1 | 3/2004 | Terada | |
| 6,746,246 B2 | 6/2004 | Cliff | |
| 6,747,201 B2 | 6/2004 | Birmingham | |
| 6,756,533 B2 | 6/2004 | Aoki | |
| 6,765,997 B1 | 7/2004 | Zirngibl | |
| 6,822,153 B2 | 11/2004 | Comair | |
| 6,865,533 B2 | 3/2005 | Addison | |
| 6,888,999 B2 | 5/2005 | Herberger | |
| 6,897,367 B2 | 5/2005 | Leach | |
| 6,963,839 B1 | 11/2005 | Ostermann | |
| 6,969,796 B2 | 11/2005 | Sasaki | |
| 7,022,907 B2 | 4/2006 | Lu | |
| 7,058,428 B2 * | 6/2006 | Yamaki | G10H 1/0025 455/412.2 |
| 7,115,808 B2 | 10/2006 | Lu | |
| 7,250,567 B2 | 7/2007 | Gayama | |
| 7,396,990 B2 | 7/2008 | Lu | |
| 7,424,682 B1 | 9/2008 | Pupius | |
| RE40,543 E | 10/2008 | Aoki | |
| 7,491,878 B2 | 2/2009 | Orr | |
| 7,498,504 B2 | 3/2009 | Bourgeois | |
| 7,582,823 B2 | 9/2009 | Kim | |
| 7,605,323 B2 | 10/2009 | Ishii | |
| 7,693,746 B2 | 4/2010 | Wachi | |
| 7,720,934 B2 | 5/2010 | Yanase | |
| 7,754,955 B2 * | 7/2010 | Egan | G09B 15/023 84/464 R |
| 7,754,959 B2 | 7/2010 | Herberger | |
| 7,790,974 B2 | 9/2010 | Sherwani | |
| 7,792,782 B2 | 9/2010 | Yun | |
| 7,792,834 B2 | 9/2010 | Sorensen | |
| 7,884,274 B1 | 2/2011 | Wieder | |
| 7,902,447 B1 | 3/2011 | Abrego | |
| 7,917,148 B2 | 3/2011 | Rosenberg | |
| 7,919,707 B2 | 4/2011 | Harvey | |
| 8,022,287 B2 | 9/2011 | Yamashita | |
| 8,026,436 B2 | 9/2011 | Hufford | |
| 8,053,659 B2 | 11/2011 | Ricard | |
| 8,229,935 B2 | 7/2012 | Lee | |
| 8,259,192 B2 | 9/2012 | Nair | |
| 8,271,354 B2 | 9/2012 | Deguchi | |
| 8,354,579 B2 * | 1/2013 | Park | G06F 17/30029 707/754 |
| 8,357,847 B2 | 1/2013 | Huet | |
| 8,359,382 B1 | 1/2013 | Gailloux | |
| 8,489,606 B2 | 7/2013 | Lee | |
| 8,631,358 B2 | 1/2014 | Louch | |
| 8,644,971 B2 | 2/2014 | Weinstein | |
| 8,660,849 B2 | 2/2014 | Gruber | |
| 8,670,979 B2 | 3/2014 | Gruber | |
| 8,706,503 B2 | 4/2014 | Cheyer | |
| 8,710,343 B2 | 4/2014 | Kellett | |
| 8,798,438 B1 * | 8/2014 | Yagnik | G11B 27/10 386/241 |
| 8,799,000 B2 | 8/2014 | Guzzoni | |
| 8,874,026 B2 | 10/2014 | Anstandig | |
| 8,892,446 B2 | 11/2014 | Cheyer | |
| 8,903,716 B2 | 12/2014 | Chen | |
| 8,921,677 B1 | 12/2014 | Severino | |
| 8,930,191 B2 | 1/2015 | Gruber | |
| 8,942,986 B2 | 1/2015 | Cheyer | |
| 8,996,538 B1 * | 3/2015 | Cremer | G06F 17/30864 707/749 |
| 9,042,921 B2 | 5/2015 | Karmarkar | |
| 9,117,447 B2 | 8/2015 | Gruber | |
| 9,165,255 B1 * | 10/2015 | Shetty | G06N 7/005 |
| 9,213,747 B2 | 12/2015 | Cremer | G06F 17/30864 |
| 9,318,108 B2 | 4/2016 | Gruber | |
| 9,361,869 B2 | 6/2016 | Rex | |
| 9,613,654 B2 | 4/2017 | Cameron | |
| 9,679,305 B1 | 6/2017 | Bhat | |
| 9,721,551 B2 | 8/2017 | Silverstein | |
| 9,753,925 B2 * | 9/2017 | Cremer | G06F 17/30864 |
| 9,799,312 B1 | 10/2017 | Cabral | |
| 2001/0007960 A1 | 7/2001 | Yoshihara | |
| 2001/0025561 A1 | 10/2001 | Milburn | |
| 2001/0047717 A1 | 12/2001 | Aoki | |
| 2002/0000156 A1 | 1/2002 | Nishimoto | |
| 2002/0002899 A1 | 1/2002 | Gjerdingen | |
| 2002/0007720 A1 | 1/2002 | Aoki | |
| 2002/0007721 A1 | 1/2002 | Aoki | |
| 2002/0007722 A1 | 1/2002 | Aoki | |
| 2002/0011145 A1 | 1/2002 | Aoki | |
| 2002/0017188 A1 | 2/2002 | Aoki | |
| 2002/0023529 A1 | 2/2002 | Kurakake | |
| 2002/0029685 A1 | 3/2002 | Aoki | |
| 2002/0035915 A1 | 3/2002 | Tolonen | |

(56) References Cited

U.S. PATENT DOCUMENTS

| | | |
|---|---|---|
| 2002/0134219 A1 | 9/2002 | Aoki |
| 2002/0193996 A1 | 12/2002 | Squibbs |
| 2003/0013497 A1* | 1/2003 | Yamaki ............... G10H 1/0025 455/567 |
| 2003/0037664 A1 | 2/2003 | Comair |
| 2003/0089216 A1 | 5/2003 | Birmingham |
| 2003/0131715 A1 | 7/2003 | Georges |
| 2003/0160944 A1* | 8/2003 | Foote .................... G03B 31/00 352/1 |
| 2003/0183065 A1 | 10/2003 | Leach |
| 2003/0205124 A1* | 11/2003 | Foote .................... G10G 1/00 84/608 |
| 2004/0024822 A1 | 2/2004 | Werndorfer |
| 2004/0025668 A1 | 2/2004 | Jarrett |
| 2004/0027369 A1 | 2/2004 | Kellock |
| 2004/0089140 A1 | 5/2004 | Georges |
| 2004/0089141 A1 | 5/2004 | Georges |
| 2004/0159213 A1 | 8/2004 | Eruera |
| 2005/0076772 A1 | 4/2005 | Gartland-Jones |
| 2005/0091278 A1 | 4/2005 | Wang |
| 2005/0109194 A1 | 5/2005 | Gayama |
| 2005/0223071 A1 | 10/2005 | Hosono |
| 2006/0011044 A1 | 1/2006 | Chew |
| 2006/0015560 A1 | 1/2006 | MacAuley |
| 2006/0059236 A1 | 3/2006 | Sheppard |
| 2006/0122840 A1 | 6/2006 | Anderson |
| 2006/0212818 A1 | 9/2006 | Lee |
| 2006/0230910 A1* | 10/2006 | Song .................... G10H 1/0025 84/616 |
| 2006/0236848 A1 | 10/2006 | Stone |
| 2007/0137463 A1 | 6/2007 | Lumsden |
| 2007/0208990 A1 | 9/2007 | Kim |
| 2007/0221044 A1 | 9/2007 | Orr |
| 2008/0010372 A1 | 1/2008 | Khedouri |
| 2008/0141850 A1 | 6/2008 | Cope |
| 2008/0156178 A1 | 7/2008 | Georges |
| 2008/0189171 A1 | 8/2008 | Wasserblat |
| 2008/0212947 A1* | 9/2008 | Nesvadba ............... G11B 27/28 386/291 |
| 2008/0235285 A1 | 9/2008 | Della Pasqua |
| 2008/0288095 A1 | 11/2008 | Miyajima |
| 2009/0069914 A1* | 3/2009 | Kemp .................. G10H 1/0008 700/94 |
| 2009/0071315 A1 | 3/2009 | Fortuna |
| 2009/0114079 A1* | 5/2009 | Egan ................... G09B 15/023 84/477 R |
| 2009/0217805 A1 | 9/2009 | Lee |
| 2009/0238538 A1* | 9/2009 | Fink .................... G11B 27/034 386/278 |
| 2009/0249945 A1* | 10/2009 | Yamashita ............. G10H 1/368 84/612 |
| 2009/0291707 A1* | 11/2009 | Choi .................... H04N 5/2257 455/556.1 |
| 2009/0316862 A1 | 12/2009 | Sugimoto |
| 2010/0043625 A1 | 2/2010 | Van Geenen |
| 2010/0050854 A1 | 3/2010 | Huet |
| 2010/0131895 A1* | 5/2010 | Wohlert ................ H04L 65/604 715/811 |
| 2010/0212478 A1 | 8/2010 | Taub |
| 2010/0224051 A1 | 9/2010 | Kurebayashi |
| 2010/0250510 A1 | 9/2010 | Herberger |
| 2010/0250585 A1* | 9/2010 | Hagg ................... G06F 17/30781 707/769 |
| 2010/0257995 A1 | 10/2010 | Kamiya |
| 2010/0305732 A1 | 12/2010 | Serletic |
| 2010/0307320 A1 | 12/2010 | Hoeberechts |
| 2010/0307321 A1 | 12/2010 | Mann |
| 2011/0010321 A1 | 1/2011 | Pachet |
| 2011/0142420 A1* | 6/2011 | Singer ................. G06F 17/30017 386/280 |
| 2011/0184542 A1* | 7/2011 | Tsoneva ............. G06F 17/30056 700/94 |
| 2011/0224969 A1 | 9/2011 | Mulligan |
| 2011/0273455 A1 | 11/2011 | Powar |
| 2011/0276396 A1 | 11/2011 | Rathod |
| 2012/0259240 A1 | 10/2012 | Llewellynn |
| 2012/0312145 A1 | 12/2012 | Kellett |
| 2013/0006627 A1 | 1/2013 | Guthery |
| 2013/0110505 A1 | 5/2013 | Gruber |
| 2013/0110519 A1 | 5/2013 | Cheyer |
| 2013/0185081 A1 | 7/2013 | Cheyer |
| 2014/0000440 A1 | 1/2014 | Georges |
| 2014/0052282 A1 | 2/2014 | Balassanian |
| 2014/0058735 A1 | 2/2014 | Sharp |
| 2014/0069263 A1 | 3/2014 | Chen |
| 2014/0139555 A1 | 5/2014 | Levy |
| 2014/0174279 A1 | 6/2014 | Wong |
| 2014/0301573 A1* | 10/2014 | Kiely .................... G11B 27/031 381/119 |
| 2014/0344718 A1 | 11/2014 | Rapaport |
| 2015/0017915 A1 | 1/2015 | Hennequin |
| 2015/0026578 A1* | 1/2015 | Rav-Acha ......... G06F 17/30056 715/723 |
| 2015/0058733 A1* | 2/2015 | Novikoff ............. G11B 27/031 715/723 |
| 2015/0059558 A1 | 3/2015 | Morell |
| 2015/0179157 A1 | 6/2015 | Chon |
| 2015/0194185 A1* | 7/2015 | Eronen ................ H04N 21/233 386/279 |
| 2015/0206523 A1 | 7/2015 | Song |
| 2015/0234833 A1* | 8/2015 | Cremer ............... G06F 17/3053 707/626 |
| 2015/0255052 A1 | 9/2015 | Rex |
| 2015/0293925 A1 | 10/2015 | Greenzeiger |
| 2015/0317391 A1 | 11/2015 | Harrison |
| 2015/0317690 A1 | 11/2015 | Mishra |
| 2015/0319479 A1* | 11/2015 | Mishra ............... G06Q 30/0277 725/32 |
| 2015/0331943 A1* | 11/2015 | Luo .................... G06F 17/30817 707/722 |
| 2016/0055838 A1 | 2/2016 | Serletic, II |
| 2016/0071549 A1* | 3/2016 | von Sneidern ...... G11B 27/031 386/241 |
| 2016/0080835 A1* | 3/2016 | von Sneidern ...... G11B 27/031 386/282 |
| 2016/0124953 A1* | 5/2016 | Cremer ............. G06F 17/30864 715/203 |
| 2016/0133242 A1 | 5/2016 | Morell |
| 2016/0148605 A1 | 5/2016 | Minamitaka |
| 2016/0148606 A1 | 5/2016 | Minamitaka |
| 2016/0267944 A1* | 9/2016 | Lammers ................. H04N 5/76 |
| 2017/0092247 A1 | 3/2017 | Silverstein |
| 2017/0092324 A1* | 3/2017 | Leonard ............. G11B 27/031 |
| 2017/0103740 A1* | 4/2017 | Hwang ............... G10H 1/0025 |
| 2017/0188102 A1* | 6/2017 | Zhang ................ H04N 21/4662 |
| 2017/0229030 A1* | 8/2017 | Aguayo, Jr. ........... G09B 5/065 |
| 2017/0263225 A1 | 9/2017 | Silverstein |
| 2017/0263226 A1 | 9/2017 | Silverstein |
| 2017/0263227 A1 | 9/2017 | Silverstein |
| 2017/0263228 A1 | 9/2017 | Silverstein |
| 2017/0358285 A1 | 12/2017 | Cabral |
| 2017/0358320 A1* | 12/2017 | Cameron ......... G11B 20/10527 |
| 2018/0018948 A1 | 1/2018 | Silverstein |
| 2018/0025004 A1* | 1/2018 | Koenig ............. G06F 17/30029 715/748 |
| 2018/0076913 A1* | 3/2018 | Kiely .................... G11B 27/031 |
| 2018/0136612 A1* | 5/2018 | Zayets-Volshin .... G04G 13/026 |
| 2018/0192108 A1* | 7/2018 | Lyons ............... G06F 17/30828 |

FOREIGN PATENT DOCUMENTS

| | | |
|---|---|---|
| IN | 1369MUM2011 A | 8/2011 |
| WO | 1997021210 A1 | 6/1997 |
| WO | 2006071876 A2 | 7/2006 |
| WO | 2007106371 A2 | 9/2007 |
| WO | 2012136599 A1 | 10/2012 |
| WO | 2012150602 A1 | 11/2012 |
| WO | 2013003854 A2 | 1/2013 |
| WO | 2012150602 A8 | 1/2014 |
| WO | 2013003854 A3 | 5/2014 |

(56) References Cited

FOREIGN PATENT DOCUMENTS

| WO | 2014068309 A1 | 5/2014 |
|---|---|---|
| WO | 2014166953 A1 | 10/2014 |
| WO | 2017058844 A1 | 4/2017 |

OTHER PUBLICATIONS

"Characteristics of Musical Keys," a selection of information from the Internet about the emotion or moodassociated with musical keys, published at http://biteyourownelbow.com/keychar.htm, on Oct. 14, 2009, 6 Pages.

Joel Douek, "Music and Emotion—A Composer's Perspective", vol. 7, Article 82, Frontiers in Systems Neuroscience, Nov. 2013,4 Pages.

Kris Goffin, "Music Feels Like Moods Feel", vol. 5, Article 327, Frontiers in Psychology, Apr. 2014, 4 Pages.

Patrik N. Juslin, Daniel Vastfjall, Emotional Responses to Music: The Need to Consider Underlying Mechanisms, Behavioral and Brain Sciences, 2008, pp. 559-621, vol. 31, Cambridge University Press.

Paul Nelson, "Talking About Music—A Dictionary" (Version Sep. 1, 2005), published at http://www.composertools.com/Dictionary/, 50 Pages.

Website Pages from Audio Network Limited, covering the directory structure of its Production Music Database Prganized by Musical Styles, Mood/Emotion, Instrumentation, Production Genre, Album Listing and Artists & Composers, https://www.audionetwork.com, 7 Pages.

Alex Rodriguez Lopez, Antonio Pedro Oliveira, and Amilcar Cardosa, "Real-Time Emotion-Driven Music Engine", Centre for Informatics and Systems, University of Coimbra, Portugal, Conference Paper, Jan. 2010, published in ResearchGate on Jun. 2015, 6 Pages.

Alper Gungormusler, Natasa Paterson-Paulberg, and Mads Haahr, "barelyMusician: An Adaptive Music Engine for / Video Games", AES 56th International Conference, London, UK, Feb. 11-13, 2015, published in ResearchGate Feb. 2015, 9 Pages.

International Search Report and Written Opinion of the International Searching Authority, dated Feb. 7, 2017 PCT/US2016/054066, 37 Pages.

Maia Hoeberechts, Ryan Demopoulos and Michael Katchabaw, "A Flexible Music Composition Engine", Department of Computer Science, Middlesex College, The University of Western Ontario, London, Ontario, Canada, published in Audio Mostly 2007, 2nd Conference on Interaction with Sound, Conference Proceedings, Sep. 27-28, 2007, Rontgenbau, Ilmenau, Germany, Fraunhofer Institute for Digital Media Technology IDMT, 6 Pages.

Ryan Demopoulos and Michael Katchabaw, "MUSIDO: A Framework for Musical Data Organization to Support Automatic Music Composition", Department of Computer Science, The University of Western Ontario, London, Ontario Canada, published in Audio Mostly 2007, 2nd Conference on Interaction with Sound, Conference Proceedings, Sep. 27-28, 2007, Rontgenbau, Ilmenau, Germany, Fraunhofer Institute for Digital Media Technology IDMT, 6 Pages.

Alexis John Kirke, and Eduardo Reck Miranda, Artificial Social Composition: A Multi-Agent system for Composing Music Performances by emotional Communication, 2009, Interdisciplinary Center for Computer Music Research, University of Plymouth, UK, 19 Pages.

Alison Mattek, Computational Methods for Portraying Emotion in Generative Music Composition, May 2010, Undergraduate Thesis, Department of Music Engineering, University of Miami, Miami, Florida, 62 Pages.

Anthony Prechtl, Robin Laney, Alistair Willis, Robert Samuels, Algorithmic Music as Intelligent Game Music, Apr. 2014, published in AISB50: The 50th Annual Convention of the AISB, 1^1 Apr. 2014, London, UK, Pages.

Bernard A. Hutchins Jr., Walter H. Ku, A Simple Hardware Pitch Extractor, JAES, Mar. 1, 1982,vol. 30 issue 3, pp. 135-139, Audio Engineering Society Inc., Ithaca, New York, 5 Pages.

Bill Manaris, Dana Hughes, Yiorgos Vassilandonakis, Monterey Mirror: Combining Markov Models, Genetic Algorithms, and Power Laws, Computer Science Department, College of Charleston, SC, USA, appearred in Proceedings of 1st Workshop in Evolutionary Music, 2011 IEEE Congress on Evolutionary Computation (CEC 2011), New Orleans, LA, USA, Jun. 5, 2011, pp. 33-40, 8 Pages total.

Bongjun Kim, Woon Seung Yeo, Probabilistic Prediction of Rhythmic Characteristics in Markov Chain-Based Melodic Sequences, 2013 Graduate School of Culture Technology, Korea Republic, published in 2013 ICMC Idea, pp. 29-432, 4 Pages total.

Brit Cruise, Real Time Control of Emotional Affect in Algorithmic Music, May 31, 2010, 20 pages, britcruise.com.

Cambridge Innovation Capital Press Release, "Cambridge Innovation Capital Leads Follow-On Funding Round for Digital Music Creator Jukedeck", Dec. 7, 2015, Cambridge University, Cambridge England, 3 Pages.

Caroline Palmer, Sean Hutchins, What is Musical Prosody, Psychology of Learning and Motivation, 2005, 63 pages, vol. 46, Elsevier Press, Montreal, Canada.

Cheng Long, Raymond Chi-Wing Wong, Raymond Ka Wai Sze, A Melody Composer Based on Frequent Pattern Mining, 2013, 4 pages, The Hong Kong University of Science and Technology, Hong Kong.

Chih-Fang Huang, Wei-Gang Hong, Min-Hsuan Li, A Research of Automatic Composition and Singing Voice Synthesis System for Taiwanese Popular Songs, published in Proceedings ICMC, 2014, Sep. 4-20, 2014, Athens, Greece, 6 Pages.

Chih-Fang Huang, En-Ju Lin, An Emotion-Based Method to Perform Algorithmic Composition, Jun. 2013, 4 Pages, Department of Information Communications, Kainan University, Taiwan.

Christopher Ariza, An Open Design for Computer-Aided Algorithmic Music Composition: athenaCL, 2005, New York University, NY, NY, published on Dissertation.com, Boca Raton, Florida, 2005 (ISBN 1-58112-292-6), 25 Pages.

Christopher Ariza, Navigating the Landscape of Computer Aided Algorithmic Composition Systems: a Definition, Seven Descriptors, and a Lexicon of Systems and Research, New York University, New York, New York, published as MIT Open Course Ware, 21M.380 Music and Technology: Algorithmic and Generative MusicSpring, 2010, 8 Pages total.

Chunyang Song, Marcus Pearce, Christopher Harte, Synpy: A Python Toolkit for Syncopation Modelling, 2015, Queen Mary, University of London, London UK, 6 Pages.

Claudio Galmonte, Dimitrij Hmeljak, Study for a Real-Time Voice-to-Synthesized-Sound Converter, 1996, 6 Pages, University of Trieste, Italy.

Dave Phillips, Finlay, Ohio, USA, Review of Henrich K. Taube: Notes from the Metalevel: Introduction to Algorithmic Music Composition (2004), published in Computer Music Journal (CMJ), vol. 26, Issue 3,2005 Fall, The MIT Press, Cambridge, MA, at http://www.computermusicjournal.org/reviews/29-3/phillips-taube.html, 3 Pages.

David Cope, Experiments in Music Intelligence (EMI), University of California, Santa Cruz, 1987, ICMC Proceedings, pp. 174-181, 8 Pages.

David Cope, Techniques of the Contempory Composer, Schirmer Thomson Learning, 1997, two-page scanned, 123 Pages Total.

Donya Quick, Kulitta: A Framework for Automated Music Composition, Dec. 2014, 229 pages, Yale University, US.

Donya Quick, Paul Hudak, Grammar-Based Automated Music Composition in Haskell, 2013, 12 pages, Yale University, USA.

Donya Quick, Paul Hudak, Grammar-Based Automated Music Composition in Haskell, 2013, 20 pages, Department of Computer Science, Yale University, USA.

G. Scott Vercoe, Moodtrack: Practical Methods for Assembling Emotion-Driven Music, 2006, 86 pages, Massachusetts Institute of Technology, Massachusetts.

(56) References Cited

OTHER PUBLICATIONS

George Sioros, Carlos Guedes, Automatic Rhythmic Performance in Max/MSP: the kin.rythmicator, published in 2011 International Conference on New Interfaces for Musical Expression, Oslo, Norway, May 30-Jun. 1, 2011, 4 Pages total.
Guilherme Ludwig, Topics in Statistics: Extracting Patterns in Music for Composition via Markov Chains, May 11, 2012, 18 pages, University of Wisconsin, US.
Gustavo Diaz-Jerez, Algorithmic Music: Using mathematical Models in Music Composition, Aug. 2000, 284 Pages, The Manhattan School of Music, New York.
Hanna Jarvelainen, Algorithmic Musical Composition, Apr. 7, 2000, 12 pages, Helsinki University of Technology, Finland.
Heinrich Konrad Taube, Notes from the Metalevel: An Introduction to Computer Composition, first published online by Swets Zeitlinger Publishing on Oct. 5, 2003 at http://www.moz.ac.at/sem/lehre/lib/bib/software/cm/ Notes from the Metalevel/intro.html, then later by Routledge (Taylor & Francis) in 2005 (ISBN 10: 9026519575 ISBN 13: 9789026519574 Hardcover), 313 Pages.
Heinrich Taube, An Introduction to Common Music, Computer Music Journal, Spring 1997, vol. 21, MIT Press, USA, pp. 29-34.
Horacio Alberto Garcia Salaa, Alexander Gelbukh, Hiram Calvo, Fernando Gal In Do Soria, Automatic Music Compositon with Simple Probabilistic Generative Grammars, Polibits, 2011 ,vol. 44, pp. 57-63, Center for Technological Design and Development in Computer Science, Mexico City, Mexico.
Horacio Alberto Garcia Salas, Alexander Gelbukh, Musical Composer Based on Detection of Typical Patterns in a Human Composer's Style, 2006, 6 pages, Mexico.
Iannis Xenakis, Formalized Music: Thought and Mathematics in Composition, Pendragon Press, 1992, 201 scanned pages.
Jacob M. Peck, Explorations in Algorithmic Composition: Systems of Composition and Examination of Several Original Works, Oct. 2011, 63 pages.
James Harkins, A Practical Guide to Patterns, 2009, 72 paes, Supercollider.
Joel L. Carbonera, Joao L. T. Silva, An Emergent Markovian Model to Stochastic Music Composition, 2008, 10 Pages, University of Caxias do Sul, Brazil.
John Brownlee, Can Computers Write Music That Has a Soul?, Aug. 2013, 11 pages, FastCompany.
John J. Dubnowski, Ronald W. Schafer, Lawrence R. Rabiner, Real-Time Digital Hardware Pitch Detector, vol. 24, IEEE IEEE Transactions on Acoustics, Speech, and Signal Processing, Feb. 1976, 7 pages.
Jon Sneyers, Danny De Schreye, Apopcaleaps: Automatic Music Generation with CHRiSM, 2010, 8 pages, K.U. Leuven, Belgium.
Kento Watanabe et al, Modeling Structural Topic Transitions for Automatic Lyrics Generation, PACLIC 28,2014, pp. 422-431, Graduate School of Information Sciences Tohoku University, Japan, 10 Pages.
Kristine Monteith, Tony Martinez and Dan Ventura, "Automatic Generation of Melodic Accompaniments for Lyrics", 2012, Proceedings of the Third International Conference on Computational Creativity, pp. 87-94, 15 Pages.
Kristine Monteith, Virginia Francisco, Tony Martinez, Pablo Gervas Dan Ventura, Automatic Generation of Music for Inducing Emotive Response, Computer Science Department, Brigham Young University, Proceedings of the First International Conference on Computational Creativity, 2010, pp. 140-149, 10 Pages.
Kristine Monteith, Virginia Francisco, Tony Martinez, Pablo Gervas and Dan Ventura, Automatic Generation of Emotionally-Targeted Soundtracks, 2011 Proceedings of the Second International Conference on Computational Creativity, pp. 60-62, 3 Pages.
Kurt Kleiner, Is that Mozart or a Machine? Software can Compose Music in Classical, Pop, or Jazz Styles, Dec. 16, 2011, 1 page, Phys.org.
Leon Harkleroad, The Math Behind Music, Aug. 2006, 139 pages, Cambridge University Press, UK.
Lorenzo J. Tardon, Carles Roig, Isabel Barbancho, Ana M Barbancho, Automatic Melody Composition Based on a Probabilistic Model of Music Style and Harmonic Rules, Aug. 2014, Knowledge Based Systems.
M D Plumbley, S A Abdallah, Automatic Music Transcription ans Audio Source Separation, 2001,20 pages, Dept of Electronic Engineering, University of London, London.
Marco Scirea, Mark J. Nelson, and Julian Togelius, "Moody Music Generator: Characterizing Control Parameters Using Crowsourcing", published in 2015 Proceedings of the 4th Conference on Evolutionary and Biologically Inspired Music, Sound, Art and Design, and republished at http://julian.togelius.com/Scirea2015Moody.pdf, 12 Pages.
Michael C. Mozer, Todd Soukup, Connectionist Music Composition Based on Melodic and Stylistic Constraints, 1990, 8 pages, Department of Computer Science and Institute of Cognitive Science, University of Colorado, Boulder Colorado.
Michael Chan, John Potter, Emery Shubert, Improving Algorithmic Music Composition with Machine Learning, 9th International Conference on Music Perception and Cognition, Aug. 2006, pp. 1848-1854, University of New South Wales, Sydney, Australia.
Michael Kamp, Andrei Manea, Stones: Stochastic Technique for Generating Songs, Jan. 2013, 6 pages, Fraunhofer Institute for Intelligent Analysis Information Systems, Germany.
Miguel Febrer et al, Aneto: A Tool for Prosody Analysis of Speech, 1998,4 pages, Polytechnic University of Catalunya, Barcelona, Spain.
Miguel Haruki Yaimaguchi, An Extensible Tool for Automated Music Generation, May 2011,108 pages, Department of Computer Science, Lafayette College, Pennsylvania.
Owen Dafydd Jones, Transition Probabilities for the Simple Random Walk on Seirpinski Graph, Stochastic Processes and Their Applications, 1996, pp. 45-69, Elsevier.
Patricio Da Silva, David Cope and Experiments in Musical Intelligence, 2003, Spectrum Press, 86 Pages.
Paul Doornbusch, Gerhard Nierhaus: Algorithmic Composition: Paradigms of Automated Music Generation (Review), CMJ Reviews, 2012, 5 pages, vol. 34 Issue 3 Reviews, Computer Music Journal, Melbourne, Australia.
Philippe Martin, A Tool for Text to Speech Alignment and Prosodic Analysis, 2004,4 pages, Paris University, Paris, France.
Pop Music Automation, Mar. 8, 2016,4 Pages, on Wikipedia, at https://en.wikipedia.org/wiki/Pop_music_automation Last modified on Dec. 27, 2015, at 14:34.
Rebecca Dias, A Mathematical Melody: An Introduction to Fractals and Music, Dec. 10, 2012, 26 pages, Trinity University.
Ricardo Miguel Moreira Da Cruz, Emotion-Based Music Composition for Virtual Environments, Apr. 2008, 121 pages, Technical University of Lisbon, Lisbon, Portugal.
Robert Cookson, "Jukedeck's computer composes music at the touch of a button", published in The Financial Times Ltd, on Dec. 7, 2015, 3 Pages.
Robert Plutchik, Plutchik Wheel of Emotions, 1980.
Roger B. Danneberg, Course Outline for "Week 5—Music Generation and Algorithmic Composition", Carnegie Mellon University (CMU), Spring 2014, 29 Pages.
Roger Dannenberg, Music Generation and Algorithmic Composition, Spring 2014, Carnegie Mellon University, Pennsylvania, 29 Pages.
Ruoha Zhou, Feature Extraction of Musical Content, for Automatic Music Transcription, Oct. 2006, 169 pages, Federal Institute of Technology, Lausanne.
Satoru Fukayama et al, Automatic Song Composition from the Lyrics Exploiting Prosody of Japanese Language, 2010, 4 pages, The University of Tokyo, Nagoya Institute of Technology, Japan.
Simone Hill, Markov Melody Generator, Computer Science Department, University of Massachusetts Lowell, Published on Dec. 11, 2011, at http://www.cs.uml.edu/ecg/pub/uploads/Alfall11/SimoneHill.FinalPaper.MarkovMelodyGenerator.pdf, 4 Pages.
Siwei Qin et al, Lexical Tones Learning with Automatic Music Composition System Considering Prosody of Mandarin Chinese, 2010, 4 pages, Graduate School of Information Science and Technology, The University of Tokyo, Japan.

(56) References Cited

OTHER PUBLICATIONS

Steve Engels, Fabian Chan, and Tiffany Tong, Automatic Real-Time Music Generation for Games, 2015, 3 Pages, Department of Computer Science, Department of Engineering Science, and Department of Mechanical and ndustrial Engineering, Toronto, Ontario, Canada.
Steve Rubin, Maneesh Agrawala, Generating Emotionally Relevant Musical Scores for Audio Stories, UIST 2014, Oct. 2014, pp. 439-448.
Thomas M. Fiore, Music and Mathematics, University of Michigan, 2004, published on http://www-personal.umd.Umich.edu/~tmfiore/1/musictotal.pdf, 36 Pages.
Virginia Francisco, Raquel Hervas, EmoTag: Automated Mark Up of Affective Information in Texts, Department of Software Engineering and Artificial intelligence, Complutense University, Madrid, Spain, published at http://nil.fdi.ucm.es/sites/default/files/FranciscoHervasDCEUROLAN2007.pdf, 2007, 8 Pages.
Yu-Hao Chin, Chang-Hong Lin, Ernestasia Siahaan, Jia-Ching Wang, Music Emotion Detection Using Hierarchical Sparse Kernel Machines, 2014, 8 pages, Hindawi Publishing Corporation, Taiwan.
Supplemental Notice of Allowability dated May 2, 2017 for U.S. Appl. No. 14/869,911; (pp. 1-4).
Office Action dated Jan. 12, 2018 for U.S. Appl. No. 15/489,707; (pp. 1-6).
Notice of Allowanace dated May 23, 2018 for U.S. Appl. No. 15/489,693 (pp. 1-8).
Notice of Allowance dated Aug. 7, 2018 for U.S. Appl. No. 15/489,707 (pp. 1-8).

\* cited by examiner

AUTOMATED MUSIC COMPOSITION AND GENERATION PROCESS

A: SYSTEM USER ACCESSES THE AUTOMATED MUSIC COMPOSITION AND GENERATION SYSTEM OF THE PRESENT INVENTION, AND THEN SELECTS A VIDEO, PODCAST, SLIDESHOW, IMAGE OR EVENT MARKER TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION ENGINE OF THE SYSTEM

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS SCORED ON SELECTED MEDIA OR EVENT MARKERS

D: SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE

E: THE SYSTEM COMBINES THE ACCEPTED COMPOSED MUSIC WITH THE SELECTED MEDIA OR EVENT MARKER SO AS TO CREATE A VIDEO FILE FOR DISTRIBUTION AND DISPLAY

FIG. 2

AUTOMATED MUSICAL COMPOSITION AND GENERATION PROCESS

A: SYSTEM USER ACCESSES THE AUTOMATED MUSICAL COMPOSITION AND GENERATION SYSTEM OF THE PRESENT INVENTION, AND THEN SELECTS A VIDEO, PODCAST, SLIDESHOW, IMAGE OR EVENT MARKER TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION SYSTEM OF THE PRESENT INVENTION

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE

E: THE SYSTEM USER REQUEST THE COMPOSED MUSIC TO BE COMBINED WITH THE SELECTED VIDEO TO CREATE A NEW VIDEO FILE FOR DISTRIBUTION AND DISPLAY

FIG. 6

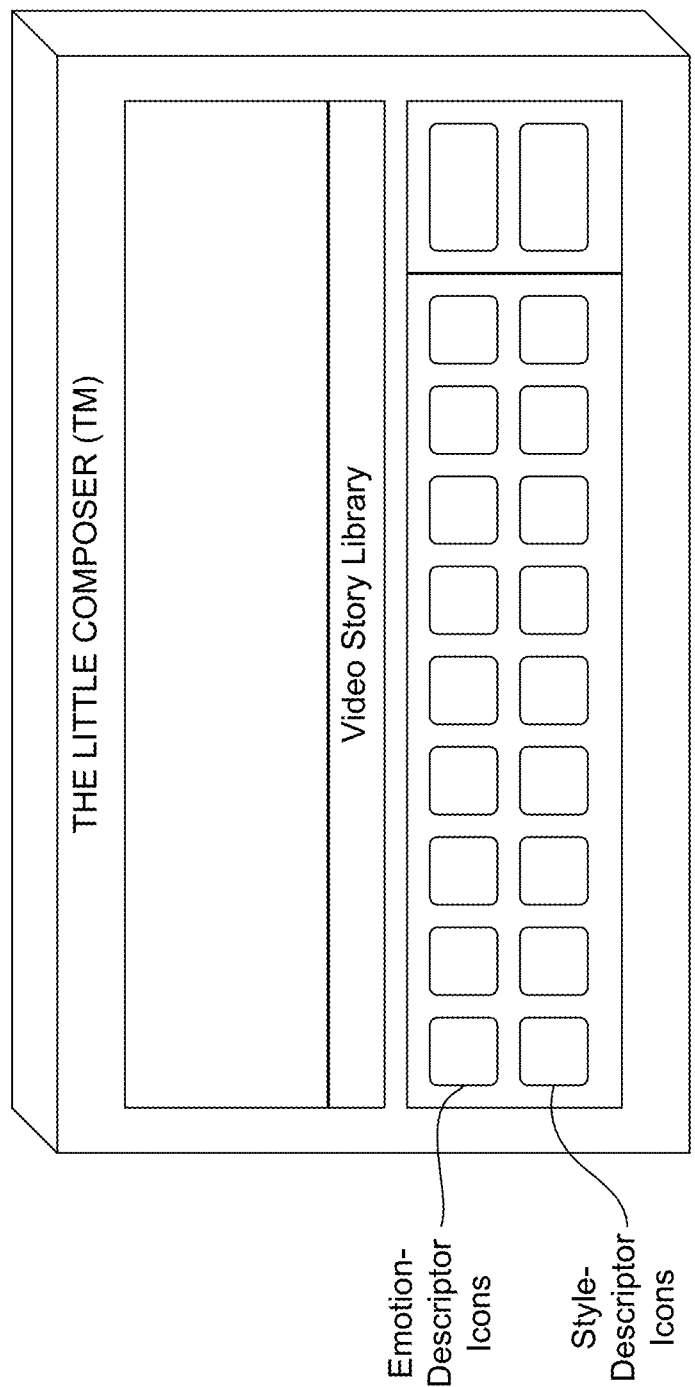

AUTOMATED MUSICAL COMPOSITION AND GENERATION PROCESS

A: SYSTEM USER ACCESSES THE TOY AUTOMATED MUSICAL COMPOSITION AND GENERATION INSTRUMENT SYSTEM OF THE PRESENT INVENTION, AND THEN SELECTS A VIDEO TO BE SCORED WITH MUSIC GENERATED BY THE AUTOMATED MUSIC COMPOSITION AND GENERATION ENGINE WITHIN THE SYSTEM

B: SYSTEM USER SELECTS AND PROVIDES GRAPHICAL ICON-BASED MUSICAL EXPERIENCE DESCRIPTORS TO THE AUTOMATED MUSIC COMPOSITION AND GENERATION ENGINE OF THE SYSTEM

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: THE SYSTEM COMBINES THE COMPOSED MUSIC WITH THE SELECTED VIDEO TO CREATE A NEW VIDEO FILE FOR DISPLAY

FIG. 10

SOC-BASED AUTOMATED MUSICAL COMPOSITION AND GENERATION SYSTEM

A: SOC-BASED AUTOMATED MUSICAL COMPOSITION AND GENERATION SYSTEM IS INTEGRATED WITHIN AN ELECTRONIC SYSTEM THAT THAT USES LINGUISTIC AND/OR GRAPHICAL ICON BASED MUSICAL EXPERIENCE DESCRIPTORS TO SPECIFY MUSIC TO BE COMPOSED AND GENERATED FOR PARTICULAR APPLICATION

B: THE USER OF THE ELECTRONIC SYSTEM PROVIDES LINGUISTIC-BASED AND/OR ICON-BASED MUSICAL EXPERIENCE DESCRIPTORS TO THE SYSTEM INTERFACE OF THE ELECTRONIC SYSTEM, AND THESE MUSICAL EXPERIENCE DESCRIPTORS ARE TRANSMITTED TO THE SOC-BASED AUTOMATED MUSIC COMPOSITION AND GENERATION SYSTEM

C: THROUGH THE SYSTEM INTERFACE OF THE ELECTRONIC SYSTEM, THE SYSTEM USER INITIATES THE AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: THROUGH THE SYSTEM INTERFACE OF THE ELECTRONIC SYSTEM, THE SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE CREATED BY THE PRODUCED MUSIC

E: THROUGH THE SYSTEM INTERFACE OF THE ELECTRONIC SYSTEM, THE SYSTEM USER PROVIDES INSTRUCTIONS TO COMBINE THE COMPOSED MUSIC WITH THE SELECTED VIDEO SO AS TO CREATE A NEW VIDEO FILE FOR DISTRIBUTION AND DISPLAY

FIG. 12

WEB-BASED AUTOMATED MUSICAL COMPOSITION AND GENERATION SYSTEM

A: SYSTEM USER ACCESSES THE AUTOMATED MUSICAL COMPOSITION AND GENERATION SYSTEM OF THE PRESENT INVENTION, AND THEN SELECTS A VIDEO, PODCAST, SLIDESHOW, IMAGE OR EVENT MARKER TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION SYSTEM OF THE PRESENT INVENTION

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE, INCLUDING THE PROVISION OF THE SYSTEM WITH NEW MUSICAL EXPERIENCE DESCRIPTORS, AND RE-COMPOSING BASED ON THE UPDATED MUSICAL EXPERIENCE DESCRIPTOR INPUTS

E: COMBINE COMPOSED MUSIC TO THE SELECTED VIDEO TO CREATE A NEW VIDEO FILE FOR DISTRIBUTION AND DISPLAY

FIG. 14

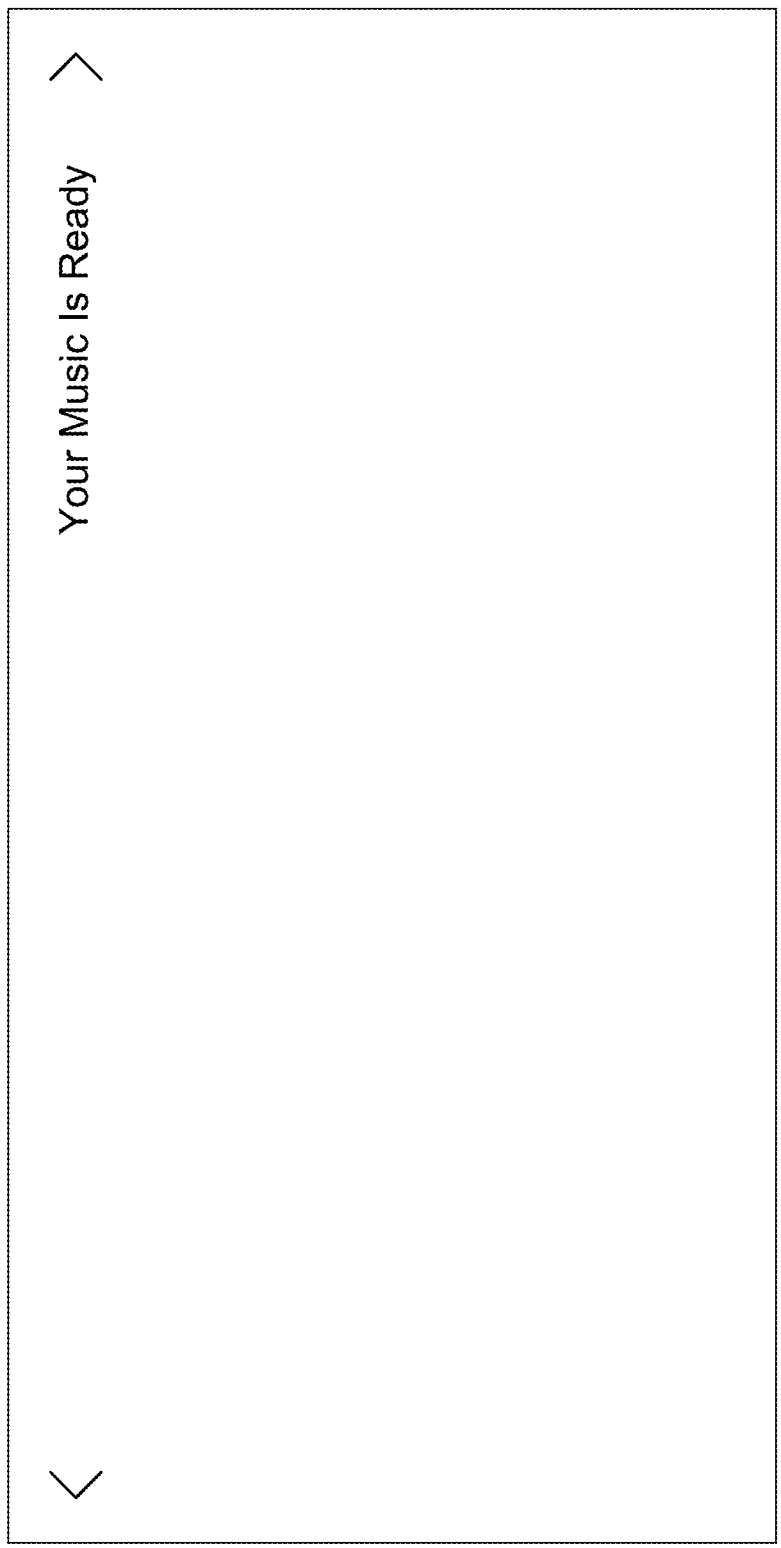

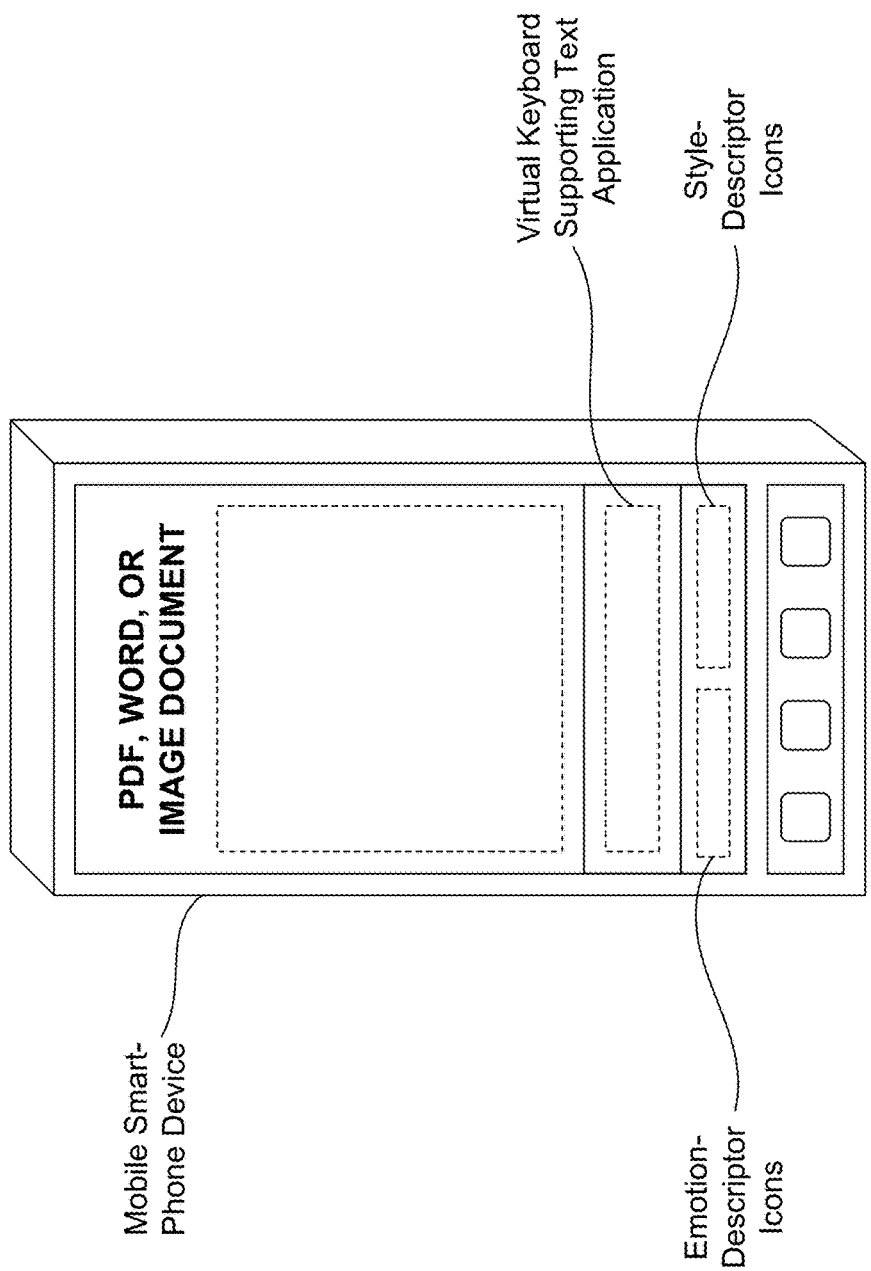

WEB-BASED AUTOMATED MUSICAL COMPOSITION AND GENERATION SYSTEM

A: SYSTEM USER ACCESSES THE AUTOMATED MUSICAL COMPOSITION AND GENERATION SYSTEM OF THE PRESENT INVENTION, AND THEN SELECTS A TEXT, SMS, OR EMAIL MESSAGE OR WORD, PDF OR HTML DOCUMENT TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION SYSTEM OF THE PRESENT INVENTION

C: THE SYSTEM USER INITIATES THE AUTOMATED MUSIC COMPOSITION AND GENERATION SYSTEM TO COMPOSE AND GENERATE MUSIC BASED ON INPUTTED MUSICAL DESCRIPTORS SCORED ON SELECTED MESSAGES OR DOCUMENTS

D: THE SYSTEM USER ACCEPTS COMPOSED AND GENERATED MUSIC PRODUCED FOR THE MESSAGE OR DOCUMENT, OR REJECTS THE MUSIC AND PROVIDES FEEDBACK TO THE SYSTEM, INCLUDING PROVIDING DIFFERENT MUSICAL EXPERIENCE DESCRIPTORS AND RE-COMPOSING MUSIC BASED ON THE UPDATED MUSICAL EXPERIENCE DESCRIPTOR INPUTS

E: THE SYSTEM COMBINES THE ACCEPTED COMPOSED MUSIC WITH THE MESSAGE OR DOCUMENT, SO AS TO CREATE A NEW FILE FOR DISTRIBUTION AND DISPLAY

FIG. 19

AUTOMATED MUSICAL COMPOSITION AND GENERATION INSTRUMENT SYSTEM

A: SYSTEM USER SELECTS EITHER THE LEAD OR FOLLOW MODE OF OPERATION FOR THE AUTOMATED MUSICAL COMPOSITION AND GENERATION INSTRUMENT SYSTEM OF THE PRESENT INVENTION

B: PRIOR TO THE SESSION, THE SYSTEM IS INTERFACED WITH A GROUP OF MUSICAL INSTRUMENTS IN A CREATIVE ENVIRONMENT DURING A MUSICAL SESSION INVOLVING A GROUP MUSICIANS PLAYING THESE MUSICAL INSTRUMENTS

C: DURING THE SESSION, THE SYSTEM RECEIVES AUDIO AND/OR MIDI DATA SIGNALS PRODUCED FROM THE GROUP OF INSTRUMENTS DURING THE SESSION, AND ANALYZES THESE SIGNALS FOR PITCH DATA AND MELODIC STRUCTURE

D: DURING THE SESSION, THE SYSTEM AUTOMATICALLY GENERATES MUSICAL DESCRIPTORS FROM ABSTRACTED PITCH AND MELODY DATA AND PRODUCES MUSICAL EXPERIENCE DESCRIPTORS THAT ARE USED TO COMPOSE MUSIC FOR THE SESSION ON A REAL-TIME BASIS

E: IN THE EVENT THAT THE PERFORM MODE HAS BEEN SELECTED, THE SYSTEM GENERATES THE COMPOSED MUSIC, AND IN THE EVENT THAT THE COMPOSED MODE HAS BEEN SELECTED, THE MUSIC COMPOSED DURING THE SESSION IS STORED FOR SUBSEQUENT ACCESS AND REVIEW BY THE GROUP OF MUSICIANS

FIG. 24

Landscape Categorization

| C0 | Pitch Landscape |
|---|---|

Includes:

| A2 | General Pitch Generation Subsystem |
|---|---|
| A4 | Melody Pitch Generation Subsystem |
| A5 | Orchestration Subsystem |
| A6 | Controller Code Creation Subsystem |

| C1 | Rhythmic Landscape |
|---|---|

Includes:

| A1 | General Rhythm Generation Subsystem |
|---|---|
| A3 | Melody Rhythm Generation Subsystem |
| A5 | Orchestration Subsystem |
| A6 | Controller Code Creation Subsystem |

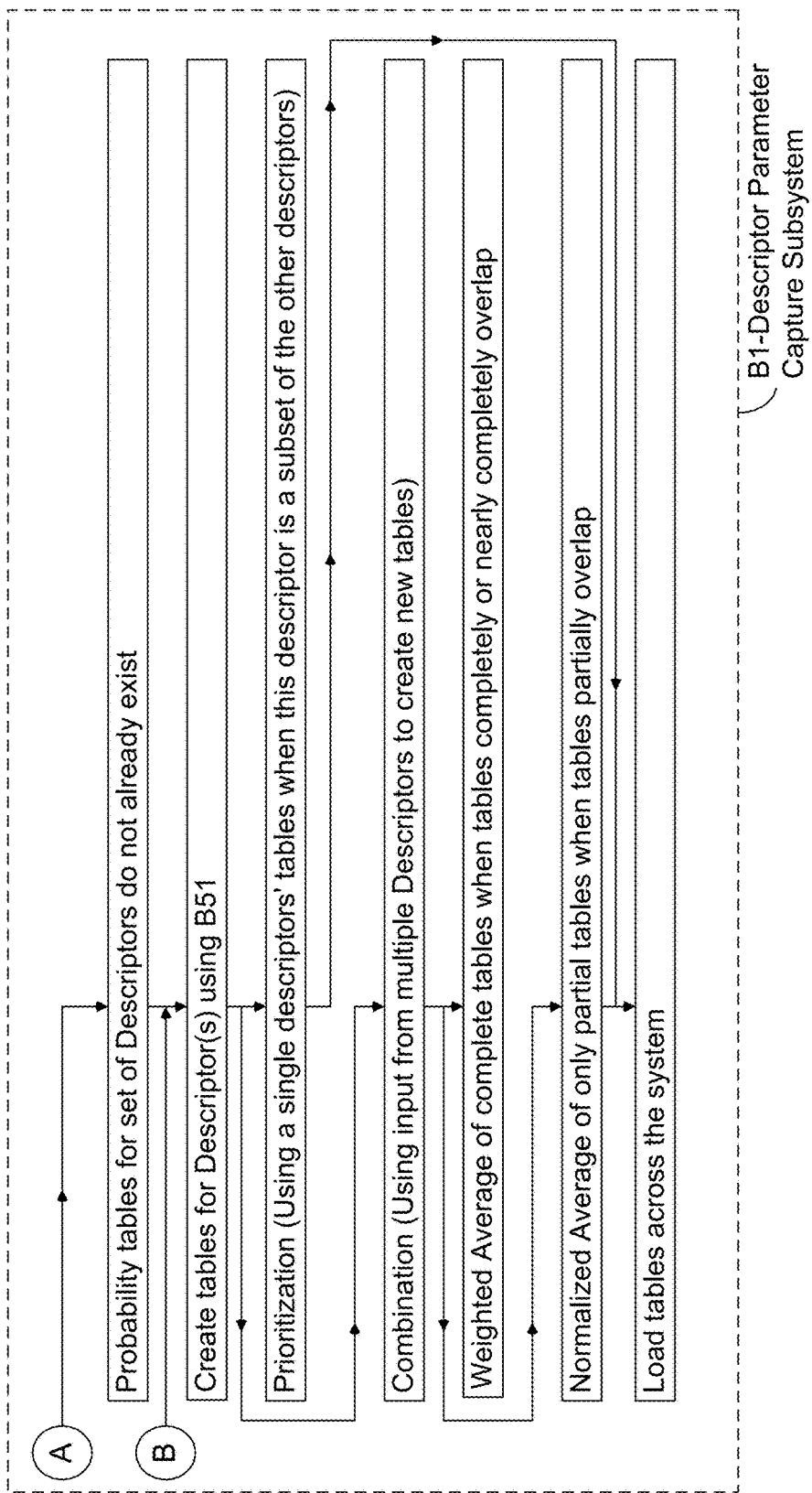
FIG. 27B2

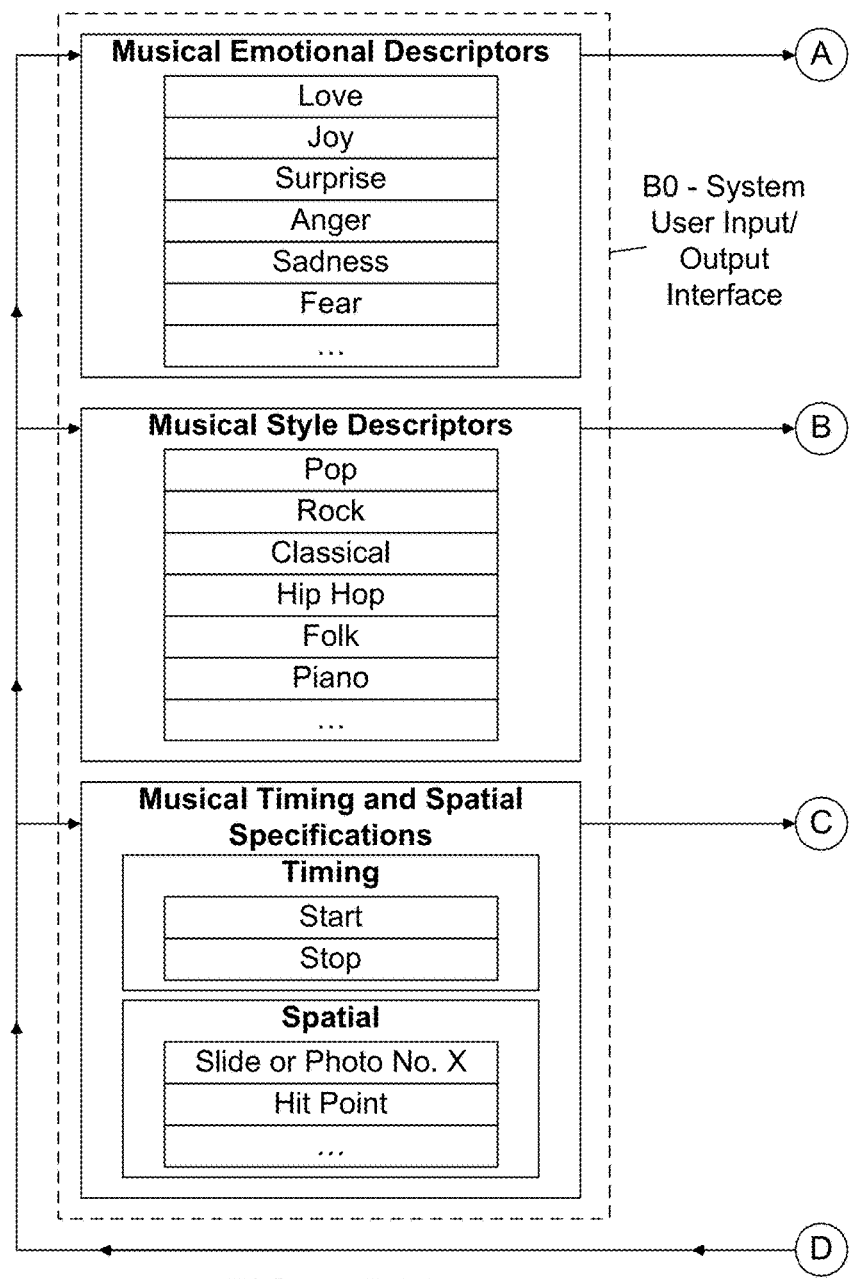
FIG. 27B3A

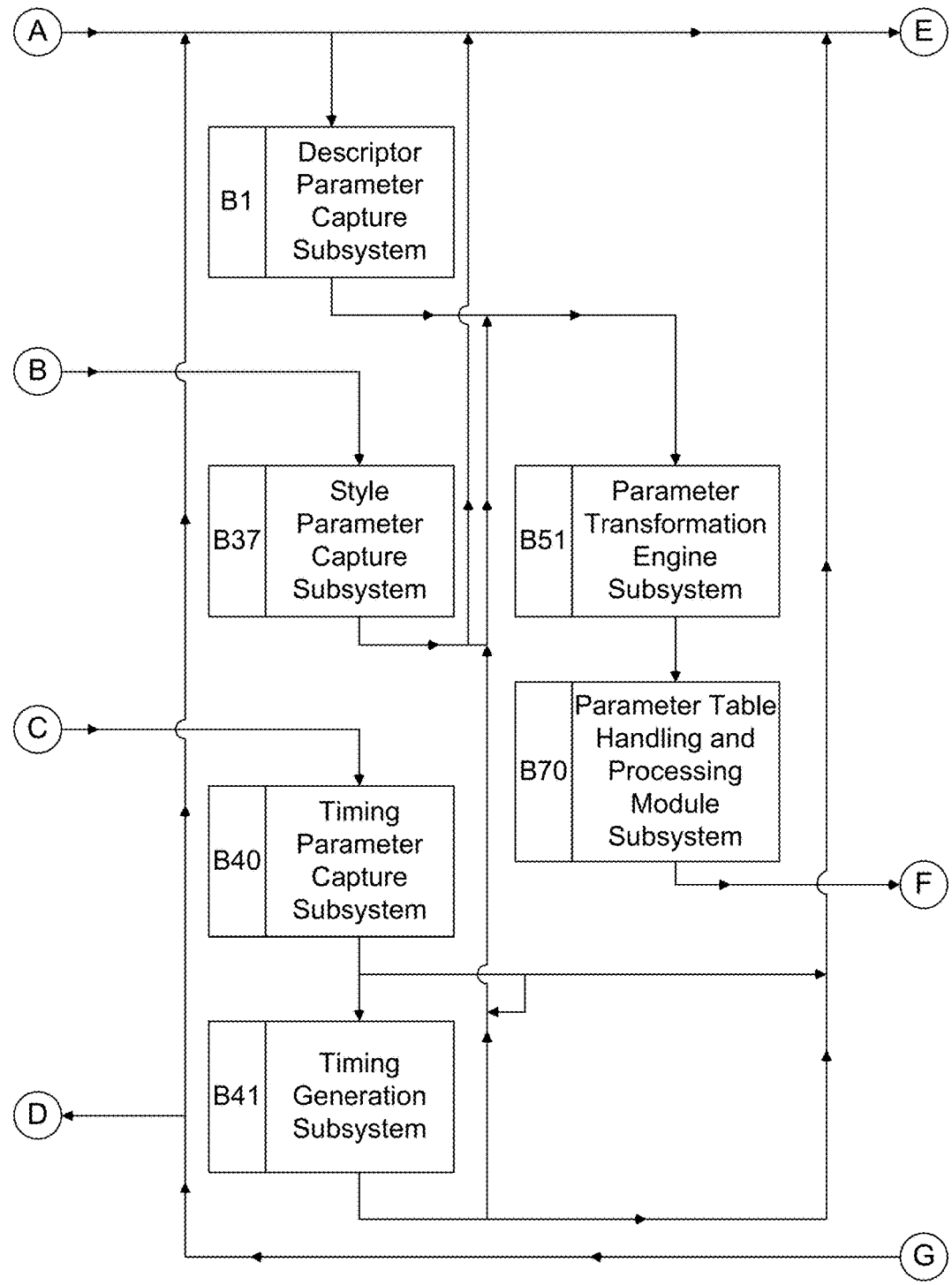
FIG. 27B3B

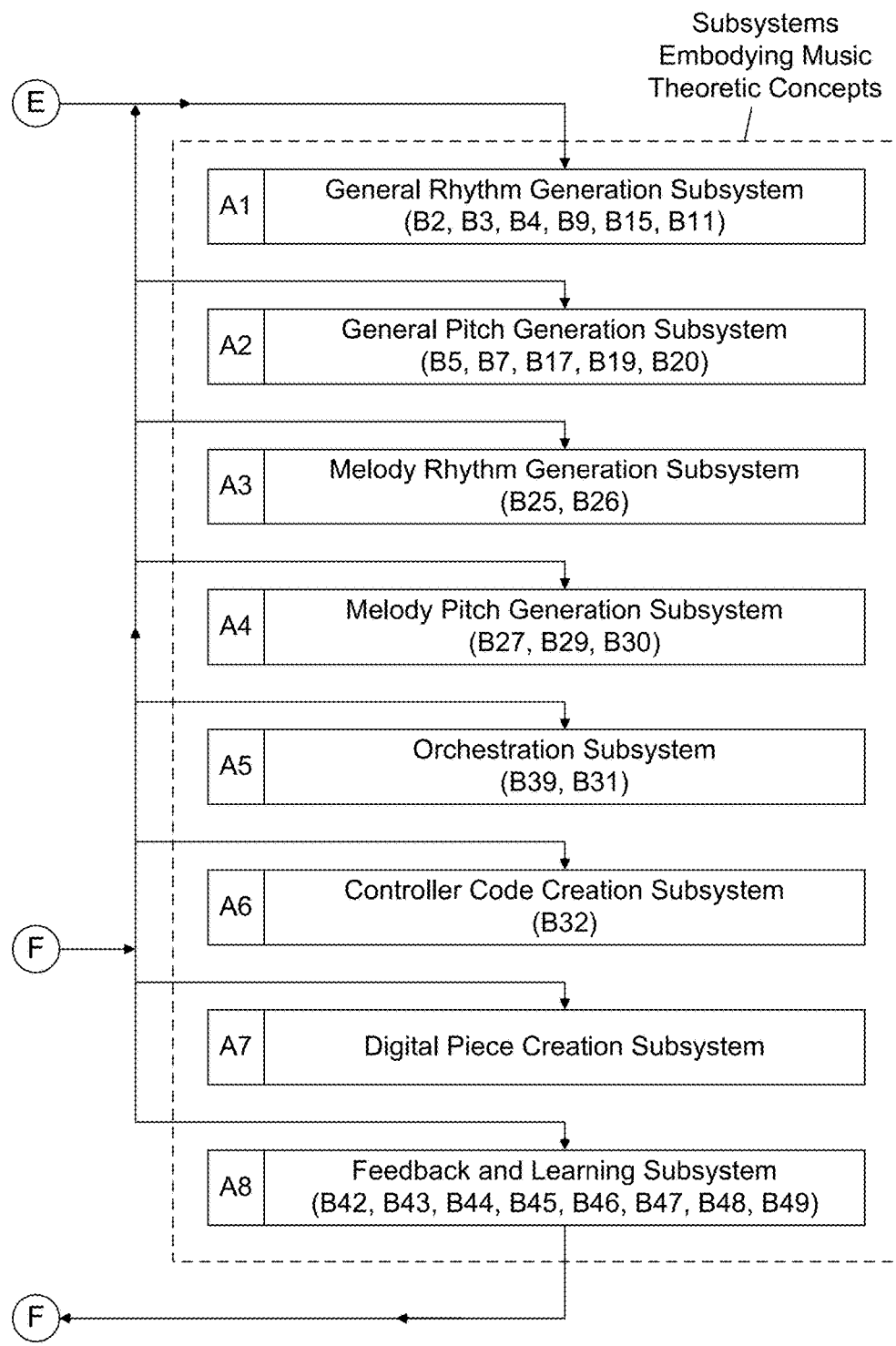
FIG. 27B3C

MAP SPECIFYING LOCATIONS OF PARTICULAR SYSTEM OPERATING PARAMETER (SOP) TABLES

| Subsystems Embodying Music Theoretic Concepts | | Probability-Based System Operating Parameter Tables | | | | |
|---|---|---|---|---|---|---|
| A1 | | | | | | |
| B2 | Length Generation Subsystem | Length | | | | |
| B3 | Tempo Generation Subsystem | Tempo | | | | |
| B4 | Meter Generation Subsystem | Meter | | | | |
| B9 | Song Form Generation Subsystem | Song Form | | | | |
| B15 | Sub-Phrase Length Generation Subsystem | Sub Phrase | Sub Phrase Length | | | |
| B11 | Chord Length Generation Subsystem | Initial Chord Length | Second Chord Length | Third Chord Length | nth Chord Length | |

FIG. 27B4A

| Subsystems Embodying Music Theoretic Concepts | | Probability-Based System Operating Parameter Tables | | |
|---|---|---|---|---|
| A2 | | | | |
| B5 | Key Generation Subsystem | Key | | |
| B7 | Tonality Generation Subsystem | Tonality | | |
| B17 | Initial Chord Generation Subsystem | Initial Root Note | Initial Chord Function | |
| B19 | Sub-Phrase Chord Progression Generation Subsystem | Second Root Note | Second Chord Function | Second Chord Beat Modifier |
| | | nth Root Note | nth Chord Function | nth Chord Beat Modifier |
| B20 | Chord Inversion Generation Subsystem | Initial Chord Inversion | Second Chord Inversion | |
| | | nth Chord Inversion | | |

Probability-Based System Operating Parameter Tables

A3
| | |
|---|---|
| Melody Sub Phrase Length | |

| Initial Melody Note Length | Second Melody Note Length | Third Melody Note Length | Nth Melody Note Length |
|---|---|---|---|

A4
| Initial Melody Pitch | Second Melody Pitch | Second Melody Pitch Chord Modifier | Second Melody Pitch Leap Reversal Modifier | Second Melody Pitch Leap Incentive Modifier |
|---|---|---|---|---|
| | nth Melody Pitch | nth Melody Pitch Chord Modifier | nth Melody Pitch Leap Reversal Modifier | nth Melody Pitch Leap Incentive Modifier |
| | Pitch Octave | nth Pitch Octave | | |

Subsystems Embodying Music Theoretic Concepts

A3
| | |
|---|---|
| B25 | Melody Sub-Phrase Length Generation Subsystem |
| B26 | Melody Note Rhythm Generation Subsystem |

A4
| | |
|---|---|
| B27 | Initial Pitch Generation Subsystem |
| B29 | Sub-Phrase Pitch Generation Subsystem |
| B30 | Pitch Octave Generation Subsystem |

Subsystems Embodying Music Theoretic Concepts

A5

B39 Instrument Selector Subsystem

B31 Orchestration Generation Subsystem

Probability-Based System Operating Parameter Tables

| Instrument Selector | | | | | |
|---|---|---|---|---|---|
| Function | Piano Style | Piano Right Hand | Piano Left Hand | Piano Initial Note Length | |
| Piano Second Note Length | Piano Third Note Length | Piano nth Note Length | Piano Dynamic | nth Instrument Style | |
| nth Instrument Right Hand | nth Instrument Left Hand | nth Instrument Initial Note Length | nth Instrument Second Note Length | | |
| nth Instrument Third Note Length | nth Instrument nth Note Length | nth Instrument Dynamic | | | |

FIG. 27B4D

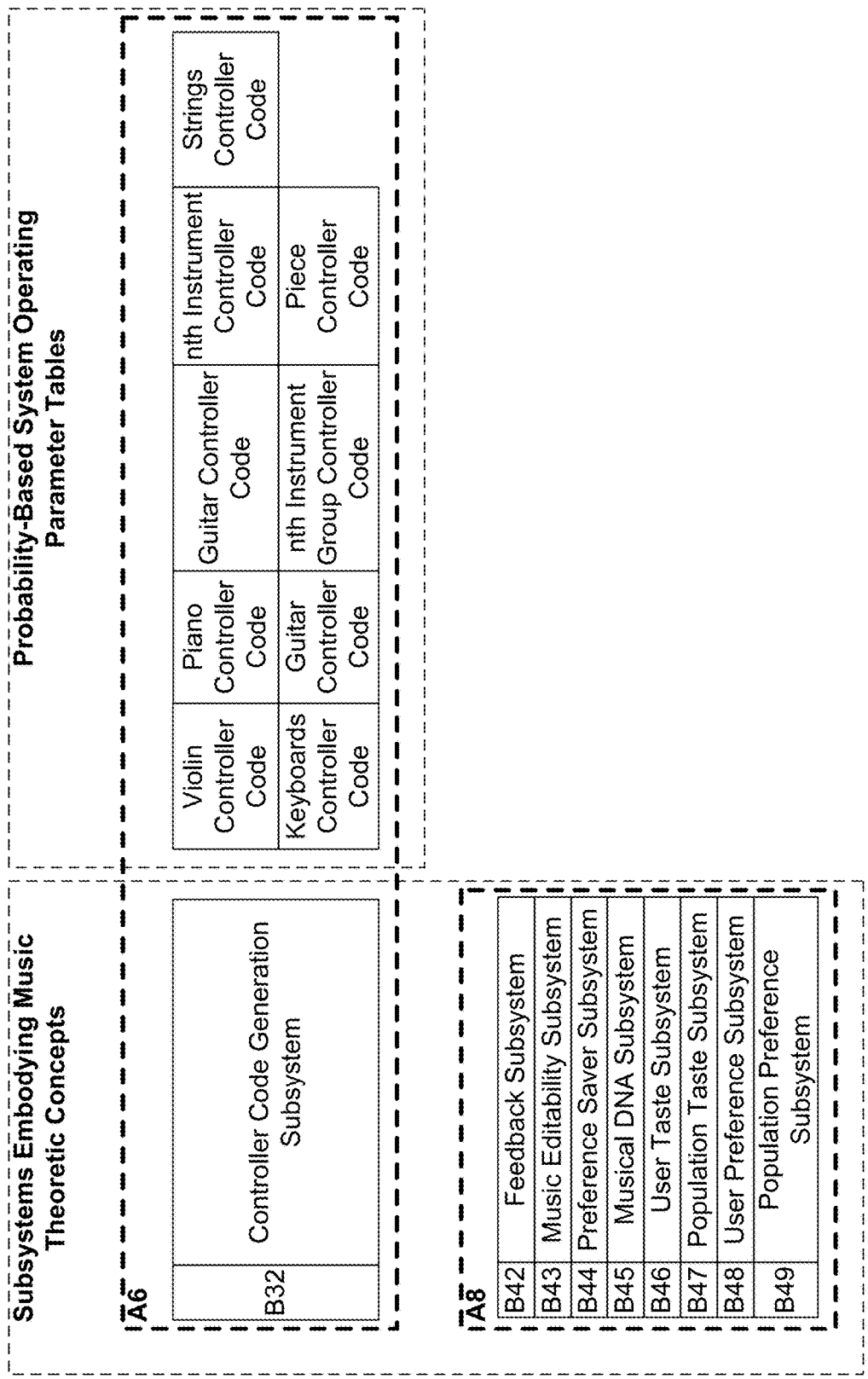
FIG. 27B4E

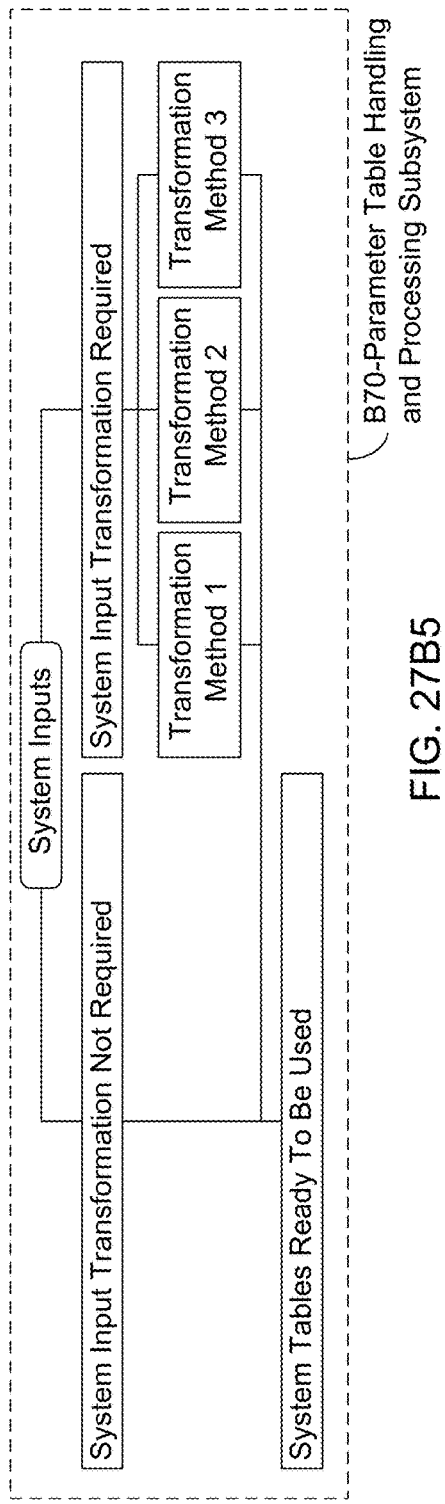
FIG. 27B5
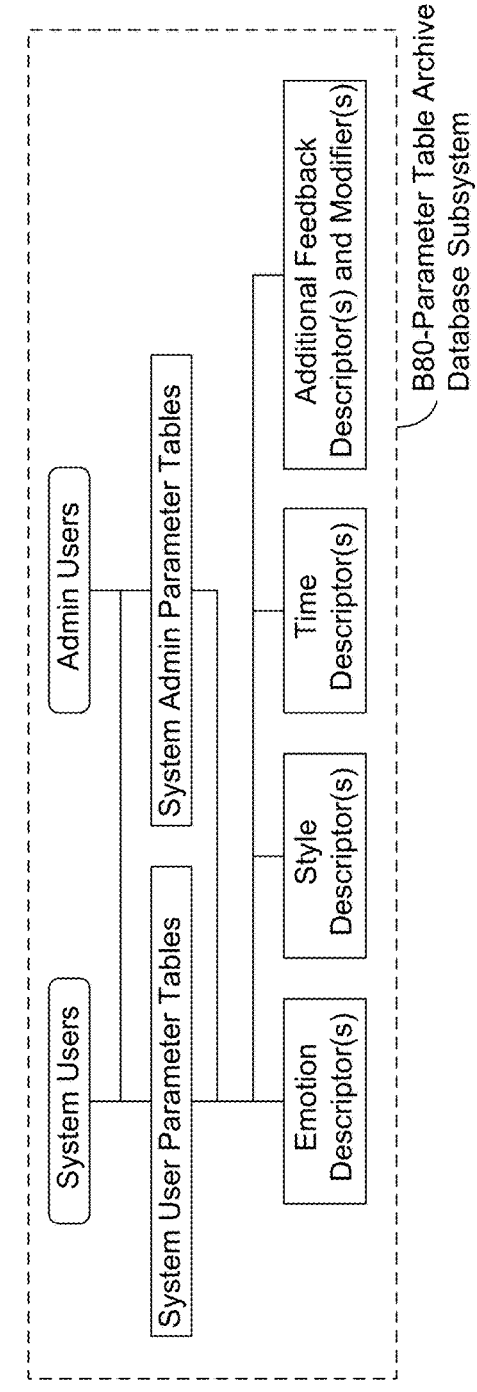
FIG. 27B6

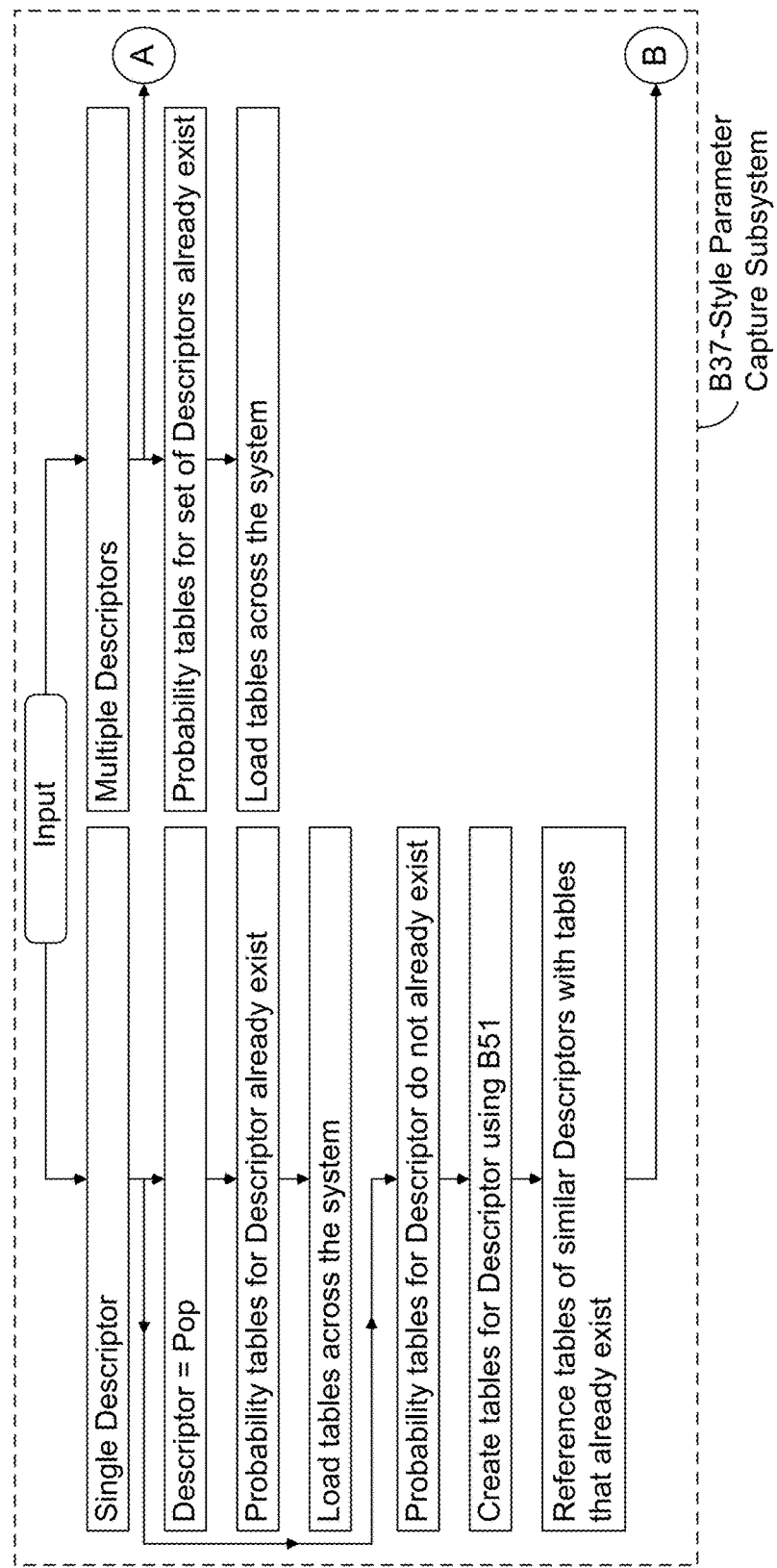
FIG. 27C1

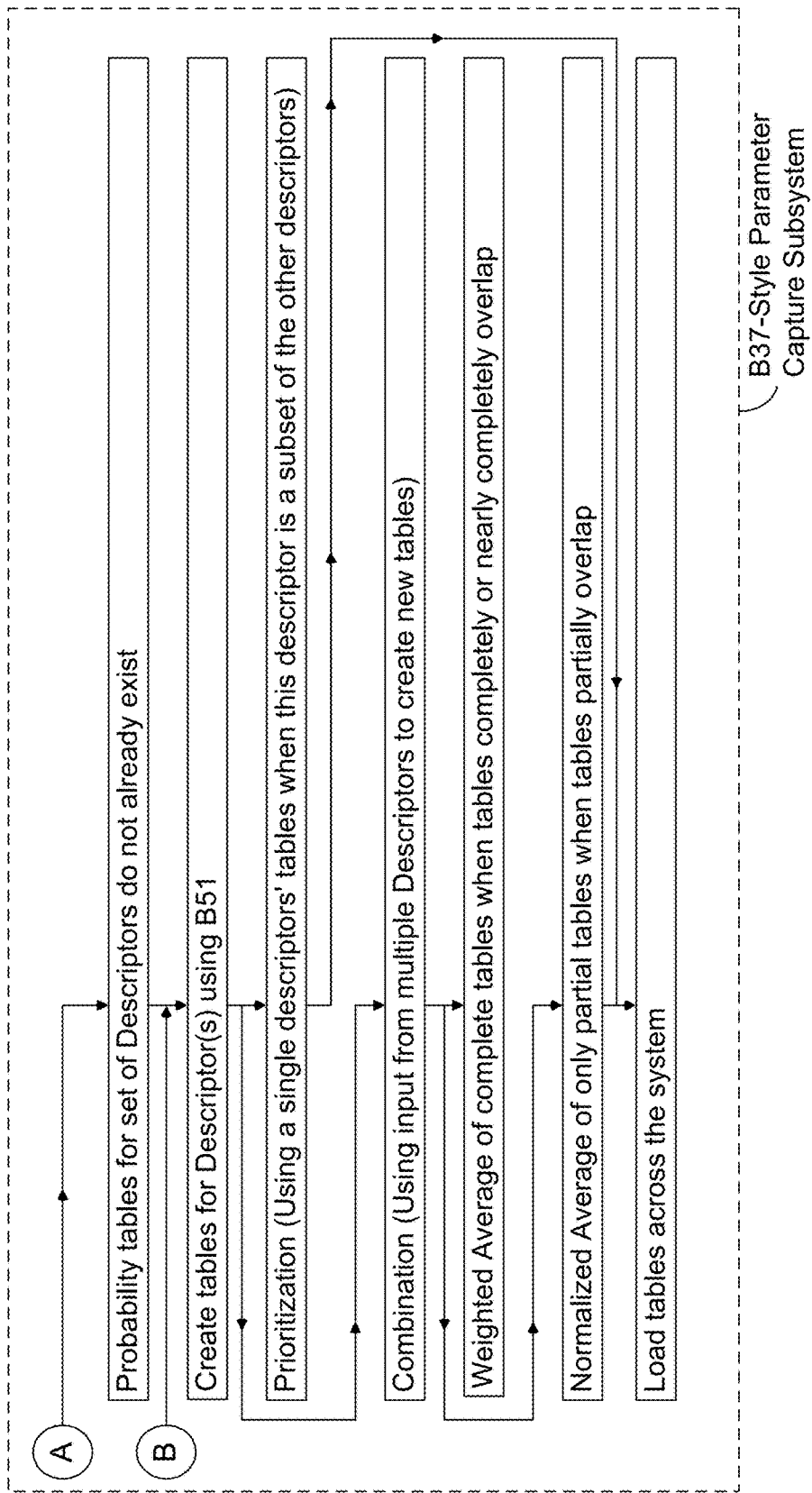
FIG. 27C2

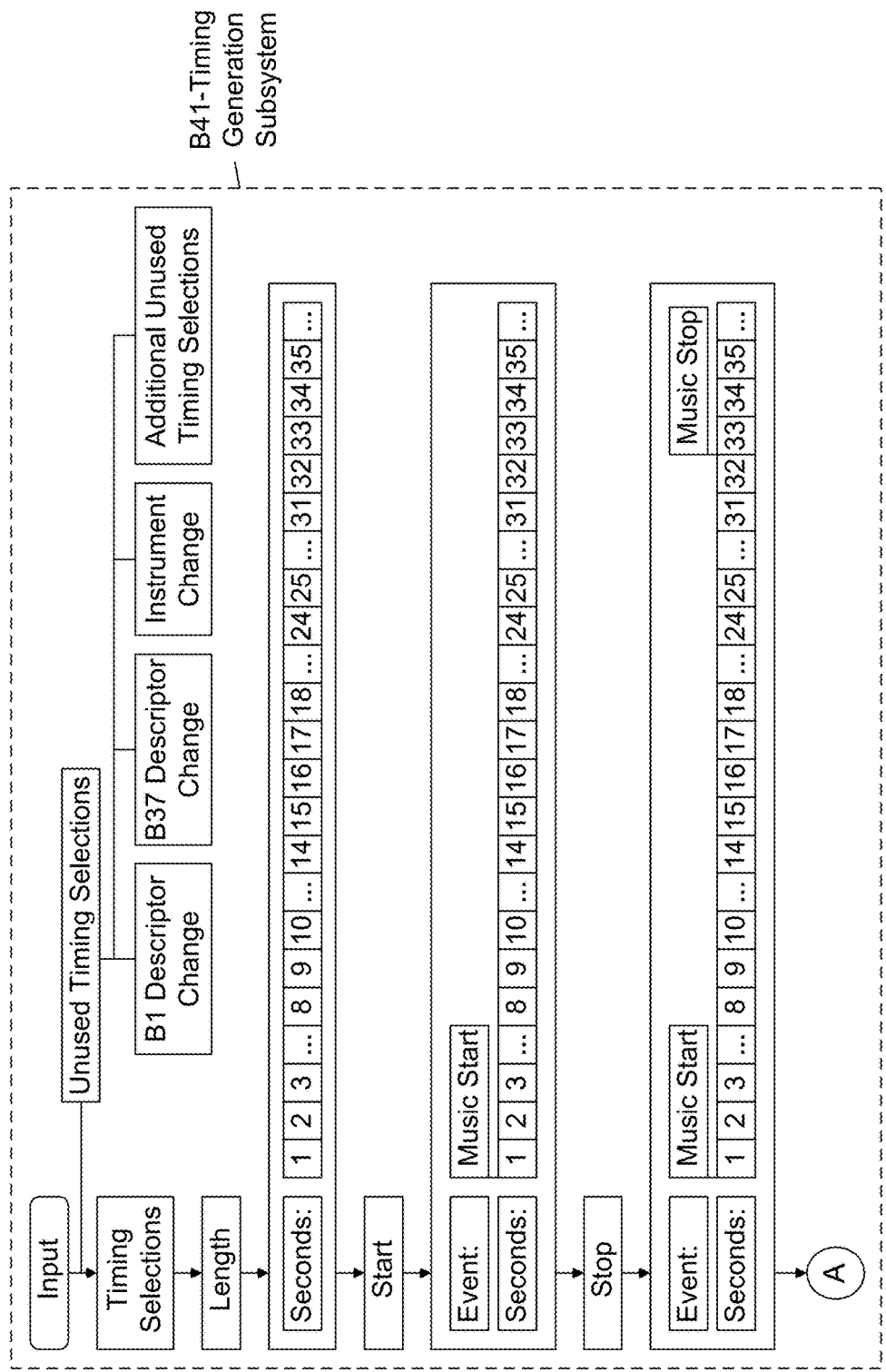
FIG. 27E1

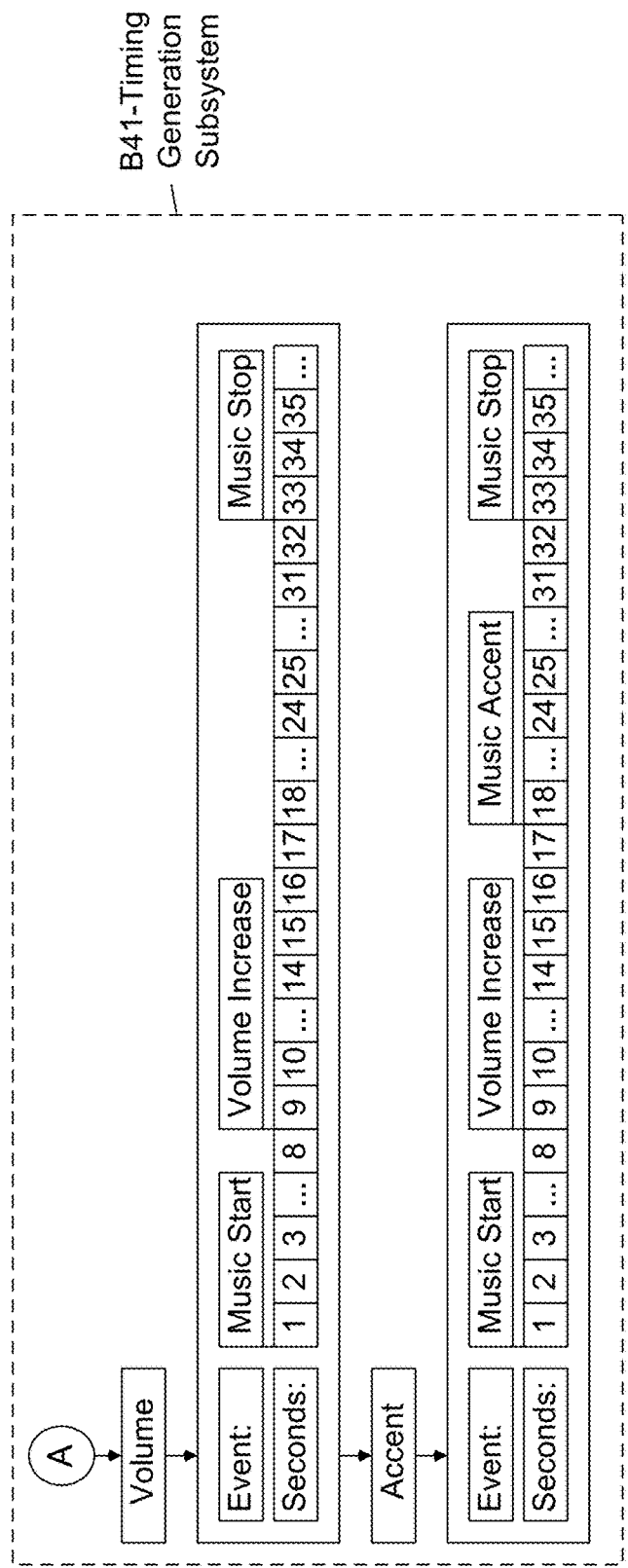
FIG. 27E2

| Format Examples: | |
|---|---|
| Text | Happy, Table, Airplane |
| Chord | C, D, E, F#, G Sharp, Ab, B Flat, Major, Minor |
| Audio File | Wave, MP3, OGG, AIFF |
| Binary | Yes/No, 0/1 |
| Command | Open, Close, Run |
| Meter | 3/4, 4/4, 6/8, 7/8 |
| Image | .PNG, .JPEG, .PDF |
| Time | Day, Hour, Minute, Second, Measure, Beat |
| Pitch | Hertz, Frequency, Note |
| Number | 0,1,2,3,4,5 |
| Tonality | C, D, E, F#, G Sharp, Ab, B Flat, Major, Minor |
| Tempo | Beats Per Minute, 0,1,2,3,4 |
| Letter | A, B, C, D |
| Linguistics | The music should be broad like a bird's wings |
| | The kids are playing on the ground with toys |
| Speech | Audio input, Microphone input, .Wav, .Mp3 |
| MIDI | .MID      .MIDI |

FIG. 28

| Primary | Love | | |
|---|---|---|---|
| Secondary | Affection | Lust | Longing |
| Tertiary | acceptance | arousal | admiration |
| | adoration | Attraction (sexual) | adoration |
| | affection | curious | ambitious |
| | aroused | desire | ardent |
| | attraction | desire | attraction (intellectual) |
| | camaraderie | enthralled | awed |
| | caring | fascinated | eager |
| | compassion | infatuation | enigmatic |
| | compassionate | infatuation | interest |
| | enchanted | lust | Longing |
| | fondness | obsessed | needed |
| | kind | passion | |
| | liking | sensual | |
| | love | sexy | |
| | love | yearning | |
| | loyal | | |
| | passion | | |
| | sensitive | | |
| | sentimentality | | |
| | sweet | | |
| | tenderness | | |

FIG. 29A

| Joy | | | | ... |
|---|---|---|---|---|
| Cheerfulness | Zest | Contentment | Pride | Optimism |
| amusement | crafty | amused | boastful | courageous |
| bliss | enthusiasm | calm | cocky | determined |
| bliss | excitement | collected | confident | eagerness |
| bubbly | exhilaration | comfortable | exuberance | excited |
| cheerfulness | goofy | contentment | Pride | hope |
| delight | lively | delighted | proud | hopeful |
| ecstasy | playful | fulfillment | resolved | innocent |
| ecstatic | spirited | humored | selfish | inspired |
| elation | thrill | inner peace | solemn | optimism |
| enjoyment | zeal | pacified | strong | optimistic |
| euphoria | zest | peaceful | superior | |
| gaiety | zesty | pensive | triumph | |
| gay | | pleased | trust | |
| giddy | | pleasure | zeal | |
| gladness | | pleasure | | |
| glee | | relief | | |
| gleeful | | satisfied | | |
| happiness | | serenity | | |
| happy | | sincerity | | |
| jolliness | | tranquil | | |
| joviality | | warm | | |
| joy | | | | |
| joy | | | | |
| jubilant | | | | |
| jubilation | | | | |
| merry | | | | |
| satisfaction | | | | |
| | | | | |
| | | | | |
| | | | | |
| | | | | |

FIG. 29B

| ...Joy | | Surprise | Anger | ... |
|---|---|---|---|---|
| Enthrallment | Relief | Surprise | Irritation | Exasperation |
| breathless | appreciative | amazement | aggravation | bewildered |
| enthrallment | grateful | astonishment | agitation | crazy |
| euphoric | gratified | enlightened | annoyance | denial |
| hyper | liberated | flabbergasted | cranky | distrustful |
| insanity | mercy | shocked | cynic | Exasperation |
| rapture | relief | surprise | delirious | exhausted |
| wonder | | thrilled | grouchiness | frazzled |
| | | | grouchy | frustration |
| | | | grudging | hysterical |
| | | | grumpiness | overwhelmed |
| | | | hostile | |
| | | | irritability | |
| | | | irritation | |
| | | | perturbation | |
| | | | provoked | |
| | | | tense | |

FIG. 29C

| ...Anger | | | | Sadness ... |
|---|---|---|---|---|
| Rage | Disgust | Envy | Torment | Suffering |
| aggressive | animosity | bitter | anguish | Agony |
| anger | contempt | envy | calamitous | betrayed |
| bitterness | detest | greedy | cruelty | disheartened |
| dislike | Disgust | jealousy | loathsome | distressed |
| enraged | dismal | possessive | submissive | heartbroken |
| ferocity | hate | schadenfreude | torment | homesick |
| furious | obscene | vengeful | troubled | hurt |
| fury | offended | | | hurt |
| hate | resentment | | | longing |
| hostility | revulsion | | | lovesick |
| infuriated | scorn | | | mean |
| irate | | | | miserable |
| loathing | | | | needy |
| mad | | | | pain |
| outrage | | | | suffering |
| outraged | | | | suffering |
| rage | | | | weary |
| resentment | | | | worn-out |
| scorn | | | | |
| spite | | | | |
| vengefulness | | | | |
| vicious | | | | |
| wrath | | | | |
| wrathful | | | | |

FIG. 29D

| ...Sadness | | | | |
|---|---|---|---|---|
| Sadness | Disappointment | Shame | Neglect | Sympathy |
| apathy | bored | cowardly | abandoned | concerned |
| blue | crummy | dopey | alienation | empathic |
| cold | crushed | dreary | contempt | pity |
| dark | dejected | embarrassed | defeat | sympathy |
| Depression | depression | foolish | dejection | |
| despair | disappointment | guilt | discouraged | |
| despair | disapproval | guilty | dispirited | |
| devastated | dismay | humiliated | distracted | |
| down | displeasure | regret | embarrassment | |
| emptiness | hopeless | remorse | homesickness | |
| gloom | jaded | remorse | humiliation | |
| gloomy | lazy | shame | indifference | |
| glumness | pathetic | sheepish | indignation | |
| gray | resignation | | insecurity | |
| grief | sorry | | insult | |
| hopelessness | worthless | | loneliness | |
| lonely | | | neglect | |
| melancholic | | | rejection | |
| melancholy | | | remorse | |
| mellow | | | | |
| misery | | | | |
| pessimistic | | | | |
| sadness | | | | |
| somber | | | | |
| sorrow | | | | |
| sorrow | | | | |
| tired | | | | |
| unhappiness | | | | |
| unhappy | | | | |
| upset | | | | |
| woe | | | | |

FIG. 29E

| Fear | |
|---|---|
| Horror | Nervousness |
| Alarm | alert |
| fear | anticipation |
| fright | anxiety |
| horrified | apprehension |
| horror | cautious |
| hysteria | confused |
| intimidated | distress |
| invidious | dread |
| morbid | expectation |
| mortification | fight-or-flight |
| panic | insecure |
| petrified | nervous |
| shock | nervousness |
| terrified | panicky |
| terror | paranoia |
| threatened | puzzled |
| | scared |
| | shy |
| | stressed |
| | temperamental |
| | tenseness |
| | uncertainty |
| | uneasiness |
| | uneasiness |
| | worried |
| | worry |
| | |
| | |
| | |
| | |
| | |

FIG. 29F

| Base level unique styles that are distilled, alone in combination, from system inputs | Chamber Music |
|---|---|
| Alternative | Chant |
| Art Punk | Choral |
| Alternative Rock | Classical Crossover |
| College Rock | Early Music |
| Experimental Rock | High Classical |
| Goth / Gothic Rock | Impressionist |
| Grunge | Medieval |
| Hardcore Punk | Minimalism |
| Hard Rock | Modern Composition |
| Indie Rock | Opera |
| Lo-fi | Orchestral |
| New Wave | Renaissance |
| Progressive Rock | Romantic |
| Punk | Wedding Music |
| Shoegaze | Comedy |
| Steampunk | Novelty |
| Anime | Standup Comedy |
| Blues | Vaudeville |
| Acoustic Blues | Commercial |
| Chicago Blues | Jingles |
| Classic Blues | TV Themes |
| Contemporary Blues | Country |
| Country Blues | Alternative Country |
| Delta Blues | Americana |
| Electric Blues | Bluegrass |
| Children's Music | Contemporary Bluegrass |
| Lullabies | Contemporary Country |
| Sing-Along | Country Gospel |
| Stories | Country Pop |
| Classical | Honky Tonk |
| Avant-Garde | Outlaw Country |
| Baroque | Traditional Bluegrass |
| | Traditional Country |
| | Urban Cowboy |

FIG. 30A

| | |
|---|---|
| Dance/EDM | Electronic Rock |
| Club / Club Dance | Hardstyle |
| Breakbeat | IDM/Experimental |
| Brostep | Industrial |
| Deep House | Trip Hop |
| Dubstep | Enka |
| Electro House | French Pop |
| Exercise | German Folk |
| Garage | German Pop |
| Glitch Hop | Fitness & Workout |
| Hardcore | Hip-Hop/Rap |
| Hard Dance | Alternative Rap |
| Hi-NRG / Eurodance | Bounce |
| House | Dirty South |
| Jackin House | East Coast Rap |
| Jungle / Drum'n'bass | Gangsta Rap |
| Regstep | Hardcore Rap |
| Techno | Hip-Hop |
| Trance | Latin Rap |
| Trap | Old School Rap |
| Disney | Rap |
| Easy Listening | Turntablism |
| Bop | Underground Rap |
| Lounge | West Coast Rap |
| Swing | Holiday |
| Electronic | Chanukah |
| 8bit | Christmas |
| Ambient | Christmas: Children's |
| Bassline | Christmas: Classic |
| Chiptune | Christmas: Classical |
| Crunk | Christmas: Jazz |
| Downtempo | Christmas: Modern |
| Drum & Bass | Christmas: Pop |
| Electro | Christmas: R&B |
| Electro-swing | Christmas: Religious |
| Electronica | Christmas: Rock |

FIG. 30B

| | |
|---|---|
| Easter | Dixieland |
| Halloween | Ethio-jazz |
| Holiday: Other | Fusion |
| Thanksgiving | Gypsy Jazz |
| Indie Pop | Hard Bop |
| Industrial | Latin Jazz |
| Inspirational – Christian & Gospel | Mainstream Jazz |
| CCM | Ragtime |
| Christian Metal | Smooth Jazz |
| Christian Pop | Trad Jazz |
| Christian Rap | K-Pop |
| Christian Rock | Karaoke |
| Classic Christian | Kayokyoku |
| Contemporary Gospel | Latin |
| Gospel | Alternativo & Rock Latino |
| Christian & Gospel | Argentine tango |
| Praise & Worship | Baladas y Boleros |
| Qawwali | Bossa Nova |
| Southern Gospel | Brazilian |
| Traditional Gospel | Contemporary Latin |
| Instrumental | Flamenco / Spanish Flamenco |
| March (Marching Band) | Latin Jazz |
| J-Pop | Nuevo Flamenco |
| J-Rock | Pop Latino |
| J-Synth | Portuguese fado |
| J-Ska | Raíces |
| J-Punk | Reggaeton y Hip-Hop |
| Jazz | Regional Mexicano |
| Acid Jazz | Salsa y Tropical |
| Avant-Garde Jazz | New Age |
| Bebop | Environmental |
| Big Band | Healing |
| Blue Note | Meditation |
| Contemporary Jazz | Nature |
| Cool | Relaxation |
| Crossover Jazz | Travel |

FIG. 30C

| | |
|---|---|
| Opera | Adult-Oriented Rock |
| Pop | Afro Punk |
| Adult Contemporary | Adult Alternative |
| Britpop | Alternative Rock |
| Bubblegum Pop | American Trad Rock |
| Chamber Pop | Anatolian Rock |
| Dance Pop | Arena Rock |
| Dream Pop | Art Rock |
| Electro Pop | Blues-Rock |
| Orchestral Pop | British Invasion |
| Pop/Rock | Death Metal / Black Metal |
| Power Pop | Glam Rock |
| Soft Rock | Gothic Metal |
| Synthpop | Hair Metal |
| Teen Pop | Hard Rock |
| R&B/Soul | Metal |
| Contemporary R&B | Noise Rock |
| Disco | Jam Bands |
| Doo Wop | Post Punk |
| Funk | Prog-Rock/Art Rock |
| Modern Soul | Psychedelic |
| Motown | Rock & Roll |
| Neo-Soul | Rockabilly |
| Northern Soul | Roots Rock |
| Psychedelic Soul | Singer/Songwriter |
| Quiet Storm | Southern Rock |
| Soul | Surf |
| Soul Blues | Tex-Mex |
| Southern Soul | Time Lord Rock |
| Reggae | Singer/Songwriter |
| Dancehall | Alternative Folk |
| Dub | Contemporary Folk |
| Roots Reggae | Contemporary Singer/Songwriter |
| Ska | Indie Folk |
| Rock | Folk-Rock |
| Acid Rock | Love Song |

FIG. 30D

| | |
|---|---|
| New Acoustic | Contemporary Celtic |
| Traditional Folk | Dangdut |
| Soundtrack | Drinking Songs |
| Foreign Cinema | Drone |
| Musicals | Europe |
| Original Score | France |
| Soundtrack | Hawaii |
| TV Soundtrack | Indian Ghazal |
| Spoken Word | Indian Pop |
| Tex-Mex / Tejano | Japan |
| Chicano | Japanese Pop |
| Classic | Klezmer |
| Conjunto | Middle East |
| Conjunto Progressive | North America |
| New Mex | Ode |
| Tex-Mex | Polka |
| Vocal | Soca |
| A cappella | South Africa |
| Barbershop | South America |
| Doo-wop | Traditional Celtic |
| Gregorian Chant | Worldbeat |
| Standards | Zydeco |
| Traditional Pop | |
| Vocal Jazz | |
| Vocal Pop | |
| World | |
| Africa | |
| Afro-Beat | |
| Afro-Pop | |
| Asia | |
| Australia | |
| Cajun | |
| Calypso | |
| Caribbean | |
| Celtic | |
| Celtic Folk | |

FIG. 30E

CREATION AND MANAGEMENT OF PARAMETER CONFIGURATIONS WITHIN THE PARAMETER TRANSFORMATION ENGINE SUBSYSTEM B51

| CREATING AND MANAGING PARAMETER MAPPING CONFIGURATIONS | |
|---|---|
| Manage Existing Parameter Mapping Configurations | Create New Parameter Mapping Configuration |
| HAPPY; POP; 32 Seconds | |
| SAD; POP; 60 Seconds | |
| HAPPY & FRIGHTENED; POP & CLASSICAL; 120 Seconds | |
| JOYFUL & NERVOUS; POP; 120 Seconds | |
| JOYFUL & NERVOUS; CLASSICAL; 120 Seconds | |
| JOYFUL & NERVOUS; COUNTRY; 120 Seconds | |
| JOYFUL & RUSHED; POP; 120 Seconds | |
| ANNOYED & PATIENT; JAZZ; 60 Seconds | |

FIG. 32B

AUTOMATED MUSICAL COMPOSITION AND GENERATION PROCESS

A: Using the system input and output subsystem A0 to receive emotion-type and style-type and optionally timing-type parameters as musical descriptors for the piece of music which the system user wishes to be automatically composed and generated by machine of the present invention.

B: General Rhythm Generation Subsystem A1 for generating the general rhythm for the piece of music being composed C: General Pitch Generation Subsystem A2 for generating chords for the piece of music being composed D: Using the Melody Rhythm Generation Subsystem A3 for generating a melody rhythm for the piece of music being composed E: Using the Melody Pitch Generation Subsystem A4 for generating a melody pitch for the piece of music being composed F: Using the Orchestration Subsystem A5 for generating the orchestration for the piece of music being composed G: Using the Controller Code Creation Subsystem A6 for creating controller code for the piece of music being composed H: Using the Digital Piece Creation Subsystem A7 for creating the digital piece of music being composed I: Using the Feedback and Learning Subsystem A8 for supporting the feedback and learning cycle of the system

FIG. 34

MUSIC COMPOSITION AND GENERATION INSTRUMENTS AND MUSIC LEARNING SYSTEMS EMPLOYING AUTOMATED MUSIC COMPOSITION ENGINES DRIVEN BY GRAPHICAL ICON BASED MUSICAL EXPERIENCE DESCRIPTORS

RELATED CASES

The Present application is a Continuation of co-pending application Ser. No. 14/869,911 filed Sep. 29, 2015, which is commonly and owned by Amper Music, Inc., and incorporated herein by reference as if fully set forth herein.

BACKGROUND OF INVENTION

Field of Invention

The present invention relates to new and improved methods of and apparatus for helping individuals, groups of individuals, as well as children and businesses alike, to create original music for various applications, without having special knowledge in music theory or practice, as generally required by prior art technologies.

Brief Overview of the State of Knowledge and Skill in the Art

It is very difficult for video and graphics art creators to find the right music for their content within the time, legal, and budgetary constraints that they face. Further, after hours or days searching for the right music, licensing restrictions, non-exclusivity, and inflexible deliverables often frustrate the process of incorporating the music into digital content. In their projects, content creators often use "Commodity Music" which is music that is valued for its functional purpose but, unlike "Artistic Music", not for the creativity and collaboration that goes into making it.

Currently, the Commodity Music market is $3 billion and growing, due to the increased amount of content that uses Commodity Music being created annually, and the technology-enabled surge in the number of content creators. From freelance video editors, producers, and consumer content creators to advertising and digital branding agencies and other professional content creation companies, there has been an extreme demand for a solution to the problem of music discovery and incorporation in digital media.

Indeed, the use of computers and algorithms to help create and compose music has been pursued by many for decades, but not with any great success. In his 2000 landmark book, "The Algorithmic Composer," David Cope surveyed the state of the art back in 2000, and described his progress in "algorithmic composition", as he put it, including his progress developing his interactive music composition system called ALICE (ALgorithmically Integrated Composing Environment).

In this celebrated book, David Cope described how his ALICE system could be used to assist composers in composing and generating new music, in the style of the composer, and extract musical intelligence from prior music that has been composed, to provide a useful level of assistance which composers had not had before. David Cope has advanced his work in this field over the past 15 years, and his impressive body of work provides musicians with many interesting tools for augmenting their capacities to generate music in accordance with their unique styles, based on best efforts to extract musical intelligence from the artist's music compositions. However, such advancements have clearly fallen short of providing any adequate way of enabling non-musicians to automatically compose and generate unique pieces of music capable of meeting the needs and demands of the rapidly growing commodity music market.

Furthermore, over the past few decades, numerous music composition systems have been proposed and/or developed, employing diverse technologies, such as hidden Markov models, generative grammars, transition networks, chaos and self-similarity (fractals), genetic algorithms, cellular automata, neural networks, and artificial intelligence (AI) methods. While many of these systems seek to compose music with computer-algorithmic assistance, some even seem to compose and generate music in an automated manner.

However, the quality of the music produced by such automated music composition systems has been quite poor to find acceptable usage in commercial markets, or consumer markets seeking to add value to media-related products, special events and the like. Consequently, the dream for machines to produce wonderful music has hitherto been unfulfilled, despite the efforts by many to someday realize the same.

Consequently, many compromises have been adopted to make use of computer or machine assisted music composition suitable for use and sale in contemporary markets.

For example, in U.S. Pat. No. 7,754,959 entitled "System and Method of Automatically Creating An Emotional Controlled Soundtrack" by Herberger et al. (assigned to Magix AG) provides a system for enabling a user of digital video editing software to automatically create an emotionally controlled soundtrack that is matched in overall emotion or mood to the scenes in the underlying video work. As disclosed, the user will be able to control the generation of the soundtrack by positioning emotion tags in the video work that correspond to the general mood of each scene. The subsequent soundtrack generation step utilizes these tags to prepare a musical accompaniment to the video work that generally matches its on-screen activities, and which uses a plurality of prerecorded loops (and tracks) each of which has at least one musical style associated therewith. As disclosed, the moods associated with the emotion tags are selected from the group consisting of happy, sad, romantic, excited, scary, tense, frantic, contemplative, angry, nervous, and ecstatic. As disclosed, the styles associated with the plurality of prerecorded music loops are selected from the group consisting of rock, swing, jazz, waltz, disco, Latin, country, gospel, ragtime, calypso, reggae, oriental, rhythm and blues, salsa, hip hop, rap, samba, zydeco, blues and classical.

While the general concept of using emotion tags to score frames of media is compelling, the automated methods and apparatus for composing and generating pieces of music, as disclosed and taught by Herberger et al. in U.S. Pat. No. 7,754,959, is neither desirable or feasible in most environments and makes this system too limited for useful application in almost any commodity music market.

At the same time, there are a number of companies who are attempting to meet the needs of the rapidly growing commodity music market, albeit, without much success.

Overview of the XHail System by Score Music Interactive

In particular, Score Music Interactive (trading as Xhail) based in Market Square, Gorey, in Wexford County, Ireland provides the XHail system which allows users to create novel combinations of prerecorded audio loops and tracks, along the lines proposed in U.S. Pat. No. 7,754,959.

Currently available as beta web-based software, the XHail system allows musically-literate individuals to create unique combinations of pre-existing music loops, based on descriptive tags. To reasonably use the XHail system, a user must understand the music creation process, which includes, but is not limited to, (i) knowing what instruments work well when played together, (ii) knowing how the audio levels of instruments should be balanced with each other, (iii) knowing how to craft a musical contour with a diverse palette of instruments, (iv) knowing how to identifying each possible instrument or sound and audio generator, which includes, but is not limited to, orchestral and synthesized instruments, sound effects, and sound wave generators, and (v) possessing standard or average level of knowledge in the field of music.

While the XHail system seems to combine pre-existing music loops into internally-novel combinations at an abrupt pace, much time and effort is required in order to modify the generated combination of pre-existing music loops into an elegant piece of music. Additional time and effort is required to sync the music combination to a pre-existing video. As the XHail system uses pre-created "music loops" as the raw material for its combination process, it is limited by the quantity of loops in its system database and by the quality of each independently created music loop. Further, as the ownership, copyright, and other legal designators of original creativity of each loop are at least partially held by the independent creators of each loop, and because XHail does not control and create the entire creation process, users of the XHail system have legal and financial obligations to each of its loop creators each time a pre-exiting loop is used in a combination.

While the XHail system appears to be a possible solution to music discovery and incorporation, for those looking to replace a composer in the content creation process, it is believed that those desiring to create Artistic Music will always find an artist to create it and will not forfeit the creative power of a human artist to a machine, no matter how capable it may be. Further, the licensing process for the created music is complex, the delivery materials are inflexible, an understanding of music theory and current music software is required for full understanding and use of the system, and perhaps most importantly, the XHail system has no capacity to learn and improve on a user-specific and/or user-wide basis.

Overview of the Scorify System By Jukedeck

The Scorify System by Jukedeck based in London, England, and founded by Cambridge graduates Ed Rex and Patrick Stobbs, uses artificial intelligence (AI) to generate unique, copyright-free pieces of music for everything from YouTube videos to games and lifts. The Scorify system allows video creators to add computer-generated music to their video. The Scorify System is limited in the length of pre-created video that can be used with its system. Scorify's only user inputs are basic style/genre criteria. Currently, Scorify's available styles are: Techno, Jazz, Blues, 8-Bit, and Simple, with optional sub-style instrument designation, and general music tempo guidance. By requiring users to select specific instruments and tempo designations, the Scorify system inherently requires its users to understand classical music terminology and be able to identify each possible instrument or sound and audio generator, which includes, but is not limited to, orchestral and synthesized instruments, sound effects, and sound wave generators.

The Scorify system lacks adequate provisions that allow any user to communicate his or her desires and/or intentions, regarding the piece of music to be created by the system. Further, the audio quality of the individual instruments supported by the Scorify system remains well below professional standards.

Further, the Scorify system does not allow a user to create music independently of a video, to create music for any media other than a video, and to save or access the music created with a video independently of the content with which it was created.

While the Scorify system appears to provide an extremely elementary and limited solution to the market's problem, the system has no capacity for learning and improving on a user-specific and/or user-wide basis. Also, the Scorify system and music delivery mechanism is insufficient to allow creators to create content that accurately reflects their desires and there is no way to edit or improve the created music, either manually or automatically, once it exists.

Overview of the SonicFire Pro System by SmartSound

The SonicFire Pro system by SmartSound out of Beaufort, S.C., USA allows users to purchase and use pre-created music for their video content. Currently available as a web-based and desktop-based application, the SonicFire Pro System provides a Stock Music Library that uses pre-created music, with limited customizability options for its users. By requiring users to select specific instruments and volume designations, the SonicFire Pro system inherently requires its users to have the capacity to (i) identify each possible instrument or sound and audio generator, which includes, but is not limited to, orchestral and synthesized instruments, sound effects, and sound wave generators, and (ii) possess professional knowledge of how each individual instrument should be balanced with every other instrument in the piece. As the music is pre-created, there are limited "Variations" options to each piece of music. Further, because each piece of music is not created organically (i.e. on a note-by-note and/or chord/by-chord basis) for each user, there is a finite amount of music offered to a user. The process is relatively arduous and takes a significant amount of time in selecting a pre-created piece of music, adding limited-customizability features, and then designating the length of the piece of music.

The SonicFire Pro system appears to provide a solution to the market, limited by the amount of content that can be created, and a floor below which the price which the previously-created music cannot go for economic sustenance reasons. Further, with a limited supply of content, the music for each user lacks uniqueness and complete customizability. The SonicFire Pro system does not have any capacity for self-learning or improving on a user-specific and/or user-wide basis. Moreover, the process of using the software to discover and incorporate previously created music can take a significant amount of time, and the resulting discovered music remains limited by stringent licensing and legal requirements, which are likely to be created by using previously-created music.

Other Stock Music Libraries

Stock Music Libraries are collections of pre-created music, often available online, that are available for license. In these Music Libraries, pre-created music is usually tagged with relevant descriptors to allow users to search for a piece of music by keyword. Most glaringly, all stock music (sometimes referred to as "Royalty Free Music") is pre-created and lacks any user input into the creation of the music. Users must browse what can be hundreds and thousands of individual audio tracks before finding the appropriate piece of music for their content.

Additional examples of stock music containing and exhibiting very similar characteristics, capabilities, limitations, shortcomings, and drawbacks of SmartSound's SonicFire Pro System, include, for example, Audio Socket, Free Music Archive, Friendly Music, Rumble Fish, and Music Bed.

The prior art described above addresses the market need for Commodity Music only partially, as the length of time to discover the right music, the licensing process and cost to incorporate the music into content, and the inflexible delivery options (often a single stereo audio file) serve as a woefully inadequate solution.

Further, the requirement of a certain level of music theory background and/or education adds a layer of training necessary for any content creator to use the current systems to their full potential.

Moreover, the prior art systems described above are static systems that do not learn, adapt, and self-improve as they are used by others, and do not come close to offering "white glove" service comparable to that of the experience of working with a professional composer.

In view, therefore, of the prior art and its shortcomings and drawbacks, there is a great need in the art for new and improved information processing systems and methods that enable individuals, as well as other information systems, without possessing any musical knowledge, theory or expertise, to automatically compose and generate music pieces for use in scoring diverse kinds of media products, as well as supporting and/or celebrating events, organizations, brands, families and the like as the occasion may suggest or require, while overcoming the shortcomings and drawbacks of prior art systems, methods and technologies.

SUMMARY AND OBJECTS OF THE PRESENT INVENTION

Accordingly, a primary object of the present invention is to provide a new and improved Automated Music Composition And Generation System and Machine, and information processing architecture that allows anyone, without possessing any knowledge of music theory or practice, or expertise in music or other creative endeavors, to instantly create unique and professional-quality music, with the option, but not requirement, of being synchronized to any kind of media content, including, but not limited to, video, photography, slideshows, and any pre-existing audio format, as well as any object, entity, and/or event.

Another object of the present invention is to provide such an Automated Music Composition And Generation System, wherein the system user only requires knowledge of ones own emotions and/or artistic concepts which are to be expressed musically in a piece of music that will be ultimately composed by the Automated Composition And Generation System of the present invention.

Another object of the present invention is to provide an Automated Music Composition and Generation System that supports a novel process for creating music, completely changing and advancing the traditional compositional process of a professional media composer.

Another object of the present invention is to provide a novel process for creating music using an Automated Music Composition and Generation System that intuitively makes all of the musical and non-musical decisions necessary to create a piece of music and learns, codifies, and formalizes the compositional process into a constantly learning and evolving system that drastically improves one of the most complex and creative human endeavors—the composition and creation of music.

Another object of the present invention is to provide a novel process for composing and creating music an using automated virtual-instrument music synthesis technique driven by musical experience descriptors and time and space (T&S) parameters supplied by the system user, so as to automatically compose and generate music that rivals that of a professional music composer across any comparative or competitive scope.

Another object of the present invention is to provide an Automated Music Composition and Generation System, wherein the musical spirit and intelligence of the system is embodied within the specialized information sets, structures and processes that are supported within the system in accordance with the information processing principles of the present invention.

Another object of the present invention is to provide an Automated Music Composition and Generation System, wherein automated learning capabilities are supported so that the musical spirit of the system can transform, adapt and evolve over time, in response to interaction with system users, which can include individual users as well as entire populations of users, so that the musical spirit and memory of the system is not limited to the intellectual and/or emotional capacity of a single individual, but rather is open to grow in response to the transformative powers of all who happen to use and interact with the system.

Another object of the present invention is to provide a new and improved Automated Music Composition and Generation system that supports a highly intuitive, natural, and easy to use graphical interface (GUI) that provides for very fast music creation and very high product functionality.

Another object of the present invention is to provide a new and improved Automated Music Composition and Generation System that allows system users to be able to describe, in a manner natural to the user, including, but not limited to text, image, linguistics, speech, menu selection, time, audio file, video file, or other descriptive mechanism, what the user wants the music to convey, and/or the preferred style of the music, and/or the preferred timings of the music, and/or any single, pair, or other combination of these three input categories.

Another object of the present invention is to provide an Automated Music Composition and Generation Process supporting automated virtual-instrument music synthesis driven by linguistic and/or graphical icon based musical experience descriptors supplied by the system user, wherein linguistic-based musical experience descriptors, and a video, audio-recording, image, or event marker, supplied as input through the system user interface, and are used by the Automated Music Composition and Generation Engine of the present invention to generate musically-scored media (e.g. video, podcast, image, slideshow etc.) or event marker using virtual-instrument music synthesis, which is then supplied back to the system user via the system user interface.

Another object of the present invention is to provide an Automated Music Composition and Generation System supporting the use of automated virtual-instrument music synthesis driven by linguistic and/or graphical icon based musical experience descriptors supplied by the system user, wherein (i) during the first step of the process, the system user accesses the Automated Music Composition and Generation System, and then selects a video, an audio-recording (e.g. a podcast), a slideshow, a photograph or image, or an event marker to be scored with music generated by the Automated Music Composition and Generation System, (ii) the system user then provides linguistic-based and/or icon-based musical experience descriptors to its Automated Music Composition and Generation Engine, (iii) the system user initiates the Automated Music Composition and Generation System to compose and generate music using an automated virtual-instrument music synthesis method based on inputted musical descriptors that have been scored on (i.e. applied to) selected media or event markers by the system user, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display/performance.

Another object of the present invention is to provide an Automated Music Composition and Generation Instrument System supporting automated virtual-instrument music synthesis driven by linguistic-based musical experience descriptors produced using a text keyboard and/or a speech recognition interface provided in a compact portable housing that can be used in almost any conceivable user application.

Another object of the present invention is to provide a toy instrument supporting Automated Music Composition and Generation Engine supporting automated virtual-instrument music synthesis driven by icon-based musical experience descriptors selected by the child or adult playing with the toy instrument, wherein a touch screen display is provided for the system user to select and load videos from a video library maintained within storage device of the toy instrument, or from a local or remote video file server connected to the Internet, and children can then select musical experience descriptors (e.g. emotion descriptor icons and style descriptor icons) from a physical or virtual keyboard or like system interface, so as to allow one or more children to compose and generate custom music for one or more segmented scenes of the selected video.

Another object is to provide an Automated Toy Music Composition and Generation Instrument System, wherein graphical-icon based musical experience descriptors, and a video are selected as input through the system user interface (i.e. touch-screen keyboard) of the Automated Toy Music Composition and Generation Instrument System and used by its Automated Music Composition and Generation Engine to automatically generate a musically-scored video story that is then supplied back to the system user, via the system user interface, for playback and viewing.

Another object of the present invention is to provide an Electronic Information Processing and Display System, integrating a SOC-based Automated Music Composition and Generation Engine within its electronic information processing and display system architecture, for the purpose of supporting the creative and/or entertainment needs of its system users.

Another object of the present invention is to provide a SOC-based Music Composition and Generation System supporting automated virtual-instrument music synthesis driven by linguistic and/or graphical icon based musical experience descriptors, wherein linguistic-based musical experience descriptors, and a video, audio file, image, slideshow, or event marker, are supplied as input through the system user interface, and used by the Automated Music Composition and Generation Engine to generate musically-scored media (e.g. video, podcast, image, slideshow etc.) or event marker, that is then supplied back to the system user via the system user interface.

Another object of the present invention is to provide an Enterprise-Level Internet-Based Music Composition And Generation System, supported by a data processing center with web servers, application servers and database (RD-BMS) servers operably connected to the infrastructure of the Internet, and accessible by client machines, social network servers, and web-based communication servers, and allowing anyone with a web-based browser to access automated music composition and generation services on websites (e.g. on YouTube, Vimeo, etc.), social-networks, social-messaging networks (e.g. Twitter) and other Internet-based properties, to allow users to score videos, images, slide-shows, audio files, and other events with music automatically composed using virtual-instrument music synthesis techniques driven by linguistic-based musical experience descriptors produced using a text keyboard and/or a speech recognition interface.

Another object of the present invention is to provide an Automated Music Composition and Generation Process supported by an enterprise-level system, wherein (i) during the first step of the process, the system user accesses an Automated Music Composition and Generation System, and then selects a video, an audio-recording (i.e. podcast), slideshow, a photograph or image, or an event marker to be scored with music generated by the Automated Music Composition and Generation System, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv) the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Another object of the present invention is to provide an Internet-Based Automated Music Composition and Generation Platform that is deployed so that mobile and desktop client machines, using text, SMS and email services supported on the Internet, can be augmented by the addition of composed music by users using the Automated Music Composition and Generation Engine of the present invention, and graphical user interfaces supported by the client machines while creating text, SMS and/or email documents (i.e. messages) so that the users can easily select graphic and/or linguistic based emotion and style descriptors for use in generating compose music pieces for such text, SMS and email messages.

Another object of the present invention is a mobile client machine (e.g. Internet-enabled smartphone or tablet computer) deployed in a system network supporting the Automated Music Composition and Generation Engine of the present invention, where the client machine is realized as a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a client application is running that provides the user with a virtual keyboard supporting the creation of a web-based (i.e. html) document, and the creation and insertion of a piece of composed music created by selecting linguistic and/or graphical-icon based emotion descriptors, and style-descriptors, from a menu screen, so that the music piece can be delivered to a remote client and experienced using a conventional web-browser operating on the embedded URL, from which the embedded music piece is being served by way of web, application and database servers.

Another object of the present invention is to provide an Internet-Based Automated Music Composition and Generation System supporting the use of automated virtual-instrument music synthesis driven by linguistic and/or graphical icon based musical experience descriptors so as to add composed music to text, SMS and email documents/messages, wherein linguistic-based or icon-based musical experience descriptors are supplied by the system user as input through the system user interface, and used by the Automated Music Composition and Generation Engine to generate a musically-scored text document or message that is generated for preview by system user via the system user interface, before finalization and transmission.

Another object of the present invention is to provide an Automated Music Composition and Generation Process using a Web-based system supporting the use of automated virtual-instrument music synthesis driven by linguistic and/or graphical icon based musical experience descriptors so to automatically and instantly create musically-scored text, SMS, email, PDF, Word and/or HTML documents, wherein (i) during the first step of the process, the system user accesses the Automated Music Composition and Generation System, and then selects a text, SMS or email message or Word, PDF or HTML document to be scored (e.g. augmented) with music generated by the Automated Music Composition and Generation System, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected messages or documents, (iv) the system user accepts composed and generated music produced for the message or document, or rejects the music and provides feedback to the system, including providing different musical experience descriptors and a request to re-compose music based on the updated musical experience descriptor inputs, and (v) the system combines the accepted composed music with the message or document, so as to create a new file for distribution and display.

Another object of the present invention is to provide an AI-Based Autonomous Music Composition, Generation and Performance System for use in a band of human musicians playing a set of real and/or synthetic musical instruments, employing a modified version of the Automated Music Composition and Generation Engine, wherein the AI-based system receives musical signals from its surrounding instruments and musicians and buffers and analyzes these instruments and, in response thereto, can compose and generate music in real-time that will augment the music being played by the band of musicians, or can record, analyze and compose music that is recorded for subsequent playback, review and consideration by the human musicians.

Another object of the present invention is to provide an Autonomous Music Analyzing, Composing and Performing Instrument having a compact rugged transportable housing comprising a LCD touch-type display screen, a built-in stereo microphone set, a set of audio signal input connectors for receiving audio signals produced from the set of musical instruments in the system environment, a set of MIDI signal input connectors for receiving MIDI input signals from the set of instruments in the system environment, audio output signal connector for delivering audio output signals to audio signal preamplifiers and/or amplifiers, WIFI and BT network adapters and associated signal antenna structures, and a set of function buttons for the user modes of operation including (i) LEAD mode, where the instrument system autonomously leads musically in response to the streams of music information it receives and analyzes from its (local or remote) musical environment during a musical session, (ii) FOLLOW mode, where the instrument system autonomously follows musically in response to the music it receives and analyzes from the musical instruments in its (local or remote) musical environment during the musical session, (iii) COMPOSE mode, where the system automatically composes music based on the music it receives and analyzes from the musical instruments in its (local or remote) environment during the musical session, and (iv) PERFORM mode, where the system autonomously performs automatically composed music, in real-time, in response to the musical information received and analyzed from its environment during the musical session.

Another object of the present invention is to provide an Automated Music Composition and Generation Instrument System, wherein audio signals as well as MIDI input signals are produced from a set of musical instruments in the system environment are received by the instrument system, and these signals are analyzed in real-time, on the time and/or frequency domain, for the occurrence of pitch events and melodic and rhythmic structure so that the system can automatically abstract musical experience descriptors from this information for use in generating automated music composition and generation using the Automated Music Composition and Generation Engine of the present invention.

Another object of the present invention is to provide an Automated Music Composition and Generation Process using the system, wherein (i) during the first step of the process, the system user selects either the LEAD or FOLLOW mode of operation for the Automated Musical Composition and Generation Instrument System, (ii) prior to the session, the system is then is interfaced with a group of musical instruments played by a group of musicians in a creative environment during a musical session, (iii) during the session, the system receives audio and/or MIDI data signals produced from the group of instruments during the session, and analyzes these signals for pitch and rhythmic data and melodic structure, (iv) during the session, the system automatically generates musical descriptors from abstracted pitch, rhythmic and melody data, and uses the musical experience descriptors to compose music for each session on a real-time basis, and (v) in the event that the PERFORM mode has been selected, the system automatically generates music composed for the session, and in the event that the COMPOSE mode has been selected, the music composed during the session is stored for subsequent access and review by the group of musicians.

Another object of the present invention is to provide a novel Automated Music Composition and Generation System, supporting virtual-instrument music synthesis and the use of linguistic-based musical experience descriptors and lyrical (LYRIC) or word descriptions produced using a text keyboard and/or a speech recognition interface, so that system users can further apply lyrics to one or more scenes in a video that are to be emotionally scored with composed music in accordance with the principles of the present invention.

Another object of the present invention is to provide such an Automated Music Composition and Generation System supporting virtual-instrument music synthesis driven by graphical-icon based musical experience descriptors selected by the system user with a real or virtual keyboard interface, showing its various components, such as multi-core CPU, multi-core GPU, program memory (DRAM), video memory (VRAM), hard drive, LCD/touch-screen display panel, microphone/speaker, keyboard, WIFI/Bluetooth network adapters, pitch recognition module/board, and power supply and distribution circuitry, integrated around a system bus architecture.

Another object of the present invention is to provide such an Automated Music Composition and Generation System, wherein linguistic and/or graphics based musical experience descriptors, including lyrical input, and other media (e.g. a video recording, live video broadcast, video game, slideshow, audio recording, or event marker) are selected as input through a system user interface (i.e. touch-screen keyboard), wherein the media can be automatically analyzed by the system to extract musical experience descriptors (e.g. based on scene imagery and/or information content), and thereafter used by its Automated Music Composition and Generation Engine to generate musically-scored media that is then supplied back to the system user via the system user interface or other means.

Another object of the present invention is to provide such an Automated Music Composition and Generation System, wherein a system user interface is provided for transmitting typed, spoken or sung words or lyrical input provided by the system user to a subsystem where the real-time pitch event, rhythmic and prosodic analysis is performed to automatically captured data that is used to modify the system operating parameters in the system during the music composition and generation process of the present invention.

Another object of the present invention is to provide such an Automated Music Composition and Generation Process, wherein the primary steps involve supporting the use of linguistic musical experience descriptors, (optionally lyrical input), and virtual-instrument music synthesis, wherein (i) during the first step of the process, the system user accesses the Automated Music Composition and Generation System and then selects media to be scored with music generated by its Automated Music Composition and Generation Engine, (ii) the system user selects musical experience descriptors (and optionally lyrics) provided to the Automated Music Composition and Generation Engine of the system for application to the selected media to be musically-scored, (iii) the system user initiates the Automated Music Composition and Generation Engine to compose and generate music based on the provided musical descriptors scored on selected media, and (iv) the system combines the composed music with the selected media so as to create a composite media file for display and enjoyment.

Another object of the present invention is to provide an Automated Music Composition and Generation Engine comprises a system architecture that is divided into two very high-level "musical landscape" categorizations, namely: (i) a Pitch Landscape Subsystem C0 comprising the General Pitch Generation Subsystem A2, the Melody Pitch Generation Subsystem A4, the Orchestration Subsystem A5, and the Controller Code Creation Subsystem A6; and (ii) a Rhythmic Landscape Subsystem comprising the General Rhythm Generation Subsystem A1, Melody Rhythm Generation Subsystem A3, the Orchestration Subsystem A5, and the Controller Code Creation Subsystem A6.

Another object of the present invention is to provide an Automated Music Composition and Generation Engine comprises a system architecture including a user GUI-based Input Output Subsystem A0, a General Rhythm Subsystem A1, a General Pitch Generation Subsystem A2, a Melody Rhythm Generation Subsystem A3, a Melody Pitch Generation Subsystem A4, an Orchestration Subsystem A5, a Controller Code Creation Subsystem A6, a Digital Piece Creation Subsystem A7, and a Feedback and Learning Subsystem A8.

Another object of the present invention is to provide an Automated Music Composition and Generation System comprising a plurality of subsystems integrated together, wherein a User GUI-based input output subsystem (B0) allows a system user to select one or more musical experience descriptors for transmission to the descriptor parameter capture subsystem B1 for processing and transformation into probability-based system operating parameters which are distributed to and loaded in tables maintained in the various subsystems within the system, and subsequent subsystem set up and use during the automated music composition and generation process of the present invention.

Another object of the present invention is to provide an Automated Music Composition and Generation System comprising a plurality of subsystems integrated together, wherein a descriptor parameter capture subsystem (B1) is interfaced with the user GUI-based input output subsystem for receiving and processing selected musical experience descriptors to generate sets of probability-based system operating parameters for distribution to parameter tables maintained within the various subsystems therein.

Another object of the present invention is to provide such an Automated Music Composition and Generation System, wherein a Style Parameter Capture Subsystem (B37) is used in an Automated Music Composition and Generation Engine, wherein the system user provides the exemplary "style-type" musical experience descriptor—POP, for example—to the Style Parameter Capture Subsystem for processing and transformation within the parameter transformation engine, to generate probability-based parameter tables that are then distributed to various subsystems therein, and subsequent subsystem set up and use during the automated music composition and generation process of the present invention.

Another object of the present invention is to provide such an Automated Music Composition and Generation System, wherein a Timing Parameter Capture Subsystem (B40) is used in the Automated Music Composition and Generation Engine, wherein the Timing Parameter Capture Subsystem (B40) provides timing parameters to the Timing Generation Subsystem (B41) for distribution to the various subsystems in the system, and subsequent subsystem set up and use during the automated music composition and generation process of the present invention.

Another object of the present invention is to provide such an Automated Music Composition and Generation System, wherein a Parameter Transformation Engine Subsystem (B51) is used in the Automated Music Composition and Generation Engine, wherein musical experience descriptor parameters and Timing Parameters Subsystem are automatically transformed into sets of probabilistic-based system operating parameters, generated for specific sets of user-supplied musical experience descriptors and timing signal parameters provided by the system user.

Another object of the present invention is to provide such an Automated Music Composition and Generation System, wherein a Timing Generation Subsystem (B41) is used in the Automated Music Composition and Generation Engine, wherein the timing parameter capture subsystem (B40) provides timing parameters (e.g. piece length) to the timing generation subsystem (B41) for generating timing information relating to (i) the length of the piece to be composed, (ii) start of the music piece, (iii) the stop of the music piece, (iv) increases in volume of the music piece, and (v) accents in the music piece, that are to be created during the automated music composition and generation process of the present invention.

Another object of the present invention is to provide such an Automated Music Composition and Generation System, wherein a Length Generation Subsystem (B2) is used in the Automated Music Composition and Generation Engine, wherein the time length of the piece specified by the system user is provided to the length generation subsystem (B2) and this subsystem generates the start and stop locations of the piece of music that is to be composed during the during the automated music composition and generation process of the present invention.

Another object of the present invention is to provide such an Automated Music Composition and Generation System, wherein a Tempo Generation Subsystem (B3) is used in the Automated Music Composition and Generation Engine, wherein the tempos of the piece (i.e. BPM) are computed based on the piece time length and musical experience parameters that are provided to this subsystem, wherein the resultant tempos are measured in beats per minute (BPM) and are used during the automated music composition and generation process of the present invention.

Another object of the present invention is to provide such an Automated Music Composition and Generation System, wherein a Meter Generation Subsystem (B4) is used in the Automated Music Composition and Generation Engine, wherein the meter of the piece is computed based on the piece time length and musical experience parameters that are provided to this subsystem, wherein the resultant tempo is measured in beats per minute (BPM) and is used during the automated music composition and generation process of the present invention.

Another object of the present invention is to provide such an Automated Music Composition and Generation System, wherein a Key Generation Subsystem (B5) is used in the Automated Music Composition and Generation Engine of the present invention, wherein the key of the piece is computed based on musical experience parameters that are provided to the system, wherein the resultant key is selected and used during the automated music composition and generation process of the present invention.

Another object of the present invention is to provide such an Automated Music Composition and Generation System, wherein a Beat Calculator Subsystem (B6) is used in the Automated Music Composition and Generation Engine, wherein the number of beats in the piece is computed based on the piece length provided to the system and tempo computed by the system, wherein the resultant number of beats is used during the automated music composition and generation process of the present invention.

Another object of the present invention is to provide such an Automated Music Composition and Generation System, wherein a Measure Calculator Subsystem (B8) is used in the Automated Music Composition and Generation Engine, wherein the number of measures in the piece is computed based on the number of beats in the piece, and the computed meter of the piece, wherein the meters in the piece is used during the automated music composition and generation process of the present invention.

Another object of the present invention is to provide such an Automated Music Composition and Generation System, wherein a Tonality Generation Subsystem (B7) is used in the Automated Music Composition and Generation Engine, wherein the tonalities of the piece is selected using the probability-based tonality parameter table maintained within the subsystem and the musical experience descriptors provided to the system by the system user, and wherein the selected tonalities are used during the automated music composition and generation process of the present invention.

Another object of the present invention is to provide such an Automated Music Composition and Generation System, wherein a Song Form Generation Subsystem (B9) is used in the Automated Music Composition and Generation Engine, wherein the song forms are selected using the probability-based song form sub-phrase parameter table maintained within the subsystem and the musical experience descriptors provided to the system by the system user, and wherein the selected song forms are used during the automated music composition and generation process of the present invention.

Another object of the present invention is to provide such an Automated Music Composition and Generation System, wherein a Sub-Phrase Length Generation Subsystem (B15) is used in the Automated Music Composition and Generation Engine, wherein the sub-phrase lengths are selected using the probability-based sub-phrase length parameter table maintained within the subsystem and the musical experience descriptors provided to the system by the system user, and wherein the selected sub-phrase lengths are used during the automated music composition and generation process of the present invention.

Another object of the present invention is to provide such an Automated Music Composition and Generation System, wherein a Chord Length Generation Subsystem (B11) is used in the Automated Music Composition and Generation Engine, wherein the chord lengths are selected using the probability-based chord length parameter table maintained within the subsystem and the musical experience descriptors provided to the system by the system user, and wherein the selected chord lengths are used during the automated music composition and generation process of the present invention.

Another object of the present invention is to provide such an Automated Music Composition and Generation System, wherein an Unique Sub-Phrase Generation Subsystem (B14) is used in the Automated Music Composition and Generation Engine, wherein the unique sub-phrases are selected using the probability-based unique sub-phrase parameter table maintained within the subsystem and the musical experience descriptors provided to the system by the system user, and wherein the selected unique sub-phrases are used during the automated music composition and generation process of the present invention.

Another object of the present invention is to provide such an Automated Music Composition and Generation System, wherein a Number Of Chords In Sub-Phrase Calculation Subsystem (B16) is used in the Automated Music Composition and Generation Engine, wherein the number of chords in a sub-phrase is calculated using the computed unique sub-phrases, and wherein the number of chords in the sub-phrase is used during the automated music composition and generation process of the present invention.

Another object of the present invention is to provide such an Automated Music Composition and Generation System, wherein a Phrase Length Generation Subsystem (B12) is used in the Automated Music Composition and Generation Engine, wherein the length of the phrases are measured using a phrase length analyzer, and wherein the length of the phrases (in number of measures) are used during the automated music composition and generation process of the present invention.

Another object of the present invention is to provide such an Automated Music Composition and Generation System, wherein a Unique Phrase Generation Subsystem (B10) is used in the Automated Music Composition and Generation Engine, wherein the number of unique phrases is determined using a phrase analyzer, and wherein number of unique phrases is used during the automated music composition and generation process of the present invention.

Another object of the present invention is to provide such an Automated Music Composition and Generation System, wherein a Number Of Chords In Phrase Calculation Subsystem (B13) is used in the Automated Music Composition and Generation Engine, wherein the number of chords in a phrase is determined, and wherein number of chords in a phrase is used during the automated music composition and generation process of the present invention.

Another object of the present invention is to provide such an Automated Music Composition and Generation System, wherein an Initial General Rhythm Generation Subsystem (B17) is used in the Automated Music Composition and Generation Engine, wherein the initial chord is determined using the initial chord root table, the chord function table and chord function tonality analyzer, and wherein initial chord is used during the automated music composition and generation process of the present invention.

Another object of the present invention is to provide such an Automated Music Composition and Generation System, wherein a Sub-Phrase Chord Progression Generation Subsystem (B19) is used in the Automated Music Composition and Generation Engine, wherein the sub-phrase chord progressions are determined using the chord root table, the chord function root modifier table, current chord function table values, and the beat root modifier table and the beat analyzer, and wherein sub-phrase chord progressions are used during the automated music composition and generation process of the present invention.

Another object of the present invention is to provide such an Automated Music Composition and Generation System, wherein a Phrase Chord Progression Generation Subsystem (B18) is used in the Automated Music Composition and Generation Engine, wherein the phrase chord progressions are determined using the sub-phrase analyzer, and wherein improved phrases are used during the automated music composition and generation process of the present invention.

Another object of the present invention is to provide such an Automated Music Composition and Generation System, wherein a Chord Inversion Generation Subsystem (B20) is used in the Automated Music Composition and Generation Engine, wherein chord inversions are determined using the initial chord inversion table, and the chord inversion table, and wherein the resulting chord inversions are used during the automated music composition and generation process of the present invention.

Another object of the present invention is to provide such an Automated Music Composition and Generation System, wherein a Melody Sub-Phrase Length Generation Subsystem (B25) is used in the Automated Music Composition and Generation Engine, wherein melody sub-phrase lengths are determined using the probability-based melody sub-phrase length table, and wherein the resulting melody sub-phrase lengths are used during the automated music composition and generation process of the present invention.

Another object of the present invention is to provide such an Automated Music Composition and Generation System, wherein a Melody Sub-Phrase Generation Subsystem (B24) is used in the Automated Music Composition and Generation Engine, wherein sub-phrase melody placements are determined using the probability-based sub-phrase melody placement table, and wherein the selected sub-phrase melody placements are used during the automated music composition and generation process of the present invention.

Another object of the present invention is to provide such an Automated Music Composition and Generation System, wherein a Melody Phrase Length Generation Subsystem (B23) is used in the Automated Music Composition and Generation Engine, wherein melody phrase lengths are determined using the sub-phrase melody analyzer, and wherein the resulting phrase lengths of the melody are used during the automated music composition and generation process of the present invention;

Another object of the present invention is to provide such an Automated Music Composition and Generation System, wherein a Melody Unique Phrase Generation Subsystem (B22) used in the Automated Music Composition and Generation Engine, wherein unique melody phrases are determined using the unique melody phrase analyzer, and wherein the resulting unique melody phrases are used during the automated music composition and generation process of the present invention.

Another object of the present invention is to provide such an Automated Music Composition and Generation System, wherein a Melody Length Generation Subsystem (B21) used in the Automated Music Composition and Generation Engine, wherein melody lengths are determined using the phrase melody analyzer, and wherein the resulting phrase melodies are used during the automated music composition and generation process of the present invention.

Another object of the present invention is to provide such an Automated Music Composition and Generation System, wherein a Melody Note Rhythm Generation Subsystem (B26) used in the Automated Music Composition and Generation Engine, wherein melody note rhythms are determined using the probability-based initial note length table, and the probability-based initial, second, and $n^{th}$ chord length tables, and wherein the resulting melody note rhythms are used during the automated music composition and generation process of the present invention.

Another object of the present invention is to provide such an Automated Music Composition and Generation System, wherein an Initial Pitch Generation Subsystem (B27) used in the Automated Music Composition and Generation Engine, wherein initial pitch is determined using the probability-based initial note length table, and the probability-based initial, second, and $n^{th}$ chord length tables, and wherein the resulting melody note rhythms are used during the automated music composition and generation process of the present invention.

Another object of the present invention is to provide such an Automated Music Composition and Generation System, wherein a Sub-Phrase Pitch Generation Subsystem (B29) used in the Automated Music Composition and Generation Engine, wherein the sub-phrase pitches are determined using the probability-based melody note table, the probability-based chord modifier tables, and probability-based leap reversal modifier table, and wherein the resulting sub-phrase pitches are used during the automated music composition and generation process of the present invention.

Another object of the present invention is to provide such an Automated Music Composition and Generation System, wherein a Phrase Pitch Generation Subsystem (B28) used in the Automated Music Composition and Generation Engine, wherein the phrase pitches are determined using the subphrase melody analyzer and used during the automated music composition and generation process of the present invention.

Another object of the present invention is to provide such an Automated Music Composition and Generation System, wherein a Pitch Octave Generation Subsystem (B30) is used in the Automated Music Composition and Generation Engine, wherein the pitch octaves are determined using the probability-based melody note octave table, and the resulting pitch octaves are used during the automated music composition and generation process of the present invention.

Another object of the present invention is to provide such an Automated Music Composition and Generation System, wherein an Instrumentation Subsystem (B38) is used in the Automated Music Composition and Generation Engine, wherein the instrumentations are determined using the probability-based instrument tables based on musical experience descriptors (e.g. style descriptors) provided by the system user, and wherein the instrumentations are used during the automated music composition and generation process of the present invention.

Another object of the present invention is to provide such an Automated Music Composition and Generation System, wherein an Instrument Selector Subsystem (B39) is used in the Automated Music Composition and Generation Engine, wherein piece instrument selections are determined using the probability-based instrument selection tables, and used during the automated music composition and generation process of the present invention.

Another object of the present invention is to provide such an Automated Music Composition and Generation System, wherein an Orchestration Generation Subsystem (B31) is used in the Automated Music Composition and Generation Engine, wherein the probability-based parameter tables (i.e. instrument orchestration prioritization table, instrument energy tabled, piano energy table, instrument function table, piano hand function table, piano voicing table, piano rhythm table, second note right hand table, second note left hand table, piano dynamics table) employed in the subsystem is set up for the exemplary "emotion-type" musical experience descriptor—HAPPY—and used during the automated music composition and generation process of the present invention so as to generate a part of the piece of music being composed.

Another object of the present invention is to provide such an Automated Music Composition and Generation System, wherein a Controller Code Generation Subsystem (B32) is used in the Automated Music Composition and Generation Engine, wherein the probability-based parameter tables (i.e. instrument, instrument group and piece wide controller code tables) employed in the subsystem is set up for the exemplary "emotion-type" musical experience descriptor—HAPPY—and used during the automated music composition and generation process of the present invention so as to generate a part of the piece of music being composed.

Another object of the present invention is to provide such an Automated Music Composition and Generation System, wherein a digital audio retriever subsystem (B33) is used in the Automated Music Composition and Generation Engine, wherein digital audio (instrument note) files are located and used during the automated music composition and generation process of the present invention.

Another object of the present invention is to provide such an Automated Music Composition and Generation System, wherein Digital Audio Sample Organizer Subsystem (B34) is used in the Automated Music Composition and Generation Engine, wherein located digital audio (instrument note) files are organized in the correct time and space according to the music piece during the automated music composition and generation process of the present invention Another object of the present invention is to provide such an Automated Music Composition and Generation System, wherein a Piece Consolidator Subsystem (B35) is used in the Automated Music Composition and Generation Engine, wherein the digital audio files are consolidated and manipulated into a form or forms acceptable for use by the System User.

Another object of the present invention is to provide such an Automated Music Composition and Generation System, wherein a Piece Format Translator Subsystem (B50) is used in the Automated Music Composition and Generation Engine, wherein the completed music piece is translated into desired alterative formats requested during the automated music composition and generation process of the present invention.

Another object of the present invention is to provide such an Automated Music Composition and Generation System, wherein a Piece Deliver Subsystem (B36) is used in the Automated Music Composition and Generation Engine, wherein digital audio files are combined into digital audio files to be delivered to the system user during the automated music composition and generation process of the present invention.

Another object of the present invention is to provide such an Automated Music Composition and Generation System, wherein a Feedback Subsystem (B42) is used in the Automated Music Composition and Generation Engine, wherein (i) digital audio file and additional piece formats are analyzed to determine and confirm that all attributes of the requested piece are accurately delivered, (ii) that digital audio file and additional piece formats are analyzed to determine and confirm uniqueness of the musical piece, and (iii) the system user analyzes the audio file and/or additional piece formats, during the automated music composition and generation process of the present invention.

Another object of the present invention is to provide such an Automated Music Composition and Generation System, wherein a Music Editability Subsystem (B43) is used in the Automated Music Composition and Generation Engine, wherein requests to restart, rerun, modify and/or recreate the system are executed during the automated music composition and generation process of the present invention.

Another object of the present invention is to provide such an Automated Music Composition and Generation System, wherein a Preference Saver Subsystem (B44) is used in the Automated Music Composition and Generation Engine, wherein musical experience descriptors, parameter tables and parameters are modified to reflect user and autonomous feedback to cause a more positively received piece during future automated music composition and generation process of the present invention.

Another object of the present invention is to provide such an Automated Music Composition and Generation System, wherein a Musical Kernel (e.g. "DNA") Generation Subsystem (B45) is used in the Automated Music Composition and Generation Engine, wherein the musical "kernel" of a music piece is determined, in terms of (i) melody (subphrase melody note selection order), (ii) harmony (i.e. phrase chord progression), (iii) tempo, (iv) volume, and/or (v) orchestration, so that this music kernel can be used during future automated music composition and generation process of the present invention.

Another object of the present invention is to provide such an Automated Music Composition and Generation System, wherein a User Taste Generation Subsystem (B46) is used in the Automated Music Composition and Generation Engine, wherein the system user's musical taste is determined based on system user feedback and autonomous piece analysis, for use in changing or modifying the style and musical experience descriptors, parameters and table values for a music composition during the automated music composition and generation process of the present invention.

Another object of the present invention is to provide such an Automated Music Composition and Generation System, wherein a Population Taste Aggregator Subsystem (B47) is used in the Automated Music Composition and Generation Engine, wherein the music taste of a population is aggregated and changes to style, musical experience descriptors, and parameter table probabilities can be modified in response thereto during the automated music composition and generation process of the present invention;

Another object of the present invention is to provide such an Automated Music Composition and Generation System, wherein a User Preference Subsystem (B48) is used in the Automated Music Composition and Generation Engine, wherein system user preferences (e.g. style and musical experience descriptors, table parameters) are determined and used during the automated music composition and generation process of the present invention.

Another object of the present invention is to provide such an Automated Music Composition and Generation System, wherein a Population Preference Subsystem (B49) is used in its Automated Music Composition and Generation Engine, wherein user population preferences (e.g. style and musical experience descriptors, table parameters) are determined and used during the automated music composition and generation process of the present invention.

Another object of the present invention is to provide such an Automated Music Composition and Generation System, wherein a probability-based parameter table is maintained in the Tempo Generation Subsystem (B3) of its Automated Music Composition and Generation Engine, wherein for each emotional descriptor supported by the system, a probability measure is provided for each tempo (beats per minute) supported by the system, and the probability-based parameter table is used during the automated music composition and generation process of the present invention.

Another object of the present invention is to provide such an Automated Music Composition and Generation System, wherein a probability-based parameter table is maintained in the Length Generation Subsystem (B2) of its Automated Music Composition and Generation Engine, wherein for each emotional descriptor supported by the system, a probability measure is provided for each length (seconds) supported by the system, and this probability-based parameter table is used during the automated music composition and generation process of the present invention.

Another object of the present invention is to provide such an Automated Music Composition and Generation System, wherein a probability-based parameter table is maintained in the Meter Generation Subsystem (B4) of its Automated Music Composition and Generation Engine, wherein for each emotional descriptor supported by the system, a probability measure is provided for each meter supported by the system, and this probability-based parameter table is used during the automated music composition and generation process of the present invention.

Another object of the present invention is to provide such an Automated Music Composition and Generation System, wherein a probability-based parameter table is maintained in the key generation subsystem (B5) of its Automated Music Composition and Generation Engine, wherein for each musical experience descriptor selected by the system user, a probability measure is provided for each key supported by the system, and this probability-based parameter table is used during the automated music composition and generation process of the present invention.

Another object of the present invention is to provide such an Automated Music Composition and Generation System, wherein a probability-based parameter table is maintained in the Tonality Generation Subsystem (B7) of its Automated Music Composition and Generation Engine, wherein for each musical experience descriptor selected by the system user, a probability measure is provided for each tonality (i.e. Major, Minor-Natural, Minor-Harmonic, Minor-Melodic, Dorian, Phrygian, Lydian, Mixolydian, Aeolian, and Locrian) supported by the system, and this probability-based parameter table is used during the automated music composition and generation process of the present invention;

Another object of the present invention is to provide such an Automated Music Composition and Generation System, wherein a probability-based parameter tables maintained in the Song Form Generation Subsystem (B9) of its Automated Music Composition and Generation Engine, wherein for each musical experience descriptor selected by the system user, a probability measure is provided for each song form (i.e. A, AA, AB, AAA, ABA, ABC) supported by the system, as well as for each sub-phrase form (a, aa, ab, aaa, aba, abc), and these probability-based parameter tables are used during the automated music composition and generation process of the present invention;

Another object of the present invention is to provide such an Automated Music Composition and Generation System, wherein a probability-based parameter table is maintained in the Sub-Phrase Length Generation Subsystem (B15) of its Automated Music Composition and Generation Engine, wherein for each musical experience descriptor selected by the system user, a probability measure is provided for each sub-phrase length (i.e. measures) supported by the system, and this probability-based parameter table is used during the automated music composition and generation process of the present invention.

Another object of the present invention is to provide such an Automated Music Composition and Generation System, wherein a probability-based parameter tables is maintained in the Chord Length Generation Subsystem (B11) of its Automated Music Composition and Generation Engine, wherein for each musical experience descriptor selected by the system user, a probability measure is provided for each initial chord length and second chord lengths supported by the system, and these probability-based parameter tables are used during the automated music composition and generation process of the present invention.

Another object of the present invention is to provide such an Automated Music Composition and Generation System, wherein a probability-based parameter tables is maintained in the Initial General Rhythm Generation Subsystem (B17) of its Automated Music Composition and Generation Engine, wherein for each musical experience descriptor selected by the system user, a probability measure is provided for each root note (i.e. indicated by musical letter) supported by the system, and these probability-based parameter tables are used during the automated music composition and generation process of the present invention.

Another object of the present invention is to provide such an Automated Music Composition and Generation System, wherein probability-based parameter tables are maintained in the Sub-Phrase Chord Progression Generation Subsystem (B19) of its Automated Music Composition and Generation Engine, wherein for each musical experience descriptor selected by the system user, a probability measure is provided for each original chord root (i.e. indicated by musical letter) and upcoming beat in the measure supported by the system, and these probability-based parameter tables are used during the automated music composition and generation process of the present invention.

Another object of the present invention is to provide such an Automated Music Composition and Generation System, wherein a probability-based parameter tables is maintained in the Chord Inversion Generation Subsystem (B20) of its Automated Music Composition and Generation Engine, wherein for each musical experience descriptor selected by the system user, a probability measure is provided for each inversion and original chord root (i.e. indicated by musical letter) supported by the system, and these probability-based parameter tables are used during the automated music composition and generation process of the present invention.

Another object of the present invention is to provide such an Automated Music Composition and Generation System, wherein a probability-based parameter tables is maintained in the Melody Sub-Phrase Length Progression Generation Subsystem (B25) of its Automated Music Composition and Generation Engine, wherein for each musical experience descriptor selected by the system user, a probability measure is provided for each original chord root (i.e. indicated by musical letter) supported by the system, and this probability-based parameter table is used during the automated music composition and generation process of the present invention.

Another object of the present invention is to provide such an Automated Music Composition and Generation System, wherein a probability-based parameter tables is maintained in the Melody Note Rhythm Generation Subsystem (B26) of its Automated Music Composition and Generation Engine, wherein for each musical experience descriptor selected by the system user, a probability measure is provided for each initial note length and second chord lengths supported by the system, and these probability-based parameter tables are used during the automated music composition and generation process of the present invention.

Another object of the present invention is to provide such an Automated Music Composition and Generation System, wherein a probability-based parameter table is maintained in the Initial Pitch Generation Subsystem (B27) of its Automated Music Composition and Generation Engine, wherein for each musical experience descriptor selected by the system user, a probability measure is provided for each note (i.e. indicated by musical letter) supported by the system, and this probability-based parameter table is used during the automated music composition and generation process of the present invention.

Another object of the present invention is to provide such an Automated Music Composition and Generation System, wherein probability-based parameter tables are maintained in the Sub-Phrase Pitch Generation Subsystem (B29) of its Automated Music Composition and Generation Engine, and wherein for each musical experience descriptor selected by the system user, a probability measure is provided for each original note (i.e. indicated by musical letter) supported by the system, and leap reversal, and these probability-based parameter tables are used during the automated music composition and generation process of the present invention.

Another object of the present invention is to provide such an Automated Music Composition and Generation System, wherein a probability-based parameter table is maintained in the Melody Sub-Phrase Length Progression Generation Subsystem (B25) of its Automated Music Composition and Generation Engine, and wherein for each musical experience descriptor selected by the system user, a probability measure is provided for the length of time the melody starts into the sub-phrase that are supported by the system, and this probability-based parameter table is used during the automated music composition and generation process of the present invention.

Another object of the present invention is to provide such an Automated Music Composition and Generation System, wherein probability-based parameter tables are maintained in the Melody Note Rhythm Generation Subsystem (B25) of its Automated Music Composition and Generation Engine, and wherein for each musical experience descriptor selected by the system user, a probability measure is provided for each initial note length, second chord length (i.e. measure), and $n^{th}$ chord length supported by the system, and these probability-based parameter tables are used during the automated music composition and generation process of the present invention.

Another object of the present invention is to provide such an Automated Music Composition and Generation System, wherein a probability-based parameter table are maintained in the Initial Pitch Generation Subsystem (B27) of its Automated Music Composition and Generation Engine, and wherein for each musical experience descriptor selected by the system user, a probability-based measure is provided for each note supported by the system, and this probability-based parameter table is used during the automated music composition and generation process of the present invention.

Another object of the present invention is to provide such an Automated Music Composition and Generation System, wherein probability-based parameter tables are maintained in the sub-phrase pitch generation subsystem (B29) of its Automated Music Composition and Generation Engine, and wherein for each musical experience descriptor selected by the system user, a probability measure is provided for each original note and leap reversal supported by the system, and these probability-based parameter tables are used during the automated music composition and generation process of the present invention.

Another object of the present invention is to provide such an Automated Music Composition and Generation System, wherein probability-based parameter tables are maintained in the Pitch Octave Generation Subsystem (B30) of its Automated Music Composition and Generation Engine, and wherein for each musical experience descriptor selected by the system user, a set of probability measures are provided, and this probability-based parameter table is used during the automated music composition and generation process of the present invention.

Another object of the present invention is to provide such an Automated Music Composition and Generation System, wherein probability-based parameter tables are maintained in the Instrument Selector Subsystem (B39) of its Automated Music Composition and Generation Engine, wherein for each musical experience descriptor selected by the system user, a probability measure is provided for each instrument supported by the system, and these probability-based parameter tables are used during the automated music composition and generation process of the present invention.

Another object of the present invention is to provide such an Automated Music Composition and Generation System, wherein probability-based parameter tables are maintained in the Orchestration Generation Subsystem (B31) of the Automated Music Composition and Generation Engine, and wherein for each musical experience descriptor selected by the system user, probability measures are provided for each instrument supported by the system, and these parameter tables are used during the automated music composition and generation process of the present invention.

Another object of the present invention is to provide such an Automated Music Composition and Generation System, wherein probability-based parameter tables are maintained in the Controller Code Generation Subsystem (B32) of the Automated Music Composition and Generation Engine, and wherein for each musical experience descriptor selected by the system user, probability measures are provided for each instrument supported by the system, and these parameter tables are used during the automated music composition and generation process of the present invention.

Another object of the present invention is to provide such an Automated Music Composition and Generation System, wherein a Timing Control Subsystem is used to generate timing control pulse signals which are sent to each subsystem, after the system has received its musical experience descriptor inputs from the system user, and the system has been automatically arranged and configured in its operating mode, wherein music is automatically composed and generated in accordance with the principles of the present invention.

Another object of the present invention is to provide a novel system and method of automatically composing and generating music in an automated manner using a real-time pitch event analyzing subsystem.

Another object of the present invention is to provide such an automated music composition and generation system, supporting a process comprising the steps of: (a) providing musical experience descriptors (e.g. including "emotion-type" musical experience descriptors, and "style-type" musical experience descriptors) to the system user interface of the automated music composition and generation system; (b) providing lyrical input (e.g. in typed, spoken or sung format) to the system-user interface of the system, for one or more scenes in a video or media object to be scored with music composed and generated by the system; (c) using the real-time pitch event analyzing subsystem for processing the lyrical input provided to the system user interface, using real-time rhythmic, pitch event, and prosodic analysis of typed/spoken/sung lyrics or words (for certain frames of the scored media), based on time and/or frequency domain techniques; (d) using the real-time pitch event analyzing subsystem to extract pitch events, rhythmic information and prosodic information on a high-resolution time line from the analyzed lyrical input, and code with timing information on when such detected events occurred; and (e) providing the extracted information to the automated music composition and generation engine for use in constraining the probability-based parameters tables employed in the various subsystems of the automated system.

Another object of the present invention is to provide a distributed, remotely accessible GUI-based work environment supporting the creation and management of parameter configurations within the parameter transformation engine subsystem of the automated music composition and generation system network of the present invention, wherein system designers remotely situated anywhere around the globe can log into the system network and access the GUI-based work environment and create parameter mapping configurations between (i) different possible sets of emotion-type, style-type and timing/spatial parameters that might be selected by system users, and (ii) corresponding sets of probability-based music-theoretic system operating parameters, preferably maintained within parameter tables, for persistent storage within the parameter transformation engine subsystem and its associated parameter table archive database subsystem supported on the automated music composition and generation system network of the present invention.

Yet, another object of the present invention is to provide a novel automated music composition and generation systems for generating musical score representations of automatically composed pieces of music responsive to emotion and style type musical experience descriptors, and converting such representations into MIDI control signals to drive and control one or more MIDI-based musical instruments that produce an automatically composed piece of music for the enjoyment of others.

These and other objects of the present invention will become apparent hereinafter and in view of the appended Claims to Invention.

BRIEF DESCRIPTION OF THE DRAWINGS

The Objects of the Present Invention will be more fully understood when read in conjunction with the Figures Drawings, wherein:

FIG. 2 is a flow chart illustrating the primary steps involved in carrying out the generalized automated music composition and generation process of the present invention supporting the use of virtual-instrument music synthesis driven by linguistic and/or graphical icon based musical experience descriptors and, wherein (i) during the first step of the process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 6 is a flow chart illustrating the primary steps involved in carrying out the automated music composition and generation process of the first illustrative embodiment of the present invention supporting the use of linguistic and/or graphical icon based musical experience descriptors and virtual-instrument music synthesis using the instrument system shown in FIGS. 3 through 5, wherein (i) during the first step of the process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 7 shows a prospective view of a toy instrument supporting Automated Music Composition and Generation Engine of the second illustrative embodiment of the present invention using virtual-instrument music synthesis driven by icon-based musical experience descriptors, wherein a touch screen display is provided to select and load videos from a library, and children can then select musical experience descriptors (e.g. emotion descriptor icons and style descriptor icons) from a physical keyboard to allow a child to compose and generate custom music for segmented scene of a selected video;

FIG. 10 is a flow chart illustrating the primary steps involved in carrying out the automated music composition and generation process within the toy music composing and generation system of the second illustrative embodiment of the present invention, supporting the use of virtual-instrument music synthesis driven by graphical icon based musical experience descriptors using the instrument system shown in FIGS. 7 through 9, wherein (i) during the first step of the process, the system user accesses the Automated Music Composition and Generation System of the present invention, and then selects a video to be scored with music generated by the Automated Music Composition and Generation Engine of the present invention, (ii) the system user selects graphical icon-based musical experience descriptors to be provided to the Automated Music Composition and Generation Engine of the system, (iii) the system user initiates the Automated Music Composition and Generation Engine to compose and generate music based on inputted musical descriptors scored on selected video media, and (iv) the system combines the composed music with the selected video so as to create a video file for display and enjoyment;

FIG. 11B is a schematic representation of the system illustrated in FIGS. 11 and 11A, comprising a SOC-based subsystem architecture including a multi-core CPU, a multi-core GPU, program memory (RAM), and video memory (VRAM), shown interfaced with a solid-state (DRAM) hard drive, a LCD/Touch-screen display panel, a micro-phone speaker, a keyboard or keypad, WIFI/Bluetooth network adapters, and 3G/LTE/GSM network adapter integrated with one or more bus architecture supporting controllers and the like;

FIG. 12 is a flow chart illustrating the primary steps involved in carrying out the automated music composition and generation process of the present invention using the SOC-based system shown in FIGS. 11 and 11A supporting the use of virtual-instrument music synthesis driven by linguistic and/or graphical icon based musical experience descriptors and, wherein (i) during the first step of the process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 14 is a flow chart illustrating the primary steps involved in carrying out the Automated Music Composition And Generation Process of the present invention supported by the system illustrated in FIGS. 13 and 13A, wherein (i) during the first step of the process, the system user accesses the Automated Music Composition and Generation System of the present invention, and then selects a video, an audio-recording (i.e. podcast), slideshow, a photograph or image, or an event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 15C is an exemplary graphical user interface (GUI) screen that is generated and served by the system illustrated in FIGS. 13 and 14, wherein the selected video is displayed for scoring according to the principles of the present invention;

FIG. 15U is an exemplary graphical user interface (GUI) screen that is generated and served by the system illustrated in FIGS. 13 and 14, when the system user's composed music is ready for review;

FIG. 16C is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a Microsoft Word, PDF, or image (e.g. jpg or tiff) document, and the creation and insertion of a piece of composed music created by selecting linguistic and/or graphical-icon based emotion descriptors, and style-descriptors, from a menu screen;

FIG. 19 is a flow chart illustrating the primary steps involved in carrying out the automated music composition and generation process of the present invention using the Web-based system shown in FIGS. 16 and 18 supporting the use of virtual-instrument music synthesis driven by linguistic and/or graphical icon based musical experience descriptors so as to create musically-scored text, SMS, email, PDF, Word and/or html documents, wherein (i) during the first step of the process, the system user accesses the Automated Music Composition and Generation System of the present invention, and then selects a text, SMS or email message or Word, PDF or HTML document to be scored (e.g. augmented) with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected messages or documents, (iv) the system user accepts composed and generated music produced for the message or document, or rejects the music and provides feedback to the system, including providing different musical experience descriptors and a request to re-compose music based on the updated musical experience descriptor inputs, and (v) the system combines the accepted composed music with the message or document, so as to create a new file for distribution and display;

FIG. 24 is a flow chart illustrating the primary steps involved in carrying out the automated music composition and generation process of the present invention using the system shown in FIGS. 20 through 23, wherein (i) during the first step of the process, the system user selects either the LEAD or FOLLOW mode of operation for the automated musical composition and generation instrument system of the present invention, (ii) prior to the session, the system is then is interfaced with a group of musical instruments played by a group of musicians in a creative environment during a musical session, (iii) during the session system receives audio and/or MIDI data signals produced from the group of instruments during the session, and analyzes these signals for pitch data and melodic structure, (iv) during the session, the system automatically generates musical descriptors from abstracted pitch and melody data, and uses the musical experience descriptors to compose music for the session on a real-time basis, and (v) in the event that the PERFORM mode has been selected, the system generates the composed music, and in the event that the COMPOSE mode has been selected, the music composed during for the session is stored for subsequent access and review by the group of musicians;

FIG. 25B is a higher-level system diagram illustrating that the system of the present invention comprises two very high-level "musical landscape" categorizations, namely: (i) a Pitch Landscape Subsystem C0 comprising the General Pitch Generation Subsystem A2, the Melody Pitch Generation Subsystem A4, the Orchestration Subsystem A5, and the Controller Code Creation Subsystem A6; and (ii) a Rhythmic Landscape Subsystem C1 comprising the General Rhythm Generation Subsystem A1, Melody Rhythm Generation Subsystem A3, the Orchestration Subsystem A5, and the Controller Code Creation Subsystem A6;

FIGS. 27B1 and 27B2, taken together, show a schematic representation of the Descriptor Parameter Capture Subsystem (B1) used in the Automated Music Composition and Generation Engine of the present invention, wherein the system user provides the exemplary "emotion-type" musical experience descriptor—HAPPY—to the descriptor parameter capture subsystem for distribution to the probability-based parameter tables employed in the various subsystems therein, and subsequent subsystem set up and use during the automated music composition and generation process of the present invention;

FIGS. 27B3A, 27B3B and 27B3C, taken together, provide a schematic representation of the Parameter Transformation Engine Subsystem (B51) configured with the Parameter Capture Subsystem (B1), Style Parameter Capture Subsystem (B37) and Timing Parameter Capture Subsystem (B40) used in the Automated Music Composition and Generation Engine of the present invention, for receiving emotion-type and style-type musical experience descriptors and timing/spatial parameters for processing and transformation into music-theoretic system operating parameters for distribution, in table-type data structures, to various subsystems in the system of the illustrative embodiments;

FIGS. 27B4A, 27B4B, 27B4C, 27B4D and 27B4E, taken together, provide a schematic map representation specifying the locations of particular music-theoretic system operating parameter (SOP) tables employed within the subsystems of the automatic music composition and generation system of the present invention;

FIG. 27B5 is a schematic representation of the Parameter Table Handling and Processing Subsystem (B70) used in the Automated Music Composition and Generation Engine of the present invention, wherein multiple emotion/style-specific music-theoretic system operating parameter (SOP) tables are received from the Parameter Transformation Engine Subsystem B51 and handled and processed using one or parameter table processing methods M1, M2 or M3 so as to generate system operating parameter tables in a form that is more convenient and easier to process and use within the subsystems of the system of the present invention;

FIG. 27B6 is a schematic representation of the Parameter Table Archive Database Subsystem (B80) used in the Automated Music Composition and Generation System of the present invention, for storing and archiving system user account profiles, tastes and preferences, as well as all emotion/style-indexed system operating parameter (SOP) tables generated for system user music composition requests on the system;

FIGS. 27C1 and 27C2, taken together, show a schematic representation of the Style Parameter Capture Subsystem (B37) used in the Automated Music Composition and Generation Engine of the present invention, wherein the probability-based parameter table employed in the subsystem is set up for the exemplary "style-type" musical experience descriptor—POP—and used during the automated music composition and generation process of the present invention;

FIGS. 27E1 and 27E2, taken together, show a schematic representation of the Timing Generation Subsystem (B41) used in the Automated Music Composition and Generation Engine of the present invention, wherein the timing parameter capture subsystem (B40) provides timing parameters (e.g. piece length) to the timing generation subsystem (B41) for generating timing information relating to (i) the length of the piece to be composed, (ii) start of the music piece, (iii) the stop of the music piece, (iv) increases in volume of the music piece, and (v) accents in the music piece, that are to be created during the automated music composition and generation process of the present invention;

FIG. 28 is a schematic representation of a table describing exemplary data formats that are supported by the various data input and output signals (e.g. text, chord, audio file, binary, command, meter, image, time, pitch, number, tonality, tempo, letter, linguistics, speech, MIDI, etc.) passing through the various specially configured information processing subsystems employed in the Automated Music Composition and Generation System of the present invention;

FIGS. 29A, 29B, 29C, 29D, 29E, and 29F, taken together, provide a schematic representation of a table describing exemplary hierarchical set of "emotional" descriptors, arranged according to primary, secondary and tertiary emotions, which are supported as "musical experience descriptors" for system users to provide as input to the Automated Music Composition and Generation System of the illustrative embodiment of the present invention;

FIGS. 30, 30A 30B, 30C, 30D and 30E, taken together, provide a table describing an exemplary set of "style" musical experience descriptors (MUSEX) which are supported for system users to provide as input to the Automated Music Composition and Generation System of the illustrative embodiment of the present invention;

FIG. 32B is a schematic representation of the GUI-based work environment supported by the system network shown in FIG. 32A, wherein the system designer selects (i) manage existing parameter mapping configurations, and is presented a list of currently created parameter mapping configurations that have been created and loaded into persistent storage in the Parameter Transformation Engine Subsystem B51 of the system of the present invention;

FIG. 34 is a high-level flow chart set providing an overview of the automated music composition and generation process supported by the various systems of the present invention, with reference to FIGS. 26A through 26P, illustrating the high-level system architecture provided by the system to support the automated music composition and generation process of the present invention.

DETAILED DESCRIPTION OF THE ILLUSTRATIVE EMBODIMENTS OF THE PRESENT INVENTION

Figure 1:
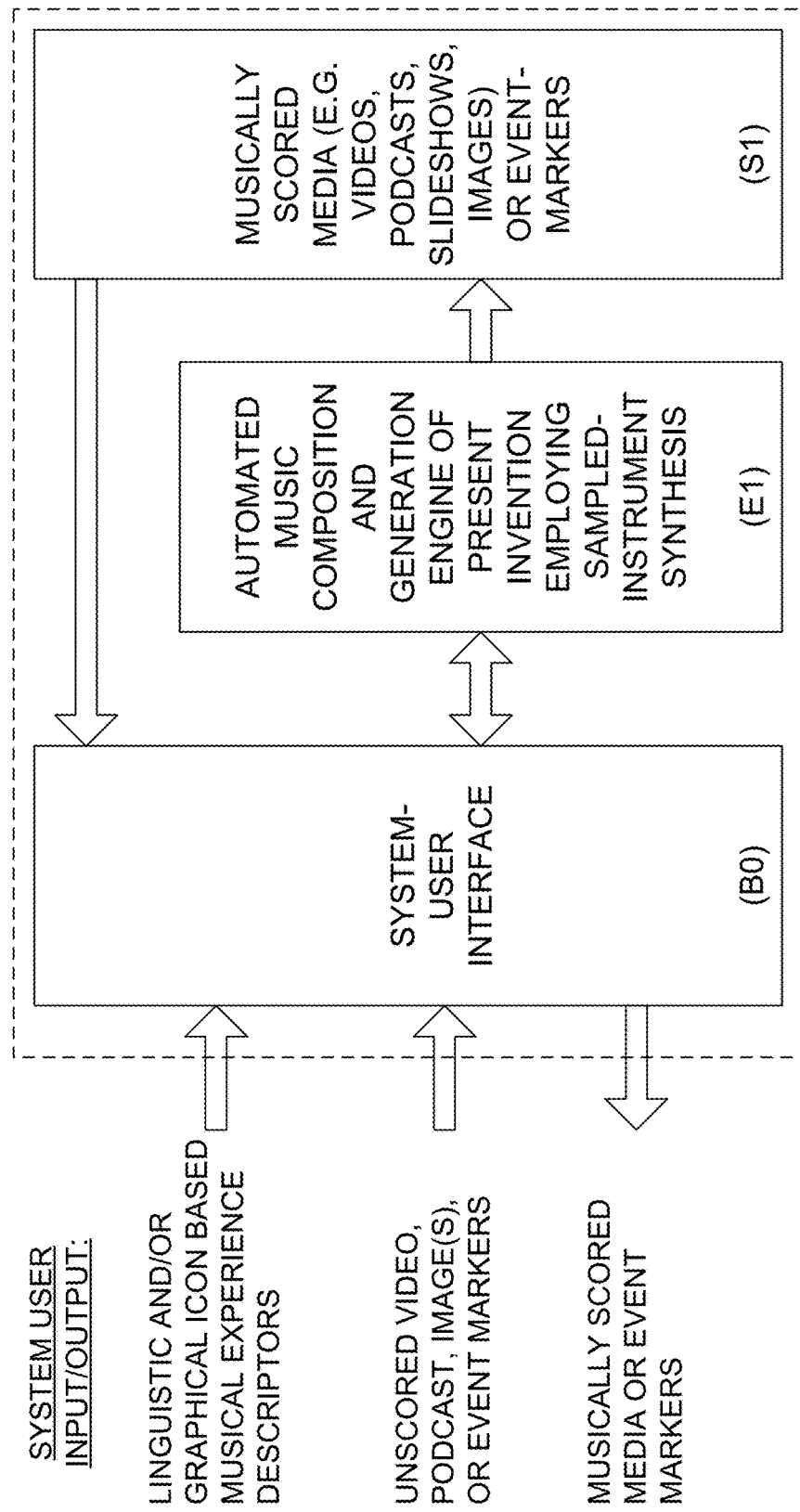
FIG. 1 is schematic representation illustrating the high-level system architecture of the automated music composition and generation system (i.e. machine) of the present invention supporting the use of virtual-instrument music synthesis driven by linguistic and/or graphical icon based musical experience descriptors and, wherein linguistic-based musical experience descriptors, and a video, audio-recording, image, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

Referring to the accompanying Drawings, like structures and elements shown throughout the figures thereof shall be indicated with like reference numerals.

Overview on the Automated Music Composition and Generation System of the Present Invention, and the Employment of its Automated Music Composition and Generation Engine in Diverse Applications FIG. 1 shows the high-level system architecture of the automated music composition and generation system of the present invention 51 supporting the use of virtual-instrument music synthesis driven by linguistic and/or graphical icon based musical experience descriptors, wherein there linguistic-based musical experience descriptors, and an piece of media (e.g. video, audio file, image), or an event marker, are supplied by the system user as input through the system user input output (I/O) interface B0, and used by the Automated Music Composition and Generation Engine of the present invention E1, illustrated in FIGS. 25A through 30E, to generate musically-scored media (e.g. video, podcast, audio file, slideshow etc.) or event marker, that is then supplied back to the system user via the system user (I/O) interface B0. The details of this novel system and its supporting information processes will be described in great technical detail hereinafter.

Figure 25A:
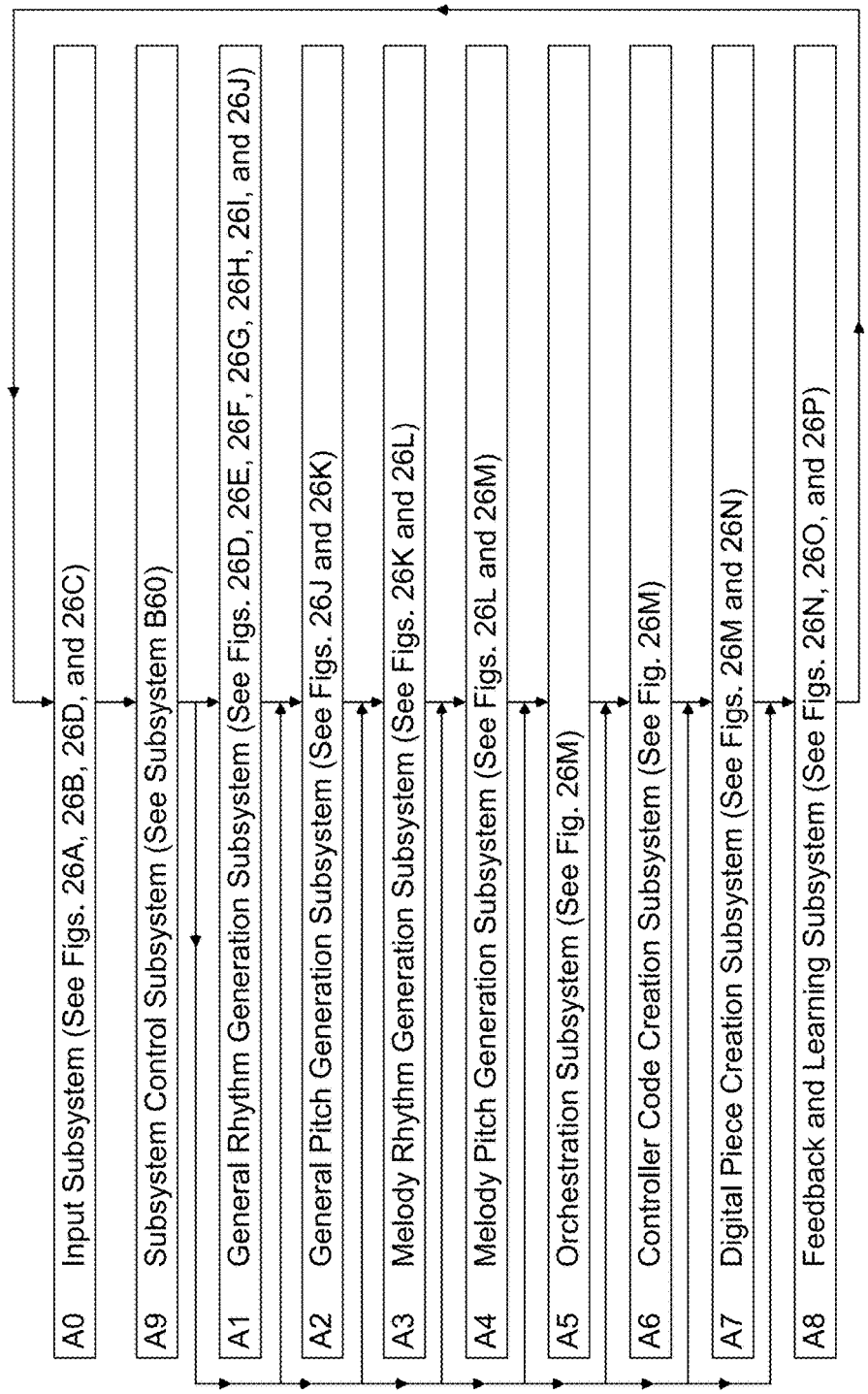
FIG. 25A is a high-level system diagram for the Automated Music Composition and Generation Engine of the present invention employed in the various embodiments of the present invention herein, comprising a user GUI-Based Input Subsystem, a General Rhythm Subsystem, a General Rhythm Generation Subsystem, a Melody Rhythm Generation Subsystem, a Melody Pitch Generation Subsystem, an Orchestration Subsystem, a Controller Code Creation Subsystem, a Digital Piece Creation Subsystem, and a Feedback and Learning Subsystem configured as shown.

The architecture of the automated music composition and generation system of the present invention is inspired by the inventor's real-world experience composing music scores for diverse kinds of media including movies, video-games and the like. As illustrated in FIGS. 25A and 25B, the system of the present invention comprises a number of higher level subsystems including specifically; an input subsystem A0, a General Rhythm subsystem A1, a General Rhythm Generation Subsystem A2, a melody rhythm generation subsystem A3, a melody pitch generation subsystem A4, an orchestration subsystem A5, a controller code creation subsystem A6, a digital piece creation subsystem A7, and a feedback and learning subsystem A8. As illustrated in the schematic diagram shown in FIGS. 27B1 and 27B2, each of these high-level subsystems A0-A7 comprises a set of subsystems, and many of these subsystems maintain probabilistic-based system operating parameter tables (i.e. structures) that are generated and loaded by the Transformation Engine Subsystem B51.

FIG. 2 shows the primary steps for carrying out the generalized automated music composition and generation process of the present invention using automated virtual-instrument music synthesis driven by linguistic and/or graphical icon based musical experience descriptors. As used herein, the term "virtual-instrument music synthesis" refers to the creation of a musical piece on a note-by-note and chord-by-chord basis, using digital audio sampled notes, chords and sequences of notes, recorded from real or virtual instruments, using the techniques disclosed herein. This method of music synthesis is fundamentally different from methods where many loops, and tracks, of music are pre-recorded and stored in a memory storage device (e.g. a database) and subsequently accessed and combined together, to create a piece of music, as there is no underlying music theoretic characterization/specification of the notes and chords in the components of music used in this prior art synthesis method. In marked contrast, strict musical-theoretic specification of each musical event (e.g. note, chord, phrase, sub-phrase, rhythm, beat, measure, melody, and pitch) within a piece of music being automatically composed and generated by the system/machine of the present invention, must be maintained by the system during the entire music composition/generation process in order to practice the virtual-instrument music synthesis method in accordance with the principles of the present invention.

As shown in FIG. 2, during the first step of the automated music composition process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

The automated music composition and generation system is a complex system comprised of many subsystems, wherein complex calculators, analyzers and other specialized machinery is used to support highly specialized generative processes that support the automated music composition and generation process of the present invention. Each of these components serves a vital role in a specific part of the music composition and generation engine system (i.e. engine) of the present invention, and the combination of each component into a ballet of integral elements in the automated music composition and generation engine creates a value that is truly greater that the sum of any or all of its parts. A concise and detailed technical description of the structure and functional purpose of each of these subsystem components is provided hereinafter in FIGS. 27A through 27XX.

Figure 26A:
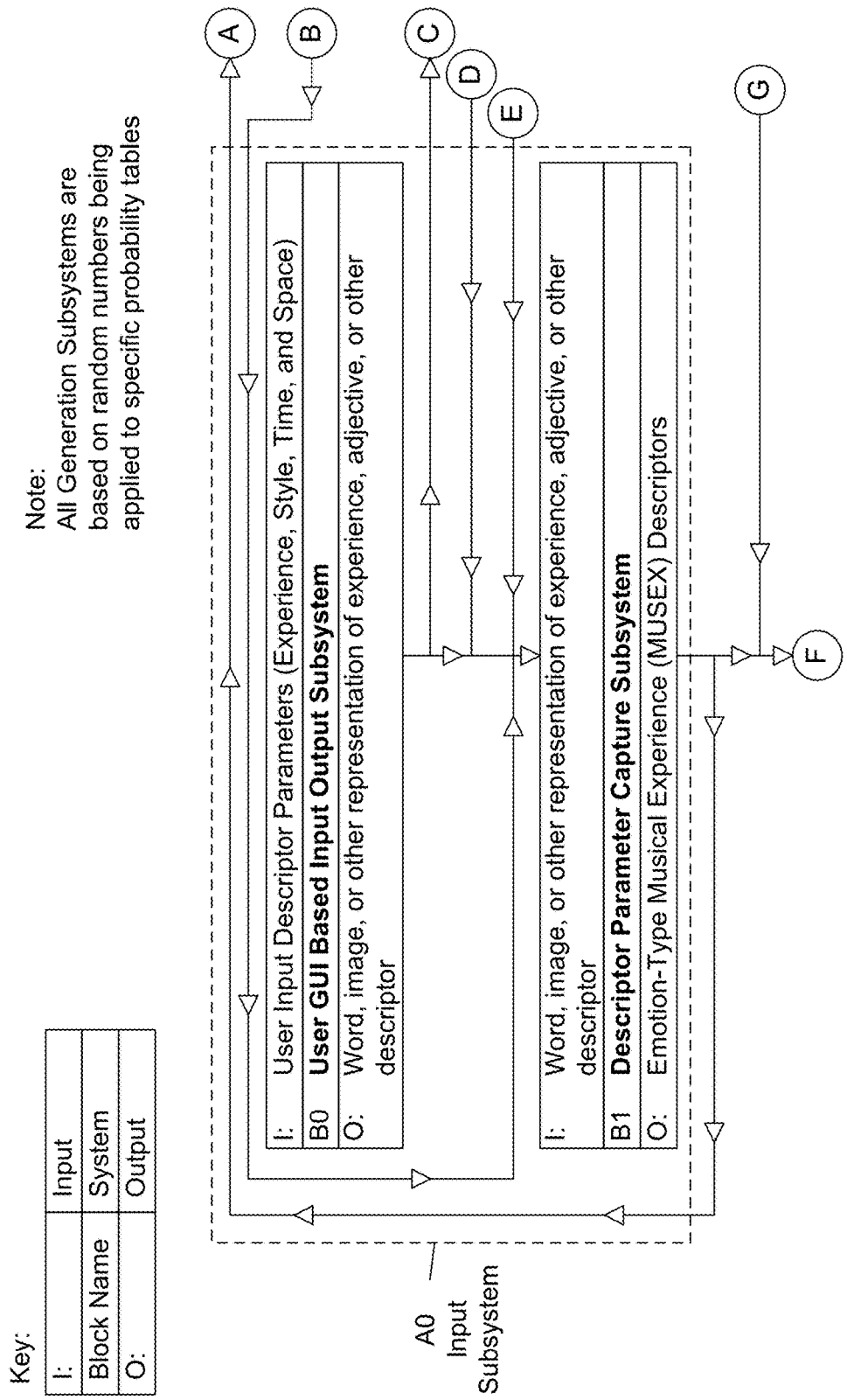
FIGS. 26A, 26B, 26C, 26D, 26E, 26F, 26G, 26H, 26I, 26J, 26K, 26L, 26M, 26N, 26O and 26P, taken together, provide a detailed system diagram showing each subsystem in FIGS. 25A and 25B configured together with other subsystems in accordance with the principles of the present invention, so that musical descriptors provided to the user GUI-Based Input Output System B0 are distributed to their appropriate subsystems for use in the automated music composition and generation process of the present invention.
Figure 26B:
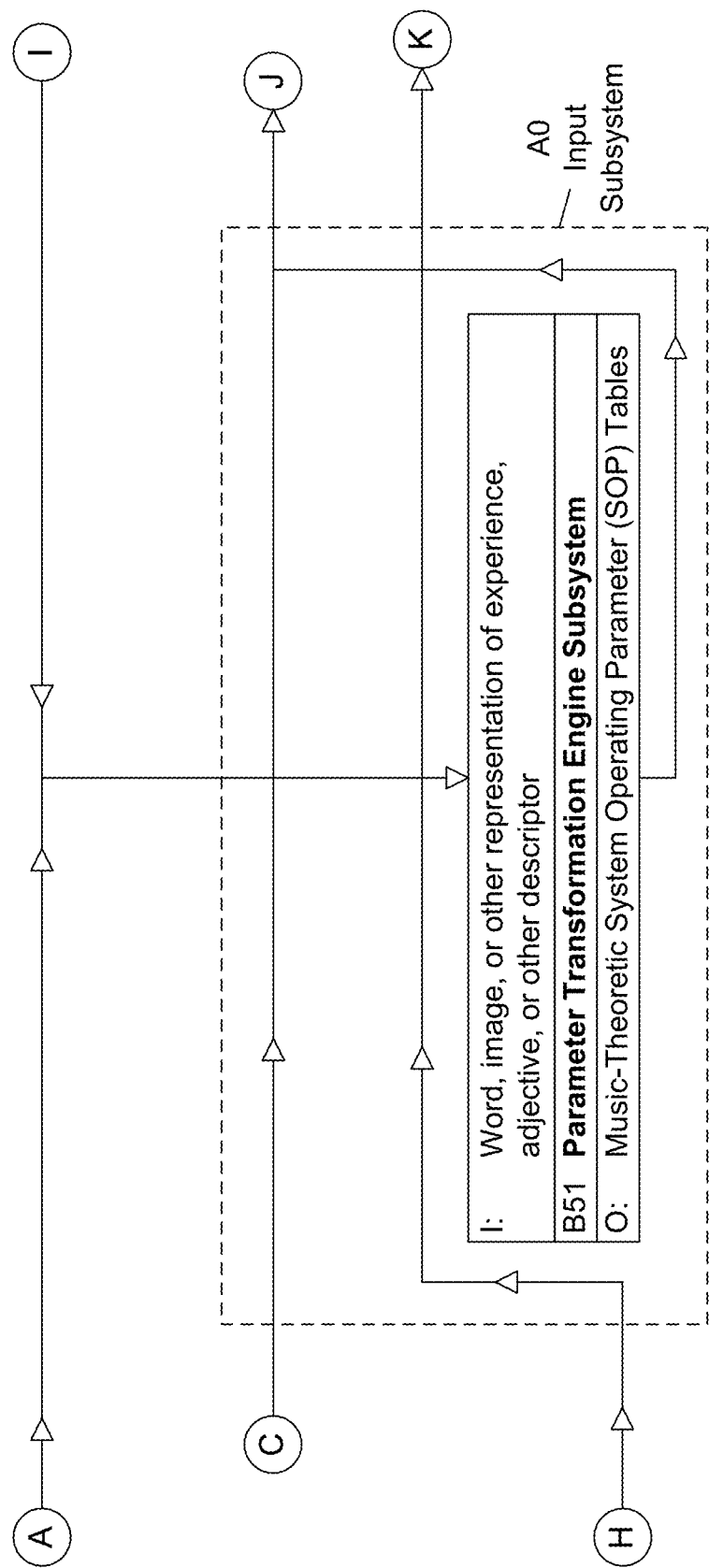
Figure 26C:
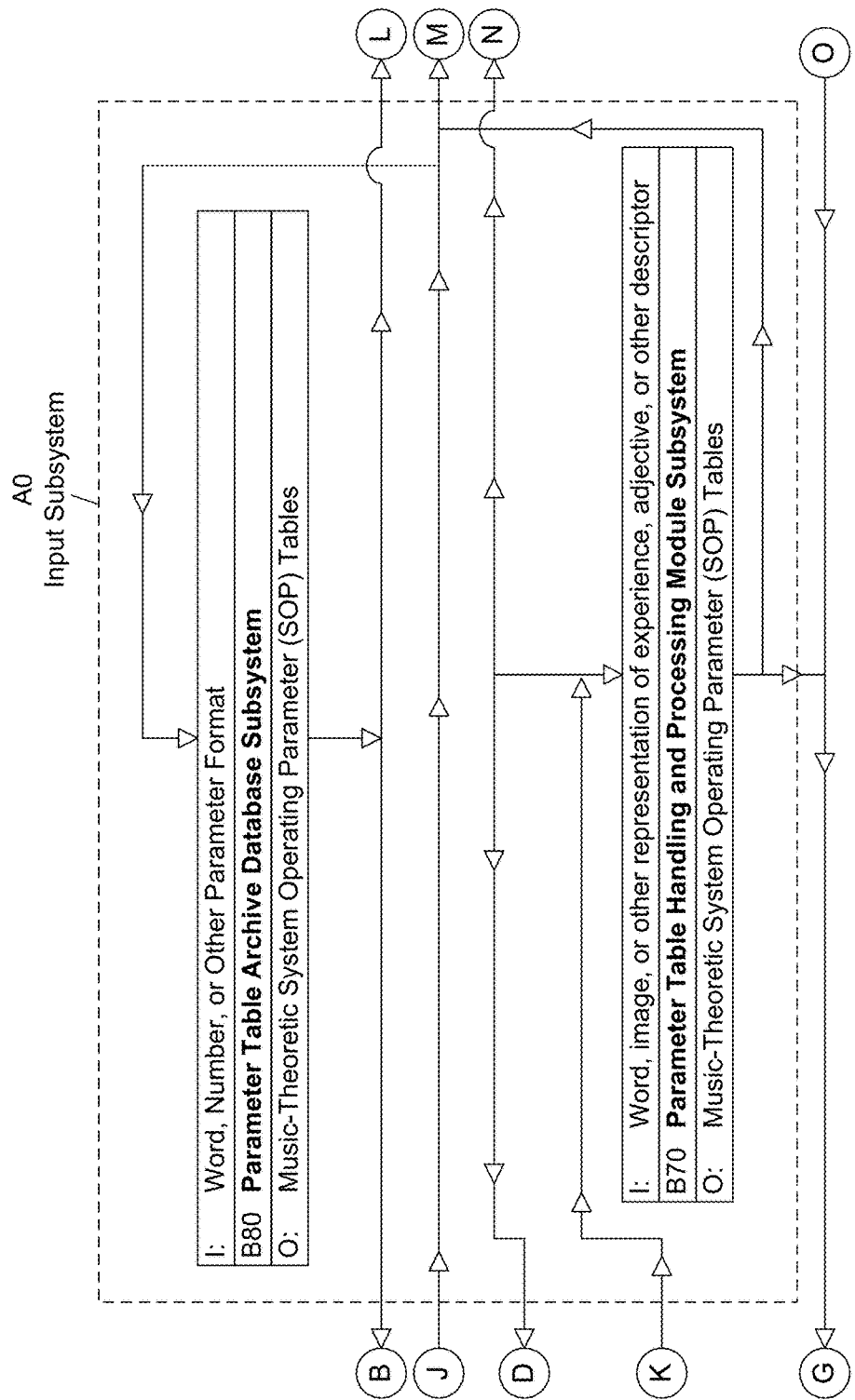
Figure 26D:
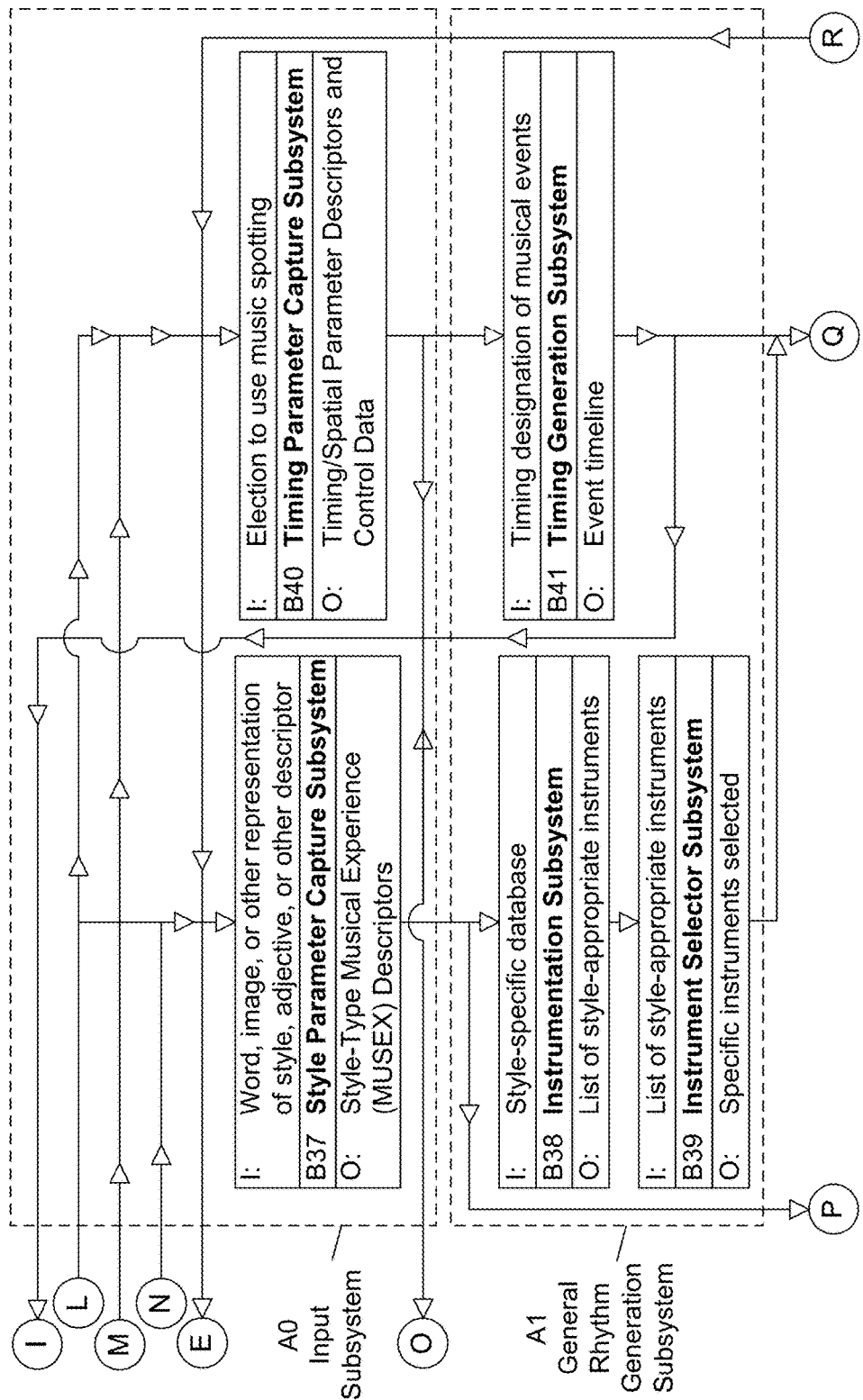
Figure 26E:
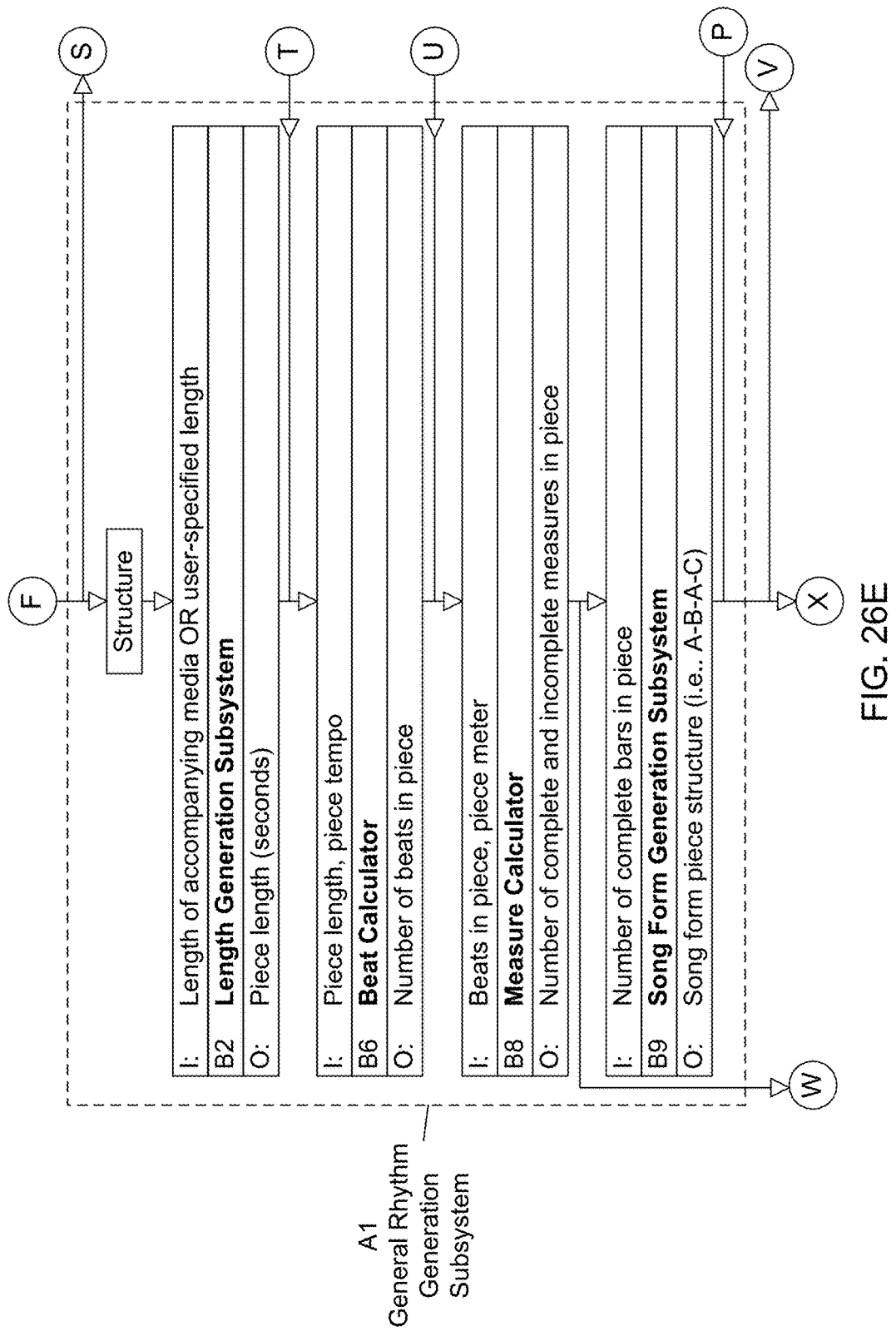
Figure 26F:
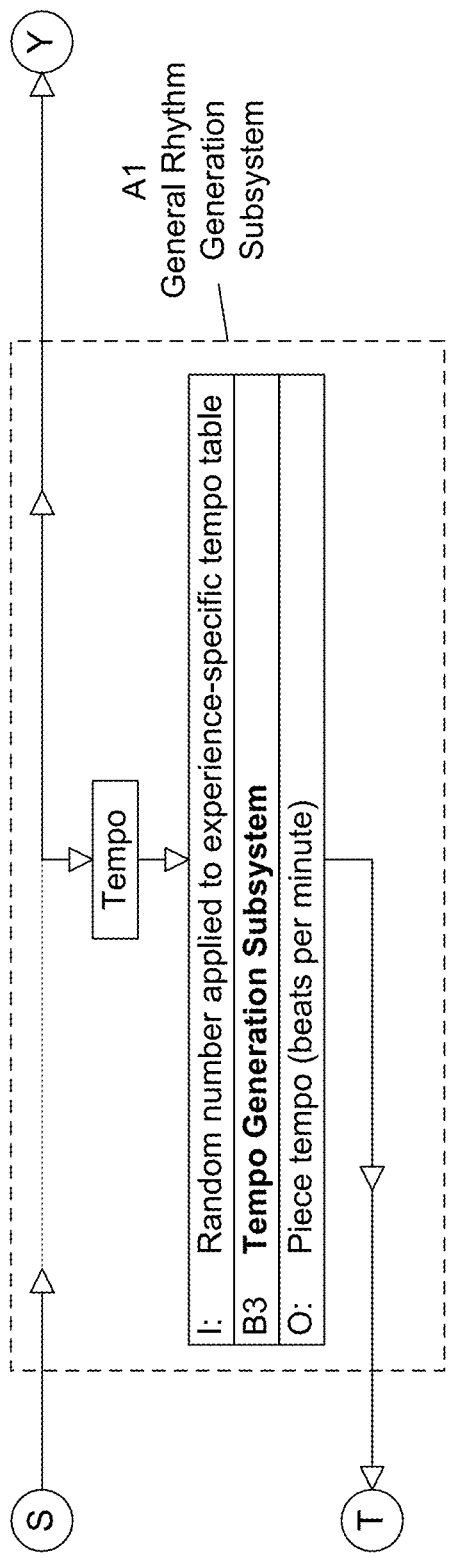
Figure 26G:
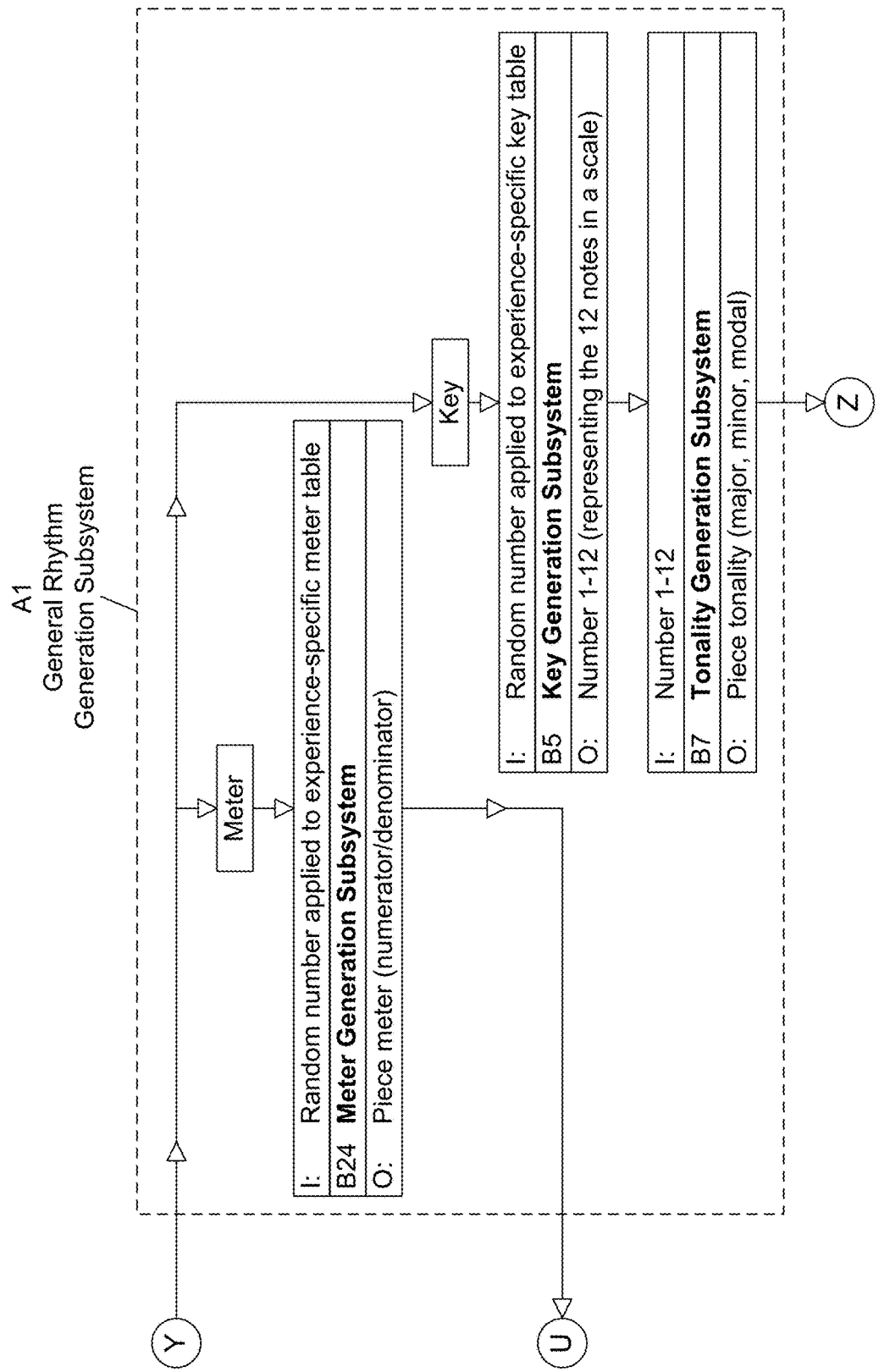
Figure 26H:
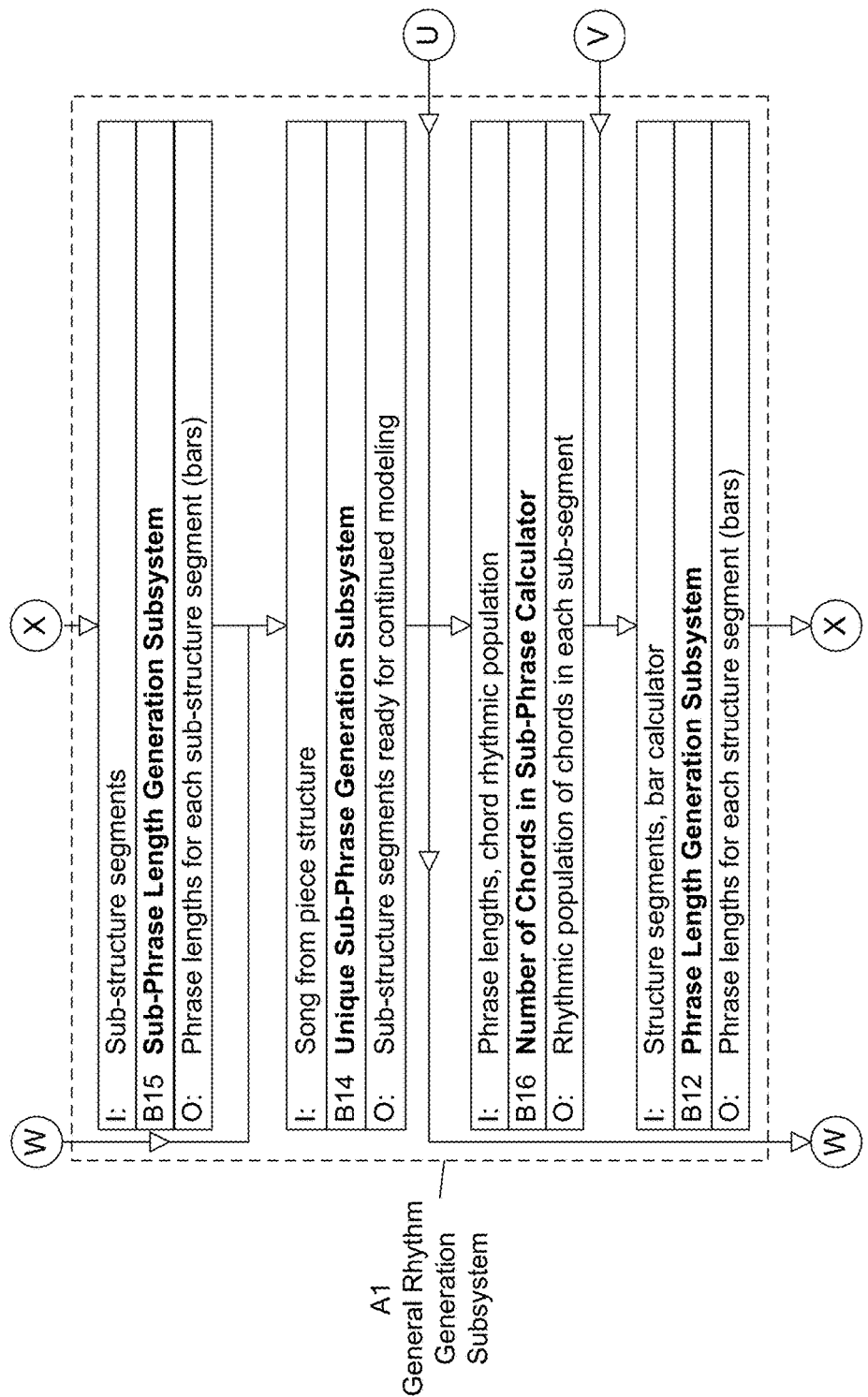
Figure 26I:
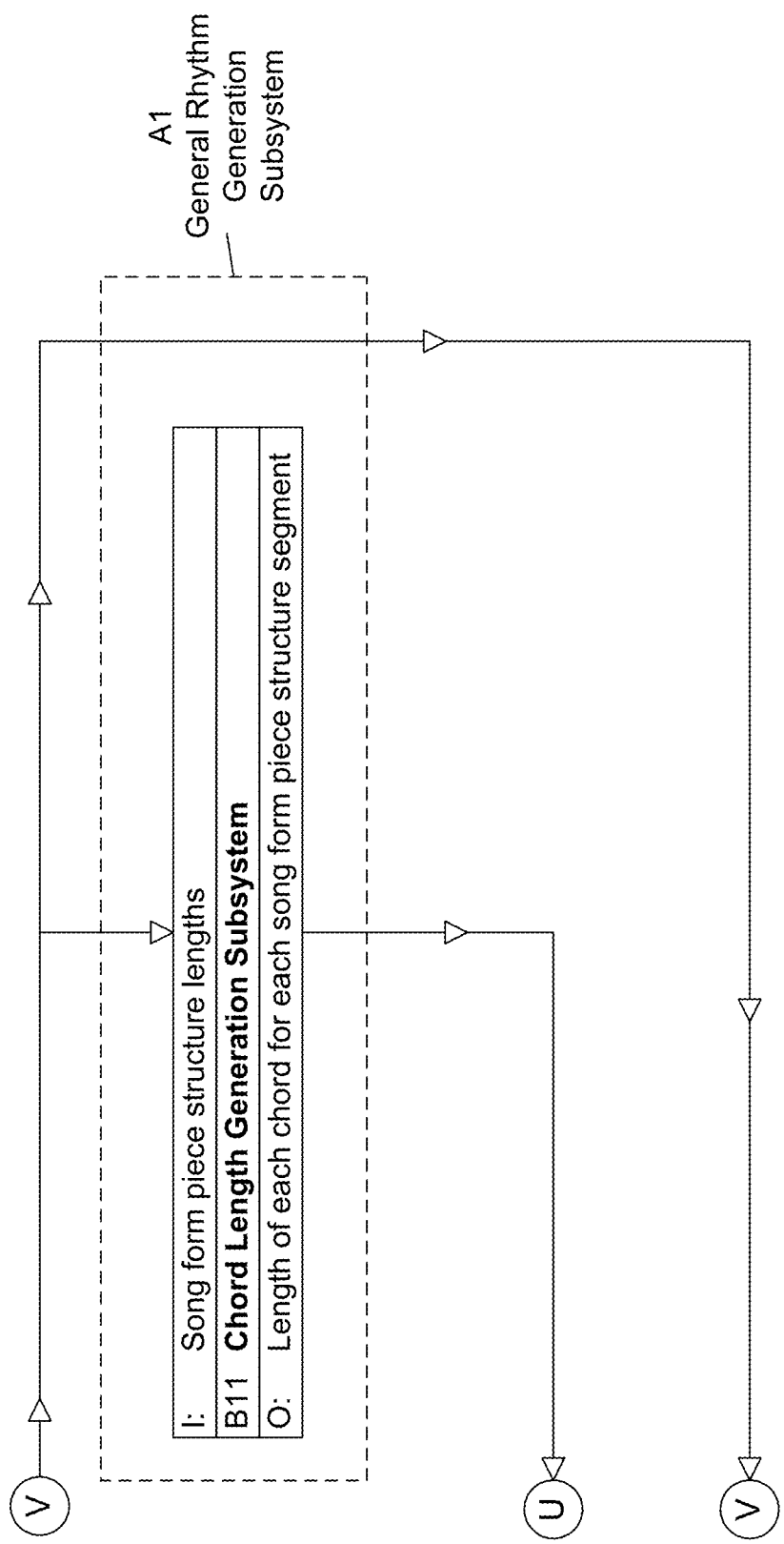
Figure 26J:
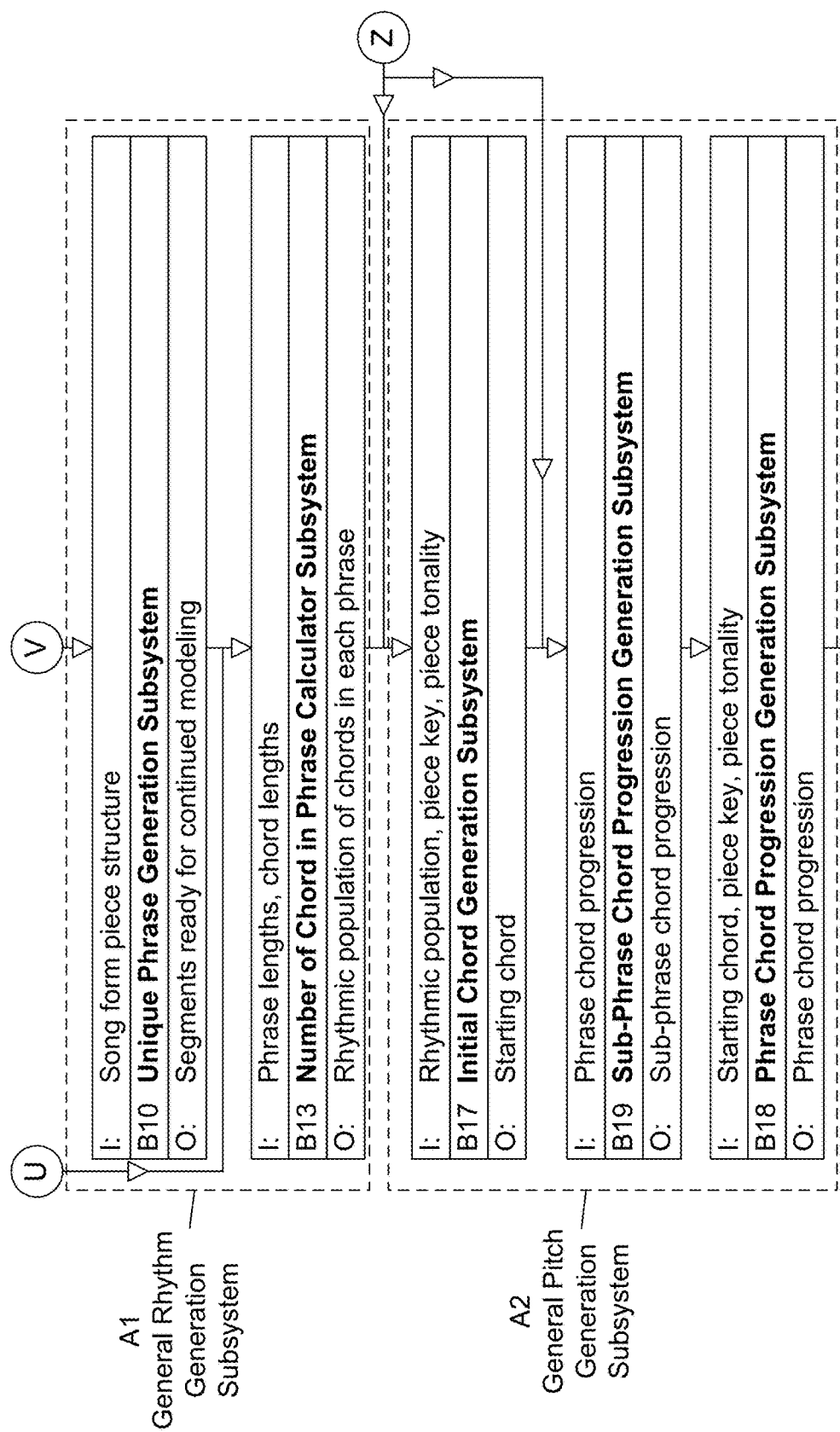
Figure 26K:
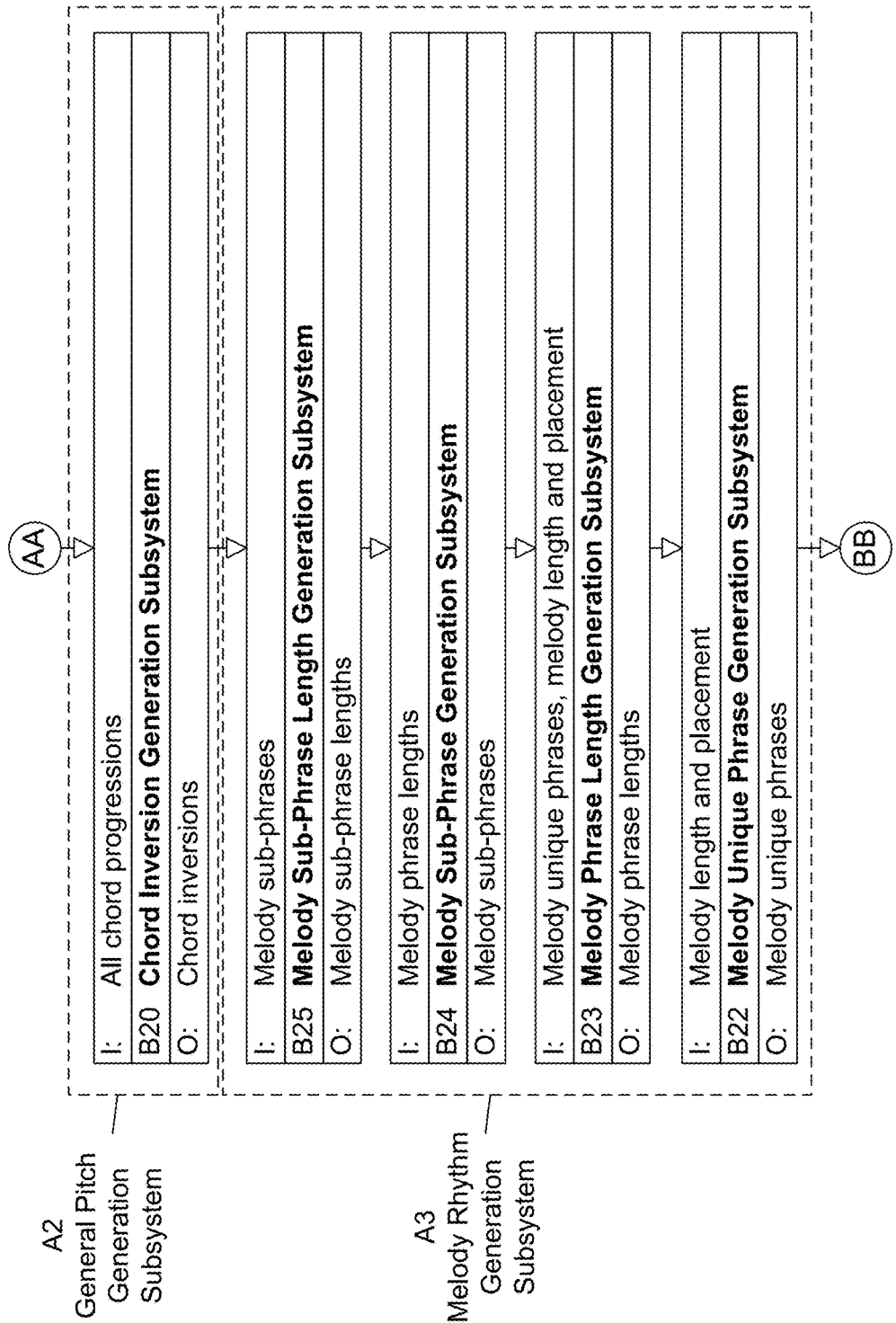
Figure 26L:
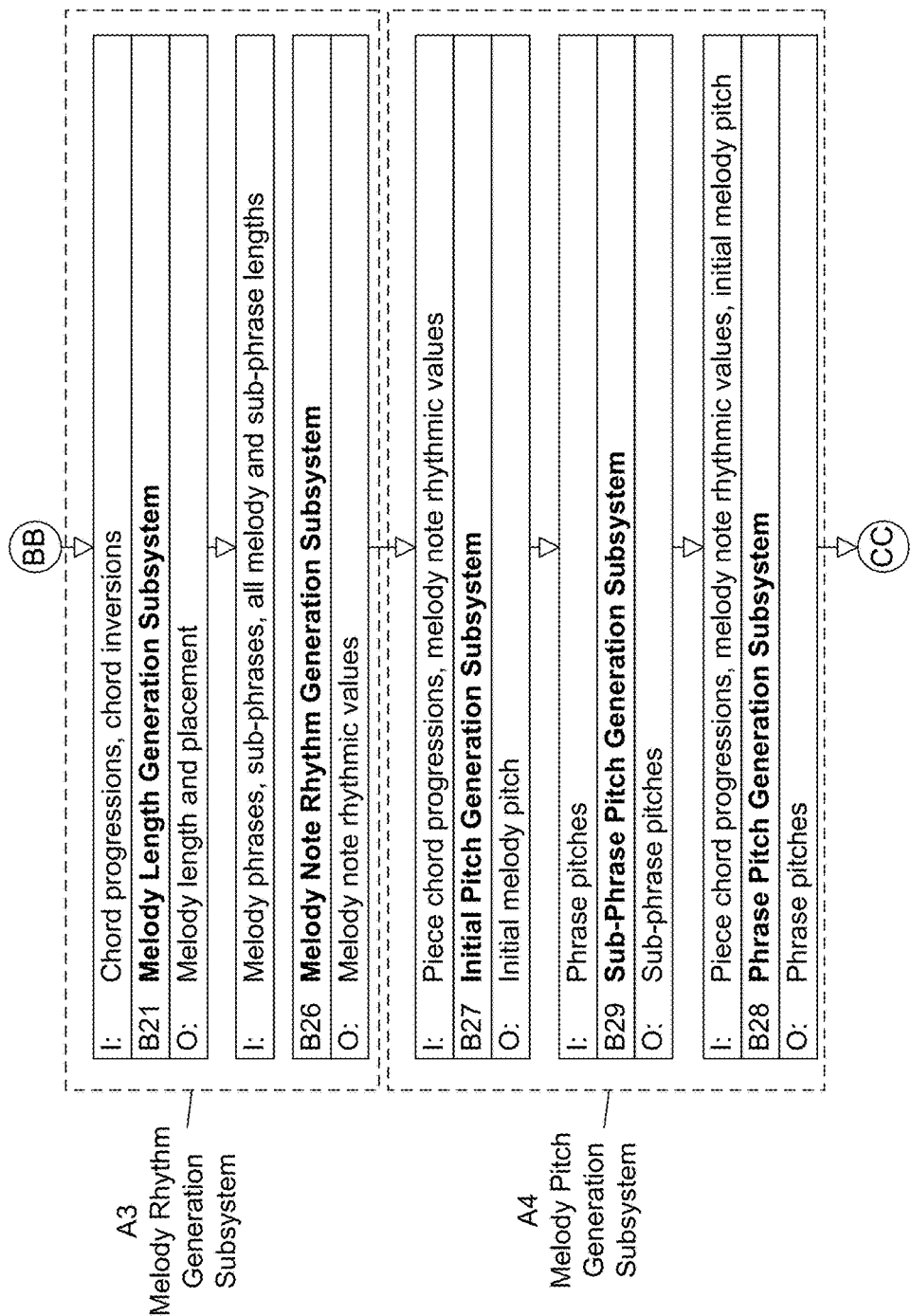
Figure 26M:
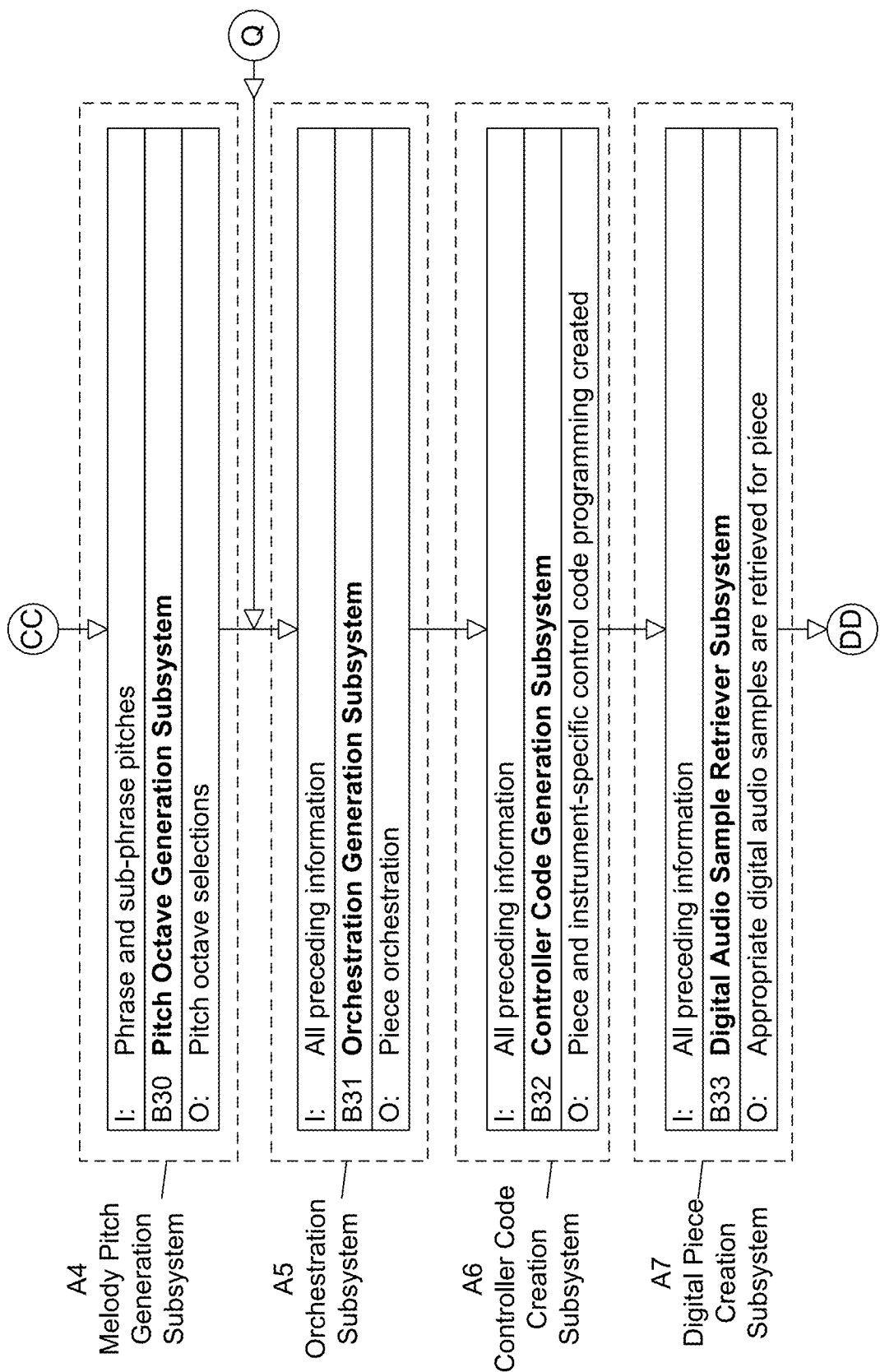
Figure 26N:
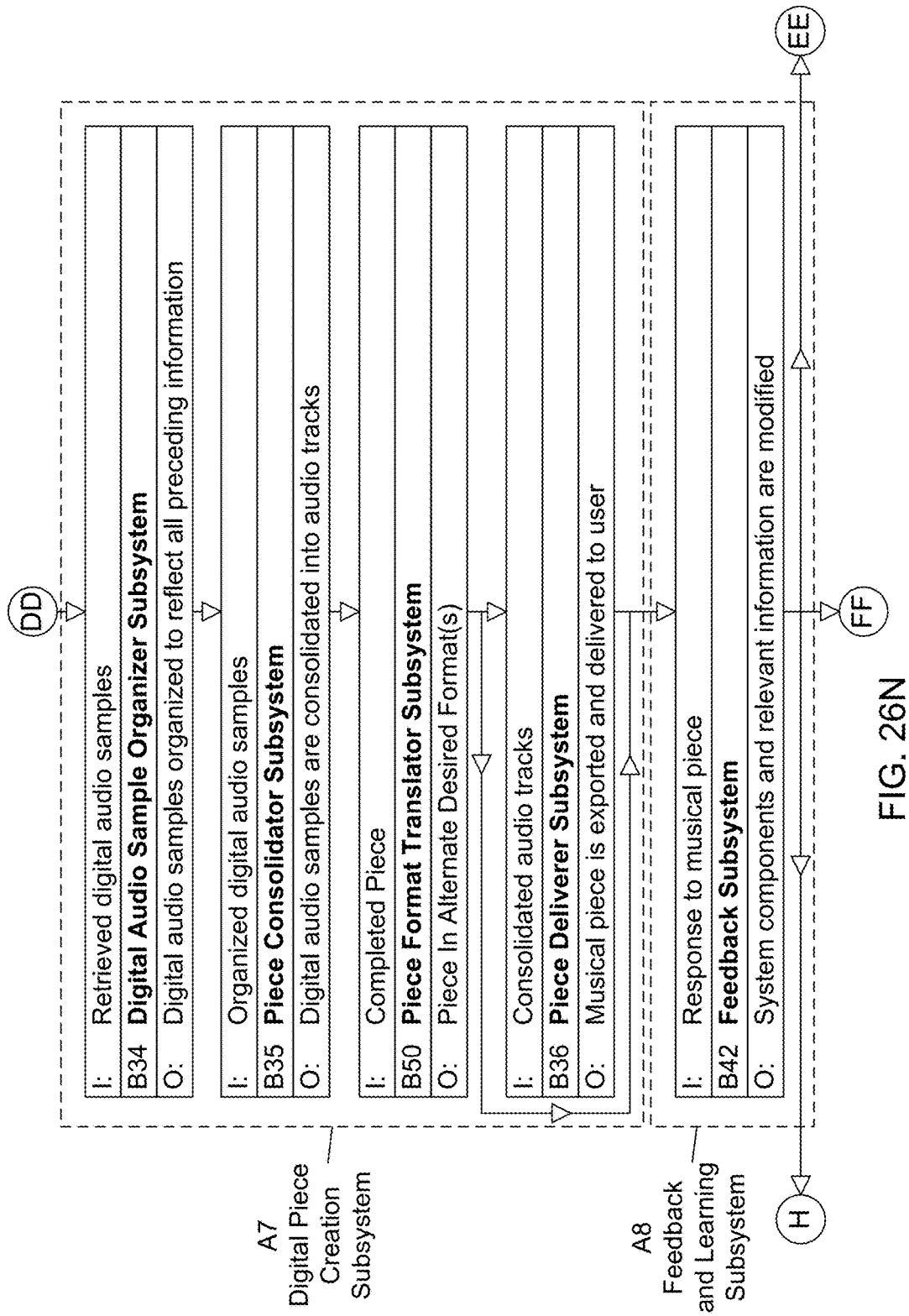
Figure 26O:
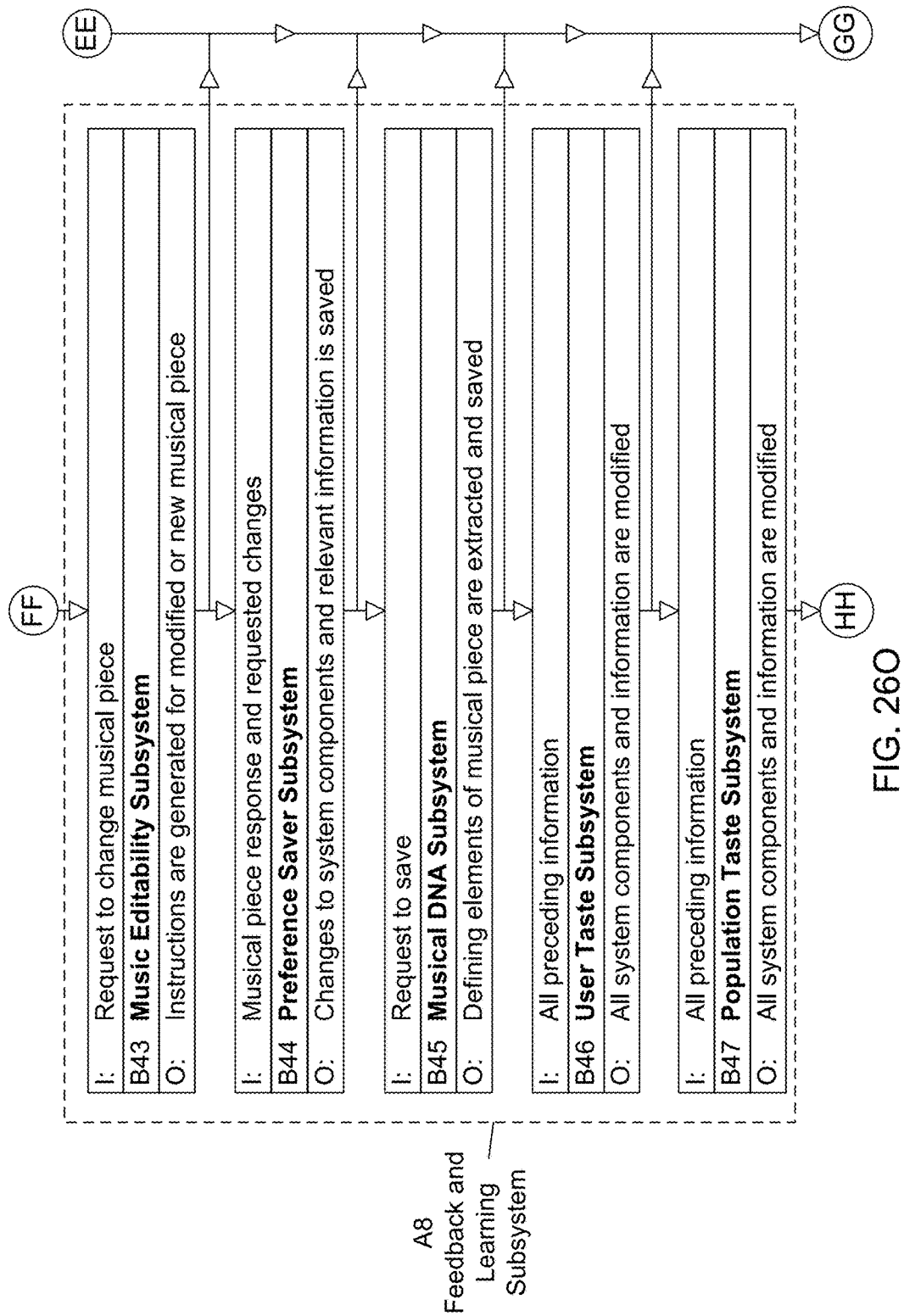
Figure 26P:
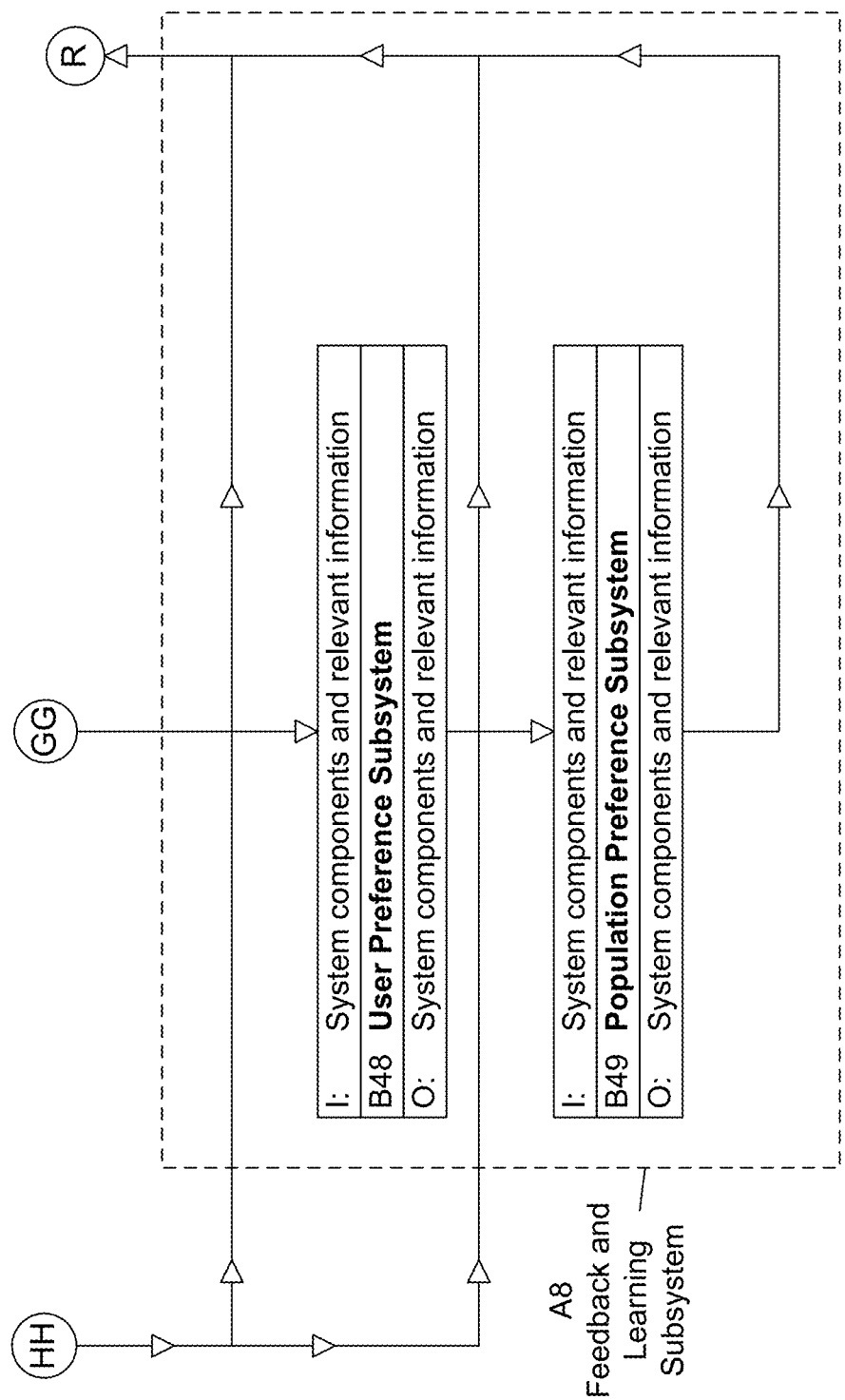

As shown in FIG. 26A through 26P, each of the high-level subsystems specified in FIGS. 25A and 25B is realized by one or more highly-specialized subsystems having very specific functions to be performed within the highly complex automated music composition and generation system of the present invention. In the preferred embodiments, the system employs and implements automated virtual-instrument music synthesis techniques, where sampled notes and chords, and sequences of notes from various kinds of instruments are digitally sampled and represented as a digital audio samples in a database and organized according to a piece of music that is composted and generated by the system of the present invention. In response to linguistic and/or graphical-icon based musical experience descriptors (including emotion-type descriptors illustrated in FIGS. 32A, 32B, 32C, 32D, 32E and 32F, and style-type descriptors illustrated in FIGS. 33A through 33E) that have been supplied to the GUI-based input output subsystem illustrated in FIG. 27A, to reflect the emotional and stylistic requirements desired by the system user, which the system automatically carries out during the automated music composition and generation process of the present invention.

Figure 27A:
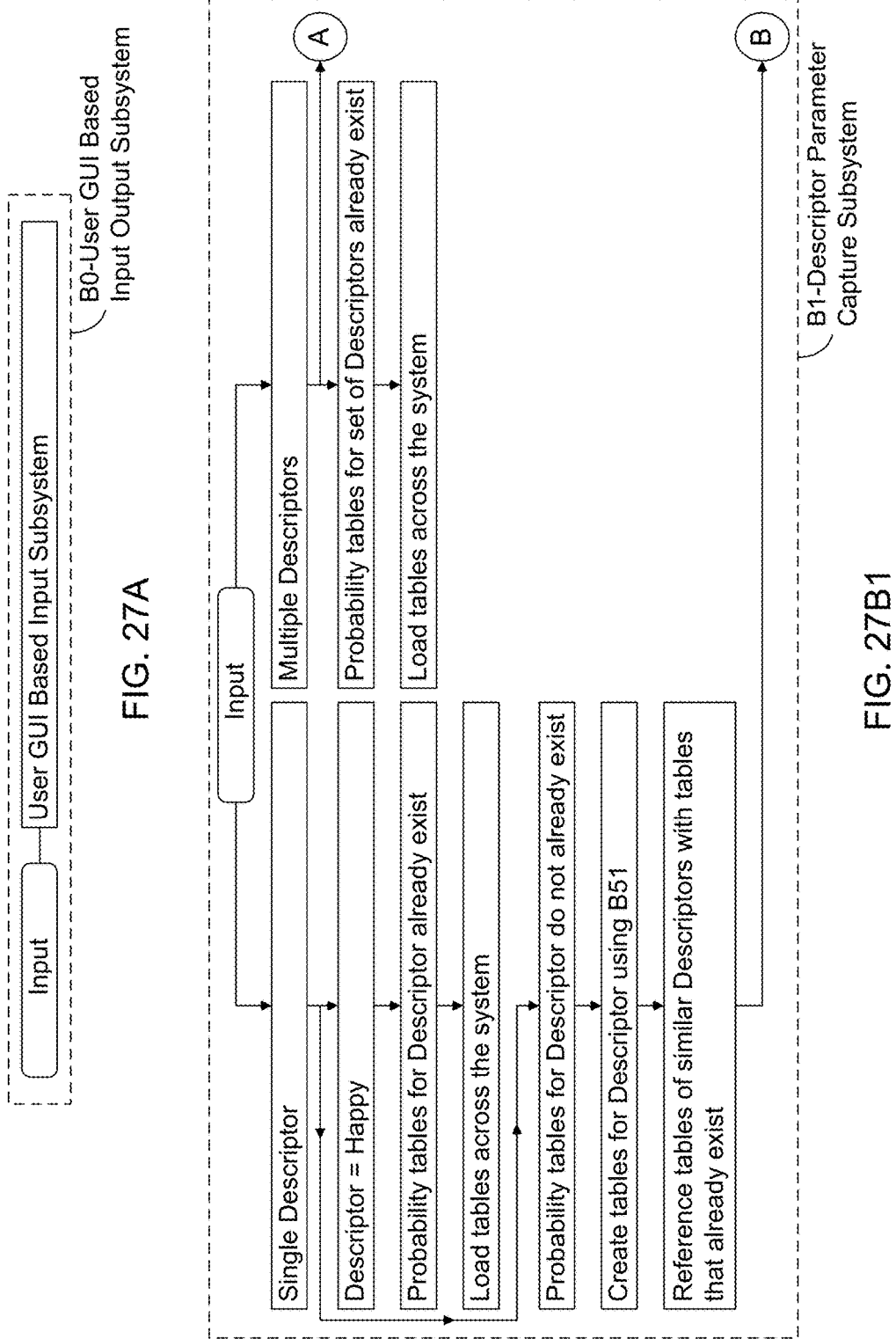
FIG. 27A shows a schematic representation of the User GUI-based input output subsystem (BO) used in the Automated Music Composition and Generation Engine E1 of the present invention, wherein the system user provides musical experience descriptors—e.g. HAPPY—to the input output system B0 for distribution to the descriptor parameter capture subsystem B1, wherein the probability-based tables are generated and maintained by the Parameter Transformation Engine Subsystem B51 shown in FIG. 27B3B, for distribution and loading in the various subsystems therein, for use in subsequent subsystem set up and automated music composition and generation.

In FIG. 27A, musical experience descriptors, and optionally time and space parameters (specifying the time and space requirements of any form of media to be scored with composed music) are provided to the GUI-based interface supported by the input output subsystem B0. The output of the input output subsystem B0 is provided to other subsystems B1, B37 and B40 in the Automated Music Composition and Generation Engine, as shown in FIGS. 26A through 26P.

As shown in FIGS. 27B1 and 27B2, the Descriptor Parameter Capture Subsystem B1 interfaces with a Parameter Transformation Engine Subsystem B51 schematically illustrated in FIG. 27B3B, wherein the musical experience descriptors (e.g. emotion-type descriptors illustrated in FIGS. 32A, 32B, 32C, 32D, 32E and 32F and style-type descriptors illustrated in FIGS. 33A, 33B, 33C, 33D, and 33E) and optionally timing (e.g. start, stop and hit timing locations) and/or spatial specifications (e.g. Slide No. 21 in the Photo Slide Show), are provided to the system user interface of subsystem B0. These musical experience descriptors are automatically transformed by the Parameter Transformation Engine B51 into system operating parameter (SOP) values maintained in the programmable music-theoretic parameter tables that are generated, distributed and then loaded into and used by the various subsystems of the system. For purposes of illustration and simplicity of explication, the musical experience descriptor—HAPPY—is used as a system user input selection. However, the SOP parameter tables corresponding to exemplary emotion-type musical experience descriptors illustrated herein are for purposes of illustration only. It is understood that the dimensions of such SOP tables in the subsystems will include (i) as many emotion-type musical experience descriptors as the system user has selected, for the probabilistic SOP tables that are structured or dimensioned on emotion-type descriptors in the respective subsystems, and (ii) as many style-type musical experience descriptors as the system user has selected, for probabilistic SOP tables that are structured or dimensioned on style-type descriptors in respective subsystems.

The principles by which such non-musical system user parameters are transformed or otherwise mapped into the probabilistic-based system operating parameters of the various system operating parameter (SOP) tables employed in the system will be described hereinbelow with reference to the transformation engine model schematically illustrated in FIGS. 27B3A, 27B3B and 27B3C, and related figures disclosed herein. In connection therewith, it will be helpful to illustrate how the load of parameter transformation engine in subsystem B51 will increase depending on the degrees of freedom supported by the musical experience descriptor interface in subsystem B0.

Consider an exemplary system where the system supports a set of N different emotion-type musical experience descriptors ($N_e$) and a set of M different style-type musical experience descriptors ($M_s$), from which a system user can select at the system user interface subsystem B0. Also, consider the case where the system user is free to select only one emotion-type descriptor from the set of N different emotion-type musical experience descriptors ($N_e$), and only one style-type descriptor set of M different style-type musical experience descriptors ($M_s$). In this highly limited case, where the system user can select any one of N unique emotion-type musical experience descriptors ($N_e$). and only one of the M different style-type musical experience descriptors ($M_s$), the Parameter Transformation Engine Subsystem B51 FIGS. 27B3A, 27B3B and 27B3C will need to generate $M_{sopt}=N_e!/(N_e-r)!r_e!\times M_s!/(M_s-r_s)!r_s!$ unique sets of probabilistic system operating parameter (SOP) tables, as illustrated in FIGS. 28A through 28S, for distribution to and loading into their respective subsystems during each automated music composition process, where $N_e$ is the total number of emotion-type musical experience descriptors, $M_s$ is the total number of style-type musical experience descriptors, $r_e$ is the number of musical experience descriptors that are selected for emotion, and $r_s$ is the number musical experience descriptors that are selected for style. The above factorial-based combination formula reduces to $N_{sopt}=N_e \times M_e$ for the case where $r_e=1$ and $r_s=1$. If $N_e=30 \times M_e=10$, the Transformation Engine will have the capacity to generate 300 different sets of probabilistic system operating parameter tables to support the set of 30 different emotion descriptors and set of 10 style descriptors, from which the system user can select one (1) emotion descriptor and one (1) style descriptor when configuring the automated music composition and generation system—with musical experience descriptors—to create music using the exemplary embodiment of the system in accordance with the principles of the present invention.

For the case where the system user is free to select up to two (2) unique emotion-type musical experience descriptors from the set of n unique emotion-type musical experience descriptors (ne), and two (2) unique style-type musical experience descriptors from the set of m different style-type musical experience descriptors ($M_s$), then the Transformation Engine of FIGS. 27B3A, 27B3B and 27B3C must generate $N_{sopt}=N_e!/(N_e-2)!2!\times M_s!/(M_s-2)!2!$ different sets of probabilistic system operating parameter tables ($S_{OPT}$) as illustrated in FIGS. 28A through 28S, for distribution to and loading into their respective subsystems during each automated music composition process of the present invention, wherein where ne is the total number of emotion-type musical experience descriptors, $M_s$ is the total number of style-type musical experience descriptors, $r_e=2$ is the number of musical experience descriptors that are selected for emotion, and $r_s=2$ is the number musical experience descriptors that are selected for style. If $N_e=30 \times M_e=10$, then the Parameter Transformation Engine subsystem B51 will have the capacity to generate $N_{sopt}=30!/(30-2)!2!\times 10!/(10-2)!2!$ different sets of probabilistic system operating parameter tables to support the set of 30 different emotion descriptors and set of 10 style descriptors, from which the system user can select one emotion descriptor and one style descriptor when programming the automated music composition and generation system—with musical experience descriptors—to create music using the exemplary embodiment of the system in accordance with the principles of the present invention. The above factorial-based combinatorial formulas provide guidance on how many different sets of probabilistic system operating parameter tables will need to be generated by the Transformation Engine over the full operating range of the different inputs that can be selected for emotion-type musical experience descriptors, $M_s$ number of style-type musical experience descriptors, $r_e$ number of musical experience descriptors that can be selected for emotion, and $r_s$ number of musical experience descriptors that can be selected for style, in the illustrative example given above. It is understood that design parameters $N_e$, $M_s$, $r_e$, and $r_s$ can be selected as needed to meet the emotional and artistic needs of the expected system user base for any particular automated music composition and generation system-based product to be designed, manufactured and distributed for use in commerce.

While the quantitative nature of the probabilistic system operating tables have been explored above, particularly with respect to the expected size of the table sets, that can be generated by the Transformation Engine Subsystem B51, it will be appropriate to discuss at a later juncture with reference to FIGS. 27B3A, 27B3B and 27B3C, the qualitative relationships that exist between (i) the musical experience descriptors and timing and spatial parameters supported by the system user interface of the system of the present invention, and (ii) music-theoretic concepts reflected in the probabilistic-based system operating parameter tables (SOPT), and how these qualitative relationships can be used to select specific probability values for each set of probabilistic-based system operating parameter tables that must be generated within the Transformation Engine and distributed to and loaded within the various subsystem before each automated music composition and generation process is carried out like clock-work within the system of the present invention.

The overall timing and control of the subsystems occurs such that, within the system, the automated music composition and generation process is executed for any given set of system user selected musical experience descriptors and timing and/or spatial parameters provided to the system.

The system begins with subsystem B1 turning on, accepting inputs from the system user, followed by similar processes with B37, B40, and B41. At this point, a waterfall creation process is engaged and the system initializes, engages, and disengages each component of the platform in a sequential manner. Each component is not required to remain on or actively engaged throughout the entire compositional process.

FIGS. 26A through 26P illustrates the flow and processing of information input, within, and out of the automated music composition and generation system. Starting with user inputs to Blocks 1, 37, 40, and 41, each component subsystem methodically makes decisions, influences other decision-making components/subsystems, and allows the system to rapidly progress in its music creation and generation process. In FIGS. 26A through 26P, and other figure drawings herein, solid lines (dashed when crossing over another line to designate no combination with the line being crossed over) connect the individual components and triangles designate the flow of the processes, with the process moving in the direction of the triangle point that is on the line and away from the triangle side that is perpendicular to the line. Lines that intersect without any dashed line indications represent a combination and or split of information and or processes, again moving in the direction designated by the triangles on the lines.

Overview of the Automated Musical Composition and Generation Process of the Present Invention Supported by the Architectural Components of the Automated Music Composition and Generation System Illustrated in FIGS. 26A Through 26P It will be helpful at this juncture to refer to the high-level flow chart set forth in FIG. 34, providing an overview of the automated music composition and generation process supported by the various systems of the present invention disclosed and taught here. In connection with this process, reference should also be made to FIGS. 26A through 26P, to follow the corresponding high-level system architecture provided by the system to support the automated music composition and generation process of the present invention, carrying out the virtual-instrument music synthesis method, described above.

As indicated in Block A of FIG. 34 and reflected in FIGS. 26A through 26D, the first phase of the automated music composition and generation process according to the illustrative embodiment of the present invention involves receiving emotion-type and style-type and optionally timing-type parameters as musical descriptors for the piece of music which the system user wishes to be automatically composed and generated by machine of the present invention. Typically, the musical experience descriptors are provided through a GUI-based system user I/O Subsystem B0, although it is understood that this system user interface need not be GUI-based, and could use EDI, XML, XML-HTTP and other types information exchange techniques where machine-to-machine, or computer-to-computer communications are required to support system users which are machines, or computer-based machines, request automated music composition and generation services from machines practicing the principles of the present invention, disclosed herein.

As indicated in Block B of FIG. 34, and reflected in FIGS. 26D through 26J, the second phase of the automated music composition and generation process according to the illustrative embodiment of the present invention involves using the General Rhythm Subsystem A1 for generating the General Rhythm for the piece of music to be composed. This phase of the process involves using the following subsystems: the Length Generation Subsystem B2; the Tempo Generation Subsystem B3; the Meter Generation Subsystem B4; the Key Generation Subsystem B5; the Beat Calculator Subsystem B6; the Tonality Generation Subsystem B7; the Measure Calculator Subsystem B8; the Song Form Generation Subsystem B9; the Sub-Phrase Length Generation Subsystem B15; the Number of Chords in Sub-Phrase Calculator Subsystem B16; the Phrase Length Generation Subsystem B12; the Unique Phrase Generation Subsystem B10; the Number of Chords in Phrase Calculator Subsystem B13; the Chord Length Generation Subsystem B11; the Unique Sub-Phrase Generation Subsystem B14; the Instrumentation Subsystem B38; the Instrument Selector Subsystem B39; and the Timing Generation Subsystem B41.

As indicated in Block C of FIG. 34, and reflected in FIGS. 26J and 26K, the third phase of the automated music composition and generation process according to the illustrative embodiment of the present invention involves using the General Pitch Generation Subsystem A2 for generating chords for the piece of music being composed. This phase of the process involves using the following subsystems: the Initial General Rhythm Generation Subsystem B17; the Sub-Phrase Chord Progression Generation Subsystem B19; the Phrase Chord Progression Generation Subsystem B18; the Chord Inversion Generation Subsystem B20.

As indicated in Block D of FIG. 34, and reflected in FIGS. 26K and 26L, the fourth phase of the automated music composition and generation process according to the illustrative embodiment of the present invention involves using the Melody Rhythm Generation Subsystem A3 for generating a melody rhythm for the piece of music being composed. This phase of the process involve using the following subsystems: the Melody Sub-Phrase Length Generation Subsystem B25; the Melody Sub-Phrase Generation Subsystem B24; the Melody Phrase Length Generation Subsystem B23; the Melody Unique Phrase Generation Subsystem B22; the Melody Length Generation Subsystem B21; the Melody Note Rhythm Generation Subsystem B26.

As indicated in Block E of FIG. 34, and reflected FIGS. 26L and 26M, the fifth phase of the automated music composition and generation process according to the illustrative embodiment of the present invention involves using the Melody Pitch Generation Subsystem A4 for generating a melody pitch for the piece of music being composed. This phase of the process involves the following subsystems: the Initial Pitch Generation Subsystem B27; the Sub-Phrase Pitch Generation Subsystem B29; the Phrase Pitch Generation Subsystem B28; and the Pitch Octave Generation Subsystem B30.

As indicated in Block F of FIG. 34, and reflected in FIG. 26M, the sixth phase of the automated music composition and generation process according to the illustrative embodiment of the present invention involves using the Orchestration Subsystem A5 for generating the orchestration for the piece of music being composed. This phase of the process involves the Orchestration Generation Subsystem B31.

As indicated in Block G of FIG. 34, and reflected in FIG. 26M, the seventh phase of the automated music composition and generation process according to the illustrative embodiment of the present invention involves using the Controller Code Creation Subsystem A6 for creating controller code for the piece of music. This phase of the process involves using the Controller Code Generation Subsystem B32.

As indicated in Block H of FIG. 34, and reflected in FIGS. 26M and 26N, the eighth phase of the automated music composition and generation process according to the illustrative embodiment of the present invention involves using the Digital Piece Creation Subsystem A7 for creating the digital piece of music. This phase of the process involves using the following subsystems: the Digital Audio Sample Audio Retriever Subsystem B333; the Digital Audio Sample Organizer Subsystem B34; the Piece Consolidator Subsystem B35; the Piece Format Translator Subsystem B50; and the Piece Deliverer Subsystem B36.

As indicated in Block I of FIG. 34, and reflected in FIGS. 26N, 26O and 26P, the ninth phase of the automated music composition and generation process according to the illustrative embodiment of the present invention involves using the Feedback and Learning Subsystem A8 for supporting the feedback and learning cycle of the system. This phase of the process involves using the following subsystems: the Feedback Subsystem B42; the Music Editability Subsystem B43; the Preference Saver Subsystem B44; the Musical kernel Subsystem B45; the User Taste Subsystem B46; the Population Taste Subsystem B47; the User Preference Subsystem B48; and the Population Preference Subsystem B49.

Figure 3:
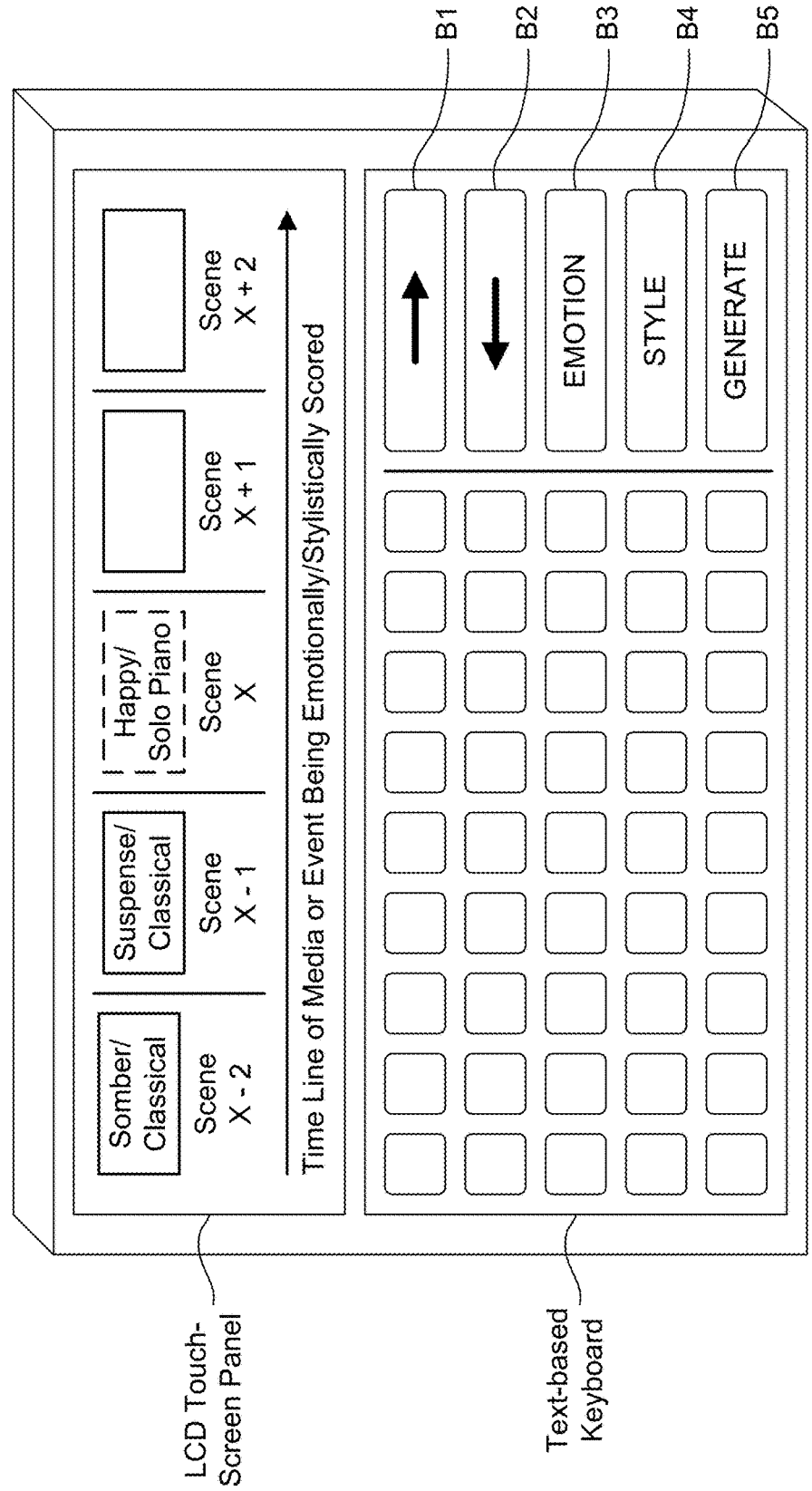
FIG. 3 shows a prospective view of an automated music composition and generation instrument system according to a first illustrative embodiment of the present invention, supporting virtual-instrument music synthesis driven by linguistic-based musical experience descriptors produced using a text keyboard and/or a speech recognition interface provided in a compact portable housing.

Specification of the First Illustrative Embodiment of the Automated Music Composition and Generation System of the Present Invention FIG. 3 shows an automated music composition and generation instrument system according to a first illustrative embodiment of the present invention, supporting virtual-instrument (e.g. sampled-instrument) music synthesis and the use of linguistic-based musical experience descriptors produced using a text keyboard and/or a speech recognition interface provided in a compact portable housing.

Figure 4:
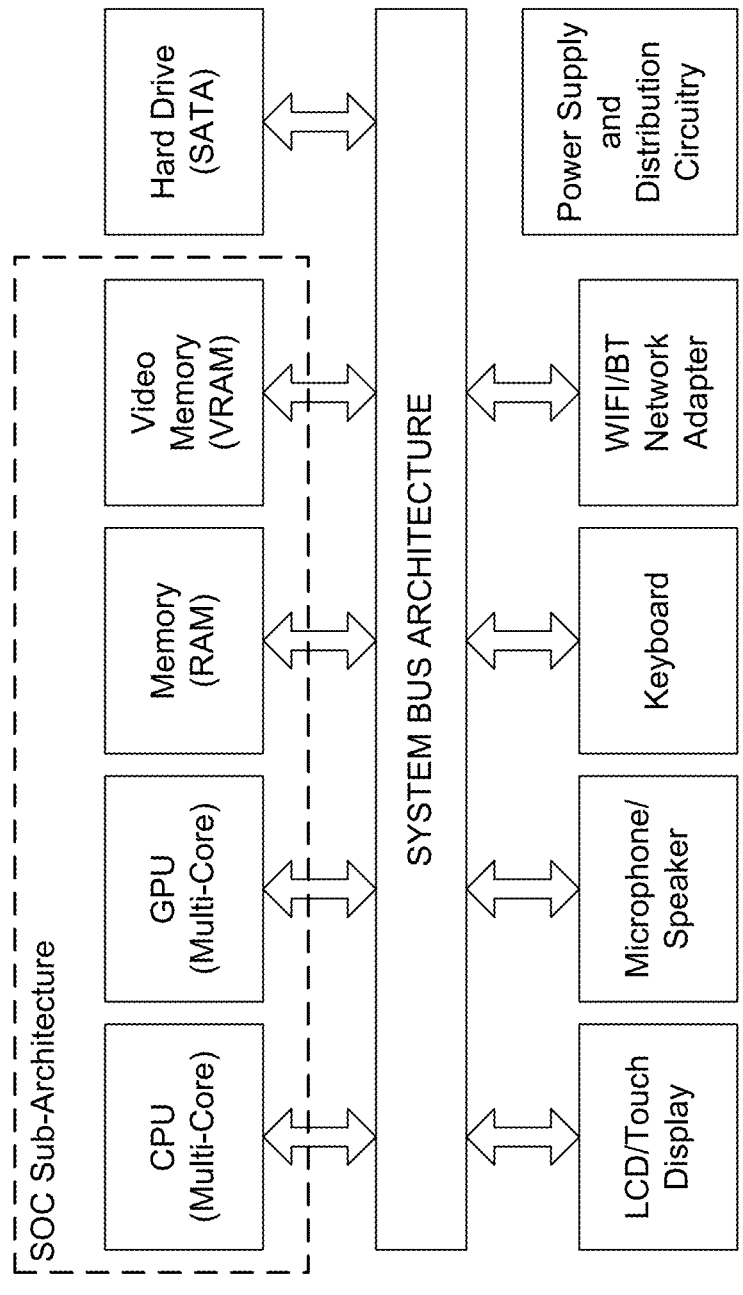
FIG. 4 is a schematic diagram of an illustrative implementation of the automated music composition and generation instrument system of the first illustrative embodiment of the present invention, supporting virtual-instrument music synthesis driven by linguistic-based musical experience descriptors produced using a text keyboard and/or a speech recognition interface, showing the various components of a SOC-based sub-architecture and other system components, integrated around a system bus architecture.

FIG. 4 is a schematic diagram of an illustrative implementation of the automated music composition and generation instrument system of the first illustrative embodiment of the present invention, supporting virtual-instrument (e.g. sampled-instrument) music synthesis and the use of linguistic-based musical experience descriptors produced using a text keyboard and/or a speech recognition interface, showing the various components integrated around a system bus architecture.

In general, the automatic or automated music composition and generation system shown in FIG. 3, including all of its inter-cooperating subsystems shown in FIGS. 26A through 33E and specified above, can be implemented using digital electronic circuits, analog electronic circuits, or a mix of digital and analog electronic circuits specially configured and programmed to realize the functions and modes of operation to be supported by the automatic music composition and generation system. The digital integrated circuitry (IC) can include low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

Figure 5:
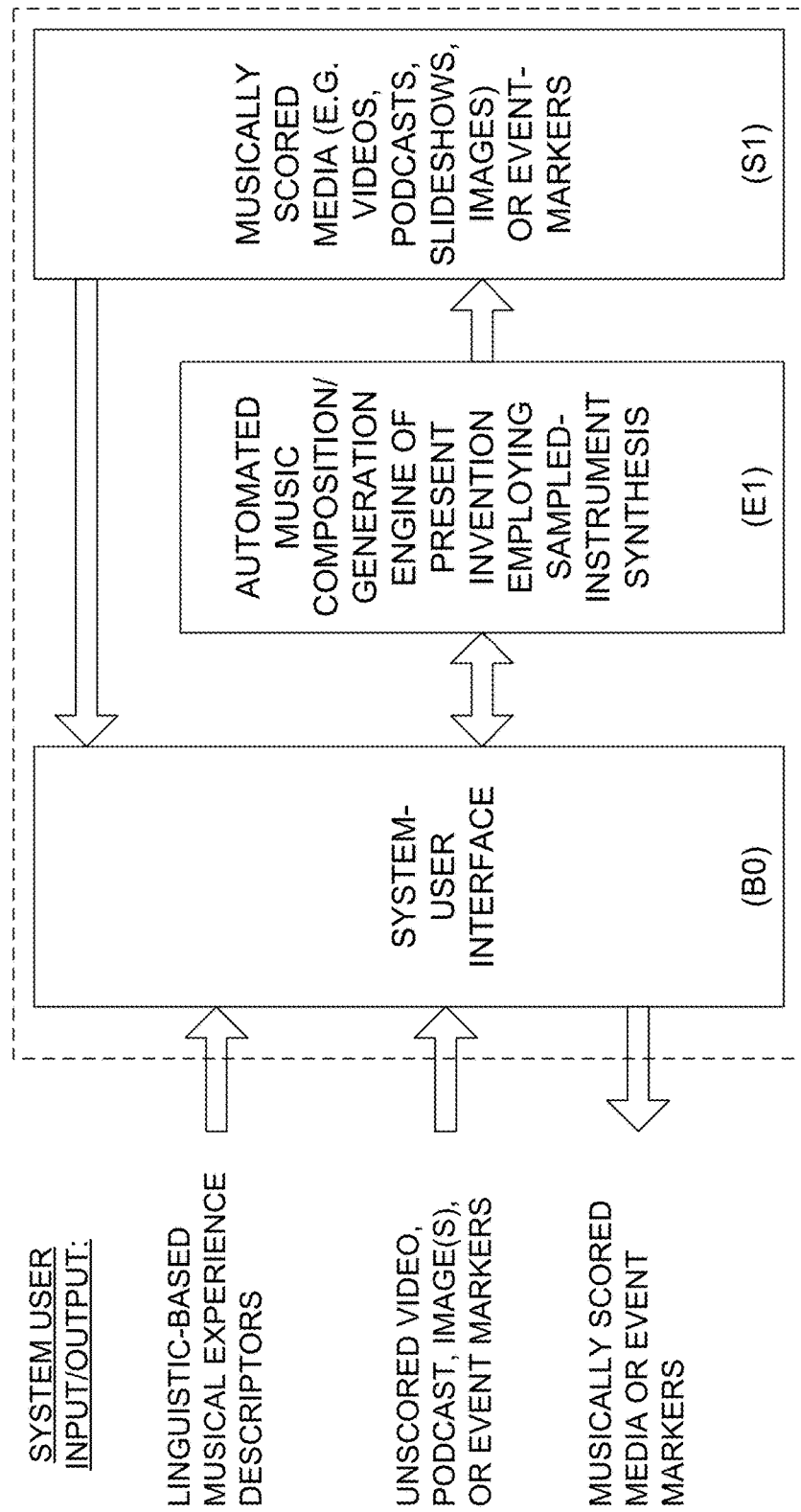
FIG. 5 is a high-level system block diagram of the automated music composition and generation instrument system of the first illustrative embodiment, supporting virtual-instrument music synthesis driven by linguistic-based musical experience descriptors produced using a text keyboard and/or a speech recognition interface, wherein linguistic-based musical experience descriptors, and a video, audio-recording, image, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

FIG. 5 shows the automated music composition and generation instrument system of the first illustrative embodiment, supporting virtual-instrument (e.g. sampled-instrument) music synthesis and the use of linguistic-based musical experience descriptors produced using a text keyboard and/or a speech recognition interface, wherein linguistic-based musical experience descriptors, and a video, audio-recording, image, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

FIG. 6 describes the primary steps involved in carrying out the automated music composition and generation process of the first illustrative embodiment of the present invention supporting the use of linguistic and/or graphical icon based musical experience descriptors and virtual-instrument (e.g. sampled-instrument) music synthesis using the instrument system shown in FIGS. 3 through 5, wherein (i) during the first step of the process, the system user accesses the Automated Music Composition and Generation System of the present invention, and then selects a video, a an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Specification of Modes of Operation of the Automated Music Composition and Generation System of the First Illustrative Embodiment of the Present Invention The Automated Music Composition and Generation System of the first illustrative embodiment shown in FIGS. 3 through 6, can operate in various modes of operation including: (i) Manual Mode where a human system user provides musical experience descriptor and timing/spatial parameter input to the Automated Music Composition and Generation System; (ii) Automatic Mode where one or more computer-controlled systems automatically supply musical experience descriptors and optionally timing/spatial parameters to the Automated Music Composition and Generation System, for controlling the operation the Automated Music Composition and Generation System autonomously without human system user interaction; and (iii) a Hybrid Mode where both a human system user and one or more computer-controlled systems provide musical experience descriptors and optionally timing/spatial parameters to the Automated Music Composition and Generation System.

Specification of the Second Illustrative Embodiment of the Automated Music Composition and Generation System of the Present Invention FIG. 7 shows a toy instrument supporting Automated Music Composition and Generation Engine of the second illustrative embodiment of the present invention using virtual-instrument music synthesis and icon-based musical experience descriptors, wherein a touch screen display is provided to select and load videos from a library, and children can then select musical experience descriptors (e.g. emotion descriptor icons and style descriptor icons) from a physical keyboard) to allow a child to compose and generate custom music for a segmented scene of a selected video.

Figure 8:
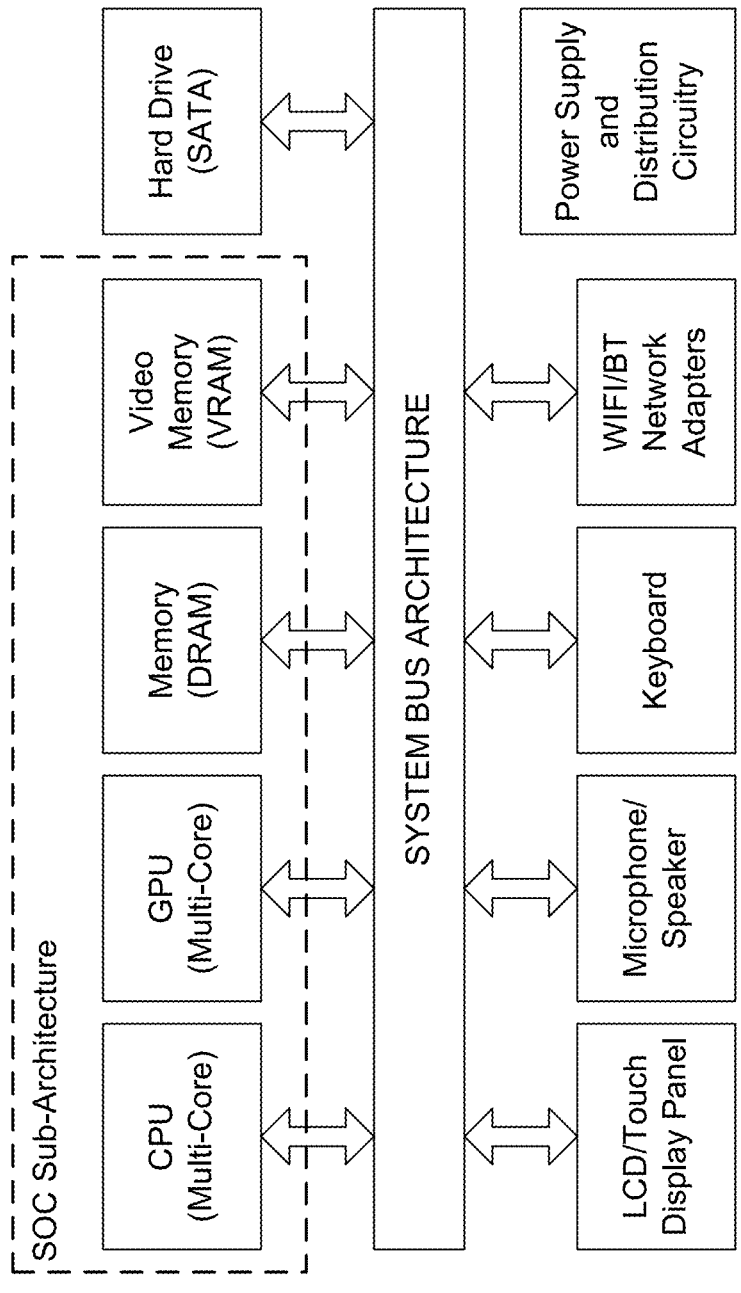
FIG. 8 is a schematic diagram of an illustrative implementation of the automated music composition and generation instrument system of the second illustrative embodiment of the present invention, supporting the use of virtual-instrument music synthesis driven by graphical icon based musical experience descriptors selected by the system user using a keyboard interface, and showing the various components of a SOC-based sub-architecture, such as multi-core CPU, multi-core GPU, program memory (DRAM), video memory (VRAM), interfaced with a hard drive (SATA), LCD/touch-screen display panel, microphone/speaker, keyboard, WIFI/Bluetooth network adapters, and power supply and distribution circuitry, integrated around a system bus architecture.

FIG. 8 is a schematic diagram of an illustrative implementation of the automated music composition and generation instrument system of the second illustrative embodiment of the present invention, supporting virtual-instrument (e.g. sampled-instrument) music synthesis and the use of graphical icon based musical experience descriptors selected using a keyboard interface, showing the various components, such as multi-core CPU, multi-core GPU, program memory (DRAM), video memory (VRAM), hard drive (SATA), LCD/touch-screen display panel, microphone/speaker, keyboard, WIFI/Bluetooth network adapters, and power supply and distribution circuitry, integrated around a system bus architecture.

In general, the automatic or automated music composition and generation system shown in FIG. 7, including all of its inter-cooperating subsystems shown in FIGS. 26A through 33E and specified above, can be implemented using digital electronic circuits, analog electronic circuits, or a mix of digital and analog electronic circuits specially configured and programmed to realize the functions and modes of operation to be supported by the automatic music composition and generation system. The digital integrated circuitry (IC) can include low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

Figure 9:
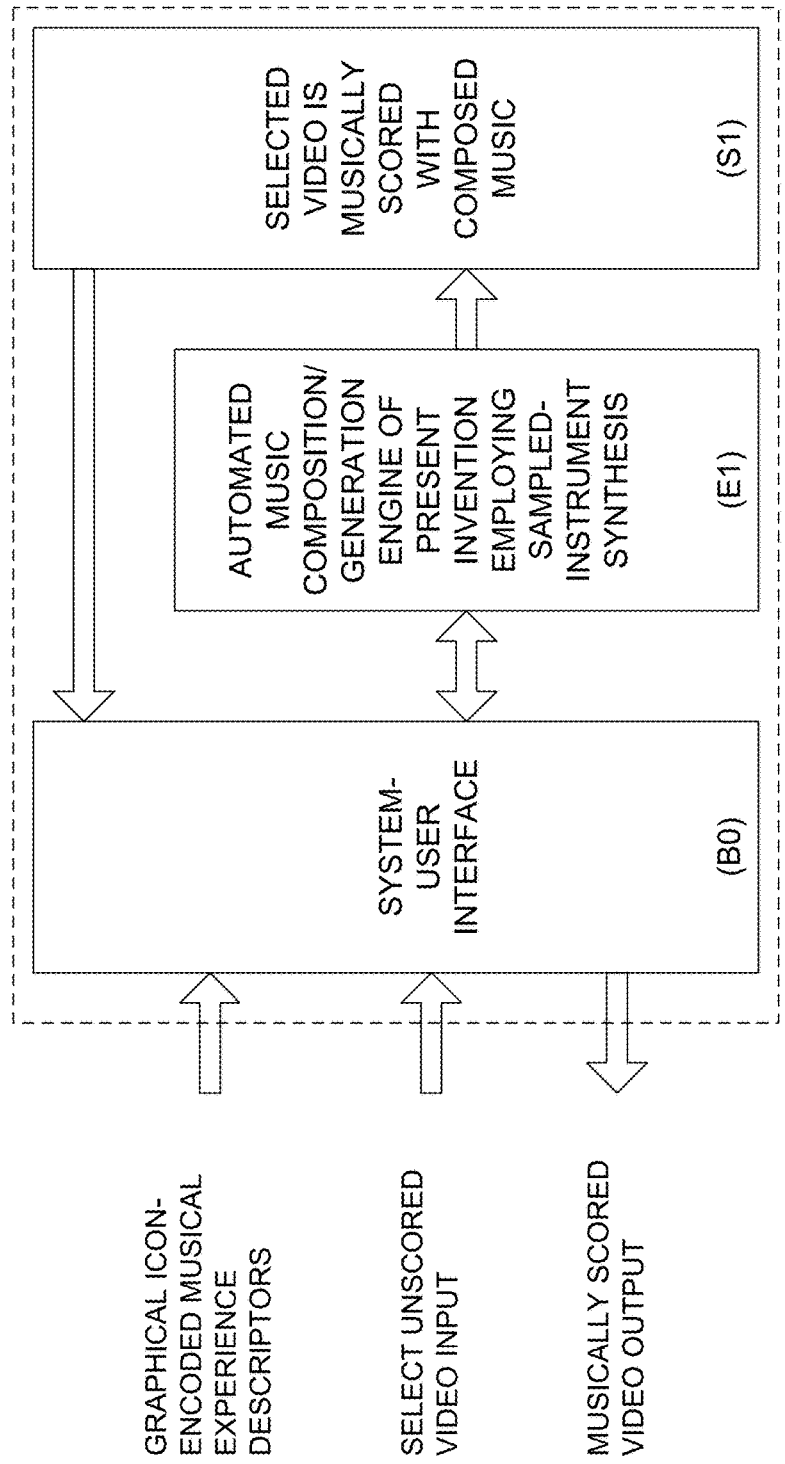
FIG. 9 is a high-level system block diagram of the automated toy music composition and generation toy instrument system of the second illustrative embodiment, wherein graphical icon based musical experience descriptors, and a video are selected as input through the system user interface (i.e. touch-screen keyboard), and used by the Automated Music Composition and Generation Engine of the present invention to generate musically-scored video story that is then supplied back to the system user via the system user interface.

FIG. 9 is a high-level system block diagram of the automated toy music composition and generation toy instrument system of the second illustrative embodiment, wherein graphical icon based musical experience descriptors, and a video are selected as input through the system user interface (i.e. touch-screen keyboard), and used by the Automated Music Composition and Generation Engine of the present invention to generate a musically-scored video story that is then supplied back to the system user via the system user interface.

FIG. 10 is a flow chart illustrating the primary steps involved in carrying out the automated music composition and generation process within the toy music composing and generation system of the second illustrative embodiment of the present invention, supporting the use of graphical icon based musical experience descriptors and virtual-instrument music synthesis using the instrument system shown in FIGS. 7 through 9, wherein (i) during the first step of the process, the system user accesses the Automated Music Composition and Generation System of the present invention, and then selects a video to be scored with music generated by the Automated Music Composition and Generation Engine of the present invention, (ii) the system user selects graphical icon-based musical experience descriptors to be provided to the Automated Music Composition and Generation Engine of the system, (iii) the system user initiates the Automated Music Composition and Generation Engine to compose and generate music based on inputted musical descriptors scored on selected video media, and (iv) the system combines the composed music with the selected video so as to create a video file for display and enjoyment.

Specification of Modes of Operation of the Automated Music Composition and Generation System of the Second Illustrative Embodiment of the Present Invention The Automated Music Composition and Generation System of the second illustrative embodiment shown in FIGS. 7 through 10, can operate in various modes of operation including: (i) Manual Mode where a human system user provides musical experience descriptor and timing/spatial parameter input to the Automated Music Composition and Generation System; (ii) an Automatic Mode where one or more computer-controlled systems automatically supply musical experience descriptors and optionally timing/spatial parameters to the Automated Music Composition and Generation System, for controlling the operation the Automated Music Composition and Generation System autonomously without human system user interaction; and (iii) a Hybrid Mode where both a human system user and one or more computer-controlled systems provide musical experience descriptors and optionally timing/spatial parameters to the Automated Music Composition and Generation System.

Figure 11:
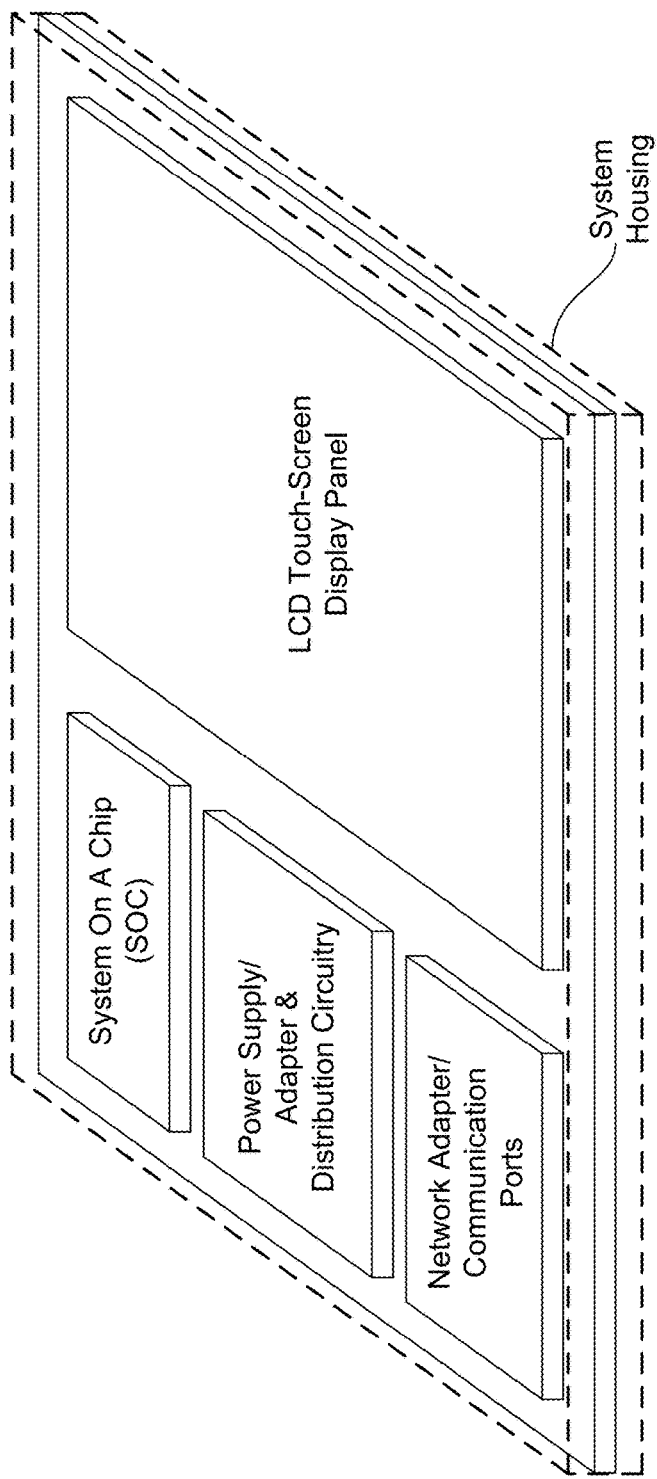
FIG. 11 is a perspective view of an electronic information processing and display system according to a third illustrative embodiment of the present invention, integrating a SOC-based Automated Music Composition and Generation Engine of the present invention within a resultant system, supporting the creative and/or entertainment needs of its system users.

Specification of the Third Illustrative Embodiment of the Automated Music Composition and Generation System of the Present Invention FIG. 11 is a perspective view of an electronic information processing and display system according to a third illustrative embodiment of the present invention, integrating a SOC-based Automated Music Composition and Generation Engine of the present invention within a resultant system, supporting the creative and/or entertainment needs of its system users.

Figure 11A:
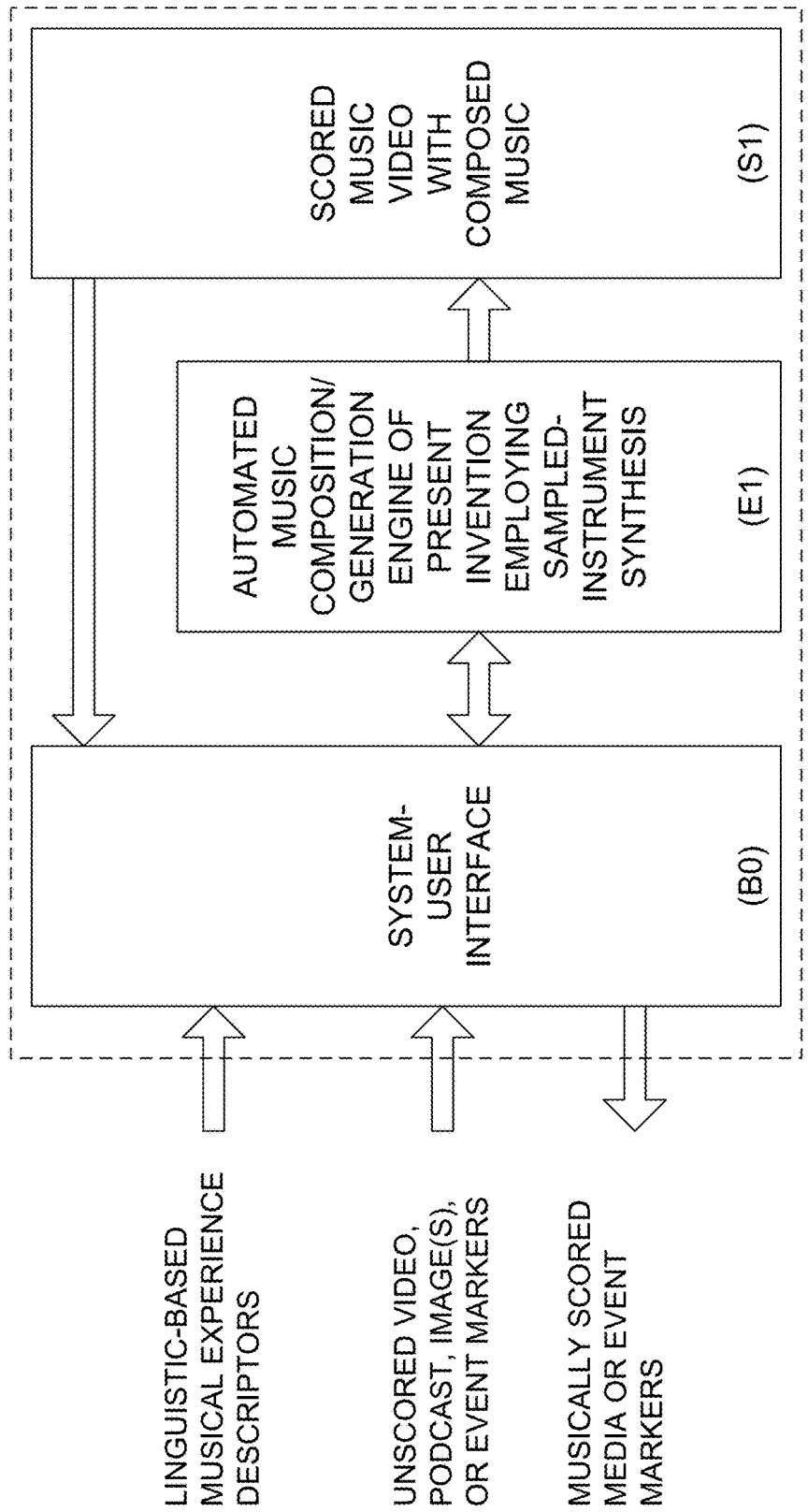
FIG. 11A is a schematic representation illustrating the high-level system architecture of the SOC-based music composition and generation system of the present invention supporting the use of virtual-instrument music synthesis driven by linguistic and/or graphical icon based musical experience descriptors and, wherein linguistic-based musical experience descriptors, and a video, audio-recording, image, slide-show, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

FIG. 11A is a schematic representation illustrating the high-level system architecture of the SOC-based music composition and generation system of the present invention supporting the use of linguistic and/or graphical icon based musical experience descriptors and virtual-instrument music synthesis, wherein linguistic-based musical experience descriptors, and a video, audio-recording, image, slideshow, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

Figure 11B:
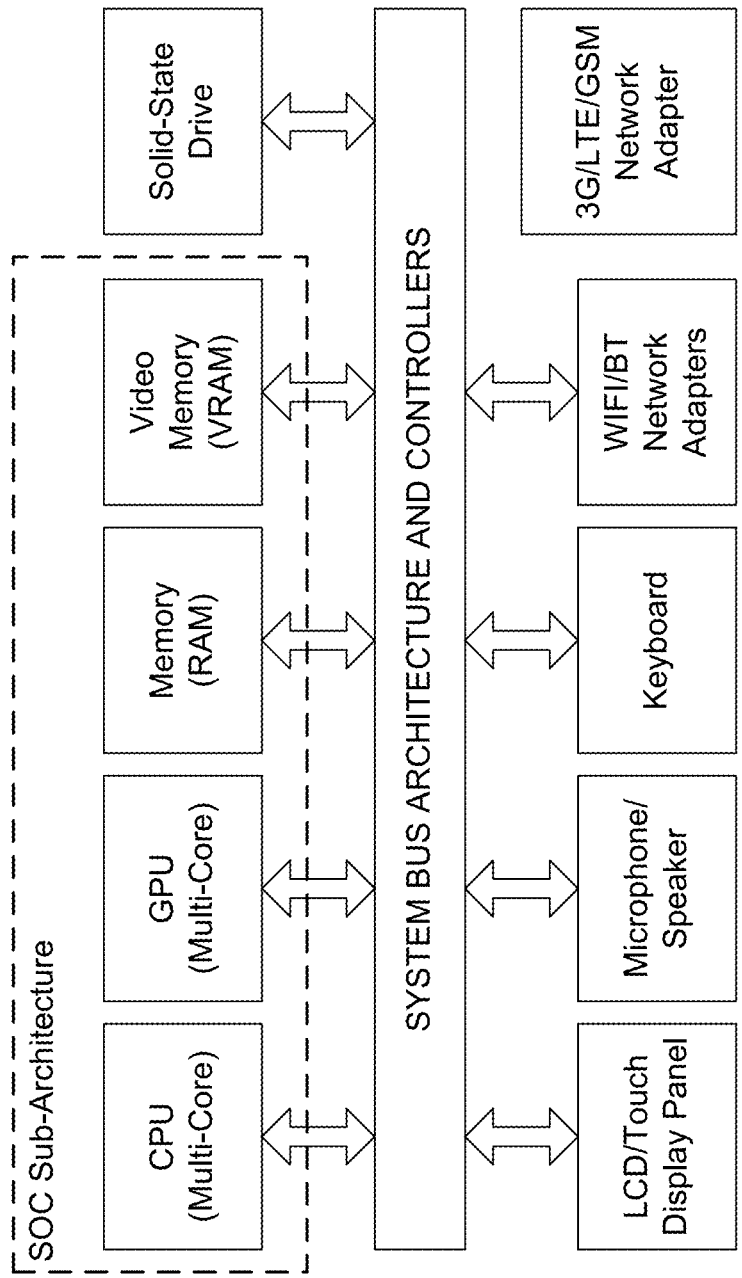

FIG. 11B shows the system illustrated in FIGS. 11 and 11A, comprising a SOC-based subsystem architecture including a multi-core CPU, a multi-core GPU, program memory (RAM), and video memory (VRAM), interfaced with a solid-state (DRAM) hard drive, a LCD/Touch-screen display panel, a micro-phone speaker, a keyboard or keypad, WIFI/Bluetooth network adapters, and 3G/LTE/GSM network adapter integrated with one or more bus architecture supporting controllers and the like.

In general, the automatic or automated music composition and generation system shown in FIG. 11, including all of its inter-cooperating subsystems shown in FIGS. 26A through 33D and specified above, can be implemented using digital electronic circuits, analog electronic circuits, or a mix of digital and analog electronic circuits specially configured and programmed to realize the functions and modes of operation to be supported by the automatic music composition and generation system. The digital integrated circuitry (IC) can include low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

FIG. 12 describes the primary steps involved in carrying out the automated music composition and generation process of the present invention using the SOC-based system shown in FIGS. 11 and 11A supporting the use of linguistic and/or graphical icon based musical experience descriptors and virtual-instrument music synthesis, wherein (i) during the first step of the process, the system user accesses the Automated Music Composition and Generation System of the present invention, and then selects a video, an audio-with music generated by the Automated Music Composition and Generation System of the present invention, (ii) the system user then provides linguistic-based and/or icon recording (i.e. podcast), slideshow, a photograph or image, or event marker to be scored-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Specification of Modes of Operation of the Automated Music Composition and Generation System of the Third Illustrative Embodiment of the Present Invention The Automated Music Composition and Generation System of the third illustrative embodiment shown in FIGS. 11 through 12, can operate in various modes of operation including: (i) Manual Mode where a human system user provides musical experience descriptor and timing/spatial parameter input to the Automated Music Composition and Generation System; (ii) Automatic Mode where one or more computer-controlled systems automatically supply musical experience descriptors and optionally timing/spatial parameters to the Automated Music Composition and Generation System, for controlling the operation the Automated Music Composition and Generation System autonomously without human system user interaction; and (iii) a Hybrid Mode where both a human system user and one or more computer-controlled systems provide musical experience descriptors and optionally timing/spatial parameters to the Automated Music Composition and Generation System.

Figure 13:
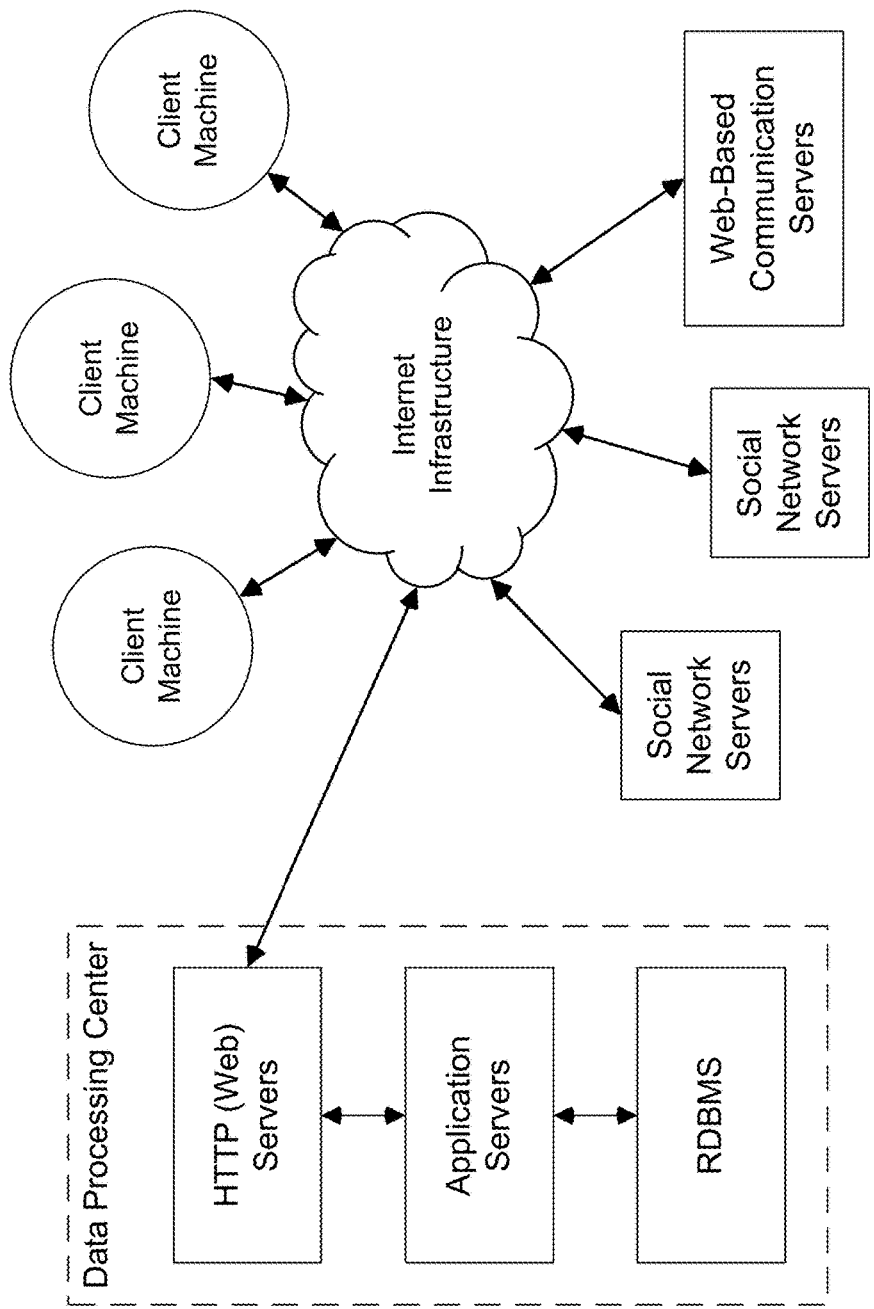
FIG. 13 is a schematic representation of the enterprise-level internet-based music composition and generation system of fourth illustrative embodiment of the present invention, supported by a data processing center with web servers, application servers and database (RDBMS) servers operably connected to the infrastructure of the Internet, and accessible by client machines, social network servers, and web-based communication servers, and allowing anyone with a web-based browser to access automated music composition and generation services on websites (e.g. on YouTube, Vimeo, etc.) to score videos, images, slide-shows, audio-recordings, and other events with music using virtual-instrument music synthesis and linguistic-based musical experience descriptors produced using a text keyboard and/or a speech recognition interface.

Specification of the Fourth Illustrative Embodiment of the Automated Music Composition and Generation System of the Present Invention FIG. 13 is a schematic representation of the enterprise-level internet-based music composition and generation system of fourth illustrative embodiment of the present invention, supported by a data processing center with web servers, application servers and database (RDBMS) servers operably connected to the infrastructure of the Internet, and accessible by client machines, social network servers, and web-based communication servers, and allowing anyone with a web-based browser to access automated music composition and generation services on websites (e.g. on YouTube, Vimeo, etc.) to score videos, images, slide-shows, audio-recordings, and other events with music using virtual-instrument music synthesis and linguistic-based musical experience descriptors produced using a text keyboard and/or a speech recognition interface.

Figure 13A:
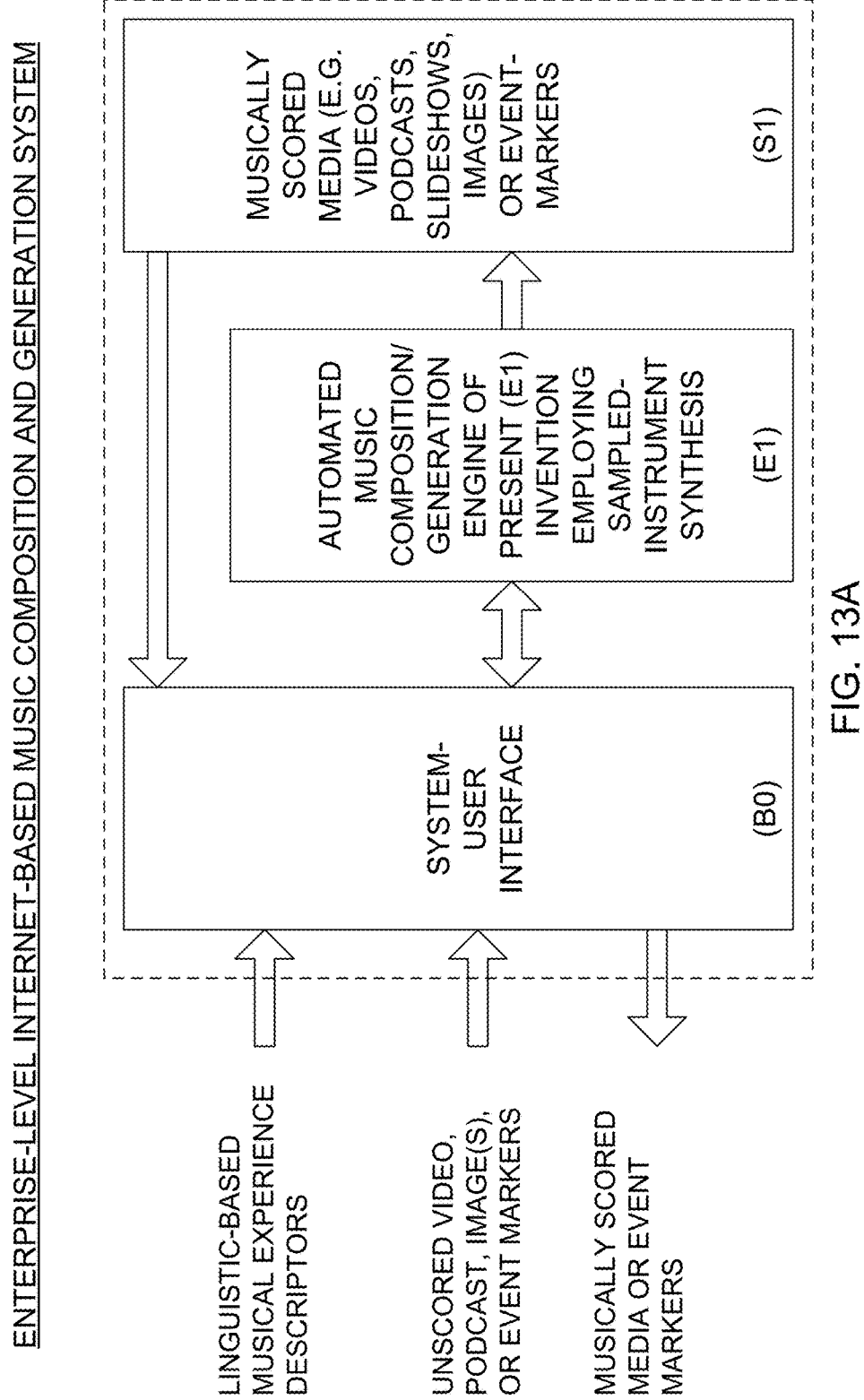
FIG. 13A is schematic representation illustrating the high-level system architecture of the automated music composition and generation process supported by the system shown in FIG. 13, supporting the use of virtual-instrument music synthesis driven by linguistic and/or graphical icon based musical experience descriptors, wherein linguistic-based musical experience descriptors, and a video, audio-recording, image, or event marker, are supplied as input through the web-based system user interface, and used by the Automated Music Composition and Generation Engine of the present invention to generate musically-scored media (e.g. video, podcast, image, slideshow etc.) or event marker, that is then supplied back to the system user via the system user interface.

FIG. 13A is a schematic representation illustrating the high-level system architecture of the automated music composition and generation process supported by the system shown in FIG. 13, supporting the use of linguistic and/or graphical icon based musical experience descriptors and virtual-instrument music synthesis, wherein linguistic-based musical experience descriptors, and a video, audio-recordings, image, or event marker, are supplied as input through the web-based system user interface, and used by the Automated Music Composition and Generation Engine of the present invention to generate musically-scored media (e.g. video, podcast, image, slideshow etc.) or event marker, that is then supplied back to the system user via the system user interface.

Figure 13B:
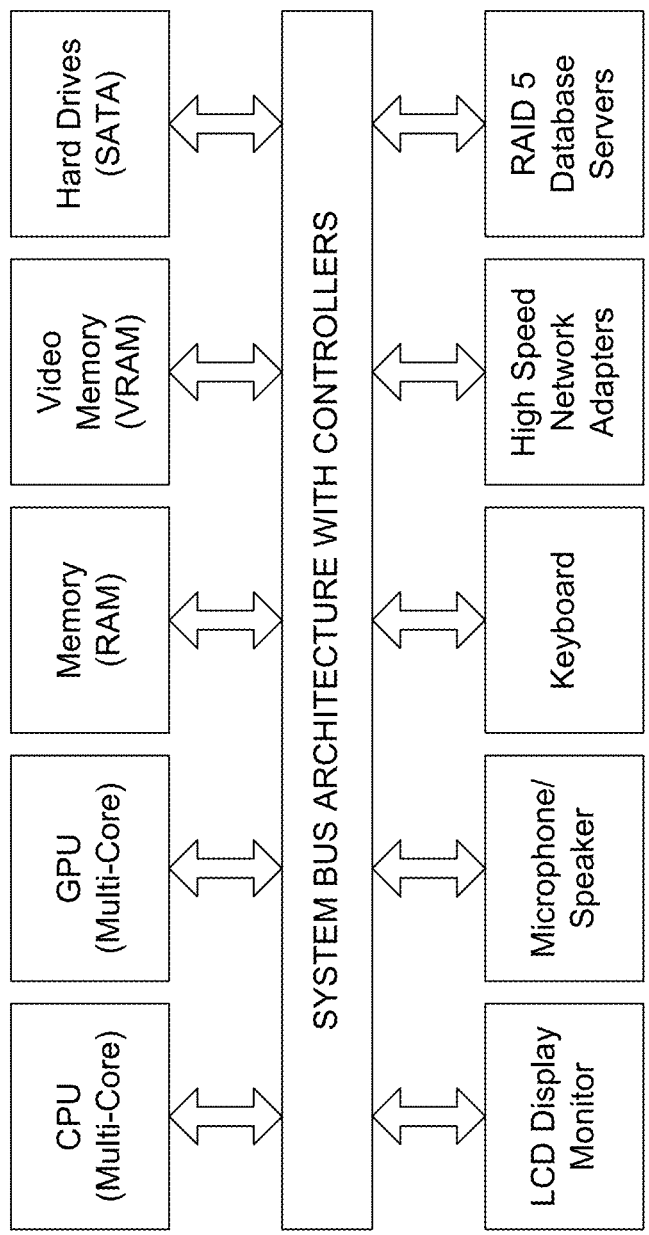
FIG. 13B is a schematic representation of the system architecture of an exemplary computing server machine, one or more of which may be used, to implement the enterprise-level automated music composition and generation system illustrated in FIGS. 13 and 13A.

FIG. 13B shows the system architecture of an exemplary computing server machine, one or more of which may be used, to implement the enterprise-level automated music composition and generation system illustrated in FIGS. 13 and 13A.

FIG. 14 is a flow chart illustrating the primary steps involved in carrying out the automated music composition and generation process supported by the system illustrated in FIGS. 13 and 13A, wherein (i) during the first step of the process, the system user accesses the Automated Music Composition and Generation System of the present invention, and then selects a video, a an audio-recording (i.e. podcast), slideshow, a photograph or image, or an event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Specification of Modes of Operation of the Automated Music Composition and Generation System of the Fourth Illustrative Embodiment of the Present Invention The Automated Music Composition and Generation System of the fourth illustrative embodiment shown in FIGS. 13 through 15W, can operate in various modes of operation including: (i) Score Media Mode where a human system user provides musical experience descriptor and timing/spatial parameter input, as well as a piece of media (e.g. video, slideshow, etc.) to the Automated Music Composition and Generation System so it can automatically generate a piece of music scored to the piece of music according to instructions provided by the system user; and (ii) Compose Music-Only Mode where a human system user provides musical experience descriptor and timing/spatial parameter input to the Automated Music Composition and Generation System so it can automatically generate a piece of music scored for use by the system user.

Figure 15A:
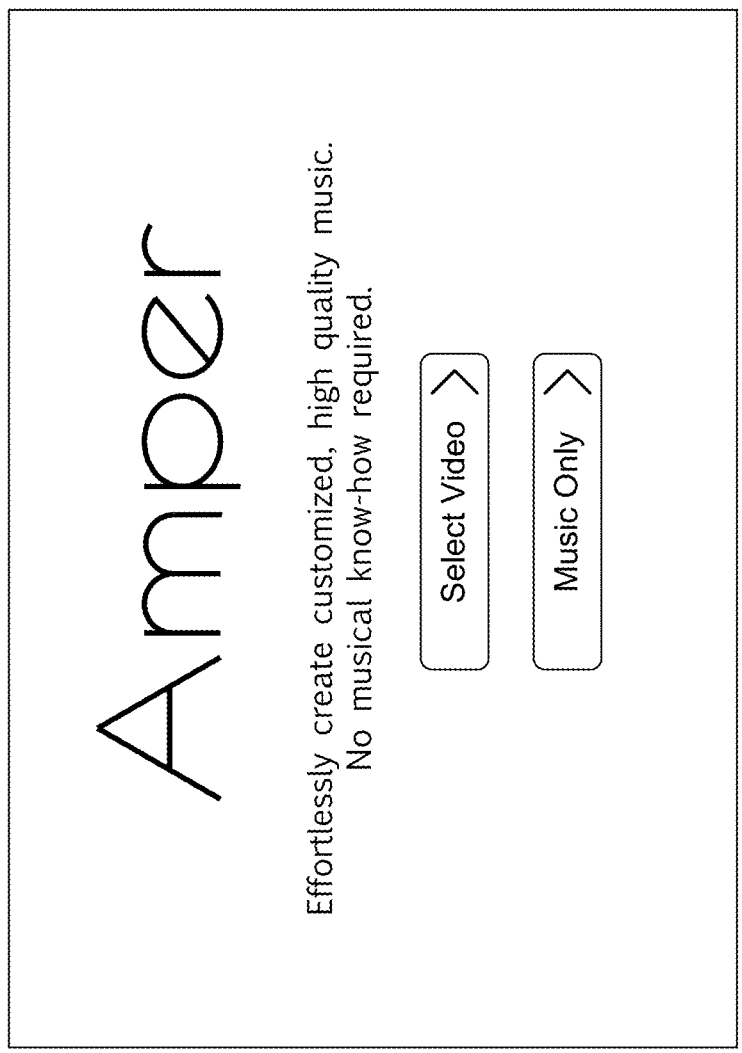
FIG. 15A is an exemplary graphical user interface (GUI) screen that is generated and served by the system illustrated in FIGS. 13 through 14, wherein the interface objects are displayed for (i) Selecting Video to upload into the system as the first step in the automated music composition and generation process of the present invention, and (ii) Composing Music Only option allowing the system user to initiative the Automated Music Composition and Generation System of the present invention.

Specification of Graphical User Interfaces (GUIs) for the Various Modes of Operation Supported by the Automated Music Composition and Generation System of the Fourth Illustrative Embodiment of the Present Invention FIG. 15A is an exemplary graphical user interface (GUI) screen that is generated and served by the system illustrated in FIGS. 13 and 14, wherein the interface objects are displayed for engaging the system into its Score Media Mode of operation or its Compose Music-Only Mode of operation as described above, by selecting one of the following graphical icons, respectively: (i) "Select Video" to upload a video into the system as the first step in the automated composition and generation process of the present invention, and then automatically compose and generate music as scored to the uploaded video; or (ii) "Music Only" to compose music only using the Automated Music Composition and Generation System of the present invention.

Specification of the Score Media Mode

The user decides if the user would like to create music in conjunction with a video or other media, then the user will have the option to engage in the workflow described below and represented in FIGS. 15A through 15W. The details of this work flow will be described below.

Figure 15B:
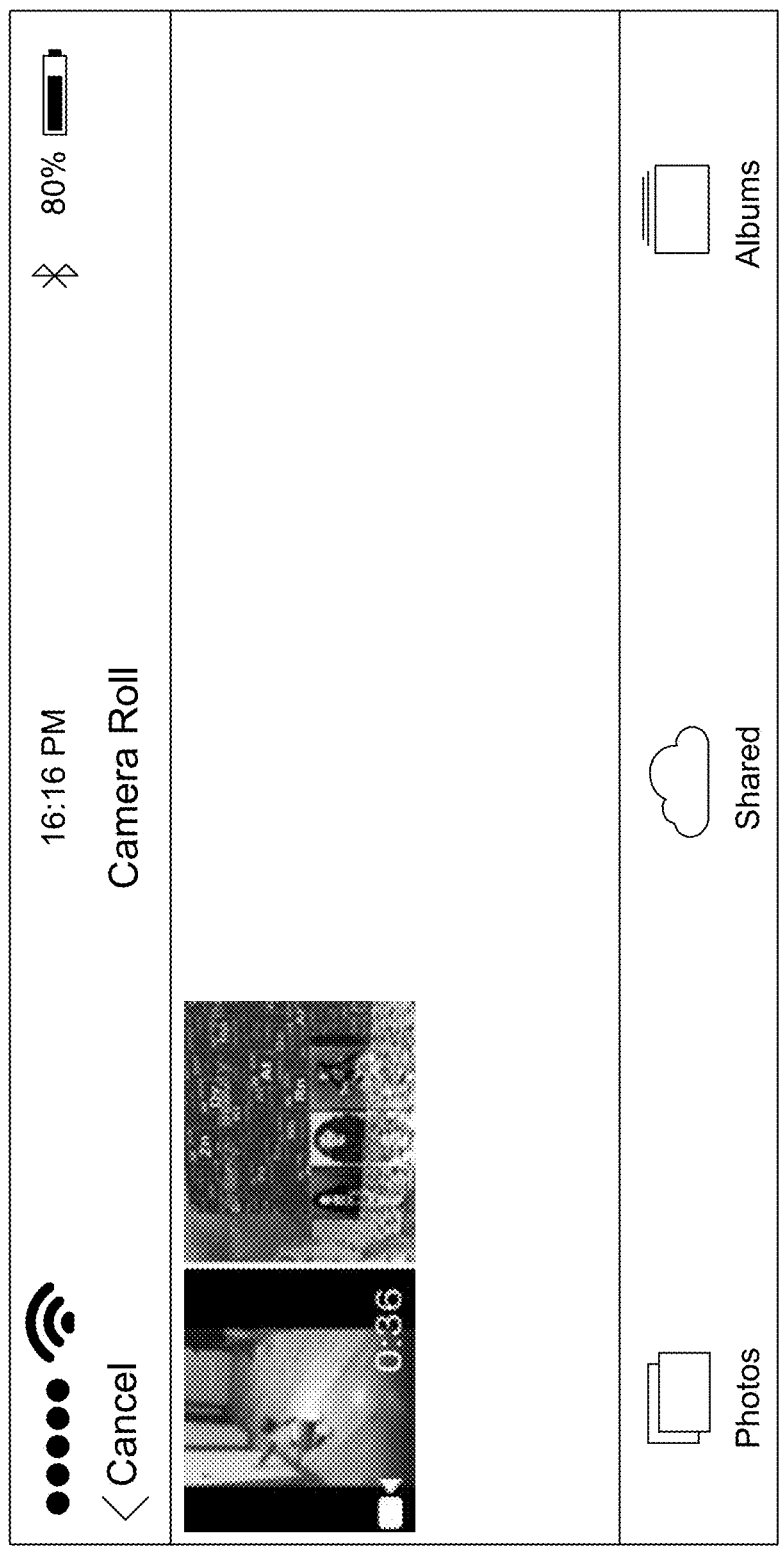
FIG. 15B is an exemplary graphical user interface (GUI) screen that is generated and served by the system illustrated in FIGS. 13 and 14, when the system user selects the "Select Video" object in the GUI of FIG. 15A, wherein the system allows the user to select a video file from several different local and remote file storage locations (e.g. local photo album, shared hosted folder on the cloud, and local photo albums from ones smartphone camera roll)

When the system user selects "Select Video" object in the GUI of FIG. 15A, the exemplary graphical user interface (GUI) screen shown in FIG. 15B is generated and served by the system illustrated in FIGS. 13 and 14. In this mode of operation, the system allows the user to select a video file, or other media object (e.g. slide show, photos, audio file or podcast, etc.), from several different local and remote file storage locations (e.g. photo album, shared folder hosted on the cloud, and photo albums from ones smartphone camera roll), as shown in FIGS. 15B and 15C. If a user decides to create music in conjunction with a video or other media using this mode, then the system user will have the option to engage in a workflow that supports such selected options.

Figure 15D:
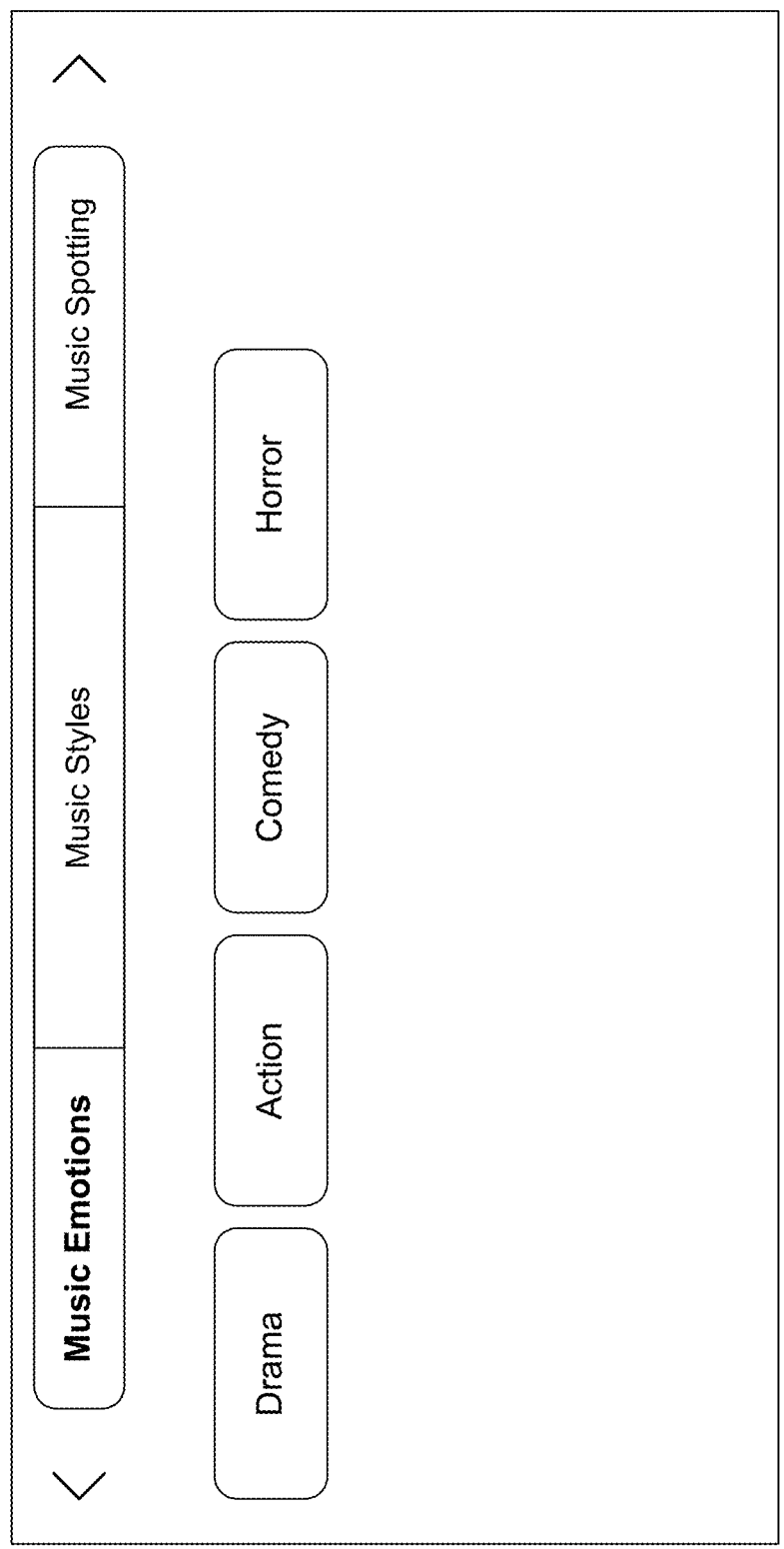
FIG. 15D is an exemplary graphical user interface (GUI) screen that is generated and served by the system illustrated in FIGS. 13 and 14, wherein the system user selects the category "music emotions" from the Music Emotions/Music Style/Music Spotting Menu, to display four exemplary classes of emotions (i.e. Drama, Action, Comedy, and Horror) from which to choose and characterize the musical experience the system user seeks.

Using the GUI screen shown in FIG. 15D, the system user selects the category "music emotions" from the music emotions/music style/music spotting menu, to display four exemplary classes of emotions (i.e. Drama, Action, Comedy, and Horror) from which to choose and characterize the musical experience the system user seeks.

Figure 15E:
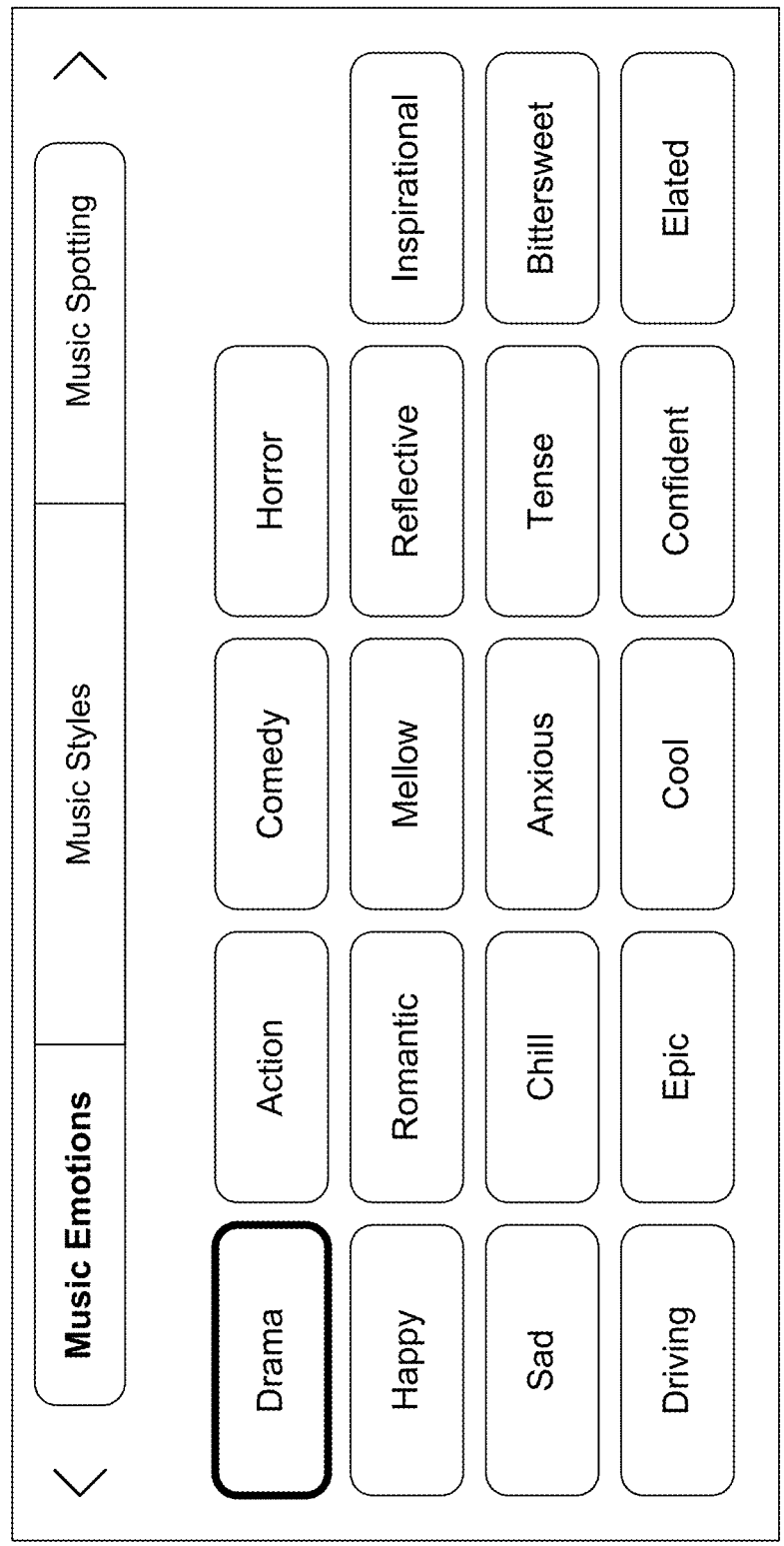
FIG. 15E is an exemplary graphical user interface (GUI) screen that is generated and served by the system illustrated in FIGS. 13 and 14, in response to the system user selecting the music emotion category—Drama.
Figure 15F:
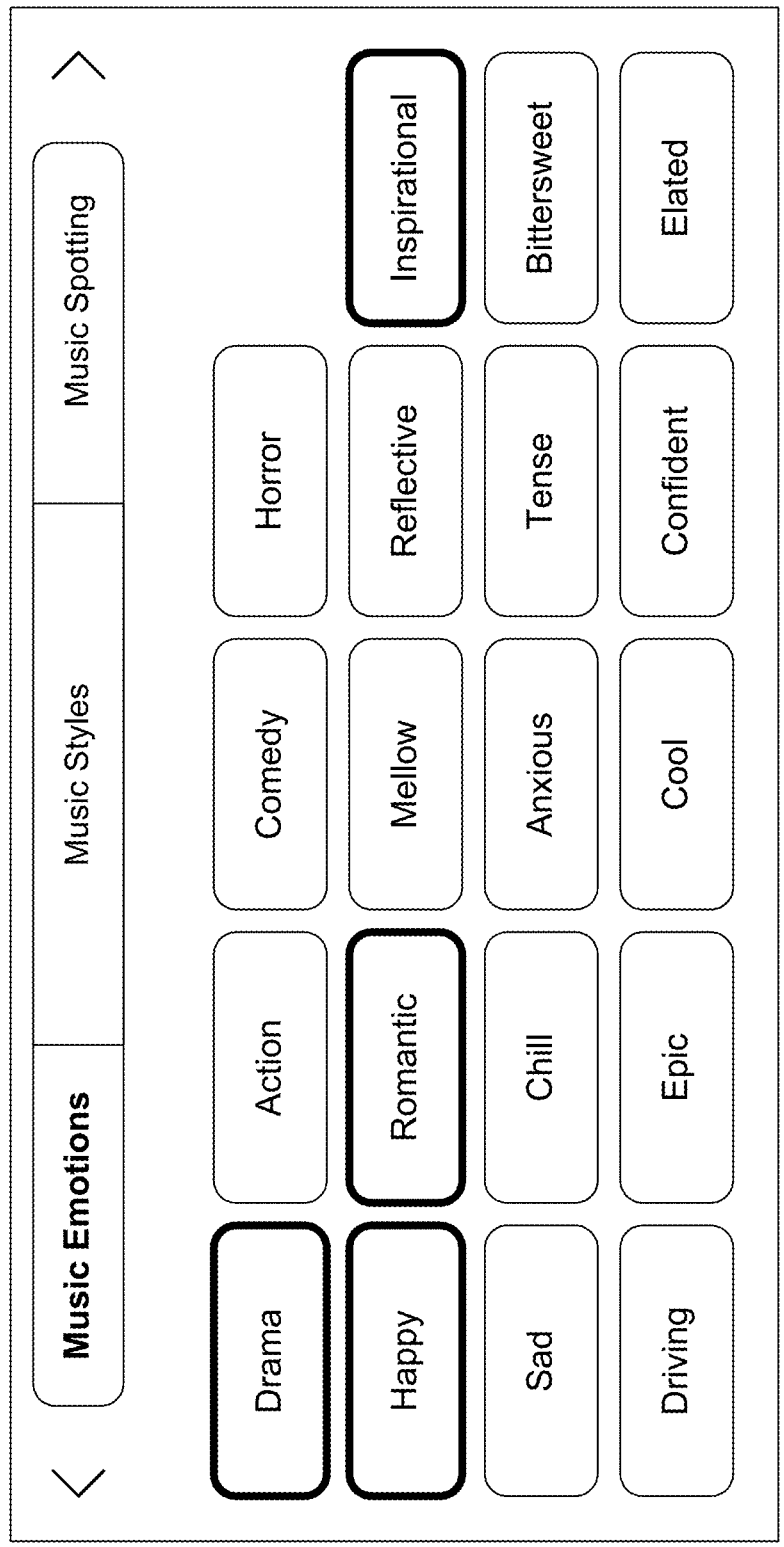
FIG. 15F is an exemplary graphical user interface (GUI) screen that is generated and served by the system illustrated in FIGS. 13 and 14, in response to the system user selecting the music emotion category—Drama, and wherein the system user has subsequently selected the Drama-classified emotions—Happy, Romantic, and Inspirational for scoring the selected video.

FIG. 15E shows an exemplary GUI screen that is generated and served by the system illustrated in FIGS. 13 and 14, in response to the system user selecting the music emotion category—Drama. FIG. 15F shows an exemplary GUI screen that is generated and served by the system illustrated in FIGS. 13 and 14, in response to the system user selecting the music emotion category—Drama, and wherein the system user has selected the Drama-classified emotions—Happy, Romantic, and Inspirational for scoring the selected video.

Figure 15G:
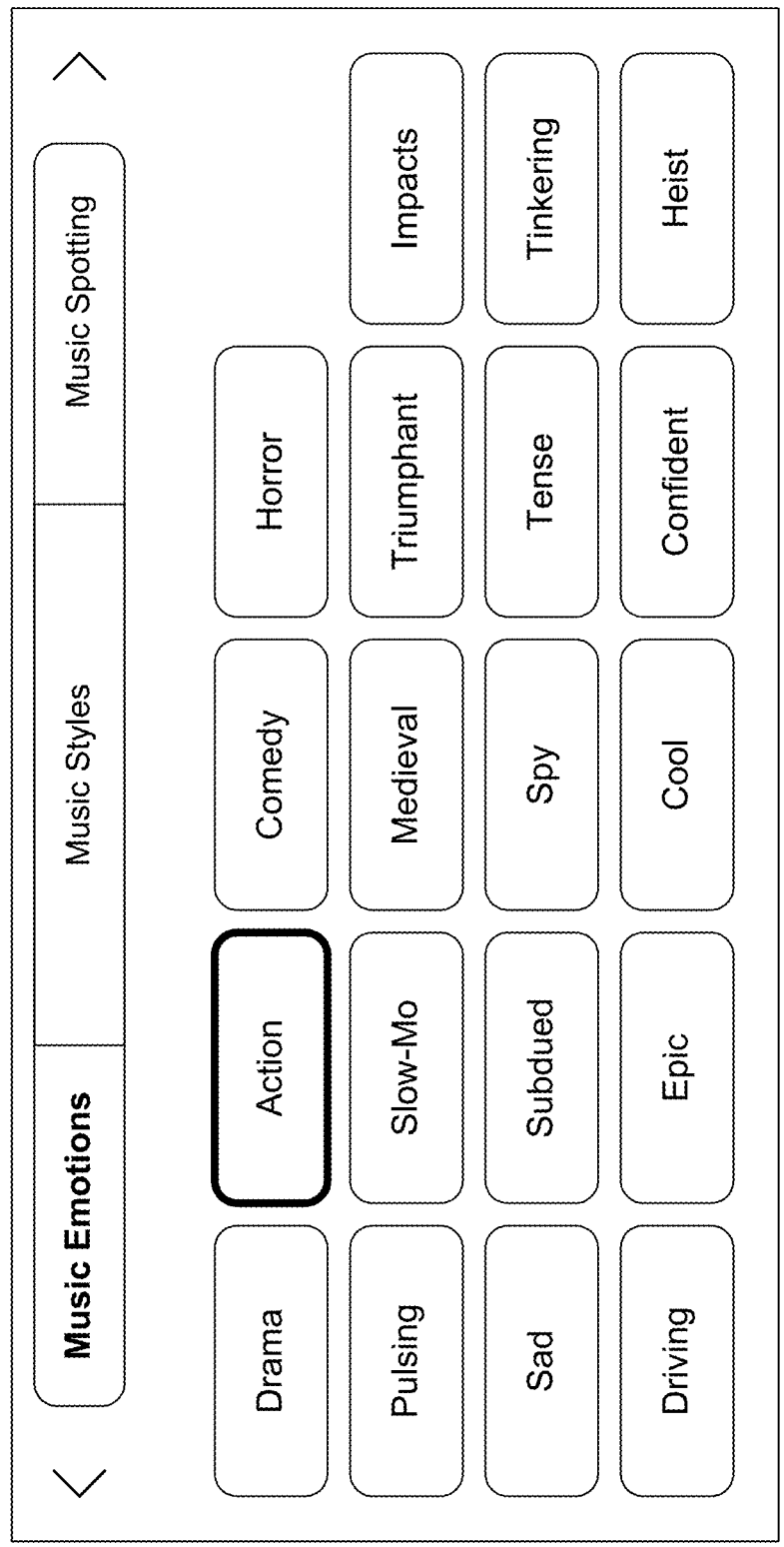
FIG. 15G is an exemplary graphical user interface (GUI) screen that is generated and served by the system illustrated in FIGS. 13 and 14, in response to the system user selecting the music emotion category—Action.
Figure 15H:
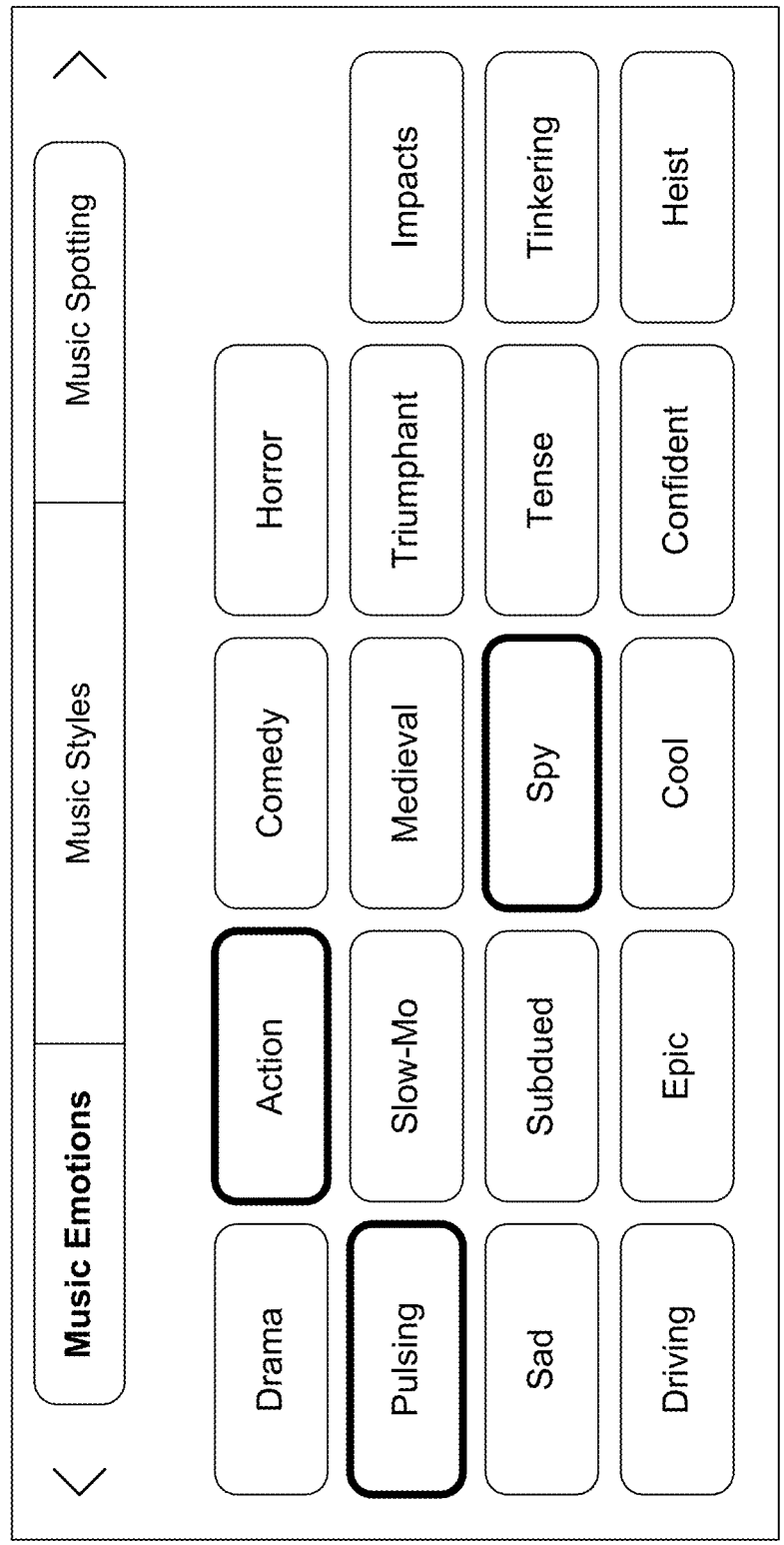
FIG. 15H is an exemplary graphical user interface (GUI) screen that is generated and served by the system illustrated in FIGS. 13 and 14, in response to the system user selecting the music emotion category—Action, and wherein the system user has subsequently selected the Action-classified emotions—Pulsating, and Spy for scoring the selected video.

FIG. 15G shows an exemplary GUI screen that is generated and served by the system illustrated in FIGS. 13 and 14, in response to the system user selecting the music emotion category—Action. FIG. 15H shows an exemplary GUI screen that is generated and served by the system illustrated in FIGS. 13 and 14, in response to the system user selecting the music emotion category—Action, and wherein the system user has selected two Action-classified emotions—Pulsating, and Spy—for scoring the selected video.

Figure 15I:
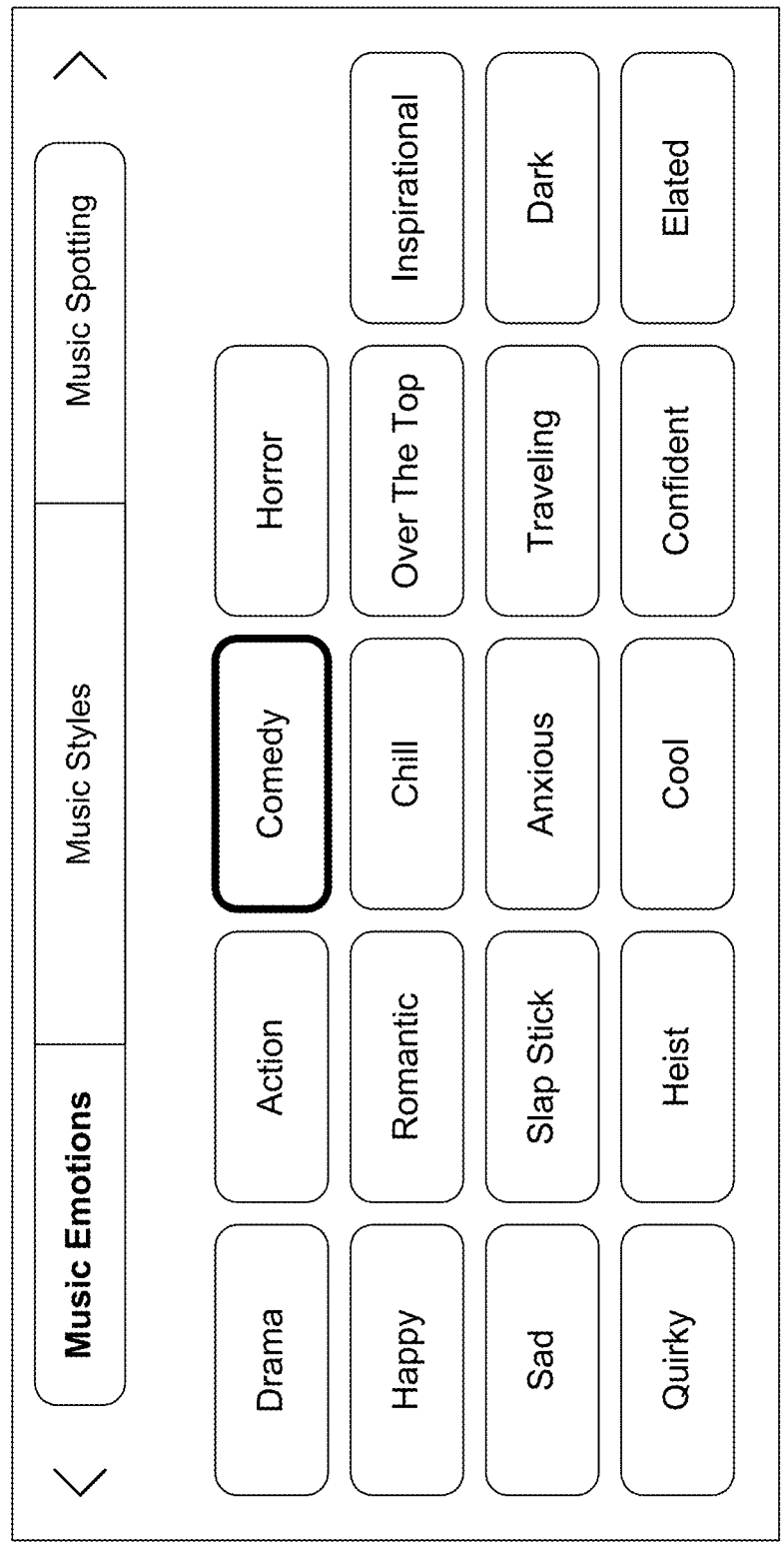
FIG. 15I is an exemplary graphical user interface (GUI) screen that is generated and served by the system illustrated in FIGS. 13 and 14, in response to the system user selecting the music emotion category—Comedy.
Figure 15J:
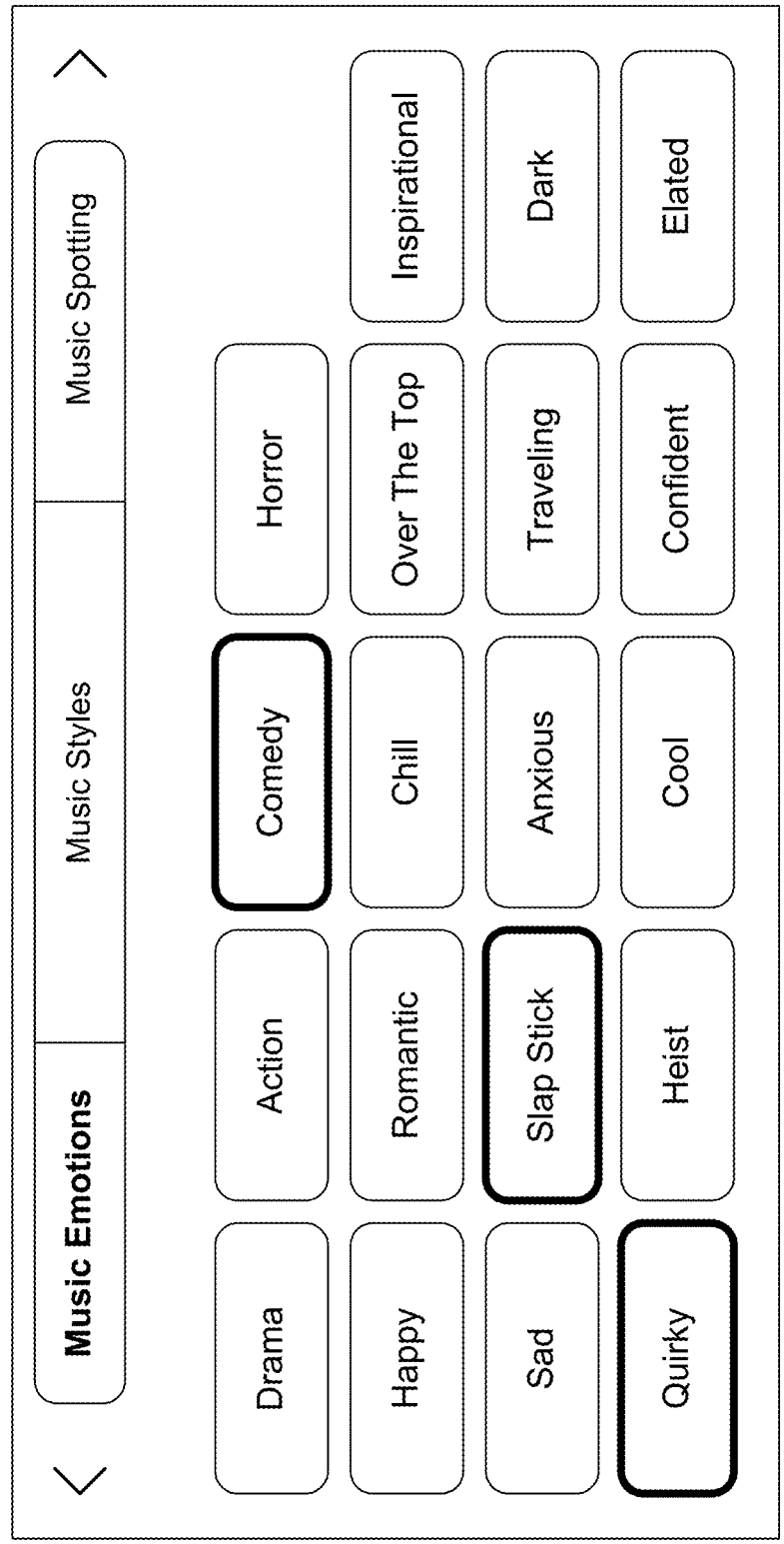
FIG. 15J is an exemplary graphical user interface (GUI) screen that is generated and served by the system illustrated in FIGS. 13 and 14, in response to the system user selecting the music emotion category—Drama, and wherein the system user has subsequently selected the Comedy-classified emotions—Quirky and Slap Stick for scoring the selected video.

FIG. 15I shows an exemplary GUI screen that is generated and served by the system illustrated in FIGS. 13 and 14, in response to the system user selecting the music emotion category—Comedy. FIG. 15J is an exemplary graphical user interface (GUI) screen that is generated and served by the system illustrated in FIGS. 13 and 14, in response to the system user selecting the music emotion category—Drama, and wherein the system user has selected the Comedy-classified emotions—Quirky and Slap Stick for scoring the selected video.

Figure 15K:
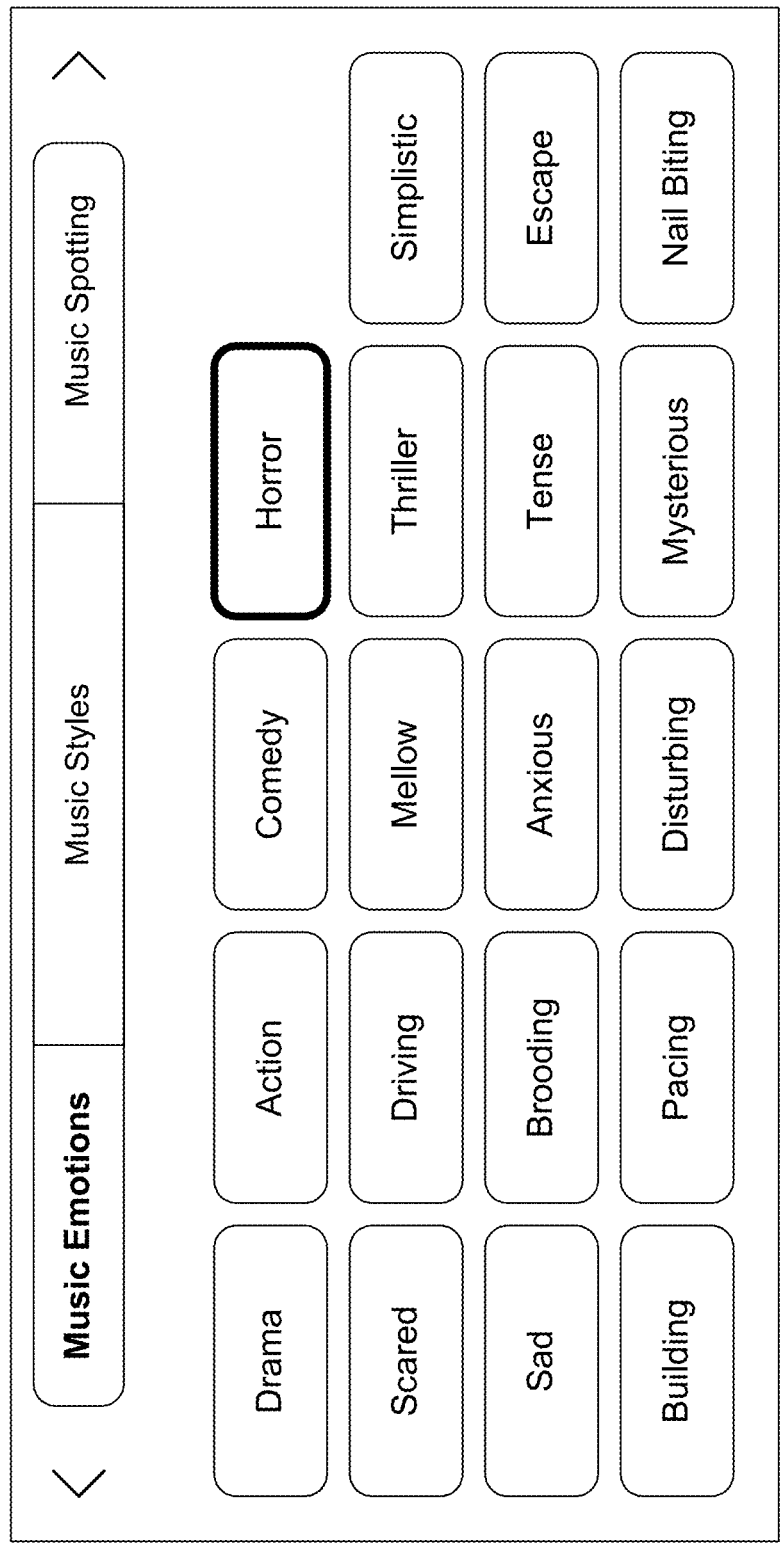
FIG. 15K is an exemplary graphical user interface (GUI) screen that is generated and served by the system illustrated in FIGS. 13 and 14, in response to the system user selecting the music emotion category—Horror.
Figure 15L:
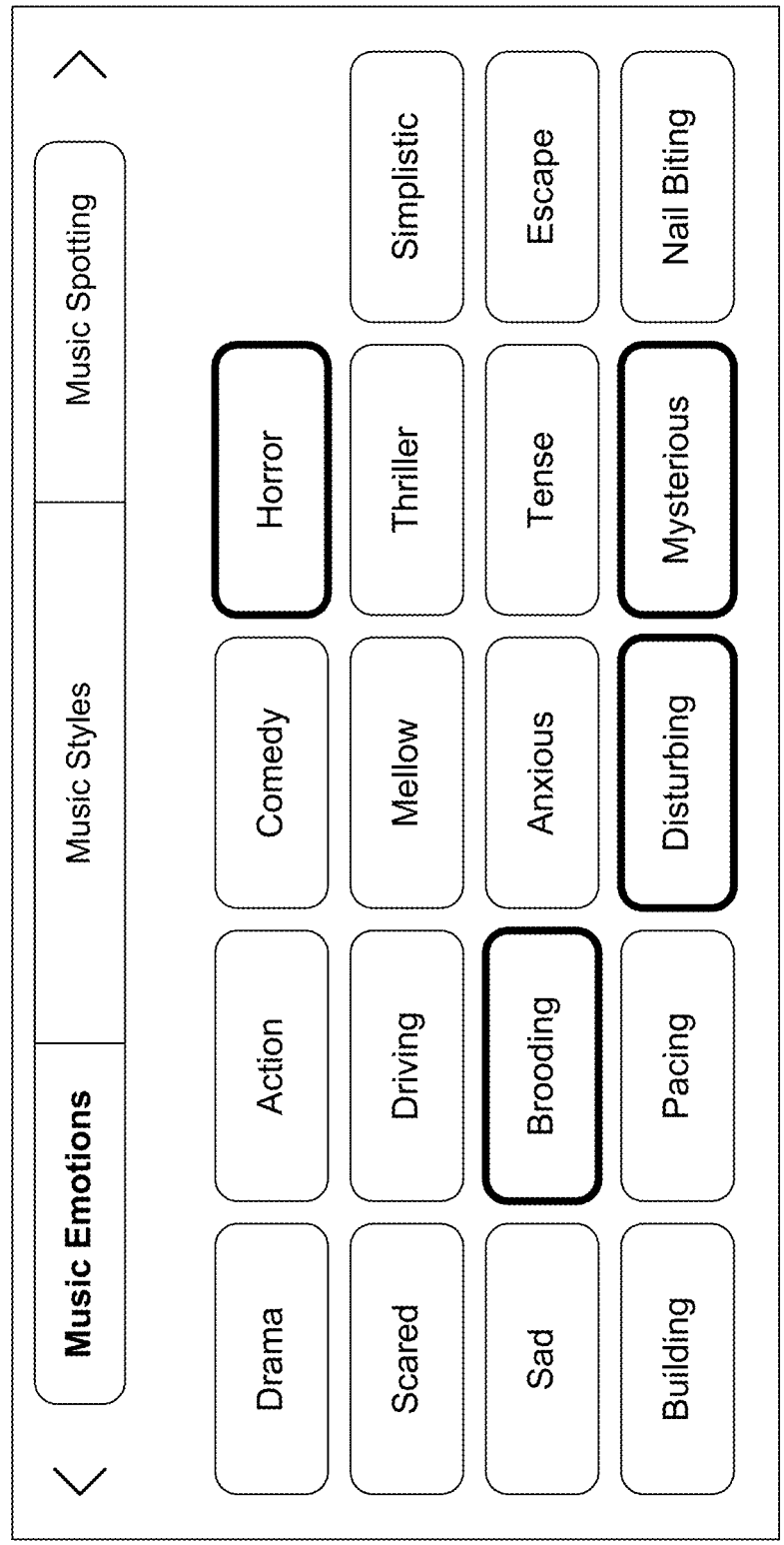
FIG. 15L is an exemplary graphical user interface (GUI) screen that is generated and served by the system illustrated in FIGS. 13 and 14, in response to the system user selecting the music emotion category—Horror, and wherein the system user has subsequently selected the Horror-classified emotions—Brooding, Disturbing and Mysterious for scoring the selected video.

FIG. 15K shows an exemplary GUI screen that is generated and served by the system illustrated in FIGS. 13 and 14, in response to the system user selecting the music emotion category—Horror. FIG. 15L shows an exemplary graphical user interface (GUI) screen that is generated and served by the system illustrated in FIGS. 13 and 14, in response to the system user selecting the music emotion category—Horror, and wherein the system user has selected the Horror-classified emotions—Brooding, Disturbing and Mysterious for scoring the selected video.

It should be noted at this juncture that while the fourth illustrative embodiment shows a fixed set of emotion-type musical experience descriptors, for characterizing the emotional quality of music to be composed and generated by the system of the present invention, it is understood that in general, the music composition system of the present invention can be readily adapted to support the selection and input of a wide variety of emotion-type descriptors such as, for example, linguistic descriptors (e.g. words), images, and/or like representations of emotions, adjectives, or other descriptors that the user would like to music to convey the quality of emotions to be expressed in the music to be composed and generated by the system of the present invention.

Figure 15M:
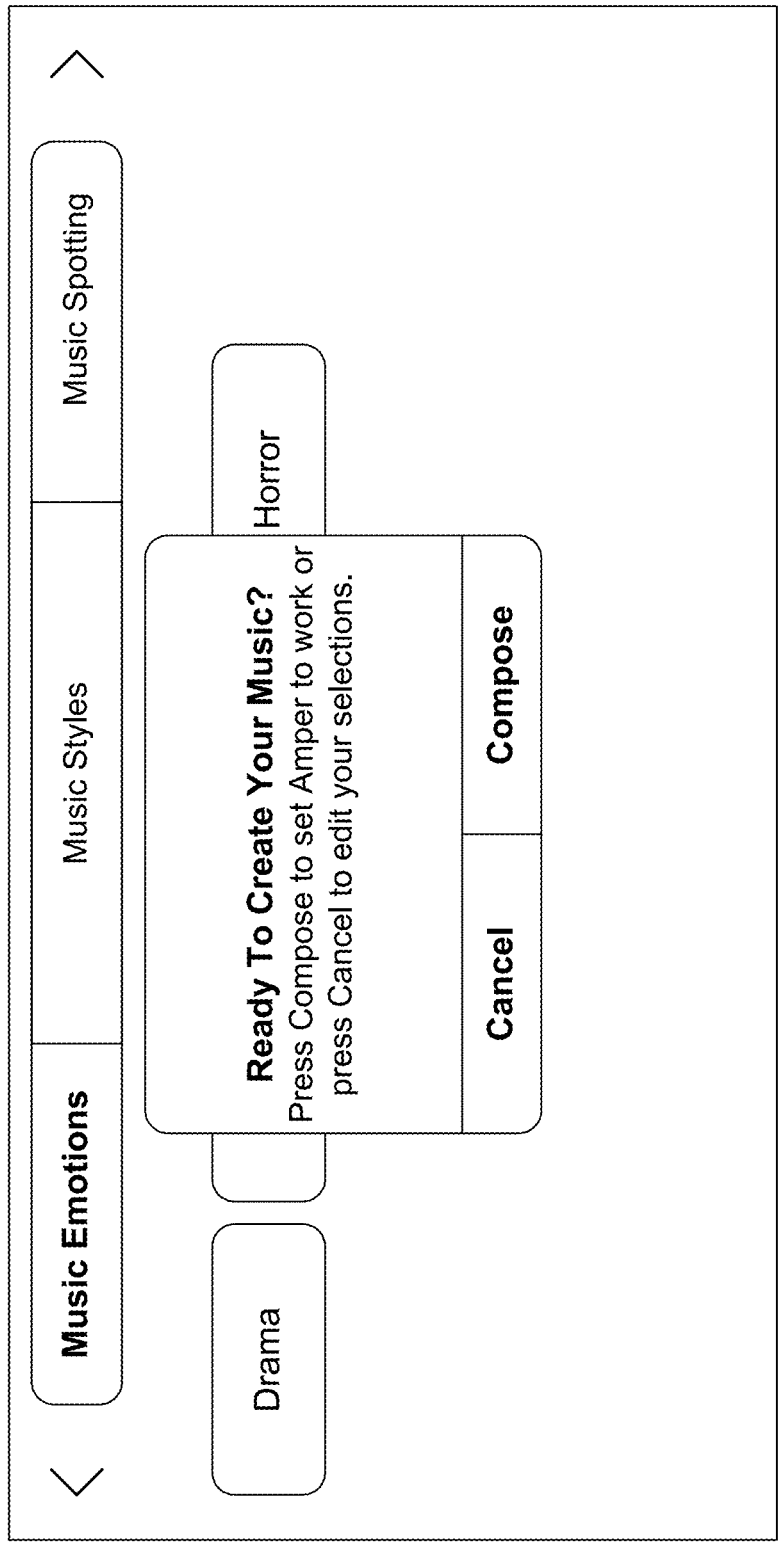
FIG. 15M is an exemplary graphical user interface (GUI) screen that is generated and served by the system illustrated in FIGS. 13 and 14, in response to the system user completing the selection of the music emotion category, displaying the message to the system user—"Ready to Create Your Music" Press Compose to Set Amper To Work Or Press Cancel To Edit Your Selections"

FIG. 15M shows an exemplary GUI screen that is generated and served by the system illustrated in FIGS. 13 and 14, in response to the system user completing the selection of the music emotion category, displaying the message to the system user—"Ready to Create Your Music" Press Compose to Set Amper To Work Or Press Cancel To Edit Your Selections".

At this stage of the workflow, the system user can select COMPOSE and the system will automatically compose and generate music based only on the emotion-type musical experience parameters provided by the system user to the system interface. In such a case, the system will choose the style-type parameters for use during the automated music composition and generation system. Alternatively, the system user has the option to select CANCEL, to allow the user to edit their selections and add music style parameters to the music composition specification.

Figure 15N:
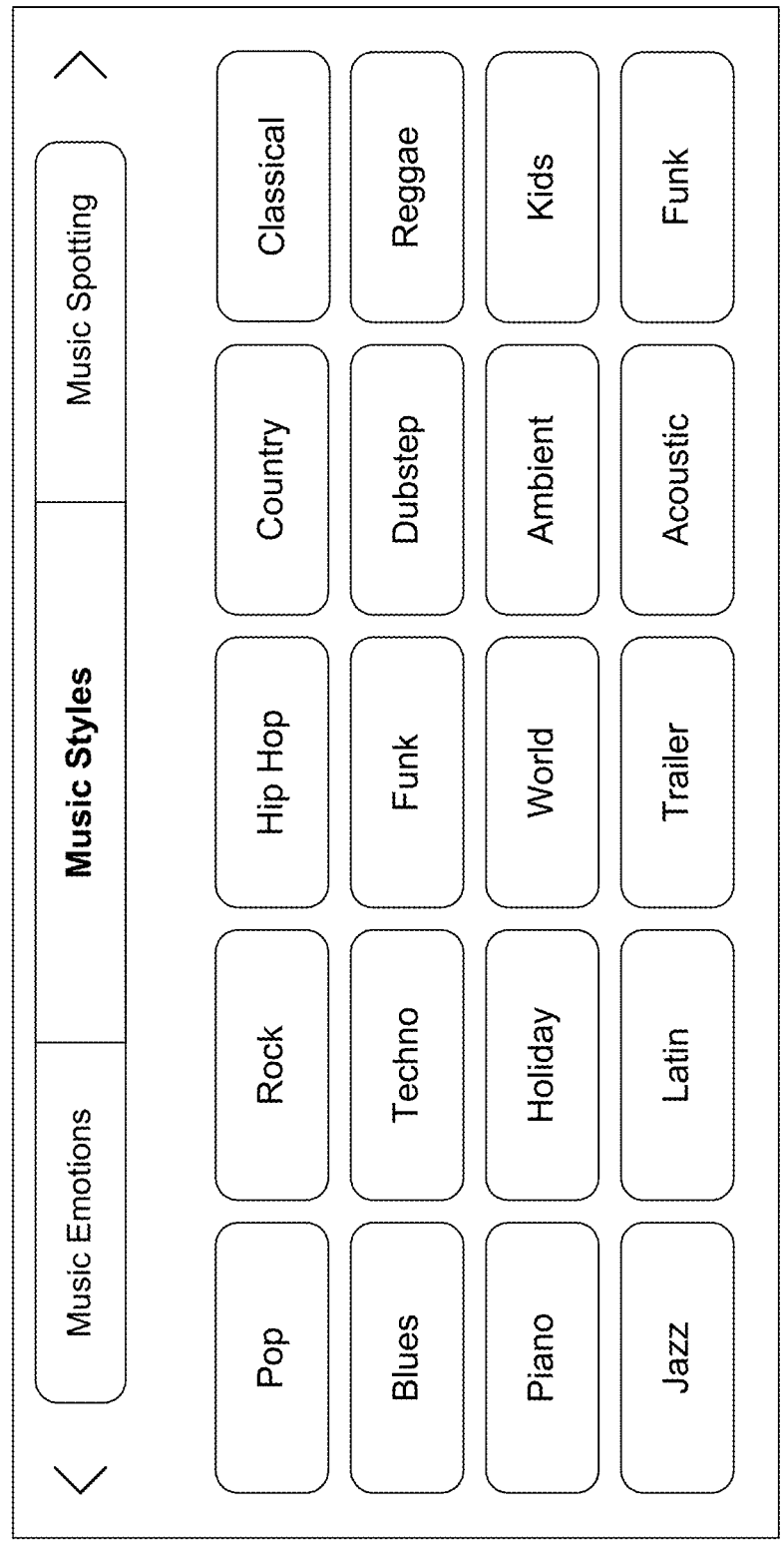
FIG. 15N is an exemplary graphical user interface (GUI) screen that is generated and served by the system illustrated in FIGS. 13 and 14, wherein the system user selects the category "music style" from the music emotions/music style/music spotting menu, to display twenty (20) styles (i.e. Pop, Rock, Hip Hop, etc.) from which to choose and characterize the musical experience they system user seeks.

FIG. 15N shows an exemplary GUI screen that is generated and served by the system illustrated in FIGS. 13 and 14 when the user selects CANCEL followed by selection of the MUSIC STYLE button from the music emotions/music style/music spotting menu, thereby displaying twenty (20) styles (i.e. Pop, Rock, Hip Hop, etc.) from which to choose and characterize the musical experience they system user seeks.

Figure 15O:
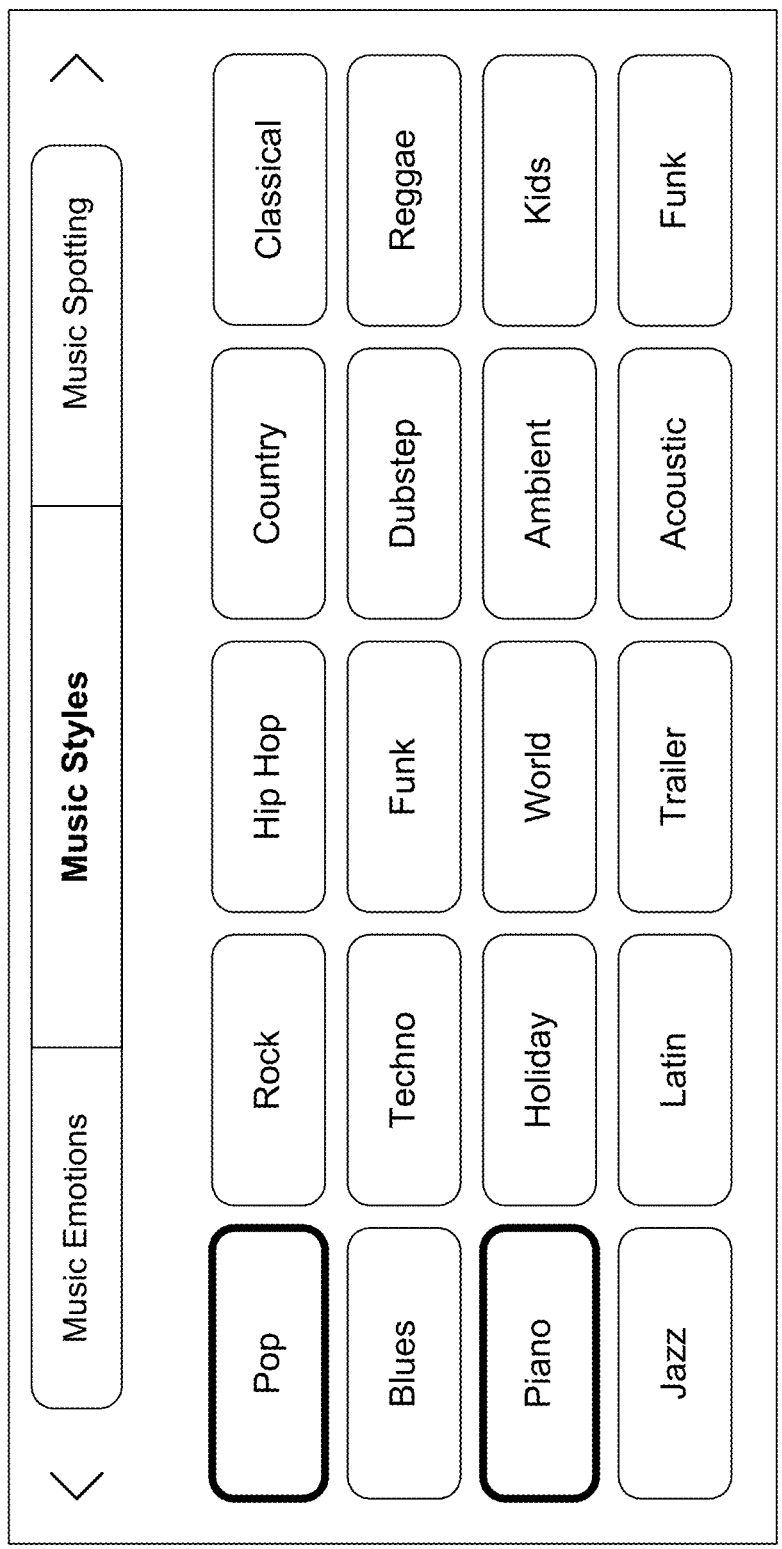
FIG. 15O is an exemplary graphical user interface (GUI) screen that is generated and served by the system illustrated in FIGS. 13 and 14, in response to the system user selecting the music style categories—Pop and Piano.

FIG. 15O is an exemplary GUI screen that is generated and served by the system illustrated in FIGS. 13 and 14, wherein the system user has selected the music style categories—Pop and Piano.

It should be noted at this juncture that while the fourth illustrative embodiment shows a fixed set of style-type musical experience descriptors, for characterizing the style quality of music to be composed and generated by the system of the present invention, it is understood that in general, the music composition system of the present invention can be readily adapted to support the selection and input of a wide variety of style-type descriptors such as, for example, linguistic descriptors (e.g. words), images, and/or like representations of emotions, adjectives, or other descriptors that the user would like to music to convey the quality of styles to be expressed in the music to be composed and generated by the system of the present invention.

Figure 15P:
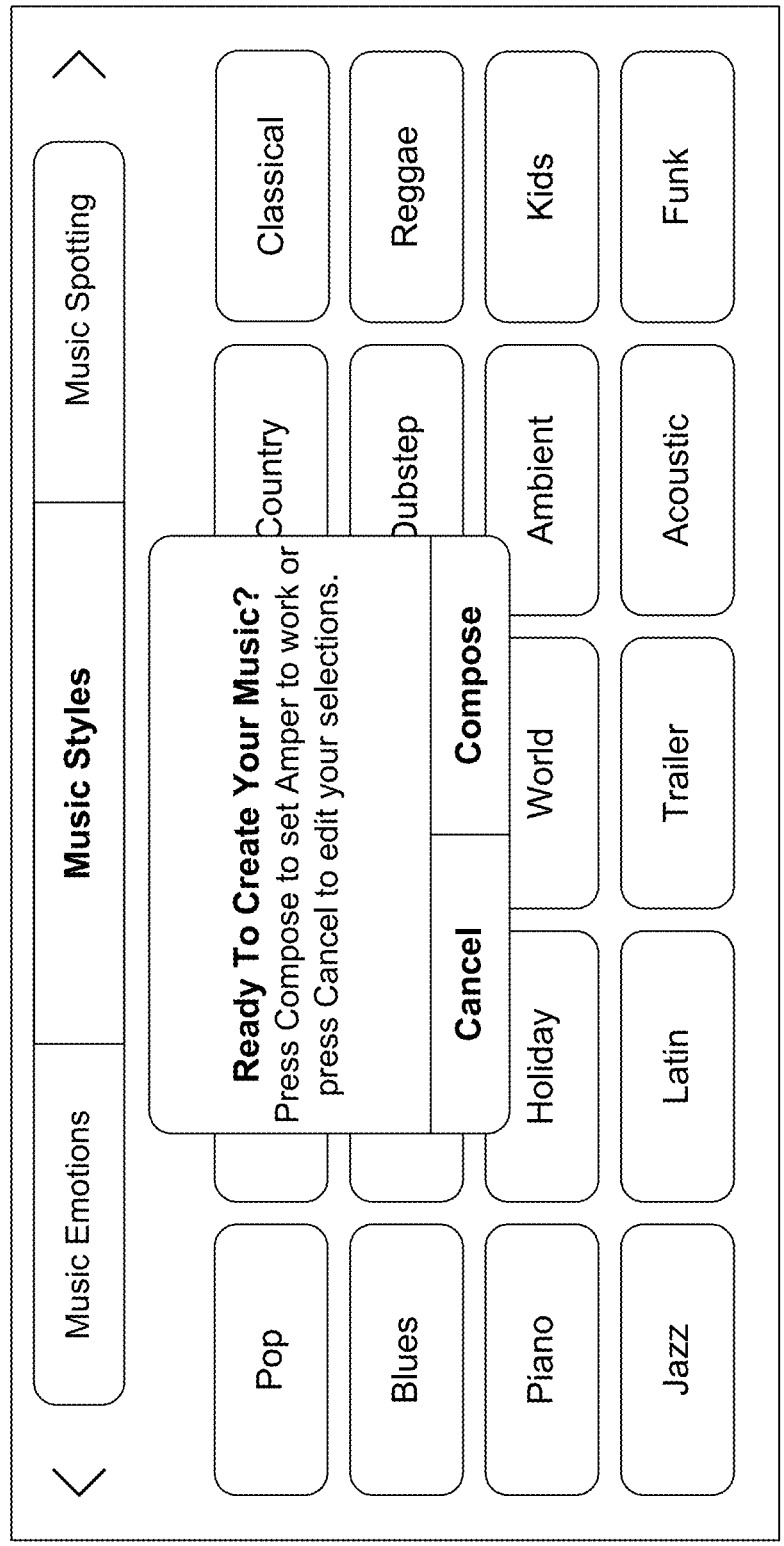
FIG. 15P is an exemplary graphical user interface (GUI) screen that is generated and served by the system illustrated in FIGS. 13 and 14, in response to the system user completing the selection of the music style category, displaying the message to the system user—"Ready to Create Your Music" Press Compose to Set Amper To Work Or Press Cancel To Edit Your Selections"

FIG. 15P is an exemplary GUI screen that is generated and served by the system illustrated in FIGS. 13 and 14, in response to the system user has selected the music style categories—POP and PIANO. At this stage of the workflow, the system user can select COMPOSE and the system will automatically compose and generate music based only on the emotion-type musical experience parameters provided by the system user to the system interface. In such a case, the system will use both the emotion-type and style-type musical experience parameters selected by the system user for use during the automated music composition and generation system. Alternatively, the system user has the option to select CANCEL, to allow the user to edit their selections and add music spotting parameters to the music composition specification.

Figure 15Q:
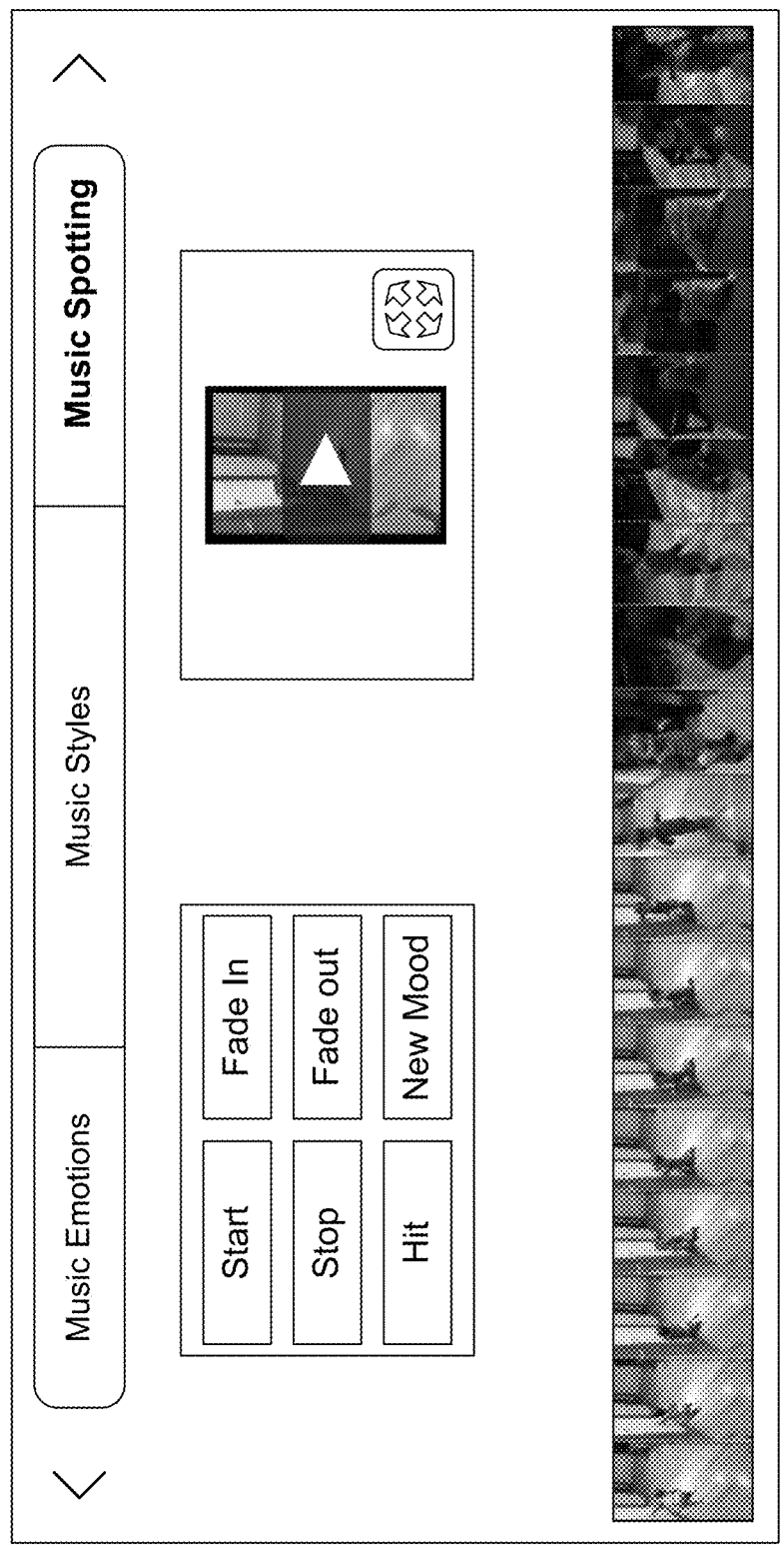
FIG. 15Q is an exemplary graphical user interface (GUI) screen that is generated and served by the system illustrated in FIGS. 13 and 14, wherein the system user selects the category "music spotting" from the music emotions/music style/music spotting menu, to display six commands from which the system user can choose during music spotting functions—"Start," "Stop," "Hit," "Fade In", "Fade Out," and "New Mood" commands.

FIG. 15Q is an exemplary GUI screen that is generated and served by the system illustrated in FIGS. 13 and 14, allowing the system user to select the category "music spotting" from the music emotions/music style/music spotting menu, to display six commands from which the system user can choose during music spotting functions.

Figure 15R:
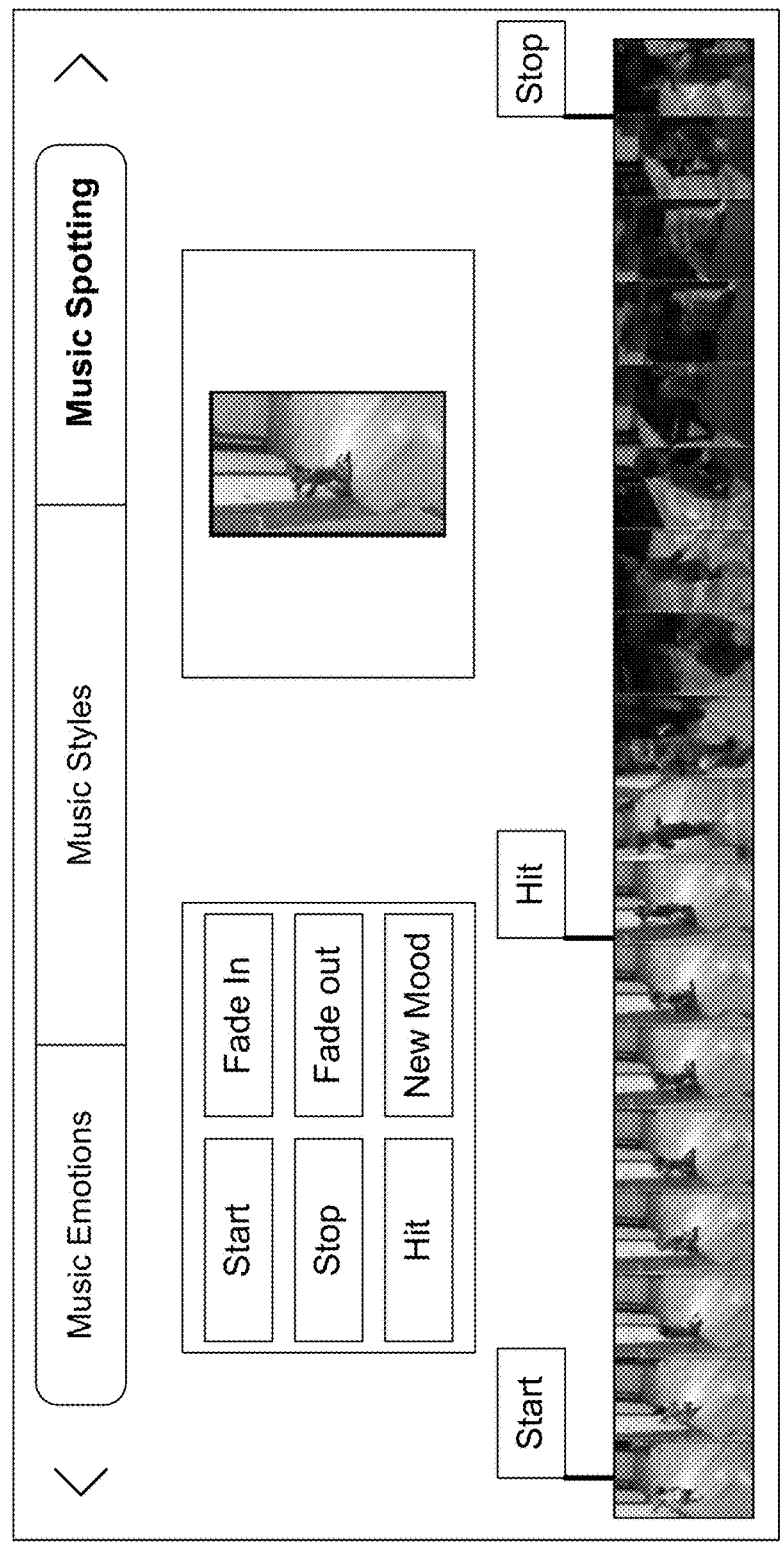
FIG. 15R is an exemplary graphical user interface (GUI) screen that is generated and served by the system illustrated in FIGS. 13 and 14, in response to the system user selecting "music spotting" from the function menu, showing the "Start," "Stop," and commands being scored on the selected video, as shown.

FIG. 15R is an exemplary GUI screen that is generated and served by the system illustrated in FIGS. 13 and 14, in response to the system user selecting "music spotting" from the function menu, showing the "Start," "Stop," "Hit," "Fade In", "Fade Out," and "New Mood" markers being scored on the selected video, as shown.

In this illustrative embodiment, the "music spotting" function or mode allows a system user to convey the timing parameters of musical events that the user would like to music to convey, including, but not limited to, music start, stop, descriptor change, style change, volume change, structural change, instrumentation change, split, combination, copy, and paste. This process is represented in subsystem blocks 40 and 41 in FIGS. 26A through 26D. As will be described in greater detail hereinafter, the transformation engine B51 within the automatic music composition and generation system of the present invention receives the timing parameter information, as well as emotion-type and style-type descriptor parameters, and generates appropriate sets of probabilistic-based system operating parameter tables which are distributed to their respective subsystems, using subsystem indicated by Blocks 1 and 37.

Figure 15S:
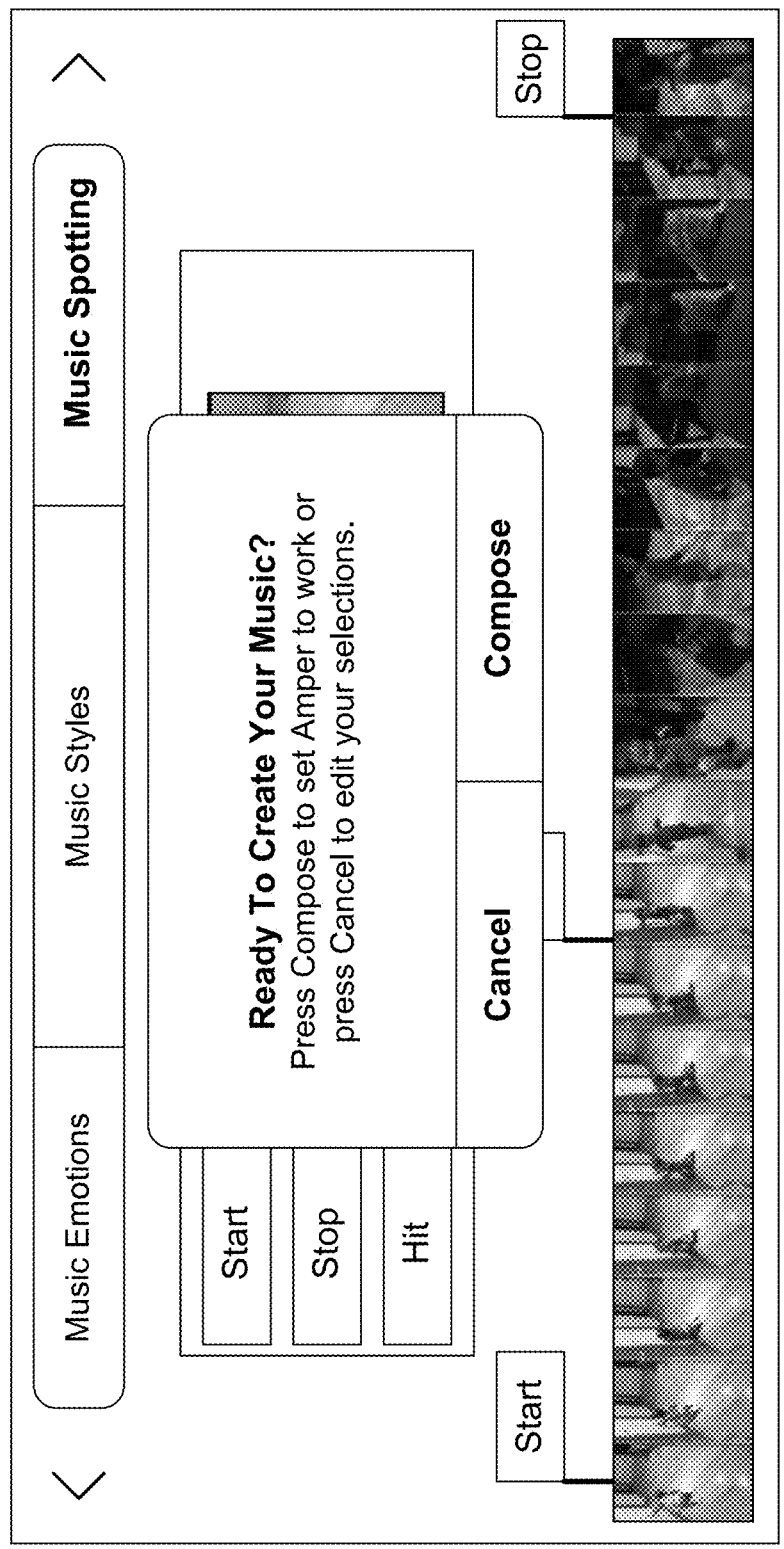
FIG. 15S is an exemplary graphical user interface (GUI) screen that is generated and served by the system illustrated in FIGS. 13 and 14, in response to completing the music spotting function, displaying a message to the system user—"Ready to Create Music" Press Compose to Set Amper To work or "Press Cancel to Edit Your Selection"

FIG. 15S is an exemplary GUI screen that is generated and served by the system illustrated in FIGS. 13 and 14, in response to completing the music spotting function, displaying a message to the system user—"Ready to Create Music" Press Compose to Set Amper To work or "Press Cancel to Edit Your Selection". At this juncture, the system user has the option of selecting COMPOSE which will initiate the automatic music composition and generation system using the musical experience descriptors and timing parameters supplied to the system by the system user. Alternatively, the system user can select CANCEL, whereupon the system will revert to displaying a GUI screen such as shown in FIG. 15D, or like form, where all three main function menus are displayed for MUSIC EMOTIONS, MUSIC STYLE, and MUSIC SPOTTING.

Figure 15T:
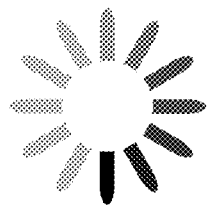
FIG. 15T is an exemplary graphical user interface (GUI) screen that is generated and served by the system illustrated in FIGS. 13 and 14, in response to the system user pressing the "Compose" button.

FIG. 15T shows an exemplary GUI screen that is generated and served by the system illustrated in FIGS. 13 and 14, in response to the system user pressing the "Compose" button, indicating the music is being composed and generated by the phrase "Bouncing Music." After the confirming the user's request for the system to generate a piece of music, the user's client system transmits, either locally or externally, the request to the music composition and generation system, whereupon the request is satisfied. The system generates a piece of music and transmits the music, either locally or externally, to the user.

Figure 15V:
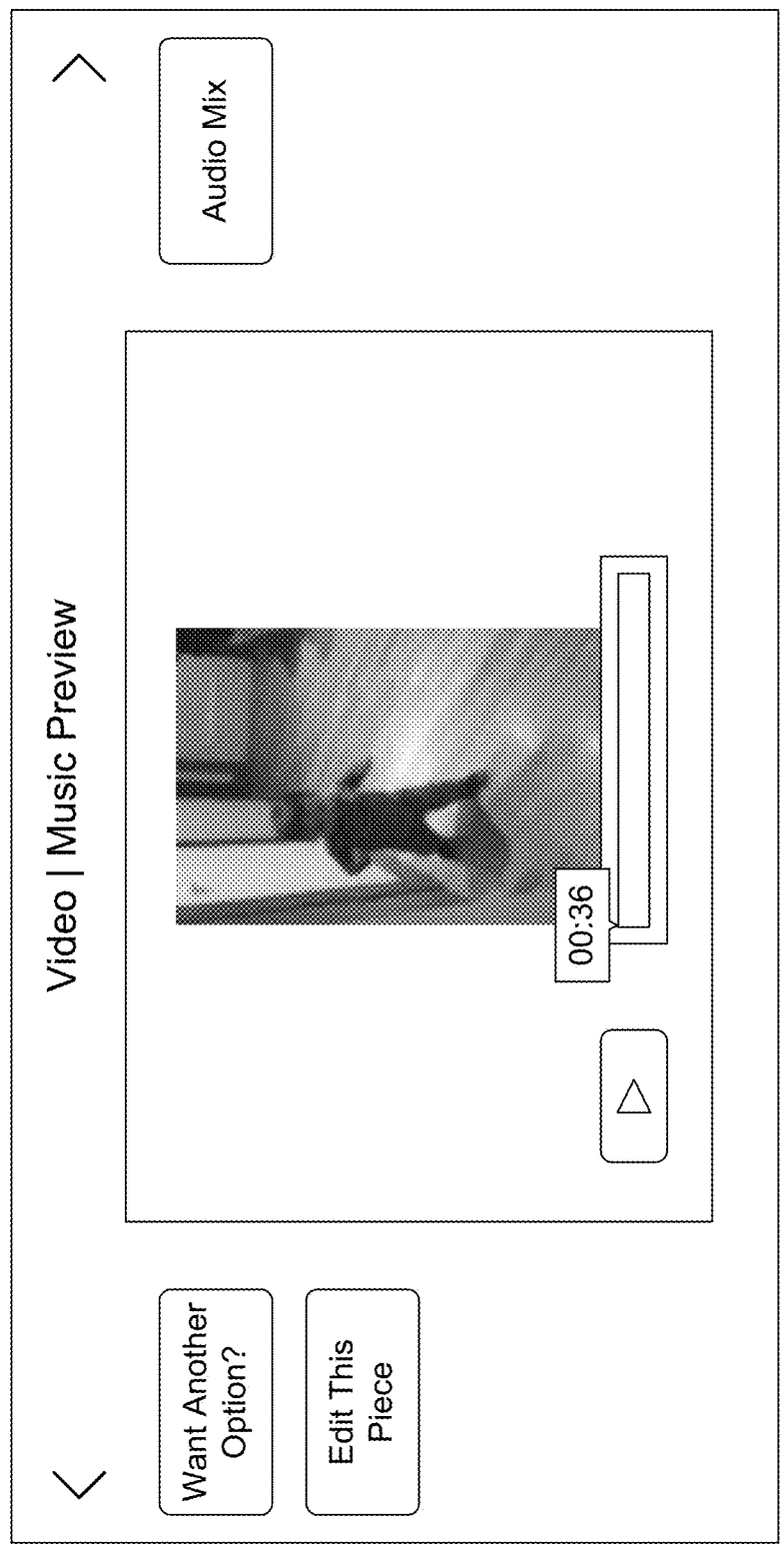
FIG. 15V is an exemplary graphical user interface (GUI) screen that is generated and served by the system illustrated in FIGS. 13 and 14, after a music composition has been generated and is ready for preview against the selected video, wherein the system user is provided with the option to edit the musical experience descriptors set for the musical piece and recompile the musical composition, or accept the generated piece of composed music and mix the audio with the video to generated a scored video file.

FIG. 15U shows an exemplary GUI screen that is generated and served by the system illustrated in FIGS. 13 and 14, when the system user's composed music is ready for review. FIG. 15V is an exemplary GUI screen that is generated and served by the system illustrated in FIGS. 13 and 14, in response to the system user selecting the "Your Music is Ready" object in the GUI screen.

At this stage of the process, the system user may preview the music that has been created. If the music was created with a video or other media, then the music may be synchronized to this content in the preview.

As shown in FIG. 15V, after a music composition has been generated and is ready for preview against the selected video, the system user is provided with several options:

(i) edit the musical experience descriptors set for the musical piece and recompile the musical composition;

(ii) accept the generated piece of composed music and mix the audio with the video to generated a scored video file; and (iii) select other options supported by the automatic music composition and generation system of the present invention.

If the user would like to resubmit the same request for music to the system and receive a different piece of music, then the system user may elect to do so. If the user would like to change all or part of the user's request, then the user may make these modifications. The user may make additional requests if the user would like to do so. The user may elect to balance and mix any or all of the audio in the project on which the user is working including, but not limited to, the pre-existing audio in the content and the music that has been generated by the platform. The user may elect to edit the piece of music that has been created.

The user may edit the music that has been created, inserting, removing, adjusting, or otherwise changing timing information. The user may also edit the structure of the music, the orchestration of the music, and/or save or incorporate the music kernel, or music genome, of the piece. The user may adjust the tempo and pitch of the music. Each of these changes can be applied at the music piece level or in relation to a specific subset, instrument, and/or combination thereof. The user may elect to download and/or distribute the media with which the user has started and used the platform to create.

The user may elect to download and/or distribute the media with which the user has started and used the platform to create.

In the event that, at the GUI screen shown in FIG. 15S, the system user decides to select CANCEL, then the system generates and delivers a GUI screen as shown in FIG. 15D with the full function menu allowing the system user to make edits with respect to music emotion descriptors, music style descriptors, and/or music spotting parameters, as discussed and described above.

Specification of the Compose Music Only Mode of System Operation

If the user decides to create music independently of any additional content by selecting Music Only in the GUI screen of FIG. 15A, then the workflow described and represented in the GUI screens shown in FIGS. 15B, 15C, 15Q, 15R, and 15S are not required, although these spotting features may still be used if the user wants to convey the timing parameters of musical events that the user would like to music to convey.

FIG. 15B is an exemplary graphical user interface (GUI) screen that is generated and served by the system illustrated in FIGS. 13 and 14, when the system user selects "Music Only" object in the GUI of FIG. 15A. In the mode of operation, the system allows the user to select emotion and style descriptor parameters, and timing information, for use by the system to automatically compose and generate a piece of music that expresses the qualities reflected in the musical experience descriptors. In this mode, the general workflow is the same as in the Score Media Mode, except that scoring commands for music spotting, described above, would not typically be supported. However, the system user would be able to input timing parameter information as would desired in some forms of music.

Figure 16:
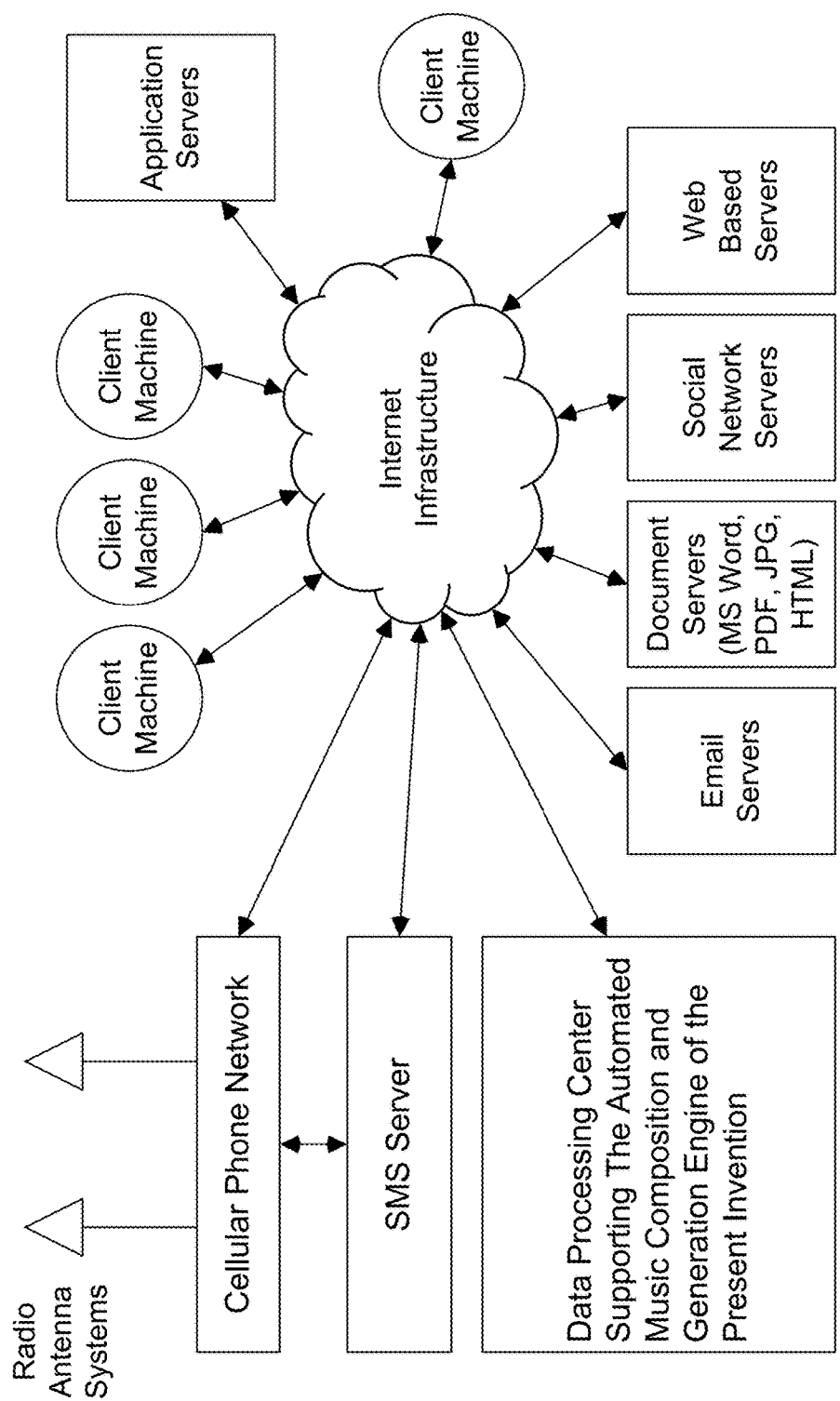
FIG. 16 is a perspective view of the Automated Music Composition and Generation System according to a fifth illustrative embodiment of the present invention, wherein an Internet-based automated music composition and generation platform is deployed so mobile and desktop client machines, alike, using text, SMS and email services supported on the Internet can be augmented by the addition of composed music by users using the Automated Music Composition and Generation Engine of the present invention, and graphical user interfaces supported by the client machines while creating text, SMS and/or email documents (i.e. messages) so that the users can easily select graphic and/or linguistic based emotion and style descriptors for use in generating compose music pieces for such text, SMS and email messages.

Specification of the Fifth Illustrative Embodiment of the Automated Music Composition and Generation System of the Present Invention FIG. 16 shows the Automated Music Composition and Generation System according to a fifth illustrative embodiment of the present invention. In this illustrative embodiment, an Internet-based automated music composition and generation platform is deployed so that mobile and desktop client machines, alike, using text, SMS and email services supported on the Internet, can be augmented by the addition of automatically-composed music by users using the Automated Music Composition and Generation Engine of the present invention, and graphical user interfaces supported by the client machines while creating text, SMS and/or email documents (i.e. messages). Using these interfaces and supported functionalities, remote system users can easily select graphic and/or linguistic based emotion and style descriptors for use in generating composed music pieces for insertion into text, SMS and email messages, as well as diverse document and file types.

Figure 16A:
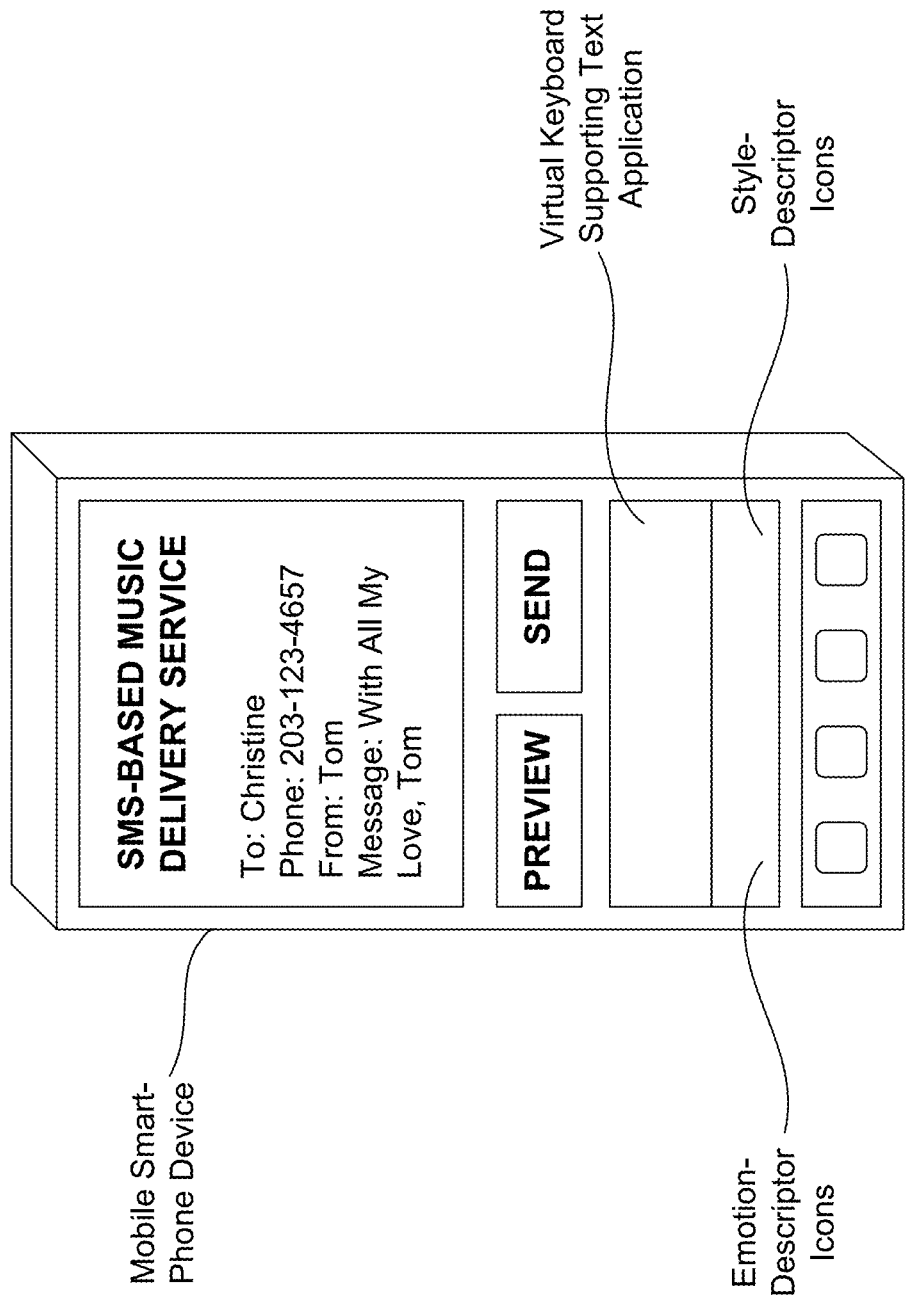
FIG. 16A is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a first exemplary client application is running that provides the user with a virtual keyboard supporting the creation of a text or SMS message, and the creation and insertion of a piece of composed music created by selecting linguistic and/or graphical-icon based emotion descriptors, and style-descriptors, from a menu screen.

FIG. 16A is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a first exemplary client application is running that provides the user with a virtual keyboard supporting the creation of a text or SMS message, and the creation and insertion of a piece of composed music created by selecting linguistic and/or graphical-icon based emotion descriptors, and style-descriptors, from a menu screen.

Figure 16B:
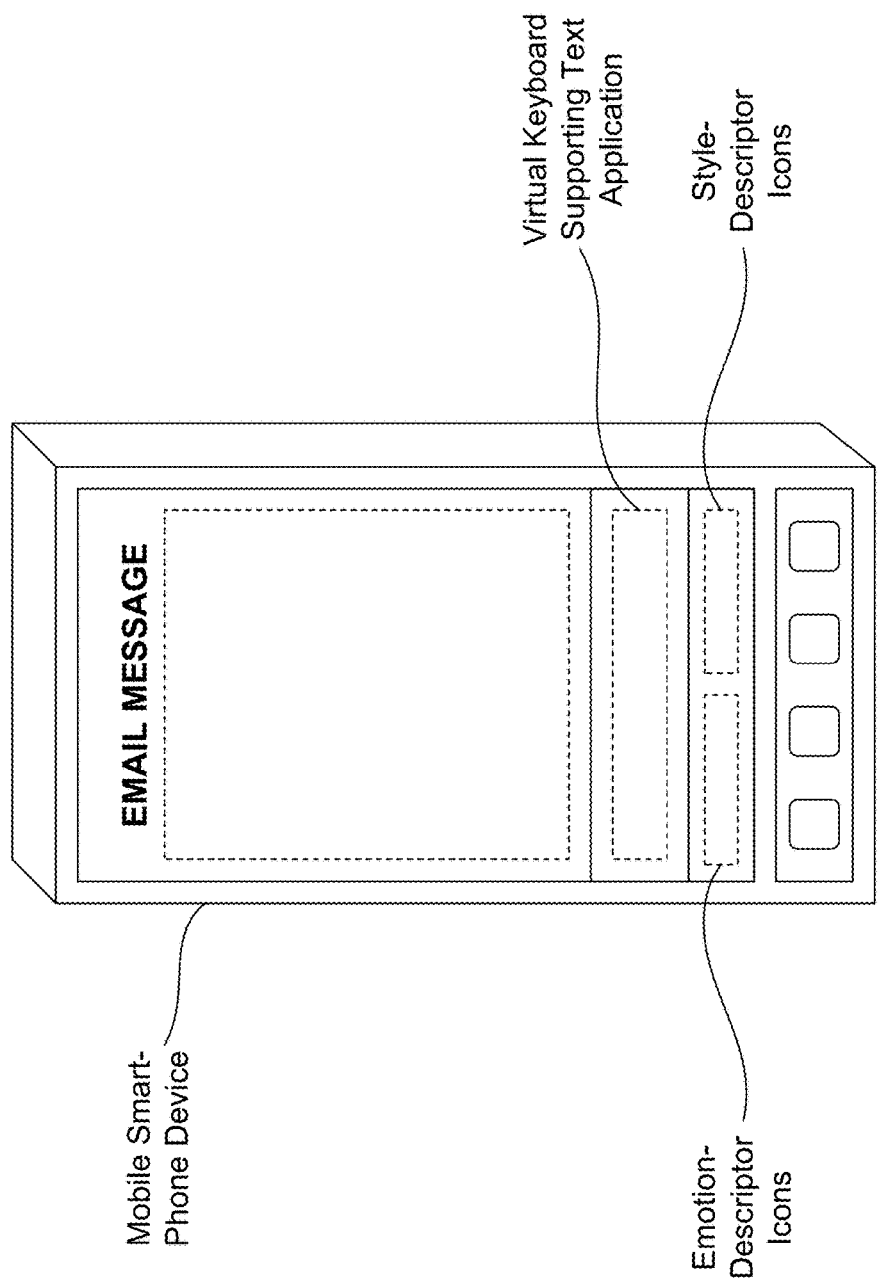
FIG. 16B is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of an email document, and the creation and embedding of a piece of composed music therein created by the user selecting linguistic and/or graphical-icon based emotion descriptors, and style-type descriptors from a menu screen in accordance with the principles of the present invention.

FIG. 16B is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of an email document, and the creation and embedding of a piece of composed music therein, which has been created by the user selecting linguistic and/or graphical-icon based emotion descriptors, and style-descriptors, from a menu screen in accordance with the principles of the present invention.

FIG. 16C is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a Microsoft Word, PDF, or image (e.g. jpg or tiff) document, and the creation and insertion of a piece of composed music created by selecting linguistic and/or graphical-icon based emotion descriptors, and style-descriptors, from a menu screen.

Figure 16D:
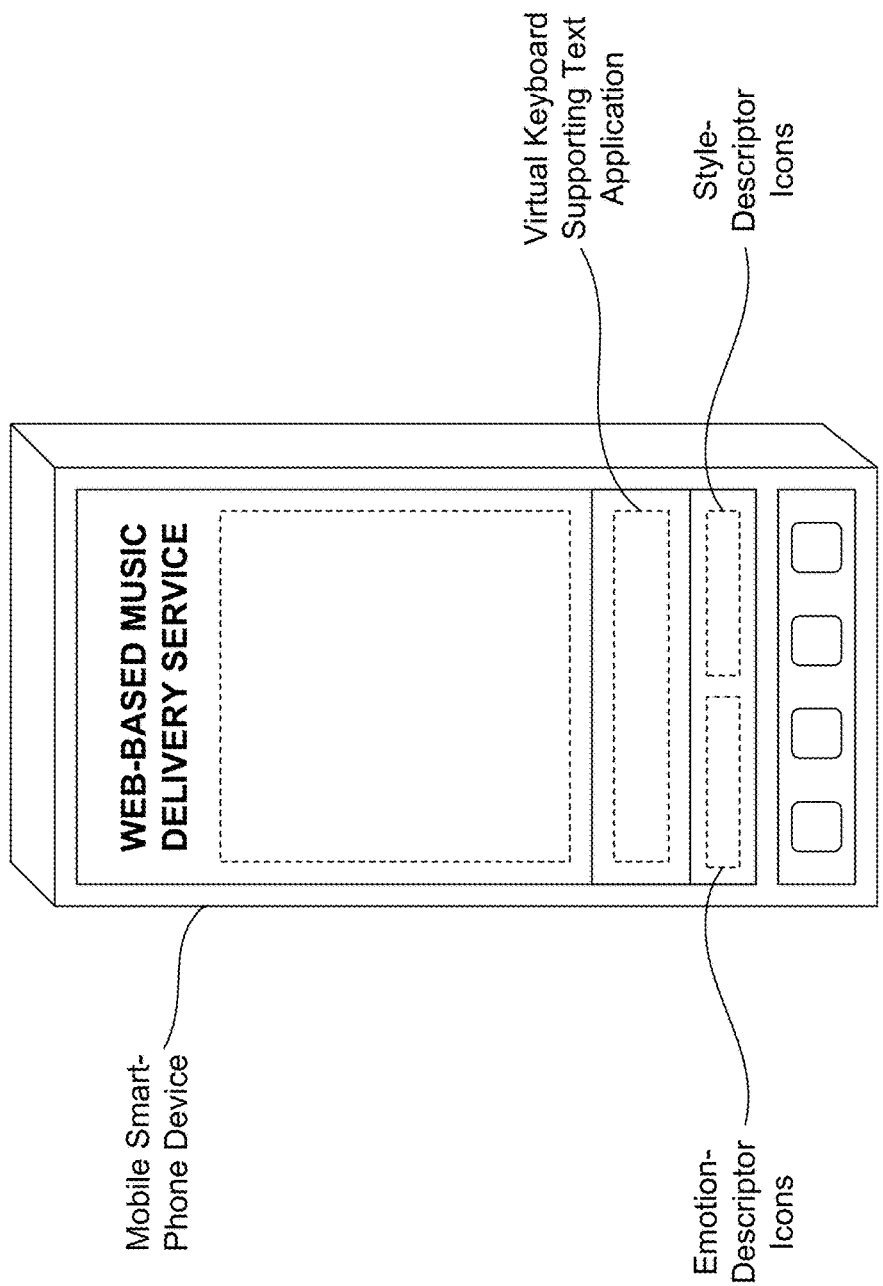
FIG. 16D is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a web-based (i.e. html) document, and the creation and insertion of a piece of composed music created by selecting linguistic and/or graphical-icon based emotion descriptors, and style-descriptors, from a menu screen, so that the music piece can be delivered to a remote client and experienced using a conventional web-browser operating on the embedded URL, from which the embedded music piece is being served by way of web, application and database servers.

FIG. 16D is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a web-based (i.e. html) document, and the creation and insertion of a piece of composed music created by selecting linguistic and/or graphical-icon based emotion descriptors, and style-descriptors, from a menu screen, so that the music piece can be delivered to a remote client and experienced using a conventional web-browser operating on the embedded URL, from which the embedded music piece is being served by way of web, application and database servers.

Figure 17:
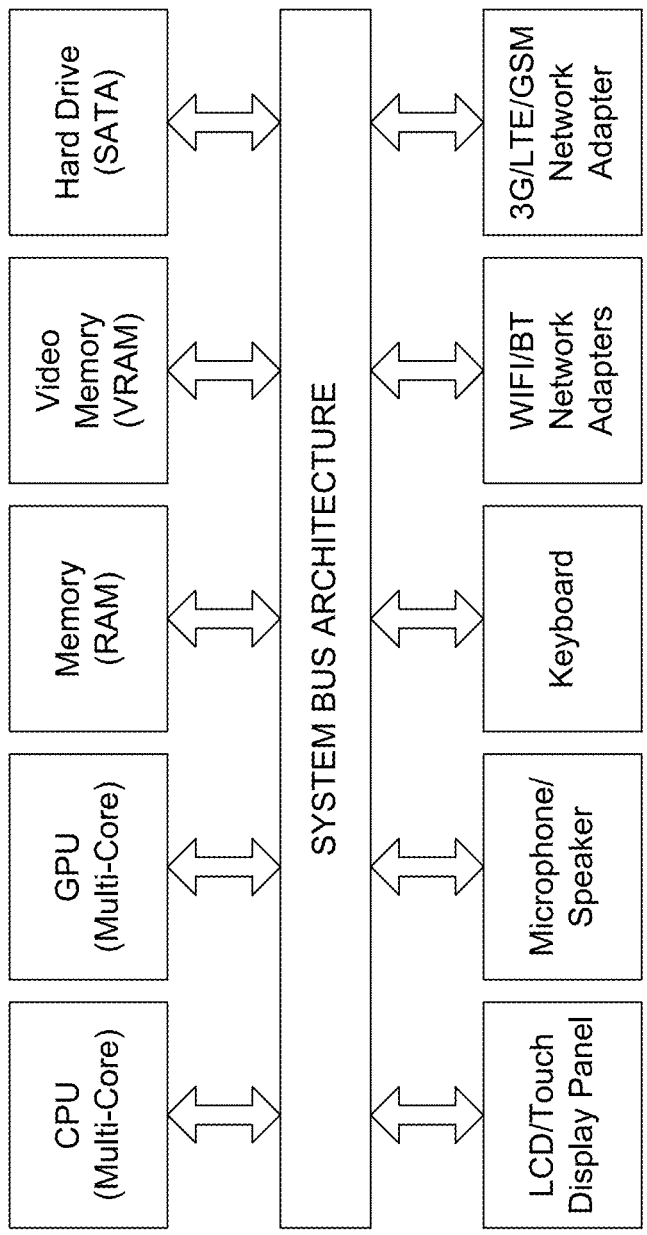
FIG. 17 is a schematic representation of the system architecture of each client machine deployed in the system illustrated in FIGS. 16A, 16B, 16C and 16D, comprising around a system bus architecture, subsystem modules including a multi-core CPU, a multi-core GPU, program memory (RAM), video memory (VRAM), hard drive (SATA drive), LCD/Touch-screen display panel, micro-phone speaker, keyboard, WIFI/Bluetooth network adapters, and 3G/LTE/GSM network adapter integrated with the system bus architecture.

FIG. 17 is a schematic representation of the system architecture of each client machine deployed in the system illustrated in FIGS. 16A, 16B, 16C and 16D, comprising around a system bus architecture, subsystem modules including a multi-core CPU, a multi-core GPU, program memory (RAM), video memory (VRAM), hard drive (SATA drive), LCD/Touch-screen display panel, micro-phone speaker, keyboard, WIFI/Bluetooth network adapters, and 3G/LTE/GSM network adapter integrated with the system bus architecture.

Figure 18:
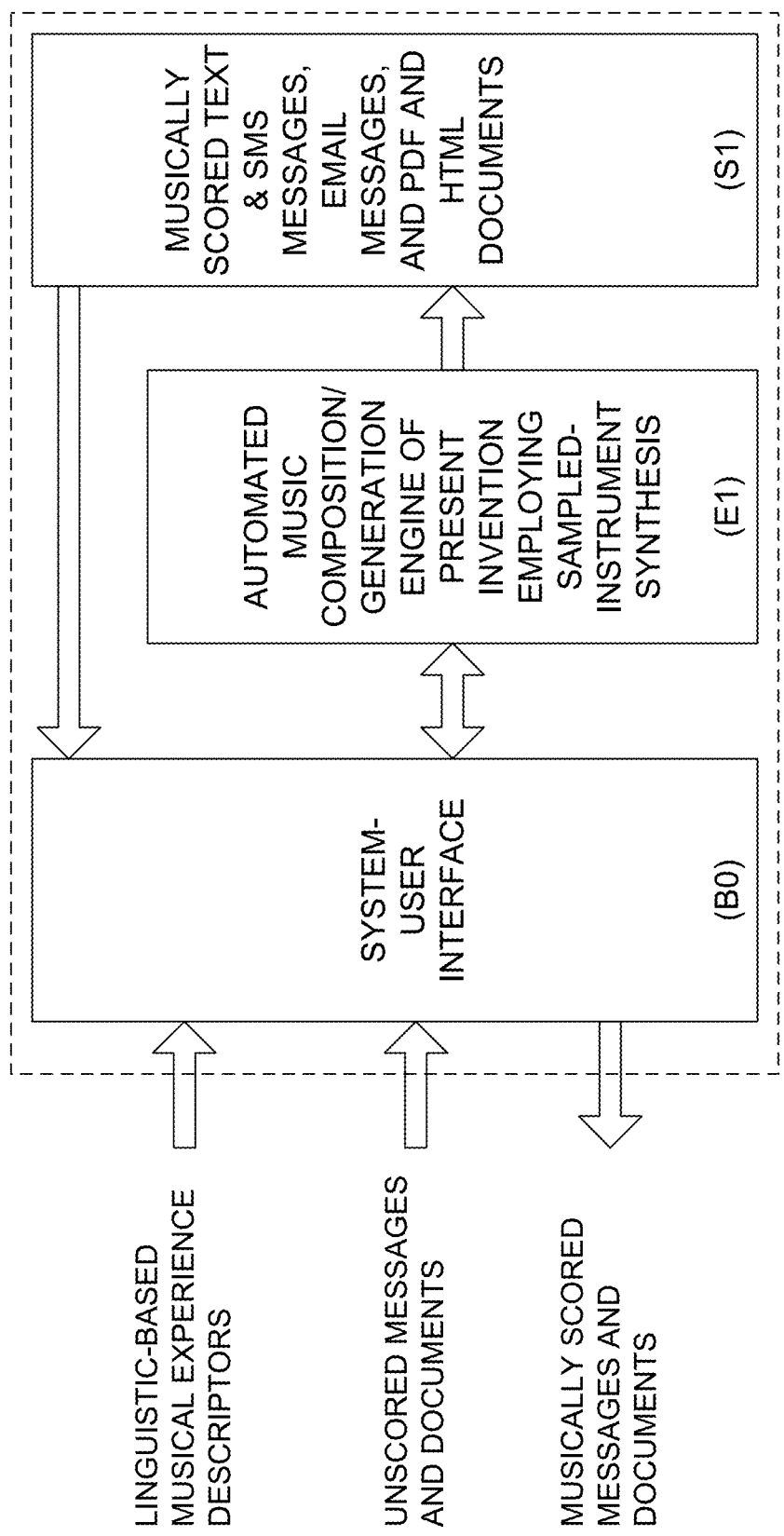
FIG. 18 is a schematic representation illustrating the high-level system architecture of the Internet-based music composition and generation system of the present invention supporting the use of virtual-instrument music synthesis driven by linguistic and/or graphical icon based musical experience descriptors, so as to add composed music to text, SMS and email documents/messages, wherein linguistic-based or icon-based musical experience descriptors are supplied as input through the system user interface, and used by the Automated Music Composition and Generation Engine of the present invention to generate a musically-scored text document or message that is generated for preview by system user via the system user interface, before finalization and transmission.

FIG. 18 is a schematic representation illustrating the high-level system architecture of the Internet-based music composition and generation system of the present invention supporting the use of linguistic and/or graphical icon based musical experience descriptors and virtual-instrument music synthesis to add composed music to text, SMS and email documents/messages, wherein linguistic-based or icon-based musical experience descriptors are supplied as input through the system user interface, and used by the Automated Music Composition and Generation Engine of the present invention to generate a musically-scored text document or message that is generated for preview by system user via the system user interface, before finalization and transmission.

FIG. 19 is a flow chart illustrating the primary steps involved in carrying out the automated music composition and generation process of the present invention using the Web-based system shown in FIGS. 16-18 supporting the use of linguistic and/or graphical icon based musical experience descriptors and virtual-instrument music synthesis to create musically-scored text, SMS, email, PDF, Word and/or html documents, wherein (i) during the first step of the process, the system user accesses the Automated Music Composition and Generation System of the present invention, and then selects a text, SMS or email message or Word, PDF or HTML document to be scored (e.g. augmented) with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected messages or documents, (iv) the system user accepts composed and generated music produced for the message or document, or rejects the music and provides feedback to the system, including providing different musical experience descriptors and a request to re-compose music based on the updated musical experience descriptor inputs, and (v) the system combines the accepted composed music with the message or document, so as to create a new file for distribution and display.

Figure 20:
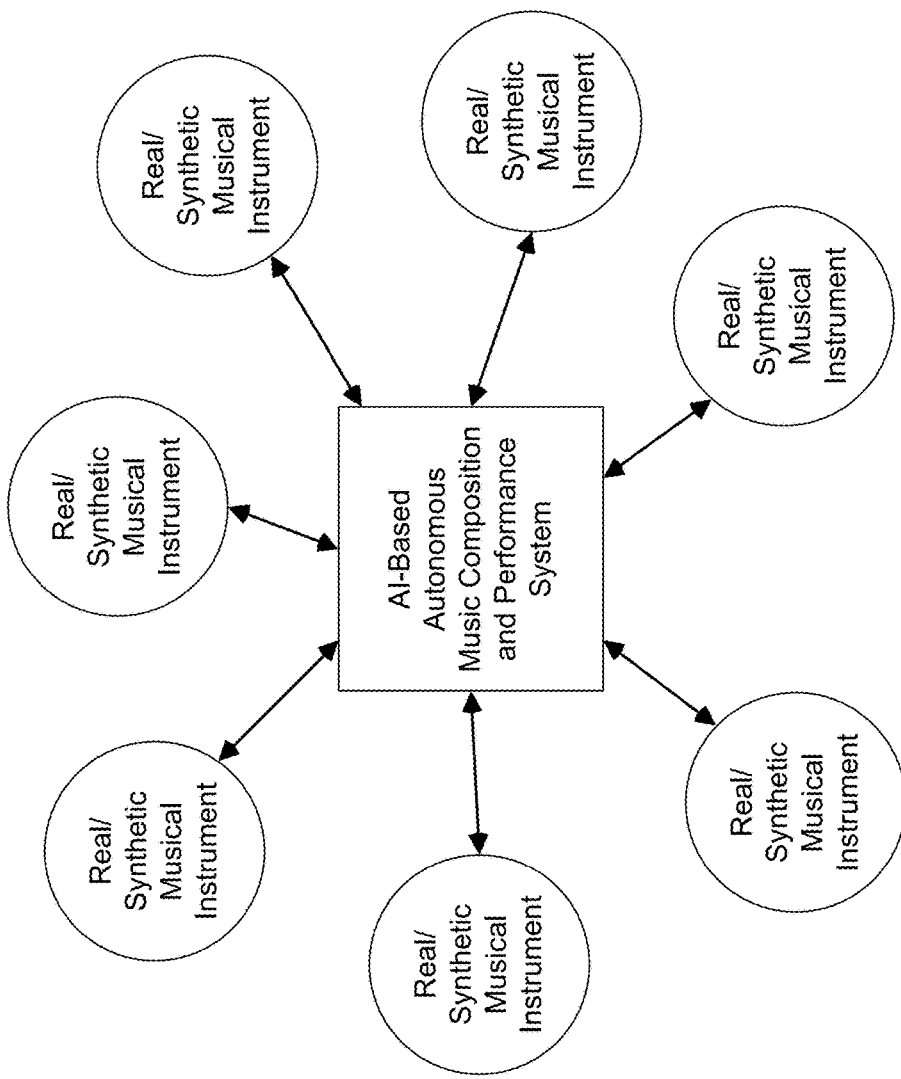
FIG. 20 is a schematic representation of a band of human musicians with a real or synthetic musical instrument, surrounded about an AI-based autonomous music composition and composition performance system, employing a modified version of the Automated Music Composition and Generation Engine of the present invention, wherein the AI-based system receives musical signals from its surrounding instruments and musicians and buffers and analyzes these instruments and, in response thereto, can compose and generate music in real-time that will augment the music being played by the band of musicians, or can record, analyze and compose music that is recorded for subsequent playback, review and consideration by the human musicians.

Specification of the Sixth Illustrative Embodiment of the Automated Music Composition and Generation System of the Present Invention FIG. 20 is a schematic representation of a band of musicians with real or synthetic musical instruments, surrounded about an AI-based autonomous music composition and composition performance system, employing a modified version of the Automated Music Composition and Generation Engine of the present invention, wherein the AI-based system receives musical signals from its surrounding instruments and musicians and buffers and analyzes these instruments and, in response thereto, can compose and generate music in real-time that will augment the music being played by the band of musicians, or can record, analyze and compose music that is recorded for subsequent playback, review and consideration by the human musicians.

Figure 21:
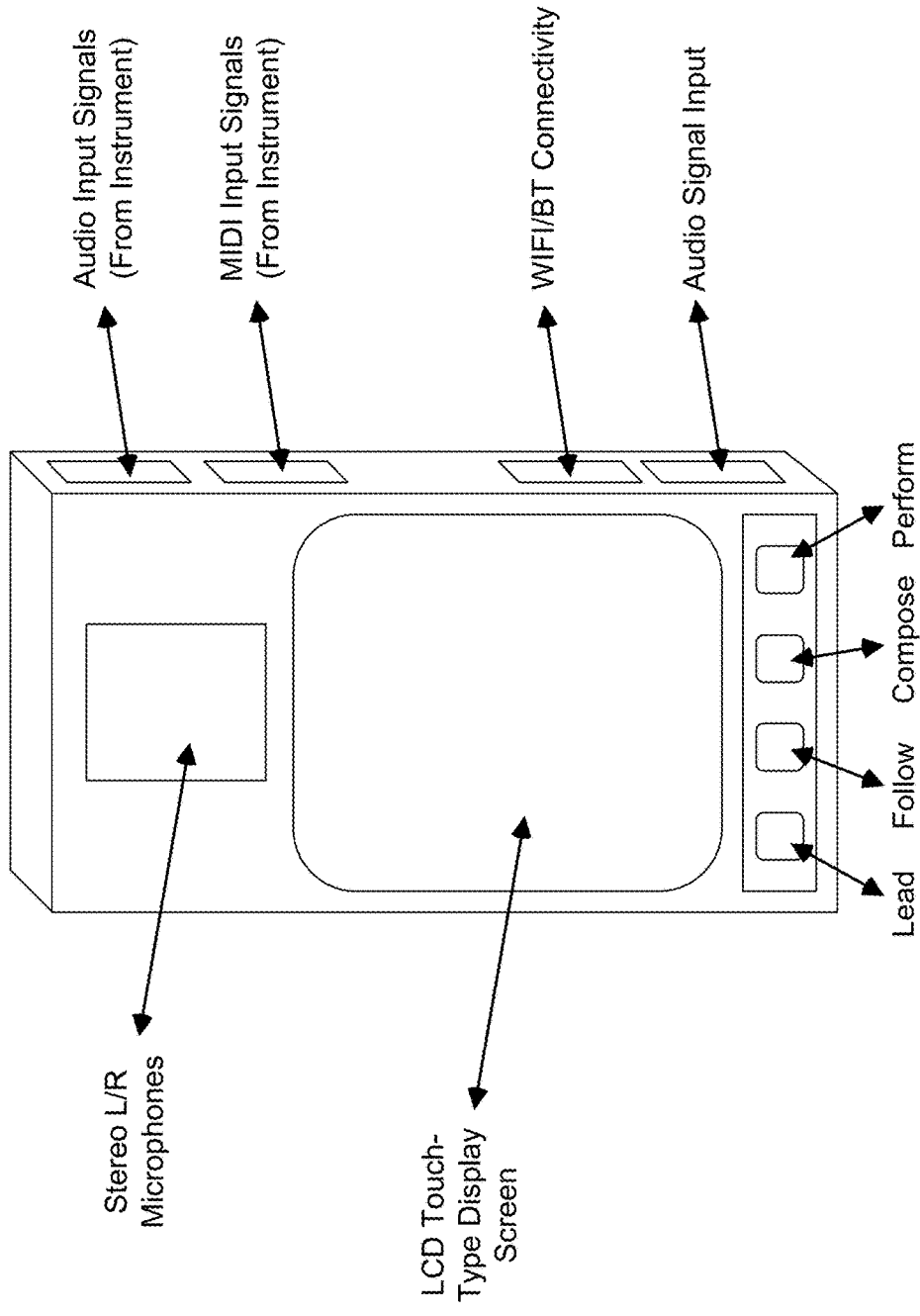
FIG. 21 is a schematic representation of the Autonomous Music Analyzing, Composing and Performing Instrument System, having a compact rugged transportable housing comprising a LCD touch-type display screen, a built-in stereo microphone set, a set of audio signal input connectors for receiving audio signals produced from the set of musical instruments in the system's environment, a set of MIDI signal input connectors for receiving MIDI input signals from the set of instruments in the system environment, audio output signal connector for delivering audio output signals to audio signal preamplifiers and/or amplifiers, WIFI and BT network adapters and associated signal antenna structures, and a set of function buttons for the user modes of operation including (i) LEAD mode, where the instrument system autonomously leads musically in response to the streams of music information it receives and analyzes from its (local or remote) musical environment during a musical session, (ii) FOLLOW mode, where the instrument system autonomously follows musically in response to the music it receives and analyzes from the musical instruments in its (local or remote) musical environment during the musical session, (iii) COMPOSE mode, where the system automatically composes music based on the music it receives and analyzes from the musical instruments in its (local or remote) environment during the musical session, and (iv) PERFORM mode, where the system autonomously performs automatically composed music, in real-time, in response to the musical information it receives and analyzes from its environment during the musical session.

FIG. 21 is a schematic representation of the autonomous music analyzing, composing and performing instrument, having a compact rugged transportable housing comprising a LCD touch-type display screen, a built-in stereo microphone set, a set of audio signal input connectors for receiving audio signals produced from the set of musical instruments in the system's environment, a set of MIDI signal input connectors for receiving MIDI input signals from the set of instruments in the system environment, audio output signal connector for delivering audio output signals to audio signal preamplifiers and/or amplifiers, WIFI and BT network adapters and associated signal antenna structures, and a set of function buttons for the user modes of operation including (i) LEAD mode, where the instrument system autonomously leads musically in response to the streams of music information it receives and analyzes from its (local or remote) musical environment during a musical session, (ii) FOLLOW mode, where the instrument system autonomously follows musically in response to the music it receives and analyzes from the musical instruments in its (local or remote) musical environment during the musical session, (iii) COMPOSE mode, where the system automatically composes music based on the music it receives and analyzes from the musical instruments in its (local or remote) environment during the musical session, and (iv) PERFORM mode, where the system autonomously performs automatically composed music, in real-time, in response to the musical information it receives and analyzes from its environment during the musical session.

Figure 22:
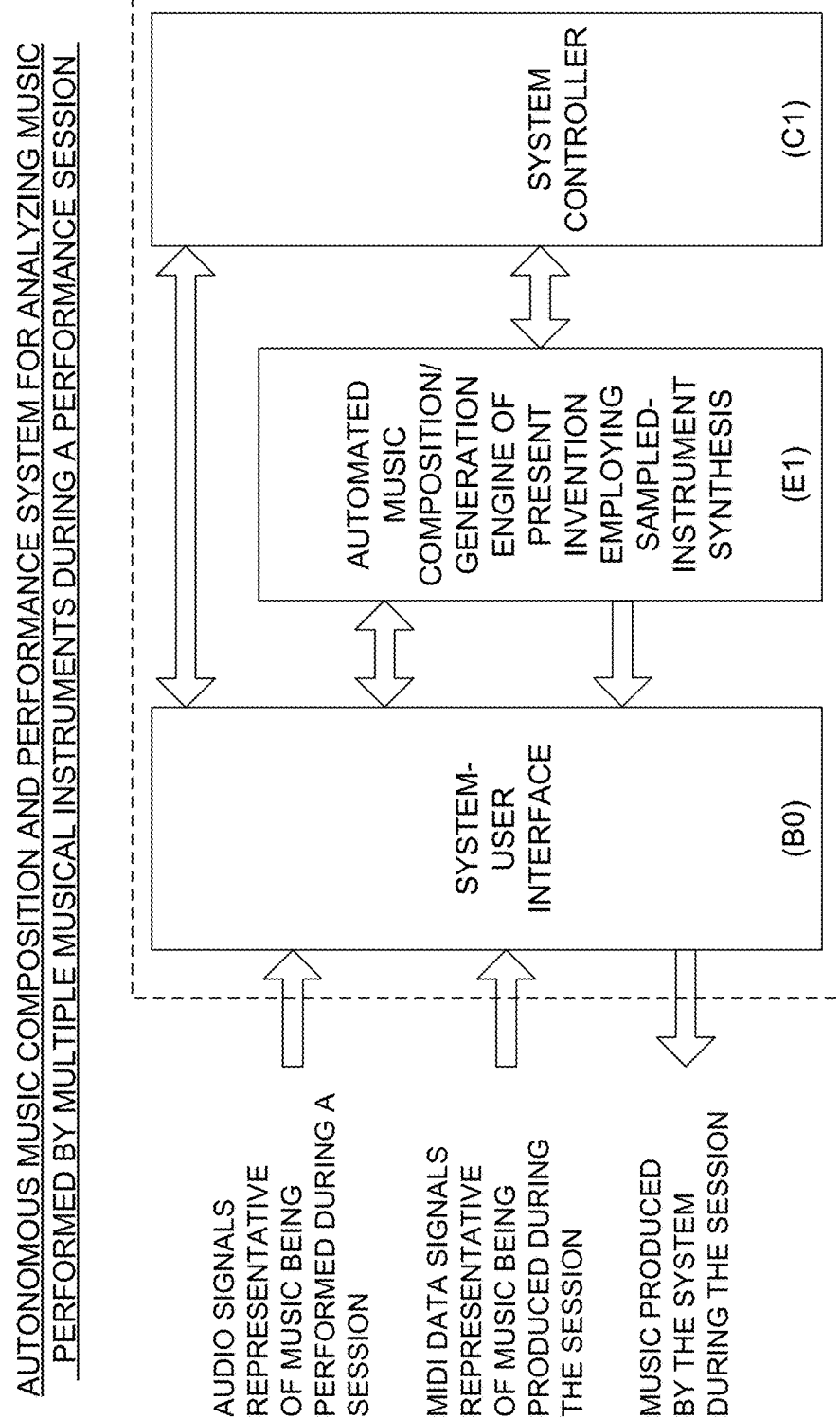
FIG. 22 is a schematic representation illustrating the high-level system architecture of the Autonomous Music Analyzing, Composing and Performing Instrument System shown in FIG. 21, wherein audio signals as well as MIDI input signals produced from a set of musical instruments in the system's environment are received by the instrument system, and these signals are analyzed in real-time, on the time and/or frequency domain, for the occurrence of pitch events and melodic structure so that the system can automatically abstract musical experience descriptors from this information for use in generating automated music composition and generation using the Automated Music Composition and Generation Engine of the present invention.

FIG. 22 illustrates the high-level system architecture of the automated music composition and generation instrument system shown in FIG. 21. As shown, audio signals as well as MIDI input signals produced from a set of musical instruments in the system's environment are received by the instrument system, and these signals are analyzed in real-time, on the time and/or frequency domain, for the occurrence of pitch events and melodic structure. The purpose of this analysis and processing is so that the system can automatically abstract musical experience descriptors from this information for use in generating automated music composition and generation using the Automated Music Composition and Generation Engine of the present invention.

Figure 23:
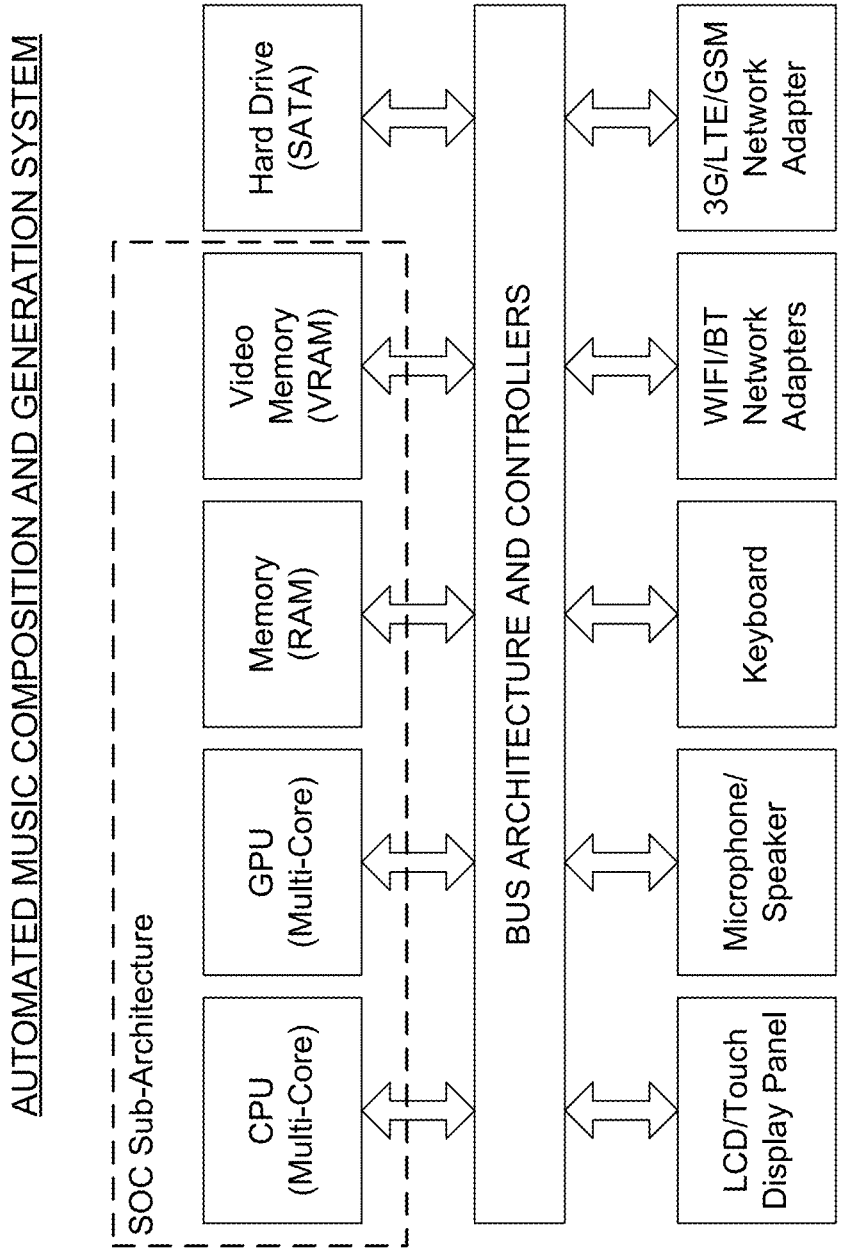
FIG. 23 is a schematic representation of the system architecture of the instrument system illustrated in FIGS. 20 and 21, comprising an arrangement of subsystem modules, around a system bus architecture, including a multi-core CPU, a multi-core GPU, program memory (DRAM), video memory (VRAM), hard drive (SATA drive), LCD/Touchscreen display panel, stereo microphones, audio speaker, keyboard, WIFI/Bluetooth network adapters, and 3G/LTE/GSM network adapter integrated with the system bus architecture.

FIG. 23 is a schematic representation of the system architecture of the system illustrated in FIGS. 20 and 21, comprising an arrangement of subsystem modules, around a system bus architecture, including a multi-core CPU, a multi-core GPU, program memory (DRAM), video memory (VRAM), hard drive (SATA drive), LCD/Touch-screen display panel, stereo microphones, audio speaker, keyboard, WIFI/Bluetooth network adapters, and 3G/LTE/GSM network adapter integrated with the system bus architecture.

In general, the automatic or automated music composition and generation system shown in FIGS. 20 and 21, including all of its inter-cooperating subsystems shown in FIGS. 26A through 33E and specified above, can be implemented using digital electronic circuits, analog electronic circuits, or a mix of digital and analog electronic circuits specifically configured and programmed to realize the functions and modes of operation to be supported by the automatic music composition and generation system. The digital integrated circuitry (IC) can be low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

FIG. 24 is a flow chart illustrating the primary steps involved in carrying out the automated music composition and generation process of the present invention using the system shown in FIGS. 20 and 23, wherein (i) during the first step of the process, the system user selects either the LEAD or FOLLOW mode of operation for the automated musical composition and generation instrument system of the present invention, (ii) prior to the session, the system is then is interfaced with a group of musical instruments played by a group of musicians in a creative environment during a musical session, (iii) during the session system receives audio and/or MIDI data signals produced from the group of instruments during the session, and analyzes these signals for pitch data and melodic structure, (iv) during the session, the system automatically generates musical descriptors from abstracted pitch and melody data, and uses the musical experience descriptors to compose music for the session on a real-time basis, and (v) in the event that the PERFORM mode has been selected, the system generates the composed music, and in the event that the COMPOSE mode has been selected, the music composed during for the session is stored for subsequent access and review by the group of musicians.

Specification of the Illustrative Embodiment of the Automated Music Composition and Generation Engine of the Present Invention FIG. 25A shows a high-level system diagram for the Automated Music Composition and Generation Engine of the present invention (E1) employed in the various embodiments of the present invention herein, and disclosed in Applicant's Published Patent Application No. US2017/0092247 A1 incorporated herein by reference. As shown, the Engine E1 comprises: a user GUI-Based Input Subsystem A0, a General Rhythm Subsystem A1, a General Pitch Generation Subsystem A2, a Melody Rhythm Generation Subsystem A3, a Melody Pitch Generation Subsystem A4, an Orchestration Subsystem A5, a Controller Code Creation Subsystem A6, a Digital Piece Creation Subsystem A7, and a Feedback and Learning Subsystem A8 configured as shown.

FIG. 25B shows a higher-level system diagram illustrating that the system of the present invention comprises two very high level subsystems, namely: (i) a Pitch Landscape Subsystem C0 comprising the General Pitch Generation Subsystem A2, the Melody Pitch Generation Subsystem A4, the Orchestration Subsystem A5, and the Controller Code Creation Subsystem A6, and (ii) a Rhythmic Landscape Subsystem C1 comprising the General Rhythm Generation Subsystem A1, Melody Rhythm Generation Subsystem A3, the Orchestration Subsystem A5, and the Controller Code Creation Subsystem A6.

At this stage, it is appropriate to discuss a few important definitions and terms relating to important music-theoretic concepts that will be helpful to understand when practicing the various embodiments of the automated music composition and generation systems of the present invention. However, it should be noted that, while the system of the present invention has a very complex and rich system architecture, such features and aspects are essentially transparent to all system users, allowing them to have essentially no knowledge of music theory, and no musical experience and/or talent. To use the system of the present invention, all that is required by the system user is to have (i) a sense of what kind of emotions they system user wishes to convey in an automatically composed piece of music, and/or (ii) a sense of what musical style they wish or think the musical composition should follow.

At the top level, the "Pitch Landscape" C0 is a term that encompasses, within a piece of music, the arrangement in space of all events. These events are often, though not always, organized at a high level by the musical piece's key and tonality; at a middle level by the musical piece's structure, form, and phrase; and at a low level by the specific organization of events of each instrument, participant, and/ or other component of the musical piece. The various subsystem resources available within the system to support pitch landscape management are indicated in the schematic representation shown in FIG. 25B.

Similarly, "Rhythmic Landscape" C1 is a term that encompasses, within a piece of music, the arrangement in time of all events. These events are often, though not always, organized at a high level by the musical piece's tempo, meter, and length; at a middle level by the musical piece's structure, form, and phrase; and at a low level by the specific organization of events of each instrument, participant, and/ or other component of the musical piece. The various subsystem resources available within the system to support pitch landscape management are indicated in the schematic representation shown in FIG. 25B.

There are several other high-level concepts that play important roles within the Pitch and Rhythmic Landscape Subsystem Architecture employed in the Automated Music Composition And Generation System of the present invention.

In particular, "Melody Pitch" is a term that encompasses, within a piece of music, the arrangement in space of all events that, either independently or in concert with other events, constitute a melody and/or part of any melodic material of a musical piece being composed.

"Melody Rhythm" is a term that encompasses, within a piece of music, the arrangement in time of all events that, either independently or in concert with other events, constitute a melody and/or part of any melodic material of a musical piece being composed.

"Orchestration" for the piece of music being composed is a term used to describe manipulating, arranging, and/or adapting a piece of music.

"Controller Code" for the piece of music being composed is a term used to describe information related to musical expression, often separate from the actual notes, rhythms, and instrumentation.

"Digital Piece" of music being composed is a term used to describe the representation of a musical piece in a digital or combination or digital and analog, but not solely analog manner.

FIG. 26A through 26P, taken together, show how each subsystem in FIG. 25 are configured together with other subsystems in accordance with the principles of the present invention, so that musical experience descriptors provided to the user GUI-based input/output subsystem A0/B0 are distributed to their appropriate subsystems for processing and use in the automated music composition and generation process of the present invention, described in great technical detail herein. It is appropriate at this juncture to identify and describe each of the subsystems B0 through B52 that serve to implement the higher-level subsystems A0 through A8 within the Automated Music Composition and Generation System (S) of the present invention.

More specifically, as shown in FIGS. 26A through 26D, the GUI-Based Input Subsystem A0 comprises: the User GUI-Based Input Output Subsystem B0; Descriptor Parameter Capture Subsystem B1; Parameter Transformation Engine Subsystem B51; Style Parameter Capture Subsystem B37; and the Timing Parameter Capture Subsystem B40. These subsystems receive and process all musical experience parameters (e.g. emotional descriptors, style descriptors, and timing/spatial descriptors) provided to the Systems A0 via the system users, or other means and ways called for by the end system application at hand.

As shown in FIGS. 27D, 26E, 26F, 26G, 26H, 26I and 27J, the General Rhythm Generation Subsystem A1 for generating the General Rhythm for the piece of music to be composed, comprises the following subsystems: the Length Generation Subsystem B2; the Tempo Generation Subsystem B3; the Meter Generation Subsystem B4; the Beat Calculator Subsystem B6; the Measure Calculator Subsystem B8; the Song Form Generation Subsystem B9; the Sub-Phrase Length Generation Subsystem B15; the Number of Chords in Sub-Phrase Calculator Subsystem B16; the Phrase Length Generation Subsystem B12; the Unique Phrase Generation Subsystem B10; the Number of Chords in Phrase Calculator Subsystem B13; the Chord Length Generation Subsystem B11; the Unique Sub-Phrase Generation Subsystem B14; the Instrumentation Subsystem B38; the Instrument Selector Subsystem B39; and the Timing Generation Subsystem B41.

As shown in FIGS. 27J and 26K, the General Pitch Generation Subsystem A2 for generating chords (i.e. pitch events) for the piece of music being composed, comprises: the Key Generation Subsystem B5; the Tonality Generation Subsystem B7; the Initial General Rhythm Generation Subsystem B17; the Sub-Phrase Chord Progression Generation Subsystem B19; the Phrase Chord Progression Generation Subsystem B18; the Chord Inversion Generation Subsystem B20; the Instrumentation Subsystem B38; the Instrument Selector Subsystem B39.

As shown in FIGS. 26K and 26L, the Melody Rhythm Generation Subsystem A3 for generating a Melody Rhythm for the piece of music being composed, comprises: the Melody Sub-Phrase Length Generation Subsystem B25; the Melody Sub-Phrase Generation Subsystem B24; the Melody Phrase Length Generation Subsystem B23; the Melody Unique Phrase Generation Subsystem B22; the Melody Length Generation Subsystem B21; and the Melody Note Rhythm Generation Subsystem B26.

As shown in FIGS. 26L and 26M, the Melody Pitch Generation Subsystem A4 for generating a Melody Pitch for the piece of music being composed, comprises: the Initial Pitch Generation Subsystem B27; the Sub-Phrase Pitch Generation Subsystem B29; the Phrase Pitch Generation Subsystem B28; and the Pitch Octave Generation Subsystem B30.

As shown in FIG. 26M, the Orchestration Subsystem A5 for generating the Orchestration for the piece of music being composed comprises: the Orchestration Generation Subsystem B31.

As shown in FIG. 26M, the Controller Code Creation Subsystem A6 for creating Controller Code for the piece of music being composed comprises: the Controller Code Generation Subsystem B32.

As shown in FIGS. 26M and 26N, the Digital Piece Creation Subsystem A7 for creating the Digital Piece of music being composed comprises: the Digital Audio Sample Audio Retriever Subsystem B33; the Digital Audio Sample Organizer Subsystem B34; the Piece Consolidator Subsystem B35; the Piece Format Translator Subsystem B50; and the Piece Deliverer Subsystem B36.

As shown in FIGS. 26N, 26O and 26P, the Feedback and Learning Subsystem A8 for supporting the feedback and learning cycle of the system, comprises: the Feedback Subsystem B42; the Music Editability Subsystem B43; the Preference Saver Subsystem B44; the Musical kernel Subsystem B45; the User Taste Subsystem B46; the Population Taste Subsystem B47; the User Preference Subsystem B48; and the Population Preference Subsystem B49.

As shown in FIGS. 26N, 26O and 26P, the Feedback and Learning Subsystem A8 for supporting the feedback and learning cycle of the system, comprises: the Feedback Subsystem B42; the Music Editability Subsystem B43; the Preference Saver Subsystem B44; the Musical kernel Subsystem B45; the User Taste Subsystem B46; the Population Taste Subsystem B47; the User Preference Subsystem B48; and the Population Preference Subsystem B49. Having taken an overview of the subsystems employed in the system, it is appropriate at this juncture to describe, in greater detail, the input and output port relationships that exist among the subsystems, as clearly shown in FIGS. 26A through 26P.

As shown in FIGS. 26A through 26J, the system user provides inputs such as emotional, style and timing type musical experience descriptors to the GUI-Based Input Output Subsystem B0, typically using LCD touchscreen, keyboard or microphone speech-recognition interfaces, well known in the art. In turn, the various data signal outputs from the GUI-Based Input and Output Subsystem B0 are provided as input data signals to the Descriptor Parameter Capture Subsystems B1, the Parameter Transformation Engine Subsystem B51, the Style Parameter Capture Subsystem B37, and the Timing Parameter Capture Subsystem B40, as shown. The (Emotional) Descriptor Parameter Capture Subsystems B1 receives words, images and/or other representations of musical experience to be produced by the piece of music to be composed, and these captured emotion-type musical experience parameters are then stored preferably in a local data storage device (e.g. local database, DRAM, etc.) for subsequent transmission to other subsystems. The Style Parameter Capture Subsystems B17 receives words, images and/or other representations of musical experience to be produced by the piece of music to be composed, and these captured style-type musical experience parameters are then stored preferably in a local data storage device (e.g. local database, DRAM, etc.), as well, for subsequent transmission to other subsystems. In the event that the music spotting feature is enabled or accessed by the system user, and timing parameters are transmitted to the input subsystem B0, the Timing Parameter Capture Subsystem B40 will enable other subsystems (e.g. Subsystems A1, A2, etc.) to support such functionalities. The Parameter Transformation Engine Subsystems B51 receives words, images and/or other representations of musical experience parameters to be produced by the piece of music to be composed, and these emotion-type, style-type and timing-type musical experience parameters are transformed by the engine subsystem B51 to generate sets of probabilistic-based system operating parameter tables, based on the provided system user input, for subsequent distribution to and loading within respective subsystems, as will be described in greater technical detailer hereinafter, with reference to FIGS. 23B3A through 27B3C and 27B4A through 27B4E, in particular and other figures as well.

Having provided an overview of the subsystems employed in the system, it is appropriate at this juncture to describe, in greater detail, the input and output port relationships that exist among the subsystems, as clearly shown in FIGS. 26A through 26P.

Specification of Input and Output Port Connections Among Subsystems within the Input Subsystem B0

As shown in FIGS. 26A through 26J, the system user provides inputs such as emotional, style and timing type musical experience descriptors to the GUI-Based Input Output Subsystem BO, typically using LCD touchscreen, keyboard or microphone speech-recognition interfaces, well known in the art. In turn, the various data signal outputs from the GUI-Based Input and Output Subsystem B0, encoding the emotion and style musical descriptors and timing parameters, are provided as input data signals to the Descriptor Parameter Capture Subsystems B1, the Parameter Transformation Engine Subsystem B51, the Style Parameter Capture Subsystem B37, and the Timing Parameter Capture Subsystem B40, as shown.

As shown in FIGS. 26A through 26J, the (Emotional) Descriptor Parameter Capture Subsystem B1 receives words, images and/or other representations of musical experience to be produced by the piece of music to be composed, and these captured emotion-type musical experience parameters are then stored preferably in a local data storage device (e.g. local database, DRAM, etc.) for subsequent transmission to other subsystems.

As shown in FIGS. 26A through 26J, the Style Parameter Capture Subsystems B17 receives words, images and/or other representations of musical experience to be produced by the piece of music to be composed, and these captured style-type musical experience parameters are then stored preferably in a local data storage device (e.g. local database, DRAM, etc.), as well, for subsequent transmission to other subsystems.

In the event that the "music spotting" feature is enabled or accessed by the system user, and timing parameters are transmitted to the input subsystem B0, then the Timing Parameter Capture Subsystem B40 will enable other subsystems (e.g. Subsystems A1, A2, etc.) to support such functionalities.

As shown in FIGS. 26A through 26J, the Parameter Transformation Engine Subsystem B51 receives words, images and/or other representations of musical experience parameters, and timing parameters, to be reflected by the piece of music to be composed, and these emotion-type, style-type and timing-type musical experience parameters are automatically and transparently transformed by the parameter transformation engine subsystem B51 so as to generate, as outputs, sets of probabilistic-based system operating parameter tables, based on the provided system user input, which are subsequently distributed to and loaded within respective subsystems, as will be described in greater technical detailer hereinafter, with reference to FIGS. 27B3A through 27B3C and 27B4A through 27B4E, in particular and other figures as well.

Specification of Input and Output Port Connections Among Subsystems within the General Rhythm Generation Subsystem A1

As shown in FIGS. 26A through 26J, the General Rhythm Generation Subsystem A1 generates the General Rhythm for the piece of music to be composed.

As shown in FIGS. 26A through 26J, the data input ports of the User GUI-based Input Output Subsystem B0 can be realized by LCD touch-screen display panels, keyboards, microphones and various kinds of data input devices well known the art. As shown, the data output of the User GUI-based Input Output Subsystem B0 is connected to the data input ports of the (Emotion-type) Descriptor Parameter Capture Subsystem B1, the Parameter Transformation Engine Subsystem B51, the Style Parameter Capture Subsystem B37, and the Timing Parameter Capture Subsystem B40.

As shown in FIGS. 26A through 26P, the data input port of the Parameter Transformation Engine Subsystem B51 is connected to the output data port of the Population Taste Subsystem B47 and the data input port of the User Preference Subsystem B48, functioning a data feedback pathway.

As shown in FIGS. 26A through 26P, the data output port of the Parameter Transformation Engine B51 is connected to the data input ports of the (Emotion-Type) Descriptor Parameter Capture Subsystem B1, and the Style Parameter Capture Subsystem B37.

As shown in FIGS. 26A through 26F, the data output port of the Style Parameter Capture Subsystem B37 is connected to the data input port of the Instrumentation Subsystem B38 and the Sub-Phrase Length Generation Subsystem B15.

As shown in FIGS. 26A through 26G, the data output port of the Timing Parameter Capture Subsystem B40 is connected to the data input ports of the Timing Generation Subsystem B41 and the Length Generation Subsystem B2, the Tempo Generation Subsystem B3, the Meter Generation Subsystem B4, and the Key Generation Subsystem B5.

As shown in FIGS. 26A through 26G, the data output ports of the (Emotion-Type) Descriptor Parameter Capture Subsystem B1 and Timing Parameter Capture Subsystem B40 are connected to (i) the data input ports of the Length Generation Subsystem B2 for structure control, (ii) the data input ports of the Tempo Generation Subsystem B3 for tempo control, (iii) the data input ports of the Meter Generation Subsystem B4 for meter control, and (iv) the data input ports of the Key Generation Subsystem B5 for key control.

As shown in FIG. 26E, the data output ports of the Length Generation Subsystem B2 and the Tempo Generation Subsystem B3 are connected to the data input port of the Beat Calculator Subsystem B6.

As shown in FIGS. 26E through 26K, the data output ports of the Beat Calculator Subsystem B6 and the Meter Generation Subsystem B4 are connected to the input data ports of the Measure Calculator Subsystem B8.

As shown in FIGS. 26E, 26F, 26G and 26H, the output data port of the Measure Calculator B8 is connected to the data input ports of the Song Form Generation Subsystem B9, and also the Unique Sub-Phrase Generation Subsystem B14.

As shown in FIG. 26G, the output data port of the Key Generation Subsystem B5 is connected to the data input port of the Tonality Generation Subsystem B7.

As shown in FIGS. 26G and 26J, the data output port of the Tonality Generation Subsystem B7 is connected to the data input ports of the Initial General Rhythm Generation Subsystem B17, and also the Sub-Phrase Chord Progression Generation Subsystem B19.

As shown in FIGS. 26E1, 26H and 26I, the data output port of the Song Form Subsystem B9 is connected to the data input ports of the Sub-Phrase Length Generation Subsystem B15, the Chord Length Generation Subsystem B11, and Phrase Length Generation Subsystem B12.

As shown in FIGS. 26G, 26H, 26I and 26J, the data output port of the Sub-Phrase Length Generation Subsystem B15 is connected to the input data port of the Unique Sub-Phrase Generation Subsystem B14. As shown, the output data port of the Unique Sub-Phrase Generation Subsystem B14 is connected to the data input ports of the Number of Chords in Sub-Phrase Calculator Subsystem B16. As shown, the output data port of the Chord Length Generation Subsystem B11 is connected to the Number of Chords in Phrase Calculator Subsystem B13.

As shown in FIG. 26H, the data output port of the Number of Chords in Sub-Phrase Calculator Subsystem B16 is connected to the data input port of the Phrase Length Generation Subsystem B12.

As shown in FIGS. 26E, 26H, 26I and 26J, the data output port of the Phrase Length Generation Subsystem B12 is connected to the data input port of the Unique Phrase Generation Subsystem B10.

As shown in FIG. 26J, the data output port of the Unique Phrase Generation Subsystem B10 is connected to the data input port of the Number of Chords in Phrase Calculator Subsystem B13.

Specification of Input and Output Port Connections Among Subsystems within the General Pitch Generation Subsystem A2

As shown in FIGS. 26J and 26K, the General Pitch Generation Subsystem A2 generates chords for the piece of music being composed.

As shown in FIGS. 26G and 26J, the data output port of the Initial Chord Generation Subsystem B17 is connected to the data input port of the Sub-Phrase Chord Progression Generation Subsystem B19, which is also connected to the output data port of the Tonality Generation Subsystem B7.

As shown in FIG. 26J, the data output port of the Sub-Phrase Chord Progression Generation Subsystem B19 is connected to the data input port of the Phrase Chord Progression Generation Subsystem B18.

As shown in FIGS. 26J and 26K, the data output port of the Phrase Chord Progression Generation Subsystem B18 is connected to the data input port of the Chord Inversion Generation Subsystem B20.

Specification of Input and Output Port Connections Among Subsystems within the Melody Rhythm Generation Subsystem A3

As shown in FIGS. 26K and 26L, the Melody Rhythm Generation Subsystem A3 generates a melody rhythm for the piece of music being composed.

As shown in FIGS. 26J and 26K, the data output port of the Chord Inversion Generation Subsystem B20 is connected to the data input port of the Melody Sub-Phrase Length Generation Subsystem B18.

As shown in FIG. 26K, the data output port of the Chord Inversion Generation Subsystem B20 is connected to the data input port of the Melody Sub-Phrase Length Generation Subsystem B25.

As shown in FIG. 26K, the data output port of the Melody Sub-Phrase Length Generation Subsystem B25 is connected to the data input port of the Melody Sub-Phrase Generation Subsystem B24.

As shown in FIG. 26K, the data output port of the Melody Sub-Phrase Generation Subsystem B24 is connected to the data input port of the Melody Phrase Length Generation Subsystem B23.

As shown in FIG. 26K, the data output port of the Melody Phrase Length Generation Subsystem B23 is connected to the data input port of the Melody Unique Phrase Generation Subsystem B22.

As shown in FIGS. 26K and 26L, the data output port of the Melody Unique Phrase Generation Subsystem B22 is connected to the data input port of Melody Length Generation Subsystem B21.

As shown in 26L, the data output port of the Melody Length Generation Subsystem B21 is connected to the data input port of Melody Note Rhythm Generation Subsystem B26.

Specification of Input and Output Port Connections Among Subsystems within the Melody Pitch Generation Subsystem A4

As shown in FIGS. 26L through 26N, the Melody Pitch Generation Subsystem A4 generates a melody pitch for the piece of music being composed.

As shown in FIG. 26L, the data output port of the Melody Note Rhythm Generation Subsystem B26 is connected to the data input port of the Initial Pitch Generation Subsystem B27.

As shown in FIG. 26L, the data output port of the Initial Pitch Generation Subsystem B27 is connected to the data input port of the Sub-Phrase Pitch Generation Subsystem B29.

As shown in FIG. 26L, the data output port of the Sub-Phrase Pitch Generation Subsystem B29 is connected to the data input port of the Phrase Pitch Generation Subsystem B28.

As shown in FIGS. 26L and 26M, the data output port of the Phrase Pitch Generation Subsystem B28 is connected to the data input port of the Pitch Octave Generation Subsystem B30.

Specification of Input and Output Port Connections Among Subsystems within the Orchestration Subsystem A5

As shown in FIG. 26M, the Orchestration Subsystem A5 generates an orchestration for the piece of music being composed.

As shown in FIGS. 26D and 26M, the data output ports of the Pitch Octave Generation Subsystem B30 and the Instrument Selector Subsystem B39 are connected to the data input ports of the Orchestration Generation Subsystem B31.

As shown in FIG. 26M, the data output port of the Orchestration Generation Subsystem B31 is connected to the data input port of the Controller Code Generation Subsystem B32.

Specification of Input and Output Port Connections Among Subsystems within the Controller Code Creation Subsystem A6

As shown in FIG. 26M, the Controller Code Creation Subsystem A6 creates controller code for the piece of music being composed.

As shown in FIG. 26M, the data output port of the Orchestration Generation Subsystem B31 is connected to the data input port of the Controller Code Generation Subsystem B32.

Specification of Input and Output Port Connections Among Subsystems within the Digital Piece Creation Subsystem A7

As shown in FIGS. 26M and 26N, the Digital Piece Creation Subsystem A7 creates the digital piece of music.

As shown in FIG. 26M, the data output port of the Controller Code Generation Subsystem B32 is connected to the data input port of the Digital Audio Sample Audio Retriever Subsystem B33.

As shown in FIGS. 26M and 26N, the data output port of the Digital Audio Sample Audio Retriever Subsystem B33 is connected to the data input port of the Digital Audio Sample Organizer Subsystem B34.

As shown in FIG. 26N, the data output port of the Digital Audio Sample Organizer Subsystem B34 is connected to the data input port of the Piece Consolidator Subsystem B35.

As shown in FIG. 26N, the data output port of the Piece Consolidator Subsystem B35 is connected to the data input port of the Piece Format Translator Subsystem B50.

As shown in FIG. 26N, the data output port of the Piece Format Translator Subsystem B50 is connected to the data input ports of the Piece Deliverer Subsystem B36 and also the Feedback Subsystem B42.

Specification of Input and Output Port Connections Among Subsystems within the Feedback and Learning Subsystem A8

As shown in FIGS. 26N, 26O and 26P, the Feedback and Learning Subsystem A8 supports the feedback and learning cycle of the system.

As shown in FIG. 26N, the data output port of the Piece Deliverer Subsystem B36 is connected to the data input port of the Feedback Subsystem B42.

As shown in FIGS. 26N and 26O, the data output port of the Feedback Subsystem B42 is connected to the data input port of the Music Editability Subsystem B43.

As shown in FIG. 26O, the data output port of the Music Editability Subsystem B43 is connected to the data input port of the Preference Saver Subsystem B44.

As shown in FIG. 26O, the data output port of the Preference Saver Subsystem B44 is connected to the data input port of the Musical Kernel (DNA) Subsystem B45.

As shown in FIG. 26O, the data output port of the Musical Kernel (DNA) Subsystem B45 is connected to the data input port of the User Taste Subsystem B46.

As shown in FIG. 26O, the data output port of the User Taste Subsystem B46 is connected to the data input port of the Population Taste Subsystem B47

As shown in FIGS. 26O and 26P, the data output port of the Population Taste Subsystem B47 is connected to the data input ports of the User Preference Subsystem B48 and the Population Preference Subsystem B49.

As shown in FIGS. 26A through 26P, the data output ports of the Music Editability Subsystem B43, the Preference Saver Subsystem B44, the Musical Kernel (DNA) Subsystem B45, the User Taste Subsystem B46 and the Population Taster Subsystem B47 are provided to the data input ports of the User Preference Subsystem B48 and the Population Preference Subsystem B49, as well as the Parameter Transformation Engine Subsystem B51, as part of a first data feedback loop, shown in FIGS. 26A through 26P.

As shown in FIGS. 26N through 26P, the data output ports of the Music Editability Subsystem B43, the Preference Saver Subsystem B44, the Musical Kernel (DNA) Subsystem B45, the User Taste Subsystem B46 and the Population Taster Subsystem B47, and the User Preference Subsystem B48 and the Population Preference Subsystem B49, are provided to the data input ports of the (Emotion-Type) Descriptor Parameter Capture Subsystem B1, the Style Descriptor Capture Subsystem B37 and the Timing Parameter Capture Subsystem B40, as part of a second data feedback loop, shown in FIGS. 26A through 26P.

Specification of Lower (B) Level Subsystems Implementing Higher (A) Level Subsystems with the Automated Music Composition and Generation Systems of the Present Invention, and Quick Identification of Parameter Tables Employed in Each B-Level Subsystem Referring to FIGS. 23B3A, 27B3B and 27B3C, there is shown a schematic representation illustrating how system user supplied sets of emotion, style and timing/spatial parameters are mapped, via the Parameter Transformation Engine Subsystem B51, into sets of system operating parameters stored in parameter tables that are loaded within respective subsystems across the system of the present invention. Also, the schematic representation illustrated in FIGS. 27B4A, 27B4B, 27B4C, 27B4D and 27B4E1 provides a map that illustrates which lower B-level subsystems are used to implement particular higher A-level subsystems within the system architecture, and which parameter tables are employed within which B-level subsystems within the system. These subsystems and parameter tables will be specified in greater technical detail hereinafter.

Methods of Distributing Probability-Based System Operating Parameters (SOP) to the Subsystems within the Automated Music Composition and Generation System of the Present Invention There are different methods by which the probability-based music-theoretic parameters, generated by the Parameter Transformation Engine Subsystem B51, can be transported to and accessed within the respective subsystems of the automated music composition and generation system of the present invention during the automated music composition process supported thereby. Several different methods will be described in detail below.

According to a first preferred method, described throughout the illustrative embodiments of the present invention, the following operations occur in an organized manner:

(i) the system user provides a set of emotion and style type musical experience descriptors (e.g. HAPPY and POP) and timing/spatial parameters (t=32 seconds) to the system input subsystem B0, which are then transported to the Parameter Transformation Engine Subsystem B51;

(ii) the Parameter Transformation Engine Subsystem B51 automatically generates only those sets of probability-based parameter tables corresponding to HAPPY emotion descriptors, and POP style descriptors, and organizes these music-theoretic parameters in their respective emotion/style-specific parameter tables (or other data suitable structures, such as lists, arrays, etc.); and (iii) any one or more of the subsystems B1, B37 and B51 are used to transport the probability-based emotion/style-specific parameter tables from Subsystem B51, to their destination subsystems, where these emotion/style-specific parameter tables are loaded into the subsystem, for access and use at particular times/stages in the execution cycle of the automated music composition process of the present invention, according to the timing control process supporting the system of the present invention.

Using this first method, there is no need for the emotion and style type musical experience parameters to be transported to each of numerous subsystems employing probabilistic-based parameter tables. The reason is because the subsystems are loaded with emotion/style-specific parameter tables containing music-theoretic parameter values seeking to implement the musical experience desired by the system user and characterized by the emotion-type and style-type musical experience descriptors selected by the system user and supplied to the system interface. So in this method, the system user's musical experience descriptors need not be transmitted past the Parameter Transformation Engine Subsystem B51, because the music-theoretic parameter tables generated from this subsystem B51 inherently contain the emotion and style type musical experience descriptors selected by the system user. There will be a need to transmit timing/spatial parameters from the system user to particular subsystems by way of the Timing Parameter Capture Subsystem B40, as illustrated throughout the drawings.

According to a second preferred method, the following operations will occur in an organized manner:

(iii) during system configuration and set-up, the Parameter Transformation Engine Subsystem B51 is used to automatically generate all possible (i.e. allowable) sets of probability-based parameter tables corresponding to all of the emotion descriptors and style descriptors available for selection by the system user at the GUI-based Input Output Subsystem B0, and then organizes these music-theoretic parameters in their respective emotion/style parameter tables (or other data suitable structures, such as lists, arrays, etc.);

(ii) during system configuration and set-up, subsystems B1, B37 and B51) are used to transport all sets of generalized probability-based parameter tables across the system data buses to their respective destination subsystems where they are loaded in memory;

(iii) during system operation and use, the system user provides a particular set of emotion and style type musical experience descriptors (e.g. HAPPY and POP) and timing/spatial parameters (t=32 seconds) to the system input subsystem B0, which are then are received by the Parameter Capture Subsystems B1, B37 and B40;

(iv) during system operation and use, the Parameter Capture subsystems B1, B37 and B40 transport these emotion descriptors and style descriptors (selected by the system user) to the various subsystems in the system; and (v) during system operation and use, the emotion descriptors and style descriptors transmitted to the subsystems are then used by each subsystem to access specific parts of the generalized probabilistic-based parameter tables relating only to the selected emotion and style descriptors (e.g. HAPPY and POP) for access and use at particular times/stages in the execution cycle of the automated music composition process of the present invention, according to the timing control process of the present invention.

Using this second method, there is a need for the emotion and style type musical experience parameters to be transported to each of numerous subsystems employing probabilistic-based parameter tables. The reason is because the subsystems need to have information on which emotion/style-specific parameter tables containing music-theoretic parameter values, should be accessed and used during the automated music composition process within the subsystem. So in this second method, the system user's emotion and style musical experience descriptors must be transmitted through Parameter Capture Subsystems B1 and B37 to the various subsystems in the system, because the generalized music-theoretic parameter tables do not contain the emotion and style type musical experience descriptors selected by the system user. Also when using this second method, there will be a need to transmit timing/spatial parameters from the system user to particular subsystems by way of the Timing Parameter Capture Subsystem B40, as illustrated throughout the drawings.

While the above-described methods are preferred, it is understood that other methods can be used to practice the automated system and method for automatically composing and generating music in accordance with the spirit of the present invention.

Specification of the B-Level Subsystems Employed in the Automated Music Composition System of the Present Invention, and the Specific Information Processing Operations Supported by and Performed within Each Subsystem During the Execution of the Automated Music Composition and Generation Process of the Present Invention A more detail technical specification of each B-level subsystem employed in the system (S) and its Engine (E1) of the present invention, and the specific information processing operations and functions supported by each subsystem during each full cycle of the automated music composition and generation process hereof, will now be described with reference to the schematic illustrations set forth in FIGS. 27A through 27E2.

Notably, the description of the each subsystem and the operations performed during the automated music composition process will be given by considering an example of where the system generates a complete piece of music, on a note-by-note, chord-by-chord basis, using the automated virtual-instrument music synthesis method, in response to the system user providing the following system inputs: (i) emotion-type music descriptor=HAPPY; (ii) style-type descriptor=POP; and (iii) the timing parameter t=32 seconds.

As shown in the Drawings, the exemplary automated music composition and generation process begins at the Length Generation Subsystem B2, and proceeds where the composition of the exemplary piece of music is completed, and resumes where the Controller Code Generation Subsystem generates controller code information for the music composition, and Subsystem B33 through Subsystem B36 completes the generation of the composed piece of digital music for delivery to the system user. This entire process is controlled under the Subsystem Control Subsystem B60 (i.e. Subsystem Control Subsystem A9), where timing control data signals are generated and distributed in a clockwork manner.

Also, while Subsystems B1, B37, B40 and B41 do not contribute to generation of musical events during the automated musical composition process, these subsystems perform essential functions involving the collection, management and distribution of emotion, style and timing/spatial parameters captured from system users, and then supplied to the Parameter Transformation Engine Subsystem B51 in a user-transparent manner, where these supplied sets of musical experience and timing/spatial parameters are automatically transformed and mapped into corresponding sets of music-theoretic system operating parameters organized in tables, or other suitable data/information structures that are distributed and loaded into their respective subsystems, under the control of the Subsystem Control Subsystem B60, illustrated in FIG. 25A. The function of the Subsystem Control Subsystem B60 is to generate the timing control data signals which, in response to system user input to the Input Output Subsystem B0, is to enable each subsystem into operation at a particular moment in time, precisely coordinated with other subsystems, so that all of the data flow paths between the input and output data ports of the subsystems are enabled in the proper time order, so that each subsystem has the necessary data required to perform its operations and contribute to the automated music composition and generation process of the present invention. While control data flow lines are not shown at the B-level subsystem architecture illustrated in FIGS. 26A through 26P, such control data flow paths are illustrated in the corresponding model shown in FIG. 25A, where the output ports of the Input Subsystem A0 are connected to the input ports of the Subsystem Control Subsystem A9, and the output data ports of Subsystem A9 are provided to the input data ports of Subsystems A1 through A8. Corresponding data flow paths exist at the B-level schematic representation, but have not been shown for clarity of illustration.

Specification of the User GUI-based Input Output Subsystem (B0)

FIG. 27A shows a schematic representation of the User GUI-Based Input Output Subsystem (B0) used in the Automated Music Composition and Generation Engine and Systems the present invention (E1). During operation, the system user interacts with the system's GUI, or other supported interface mechanism, to communicate his, her or its desired musical experience descriptor(s) (e.g. emotional descriptors and style descriptor(s)), and/or timing information. In the illustrative embodiment, and exemplary illustrations, (i) the emotion-type musical experience descriptor=HAPPY is provided to the input output system B0 of the Engine for distribution to the (Emotion) Descriptor Parameter Capture Subsystem B1, (ii) the style-type musical experience descriptor=POP is provided to the input output system B0 of the Engine for distribution to the Style Parameter Capture Subsystem B37, and (iii) the timing parameter t=32 seconds is provided to the Input Output System B0 of the Engine for distribution to the Timing Parameter Capture Subsystem B40. These subsystems, in turn, transport the supplied set of musical experience parameters and timing/spatial data to the input data ports of the Parameter Transformation Engine Subsystem B51 shown in FIGS. 27B3A, 27B3B and 27B3C, where the Parameter Transformation Engine Subsystem B51 then generates an appropriate set of probability-based parameter programming tables for subsequent distribution and loading into the various subsystems across the system, for use in the automated music composition and generation process being prepared for execution.

Specification of the Descriptor Parameter Capture Subsystem (B1)

FIGS. 27B1 and 27B2 show a schematic representation of the (Emotion-Type) Descriptor Parameter Capture Subsystem (B1) used in the Automated Music Composition and Generation Engine of the present invention. The Descriptor Parameter Capture Subsystem B1 serves as an input mechanism that allows the user to designate his or her preferred emotion, sentiment, and/or other descriptor for the music. It is an interactive subsystem of which the user has creative control, set within the boundaries of the subsystem.

In the illustrative example, the system user provides the exemplary "emotion-type" musical experience descriptor—HAPPY—to the descriptor parameter capture subsystem B1. These parameters are used by the parameter transformation engine B51 to generate probability-based parameter programming tables for subsequent distribution to the various subsystems therein, and also subsequent subsystem set up and use during the automated music composition and generation process of the present invention.

Once the parameters are inputted, the Parameter Transformation Engine Subsystem B51 generates the system operating parameter tables and then the subsystem 51 loads the relevant data tables, data sets, and other information into each of the other subsystems across the system. The emotion-type descriptor parameters can be inputted to subsystem B51 either manually or semi-automatically by a system user, or automatically by the subsystem itself. In processing the input parameters, the subsystem 51 may distill (i.e. parse and transform) the emotion descriptor parameters to any combination of descriptors as described in FIGS. 29A through 29F. Also, where text-based emotion descriptors are provided, say in a short narrative form, the Descriptor Parameter Capture Subsystem B1 can parse and analyze and translate the words in the supplied text narrative into emotion-type descriptor words that have entries in emotion descriptor library as illustrated in FIGS. 29A through 29F, so through translation processes, virtually any set of words can be used to express one or more emotion-type music descriptors registered in the emotion descriptor library of FIGS. 29A through 29F, and be used to describe the kind of music the system user wishes to be automatically composed by the system of the present invention.

Preferably, the number of distilled descriptors is between one and ten, but the number can and will vary from embodiment to embodiment, from application to application. If there are multiple distilled descriptors, and as necessary, the Parameter Transformation Engine Subsystem B51 can create new parameter data tables, data sets, and other information by combining previously existing data tables, data sets, and other information to accurately represent the inputted descriptor parameters. For example, the descriptor parameter "happy" might load parameter data sets related to a major key and an upbeat tempo. This transformation and mapping process will be described in greater detail with reference to the Parameter Transformation Engine Subsystem B51 described in greater detail hereinbelow.

In addition to performing the music-theoretic and information processing functions specified above, when necessary or helpful, System B1 can also assist the Parameter Transformation Engine System B51 in transporting probability-based music-theoretic system operating parameter (SOP) tables (or like data structures) to the various subsystems deployed throughout the automated music composition and generation system of the present invention.

Specification of the Style Parameter Capture Subsystem (B37)

FIGS. 27C1 and 27C2 show a schematic representation of the Style Parameter Capture Subsystem (B37) used in the Automated Music Composition and Generation Engine and System of the present invention. The Style Parameter Capture Subsystem B37 serves as an input mechanism that allows the user to designate his or her preferred style parameter(s) of the musical piece. It is an interactive subsystem of which the user has creative control, set within the boundaries of the subsystem. This information is based on either user inputs (if given), computationally-determined value(s), or a combination of both. Style, or the characteristic manner of presentation of musical elements (melody, rhythm, harmony, dynamics, form, etc.), is a fundamental building block of any musical piece. In the illustrative example of FIGS. 27C1 and 27C2, the probability-based parameter programming table employed in the subsystem is set up for the exemplary "style-type" musical experience descriptor=POP and used during the automated music composition and generation process of the present invention.

The style descriptor parameters can be inputted manually or semi-automatically or by a system user, or automatically by the subsystem itself. Once the parameters are inputted, the Parameter Transformation Engine Subsystem B51 receives the user's musical style inputs from B37 and generates the relevant probability tables across the rest of the system, typically by analyzing the sets of tables that do exist and referring to the currently provided style descriptors. If multiple descriptors are requested, the Parameter Transformation Engine Subsystem B51 generates system operating parameter (SOP) tables that reflect the combination of style descriptors provided, and then subsystem B37 loads these parameter tables into their respective subsystems.

In processing the input parameters, the Parameter Transformation Engine Subsystem B51 may distill the input parameters to any combination of styles as described in FIG. 30A through 30E. The number of distilled styles may be between one and ten. If there are multiple distilled styles, and if necessary, the Parameter Transformation Subsystem B51 can create new data tables, data sets, and other information by combining previously existing data tables, data sets, and other information to generate system operating parameter tables that accurately represent the inputted descriptor parameters.

In addition to performing the music-theoretic and information processing functions specified above, when necessary or helpful, Subsystem B37 can also assist the Parameter Transformation Engine System B51 in transporting probability-based music-theoretic system operating parameter (SOP) tables (or like data structures) to the various subsystems deployed throughout the automated music composition and generation system of the present invention.

Specification of the Timing Parameter Capture Subsystem (B40)

Figure 27D:
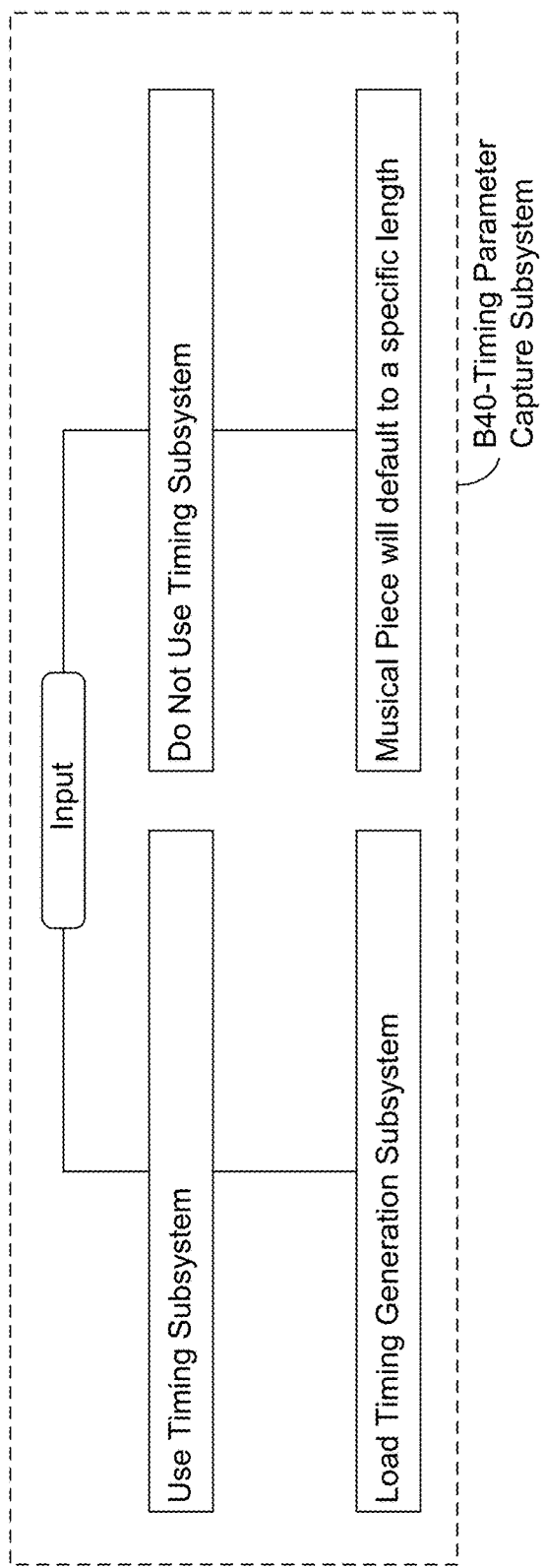
FIG. 27D shows a schematic representation of the Timing Parameter Capture Subsystem (B40) used in the Automated Music Composition and Generation Engine of the present invention, wherein the Timing Parameter Capture Subsystem (B40) provides timing parameters to the timing generation subsystem (B41) for distribution to the various subsystems in the system, and subsequent subsystem configuration and use during the automated music composition and generation process of the present invention.

FIG. 27D shows the Timing Parameter Capture Subsystem (B40) used in the Automated Music Composition and Generation Engine (E1) of the present invention. The Timing Parameter Capture Subsystem B40 locally decides whether the Timing Generation Subsystem B41 is loaded and used, or if the piece of music being created will be a specific pre-set length determined by processes within the system itself. The Timing Parameter Capture Subsystem B40 determines the manner in which timing parameters will be created for the musical piece. If the user elects to manually enter the timing parameters, then a certain user interface will be available to the user. If the user does not elect to manually enter the timing parameters, then a certain user interface might not be available to the user. As shown in FIGS. 27E1 and 27E2, the subsystem B41 allows for the specification of timing of for the length of the musical piece being composed, when music starts, when music stops, when music volume increases and decreases, and where music accents are to occur along the timeline represented for the music composition. During operation, the Timing Parameter Capture Subsystem (B40) provides timing parameters to the Timing Generation Subsystem (B41) for distribution to the various subsystems in the system, and subsequent subsystem set up and use during the automated music composition and generation process of the present invention.

In addition to performing the music-theoretic and information processing functions specified above, when necessary or helpful, Subsystem B40 can also assist the Parameter Transformation Engine System B51 in transporting probability-based music-theoretic system operating parameter (SOP) tables (or like data structures) to the various subsystems deployed throughout the automated music composition and generation system of the present invention.

Specification of the Parameter Transformation Engine (PTE) of the Present Invention (B51)

As illustrated in FIGS. 27B3A, 27B3B and 27B3C, the Parameter Transformation Engine Subsystem B51 is shown integrated with subsystems B1, B37 and B40 for handling emotion-type, style-type and timing-type parameters, respectively, supplied by the system user though subsystem B0. The Parameter Transformation Engine Subsystem B51 performs an essential function by accepting the system user input(s) descriptors and parameters from subsystems B1, B37 and B40, and transforming these parameters (e.g. input(s)) into the probability-based system operating parameter tables that the system will use during its operations to automatically compose and generate music using the virtual-instrument music synthesis technique disclosed herein. The programmed methods used by the parameter transformation engine subsystem (B51) to process any set of musical experience (e.g. emotion and style) descriptors and timing and/or spatial parameters, for use in creating a piece of unique music, will be described in great detail hereinafter with reference to FIGS. 27B3A through 27B3C, wherein the musical experience descriptors (e.g. emotion and style descriptors) and timing and spatial parameters that are selected from the available menus at the system user interface of input subsystem B0 are automatically transformed into corresponding sets of probabilistic-based system operating parameter (SOP) tables which are loaded into and used within respective subsystems in the system during the music composition and generation process.

As will be explained in greater detail below, this parameter transformation process supported within Subsystem B51 employs music theoretic concepts that are expressed and embodied within the probabilistic-based system operation parameter (SOP) tables maintained within the subsystems of the system, and controls the operation thereof during the execution of the time-sequential process controlled by timing signals. Various parameter transformation principles and practices for use in designing, constructing and operating the Parameter Transformation Engine Subsystem (B51) will be described in detail hereinafter.

In addition to performing the music-theoretic and information processing functions specified above, the Parameter Transformation Engine System B51 is fully capable of transporting probability-based music-theoretic system operating parameter (SOP) tables (or like data structures) to the various subsystems deployed throughout the automated music composition and generation system of the present invention.

Specification of the Parameter Table Handling and Processing Subsystem (B70)

In general, there is a need with the system to manage multiple emotion-type and style-type musical experience descriptors selected by the system user, to produce corresponding sets of probability-based music-theoretic parameters for use within the subsystems of the system of the present invention. The primary function of the Parameter Table Handling and Processing Subsystem B70 is to address this need at either a global or local level, as described in detail below.

FIG. 27B5 shows the Parameter Table Handling and Processing Subsystem (B70) used in connection with the Automated Music Composition and Generation Engine of the present invention. The primary function of the Parameter Table Handling and Processing Subsystem (B70) is to determine if any system parameter table transformation(s) are required in order to produce system parameter tables in a form that is more convenient and easier to process and use within the subsystems of the system of the present invention. The Parameter Table Handling and Processing Subsystem (B70) performs its functions by (i) receiving multiple (i.e. one or more) emotion/style-specific music-theoretic system operating parameter (SOP) tables from the data output port of the Parameter Transformation Engine Subsystem B51, (ii) processing these parameter tables using one or parameter table processing methods M1, M2 or M3, described below, and (iii) generating system operating parameter tables in a form that is more convenient and easier to process and use within the subsystems of the system of the present invention.

In general, there are two different ways in which to practice this aspect of the present invention: (i) performing parameter table handing and transformation processing operations in a global manner, as shown with the Parameter Table Handling and Processing Subsystem B70 configured with the Parameter Transformation Engine Subsystem B51, as shown in FIGS. 26A through 26J; or (ii) performing parameter table handing and transformation processing operations in a local manner, within each subsystem, as shown with the Parameter Table Handling and Processing Subsystem B70 configured with the input data port of each subsystem supporting probability-based system operating parameter tables employed to support the illustrative embodiments. Both approaches are shown herein for purposes of illustration. However, the details of the Parameter Table Handling and Processing Subsystem B70 will be described below with reference to the global implementation shown and illustrated in FIGS. 26A through 26J.

As shown in FIGS. 26A through 26J, the data input ports of the Parameter Table Handling and Processing Subsystem (B70) are connected to the output data ports of the Parameter Table Handling and Processing Subsystem B70, whereas the data output ports of Subsystem B70 are connected to (i) the input data port of the Parameter Table Archive Database Subsystem B80, and also (ii) the input data ports of parameter table employing Subsystems B2, B3, B4, B5, B7, B9, B15, B11, B17, B19, B20, B25, B26, B24, B27, B29, B30, B38, B39, B31, B32 and B41, illustrated in FIGS. 28A through 28S and other figure drawings disclosed herein.

As shown in FIG. 27B5, the Parameter Table Handling and Processing Subsystem B70 receives one or more emotion/style-indexed system operating parameter tables and determines whether or not system input (i.e. parameter table) transformation is required, or not required, as the case may be. In the event only a single emotion/style-indexed system parameter table is received, it is unlikely transformation will be required and therefore the system parameter table is typically transmitted to the data output port of the subsystem B70 in a pass-through manner. In the event that two or more emotion/style-indexed system parameter tables are received, then it is likely that these parameter tables will require or benefit from transformation processing, so the subsystem B70 supports three different methods M1, M2 and M3 for operating on the system parameter tables received at its data input ports, to transform these parameter tables into parameter table that are in a form that is more suitable for optimal use within the subsystems.

There are three case scenarios to consider and accompanying rules to use in situations where multiple emotion/style musical experience descriptors are provided to the input subsystem B0, and multiple emotion/style-indexed system parameter tables are automatically generated by the Parameter Transformation Engine Subsystem B51.

Considering the first case scenario, where Method M1 is employed, the subsystem B70 makes a determination among the multiple emotion/style-indexed system parameter tables, and decides to use only one of the emotion/style-indexed system parameter tables. In scenario Method 1, the subsystem B70 recognizes that, either in a specific instance or as an overall trend, that among the multiple parameter tables generated in response to multiple musical experience descriptors inputted into the subsystem B0, a single one of these descriptors-indexed parameter tables might be best utilized.

As an example, if HAPPY, EXHUBERANT, and POSITIVE were all inputted as emotion-type musical experience descriptors, then the system parameter table(s) generated for EXHUBERANT might likely provide the necessary musical framework to respond to all three inputs because EXUBERANT encompassed HAPPY and POSITIVE. Additionally, if CHRISTMAS, HOLIDAY, AND WINTER were all inputted as style-type musical experience descriptors, then the table(s) for CHRISTMAS might likely provide the necessary musical framework to respond to all three inputs.

Further, if EXCITING and NERVOUSNESS were both inputted as emotion-type musical experience descriptors and if the system user specified EXCITING: 9 out of 10, where 10 is maximum excitement and 0 is minimum excitement and NERVOUSNESS: 2 out of 10, where 10 is maximum NERVOUSNESS and 0 is minimum NERVOUSNESS (whereby the amount of each descriptor might be conveyed graphically by, but not limited to, moving a slider on a line or by entering in a percentage into a text field), then the system parameter table(s) for EXCITING might likely provide the necessary musical framework to respond to both inputs. In all three of these examples, the musical experience descriptor that is a subset and, thus, a more specific version of the additional descriptors, is selected as the musical experience descriptor whose table(s) might be used.

Considering the second case scenario, where Method M2 is employed, the subsystem B70 makes a determination among the multiple emotion/style-indexed system parameter tables, and decides to use a combination of the multiple emotion/style descriptor-indexed system parameter tables.

In scenario Method 2, the subsystem B70 recognizes that, either in a specific instance or as an overall trend, that among the multiple emotion/style descriptor indexed system parameter tables generated by subsystem B51 in response to multiple emotion/style descriptor inputted into the subsystem B0, a combination of some or all of these descriptor-indexed system parameter tables might best be utilized. According to Method M2, this combination of system parameter tables might be created by employing functions including, but not limited to, (weighted) average(s) and dominance of a specific descriptor's table(s) in a specific table only.

As an example, if HAPPY, EXUBERANT, AND POSITIVE were all inputted as emotional descriptors, the system parameter table(s) for all three descriptors might likely work well together to provide the necessary musical framework to respond to all three inputs by averaging the data in each subsystem table (with equal weighting). Additionally, IF CHRISTMAS, HOLIDAY, and WINTER were all inputted as style descriptors, the table(s) for all three might likely provide the necessary musical framework to respond to all three inputs by using the CHRISTMAS tables for the General Rhythm Generation Subsystem A1, the HOLIDAY tables for the General Pitch Generation Subsystem A2, and the a combination of the HOLIDAY and WINTER system parameter tables for the Controller Code and all other subsystems. Further, if EXCITING and NERVOUSNESS were both inputted as emotion-type musical experience descriptors and if the system user specified Exciting: 9 out of 10, where 10 is maximum excitement and 0 is minimum excitement and NERVOUSNESS: 2 out of 10, where 10 is maximum nervousness and 0 is minimum nervousness (whereby the amount of each descriptor might be conveyed graphically by, but not limited to, moving a slider on a line or by entering in a percentage into a text field), the weight in table(s) employing a weighted average might be influenced by the level of the user's specification. In all three of these examples, the descriptors are not categorized as solely a set(s) and subset(s), but also by their relationship within the overall emotional and/or style spectrum to each other.

Considering the third case scenario, where Method M3 is employed, the subsystem B70 makes a determination among the multiple emotion/style-indexed system parameter tables, and decides to use neither of multiple emotion/style descriptor-indexed system parameter tables. In scenario Method 3, the subsystem B70 recognizes that, either in a specific instance or as an overall trend, that among the multiple emotion/style-descriptor indexed system parameter tables generated by subsystem B51 in response to multiple emotion/style descriptor inputted into the subsystem B0, none of the emotion/style-indexed system parameter tables might best be utilized.

As an example, if HAPPY and SAD were both inputted as emotional descriptors, the system might determine that table(s) for a separate descriptor(s), such as BIPOLAR, might likely work well together to provide the necessary musical framework to respond to both inputs. Additionally, if ACOUSTIC, INDIE, and FOLK were all inputted as style descriptors, the system might determine that table(s) for separate descriptor(s), such as PIANO, GUITAR, VIOLIN, and BANJO, might likely work well together to provide the necessary musical framework, possibly following the avenues(s) described in Method 2 above, to respond to the inputs. Further, if EXCITING and NERVOUSNESS were both inputted as emotional descriptors and if the system user specified Exciting: 9 out of 10, where 10 is maximum excitement and 0 is minimum excitement and Nervousness:

8 out of 10, where 10 is maximum nervousness and 0 is minimum nervousness (whereby the amount of each descriptor might be conveyed graphically by, but not limited to, moving a slider on a line or by entering in a percentage into a text field), the system might determine that an appropriate description of these inputs is Panicked and, lacking a pre-existing set of system parameter tables for the descriptor PANICKED, might utilize (possibility similar) existing descriptors' system parameter tables to autonomously create a set of tables for the new descriptor, then using these new system parameter tables in the subsystem(s) process(es).

In all of these examples, the subsystem B70 recognizes that there are, or could be created, additional or alternative descriptor(s) whose corresponding system parameter tables might be used (together) to provide a framework that ultimately creates a musical piece that satisfies the intent(s) of the system user.

Specification of the Parameter Table Archive Database Subsystem (B80)

FIG. 27B6 shows the Parameter Table Archive Database Subsystem (B80) used in the Automated Music Composition and Generation System of the present invention. The primary function of this subsystem B80 is persistent storing and archiving user account profiles, tastes and preferences, as well as all emotion/style-indexed system operating parameter (SOP) tables generated for individual system users, and populations of system users, who have made music composition requests on the system, and have provided feedback on pieces of music composed by the system in response to emotion/style/timing parameters provided to the system.

As shown in FIG. 27B6, the Parameter Table Archive Database Subsystem B80, realized as a relational database management system (RBMS), non-relational database system or other database technology, stores data in table structures in the illustrative embodiment, according to database schemas, as illustrated in FIG. 27B6.

As shown, the output data port of the GUI-based Input Output Subsystem B0 is connected to the output data port of the Parameter Table Archive Database Subsystem B80 for receiving database requests from system users who use the system GUI interface. As shown, the output data ports of Subsystems B42 through B48 involved in feedback and learning operations, are operably connected to the data input port of the Parameter Table Archive Database Subsystem B80 for sending requests for archived parameter tables, accessing the database to modify database and parameter tables, and performing operations involved system feedback and learning operations. As shown, the data output port of the Parameter Table Archive Database Subsystem B80 is operably connected to the data input ports of the Systems B42 through B48 involved in feedback and learning operations. Also, as shown in FIGS. 26A through 26P, the output data port of the Parameter Table Handling and Processing Subsystem B7 is connected to data input port of the Parameter Table Archive Database Subsystem B80, for archiving copies of all parameter tables handled, processed and produced by this Subsystem B80, for future analysis, use and processing.

In general, while all parameter data sets, tables and like structures will be stored globally in the Parameter Table Archive Database Subsystem B80, it is understood that the system will also support local persistent data storage within subsystems, as required to support the specialized information processing operations performed therein in a high-speed and reliable manner during automated music composition and generation processes on the system of the present invention.

Specification of the Timing Generation Subsystem (B41)

FIGS. 27E1 and 27E2 shows the Timing Generation Subsystem (B41) used in the Automated Music Composition and Generation Engine of the present invention. In general, the Timing Generation Subsystem B41 determines the timing parameters for the musical piece. This information is based on either user inputs (if given), compute-determined value(s), or a combination of both. Timing parameters, including, but not limited to, or designations for the musical piece to start, stop, modulate, accent, change volume, change form, change melody, change chords, change instrumentation, change orchestration, change meter, change tempo, and/or change descriptor parameters, are a fundamental building block of any musical piece.

The Timing Parameter Capture Subsystem B40 can be viewed as creating a timing map for the piece of music being created, including, but not limited to, the piece's descriptor(s), style(s), descriptor changes, style changes, instrument changes, general timing information (start, pause, hit point, stop), meter (changes), tempo (changes), key (changes), tonality (changes) controller code information, and audio mix. This map can be created entirely by a user, entirely by the Subsystem, or in collaboration between the user and the subsystem.

More particularly, the Timing Parameter Capture Subsystem (B40) provides timing parameters (e.g. piece length) to the Timing Generation Subsystem (B41) for generating timing information relating to (i) the length of the piece to be composed, (ii) start of the music piece, (iii) the stop of the music piece, (iv) increases in volume of the music piece, and (v) any accents in the music piece that are to be created during the automated music composition and generation process of the present invention.

For example, a system user might request that a musical piece begin at a certain point, modulate a few seconds later, change tempo even later, pause, resume, and then end with a large accent. This information is transmitted to the rest of the system's subsystems to allow for accurate and successful implementation of the user requests. There might also be a combination of user and system inputs that allow the piece to be created as successfully as possible, including the scenario when a user might elect a start point for the music, but fail to input to stop point. Without any user input, the system would create a logical and musical stop point. Thirdly, without any user input, the system might create an entire set of timing parameters in an attempt to accurately deliver what it believes the user desires.

The Nature and Various Possible Formats of the Input and Output Data Signals Supported by the Illustrative Embodiments of the Present Invention FIG. 28 shows a table describing exemplary data formats that are supported by the various data input and output signals (e.g. text, chord, audio file, binary, command, meter, image, time, pitch, number, tonality, tempo, letter, linguistics, speech, MIDI, etc.) passing through the various specially configured information processing subsystems employed in the Automated Music Composition and Generation System of the present invention.

Specification of the Musical Experience Descriptors Supported by Automated Music Composition and Generation System of the Present Invention FIGS. 29A through 29F show a table describing an exemplary hierarchical set of "emotional" descriptors, arranged according to primary, secondary and tertiary emotions. Theses emotion-type descriptors are supported as "musical experience descriptors" for system users to provide as system user input to the Automated Music Composition and Generation System of the illustrative embodiments of the present invention.

FIGS. 30A, 30B, 30C, 30D and 30E, taken together, provides a table describing an exemplary set of "style" descriptors which are supported as musical experience descriptors for system users to provide as input to the Automated Music Composition and Generation System of the illustrative embodiments of the present invention.

Figure 31:
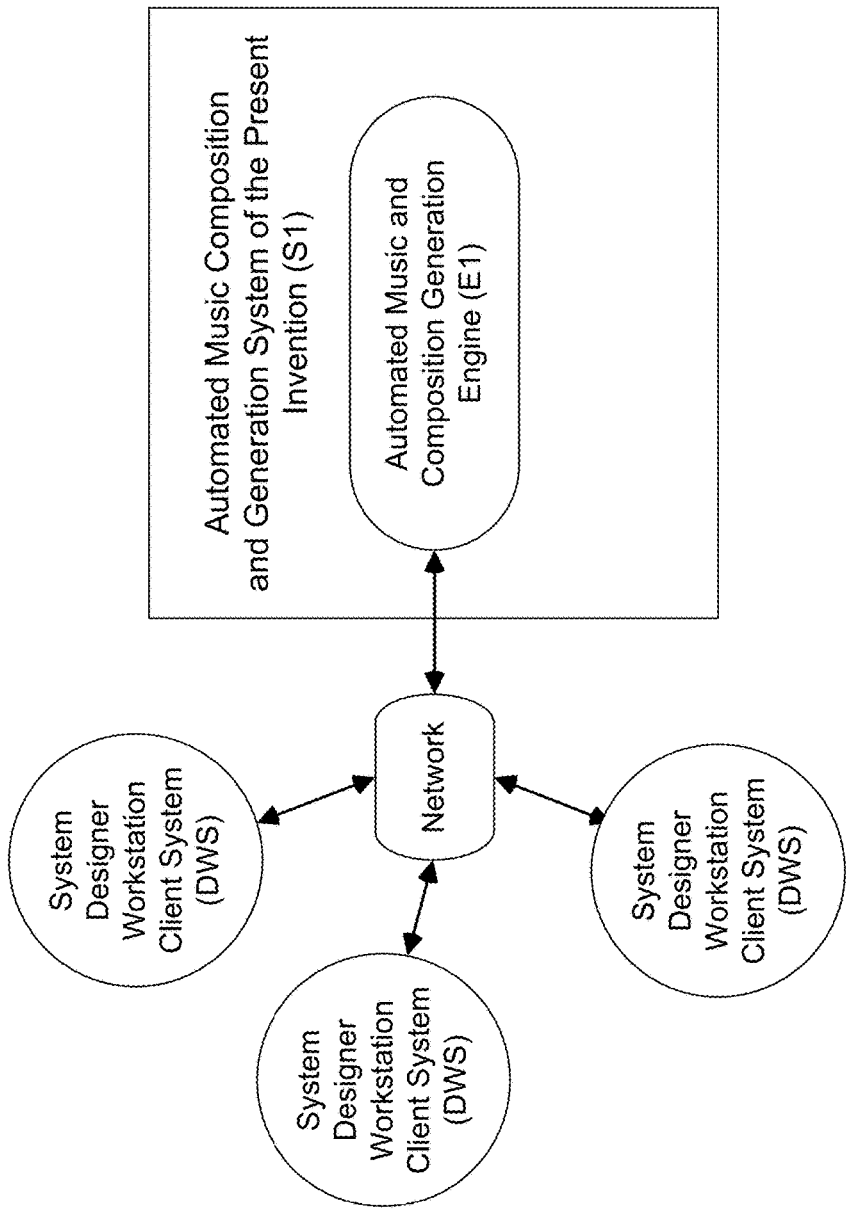
FIG. 31 is a schematic presentation of the automated music composition and generation system network of the present invention, comprising a plurality of remote system designer client workstations, operably connected to the Automated Music Composition And Generation Engine (E1) of the present invention, wherein its parameter transformation engine subsystem and its associated parameter table archive database subsystem are maintained, and wherein each workstation client system supports a GUI-based work environment for creating and managing "parameter mapping configurations (PMC)" within the parameter transformation engine subsystem, wherein system designers remotely situated anywhere around the globe can log into the system network and access the GUI-based work environment and create parameter mapping configurations between (i) different possible sets of emotion-type, style-type and timing/spatial parameters that might be selected by system users, and (ii) corresponding sets of probability-based music-theoretic system operating parameters, preferably maintained within parameter tables, for persistent storage within the parameter transformation engine subsystem and its associated parameter table archive database subsystem.

System Network Tools for Creating and Managing Parameters Configurations within the Parameter Transformation Engine Subsystem B51 of the Automated Music Composition and Generation System of the Present Invention FIG. 31 shows the automated Music Composition And Generation System Network of the present invention, comprising (i) a plurality of remote system designer client workstations (DWS), operably connected to the Automated Music Composition And Generation Engine (E1) of the present invention. As shown in other figures, the Parameter Transformation Engine Subsystem B51 and its associated Parameter Table Archive Database Subsystem B80 are maintained in the Engine E1. Each workstation client system (DWS) supports a GUI-based work environment for creating and managing "parameter mapping configurations (PMC)" within the parameter transformation engine subsystem B51, of whatever illustrative embodiment is under design and manufacture. Using this system network, one or more system designers remotely situated anywhere around the globe can log into the system network and access the GUI-based work environment and create "parameter mapping configurations" between (i) different possible sets of emotion-type, style-type and timing/spatial parameters that might be selected by system users, and (ii) corresponding sets of probability-based music-theoretic system operating parameters, preferably maintained within parameter tables, for persistent storage within the Parameter Transformation Engine Subsystem B51 and its associated Parameter Table Archive Database Subsystem B80.

These parameter mapping configuration tools are used to configure the Parameter Transformation Engine Subsystem B52 during the system design stage, and thereby program define or set probability parameters in the sets of parameter tables of the system for various possible combinations of system user inputs described herein. More particularly, these system designer tools enable the system designer(s) to define probabilistic relationships between system user selected sets of emotion/style/timing parameters and the music-theoretic system operating parameters (SOP) in the parameter tables that are ultimately distributed to and loaded into the subsystems, prior to execution of the automated music composition and generation process. Such upfront parameter mapping configurations by the system designer imposes constraints on system operation, and the parameter selection mechanisms employed within each subsystem (e.g. random number generator, or user-supplied lyrical or melodic input data sets) used by each subsystem to make local decisions on how a particular parts of a piece of music will be ultimately composed and generated by the system during the automated music composition and generation process of the present invention.

Figure 32A:
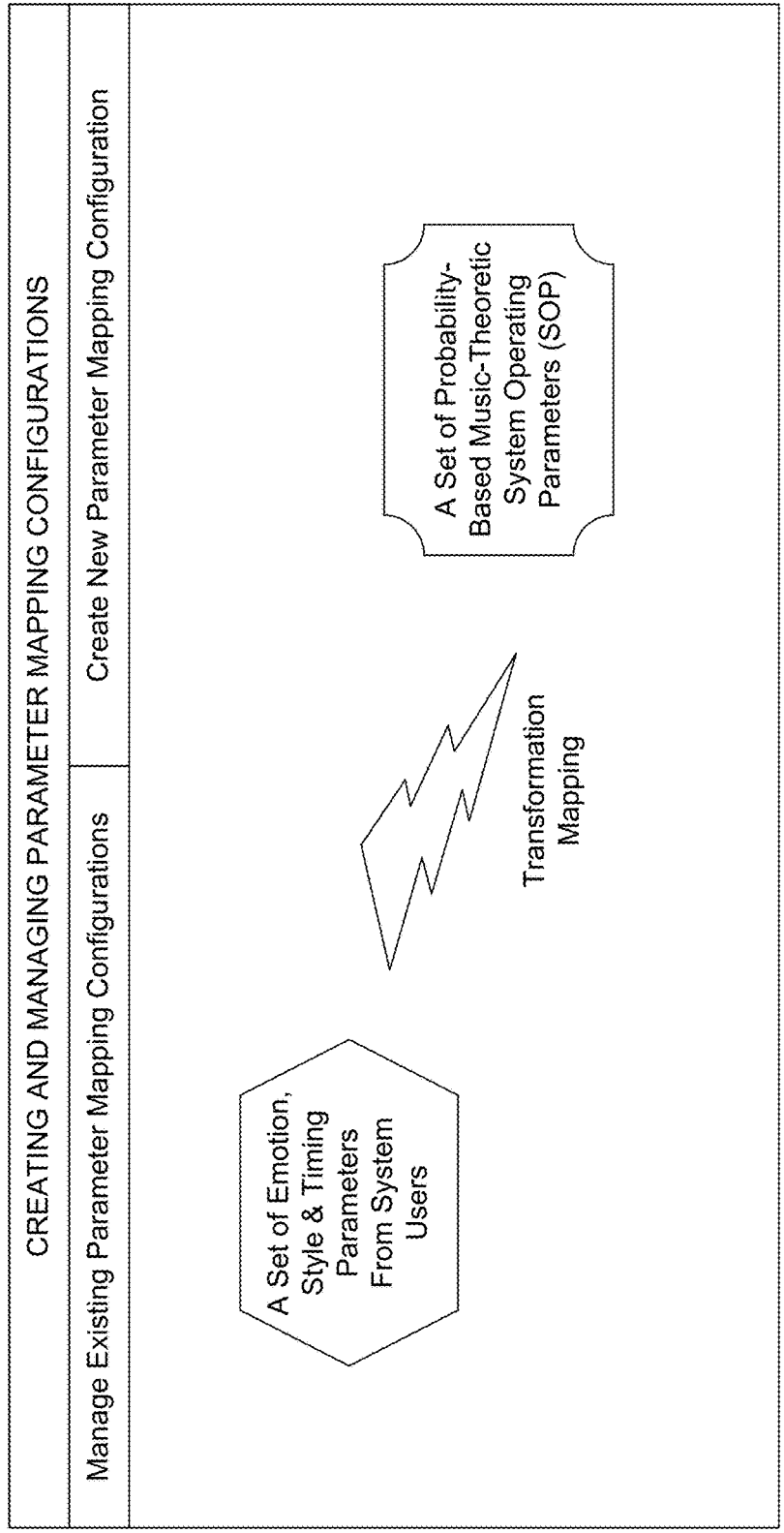
FIG. 32A is a schematic representation of the GUI-based work environment supported by the system network shown in FIG. 31, wherein the system designer has the choice of (i) managing existing parameter mapping configurations, and (ii) creating a new parameter mapping configuration for loading and persistent storage in the Parameter Transformation Engine Subsystem B51, which in turn generates corresponding probability-based music-theoretic system operating parameter (SOP) table(s), and loads the same within the various subsystems employed in the deployed Automated Music Composition and Generation System of the present invention.

As shown in FIG. 32A, the GUI-based work environment supported by the system network shown in FIG. 31 provides the system designer with the choice of (i) managing existing parameter mapping configurations, and (ii) creating a new parameter mapping configuration for loading and persistent storage in the Parameter Transformation Engine Subsystem B51. In turn, the Parameter Transformation Engine Subsystem B51 generates corresponding probability-based music-theoretic system operating parameter (SOP) table(s), and loads the same within the various subsystems employed in the deployed Automated Music Composition and Generation System of the present invention;

As shown in FIG. 32B, the system designer selects (i) managing existing parameter mapping configurations from the GUI shown in FIG. 32A, and is presented a list of currently created parameter mapping configurations that have been created and loaded into persistent storage in the Parameter Transformation Engine Subsystem B51 of the system of the present invention.

Figure 33A:
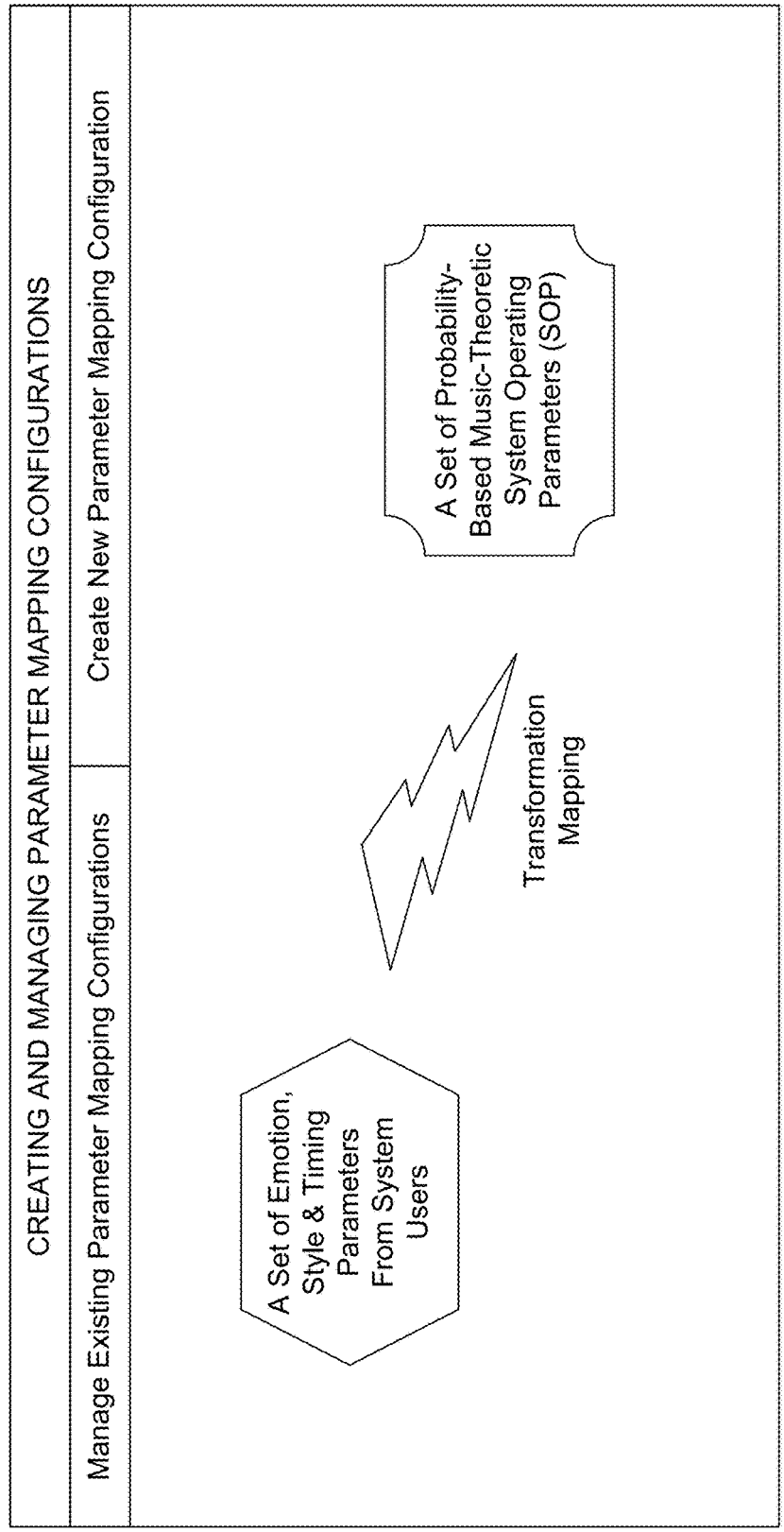
FIG. 33A is a schematic representation of the GUI-based work environment supported by the system network shown in FIG. 32A, wherein the system designer selects (i) create a new parameter mapping configuration.

As shown in FIG. 33A, the system designer selects (ii) creating a new parameter mapping configuration from the GUI screen shown in FIG. 32A.

Figure 33B:
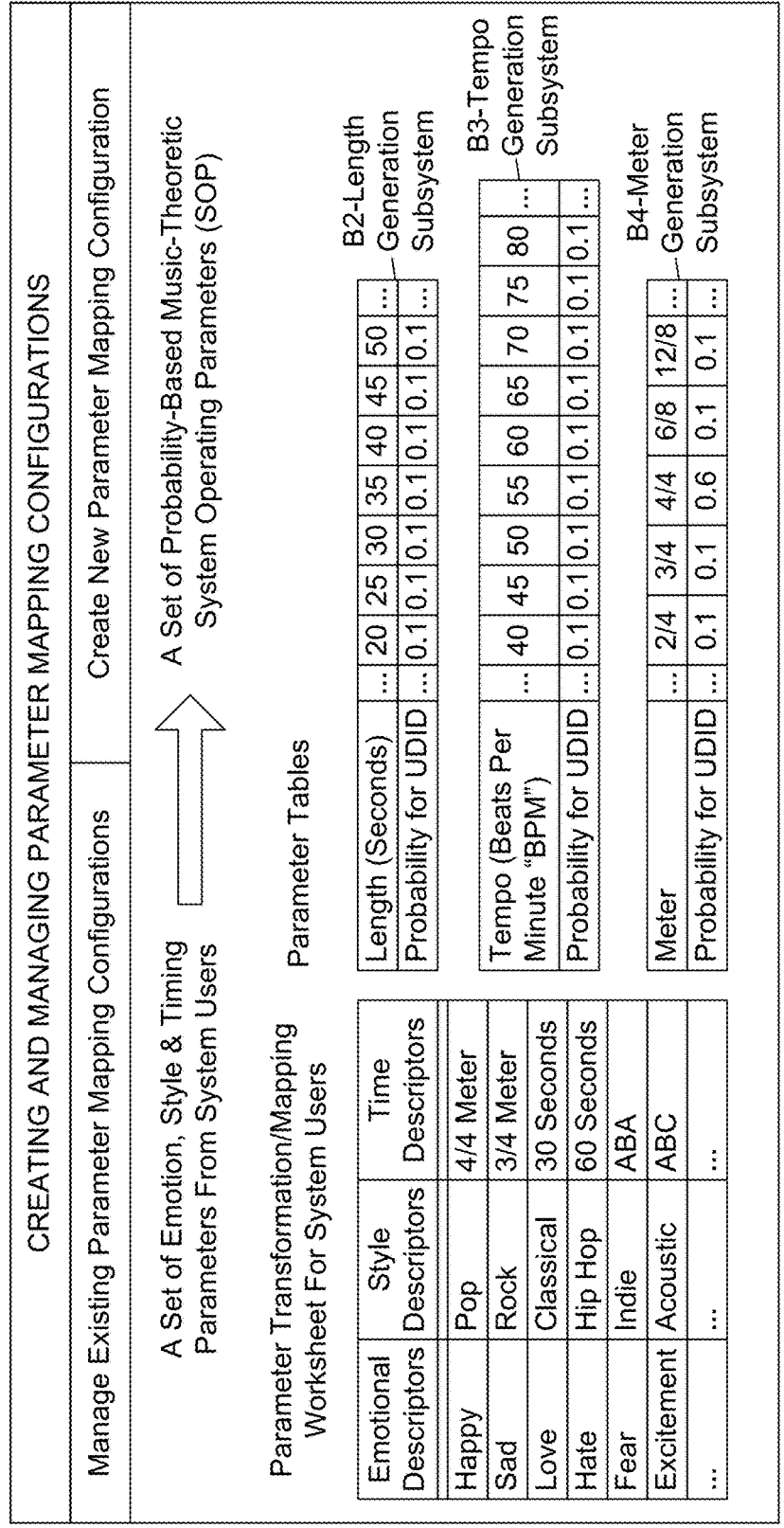
FIG. 33B is a schematic representation of the GUI-based work environment supported by the system network shown in FIG. 32A, wherein the system designer is presented with a GUI-based worksheet for use in creating a parameter mapping configuration between (i) a set of possible system-user selectable emotion/style/timing parameters, and a set of corresponding probability-based music-theoretic system operating parameter (SOP) table(s), for generating and loading within the various subsystems employed in the deployed Automated Music Composition and Generation System of the present invention.

As shown in FIG. 33B, the system designer is presented with a GUI-based worksheet for use in creating a parameter mapping configuration between (i) a set of possible system-user selectable emotion/style/timing parameters, and a set of corresponding probability-based music-theoretic system operating parameter (SOP) table(s), for loading within the various subsystems employed in the deployed Automated Music Composition and Generation System of the present invention. Using the exemplary GUI-based worksheet shown in FIG. 32B, the task of the system designer, or team thereof working together, is to create, for each possible set of emotion/style/timing parameters that might be selected by any given system user, a corresponding set the probability values for each music-theoretic SOP table in the master set of probability-based system operating parameter (SOP) tables.

In general, the number of possible combinations of probability-based SOP tables that will need to be generated for configuring the Parameter Transformation Engine Subsystem B51 with parameter-transformational capacity, will be rather large, and will be dependent on the size of possible emotion-type and style-type musical experience descriptors that may be selected by system users for any given system design deployed in accordance with the principles of the present invention. The scale of such possible combinations has been discussed and modeled hereinabove.

These tools illustrated in FIGS. 31 through 33B are merely illustrative examples of how system design experts can add and embody their musical composition expertise, knowledge and know how within the Automated Musical Composition And Generation Systems of the present invention disclosed herein. Typically, such expertise, knowledge and/or know how will be transferred from the system designer(s) and engineer(s) to digital and/or analog circuitry supported with the music composition machine, using techniques adapted for manipulating the parameters and datasets maintained within in the various system operating parameter (SOP) tables associated with the various subsystems of the system, as described herein. Other techniques and methods will readily occur to those skilled in the art in view of the present invention disclosure set forth herein.

Using Lyrical and/or Musical Input to Influence the Configuration of the Probability-Based System Operating Parameter Tables Generated in the Parameter Transformation Engine Subsystem B51, and Alternative Methods of Selecting Parameter Values from Probability-Based System Operating Parameter Tables Employed in the Various Subsystems Employed in the System of the Present Invention Throughout the illustrative embodiments, a random number generator is shown being used to select parameter values from the various probability-based music-theoretic system operating parameter tables employed in the various subsystems of the automated music composition and generation system of the present invention. It is understood, however, that non-random parameter value selection mechanisms can be used during the automated music composition and generation process. Such mechanisms can be realized globally within the Parameter Transformation Engine Subsystem B51, or locally within each Subsystem employing probability-based parameter tables.

In the case of global methods, the Parameter Transformation Engine Subsystem B51 (or other dedicated subsystem) can automatically adjust the parameter value weights of certain parameter tables shown in FIGS. 27B3A through 27B3C in response to pitch information automatically extracted from system user supplied lyrical input or musical input (e.g. humming or whistling of a tune) by the pitch and rhythm extraction subsystem B2. In such global methods, a random number generator can be used to select parameter values from the lyrically/musically-skewed parameter tables, or alternative parameter mechanisms such as the lyrical/musical-responsive parameter value section mechanism described below in connection with local methods of implementation.

In the case of local methods, a Real-Time Pitch Event Analyzing Subsystem B52 can be used to capture real-time pitch and rhythm information from system user supplied lyrics or music (alone or with selected musical experience and timing parameters) which is then provided to a lyrical/musical responsive parameter value selection mechanism supported in each subsystem (in lieu of a random number generator). The parameter value selection mechanism receives the pitch and rhythmic information extracted from the system user and can use it to form a decision criteria, as to which parameter values in probability-based parameter tables should be selected. Ideally, the selection will be made so that the resulting composed music will correspond to the pitch and rhythmic information extracted by the Real-Time Pitch Event Analyzing Subsystem B52.

In either method, global or local, from a set of lyrics and/or other input medium(s) (e.g. humming, whistling, tapping etc.), the system of the present invention may use, for example, the Real-Time Pitch Event Analyzing Subsystem B52, distill the system user input to the motivic level of the input rhythm, pitch, and rhythm/pitch. In some case, this lyrical/musical input can serve as supplemental musical experience descriptors along with emotion-type and style-type musical experience descriptors; or in other cases, this lyrical/musical input might serve as primary musical experience descriptors, without emotion and/or style descriptors. The Real-Time Pitch Event Analyzing Subsystem B52 may then analyze the motivic content to identify patterns, tendencies, preferences, and/or other meaningful relationships in the material. The Parameter Transformation Engine Subsystem B51 may then transform these relationships into parameter value or value range preferences for the probability-based system operating parameter tables. The system may then be more likely to select certain value(s) from the system operating tables (whose parameters have already been created and/or loaded) that reflect the analysis of the lyrical/musical input material so that the subsequently created piece of music reflects the analysis of the input material.

It will be helpful to discuss a few types of pitch and rhythmic information which, when extracted from lyrical/musical input by the system user, would typically influence the selection of parameter values in certain parameter tables using a lyrically, or musically, responsive parameter selection mechanism being proposed in this alternative embodiments of the present invention. These case examples will apply to both the global and local methods of implementation discussed above.

For example, in the event that the input material consists of a high frequency of short and fast rhythmic material, then the rhythmic-related subsystems (i.e. B2, B3, B4, B9, B15, B11, B25, and B26 illustrated in FIGS. 27B3A through 27BC) might be more likely to select 16th and 8th note rhythmic values or other values in the parameter tables that the input material might influence. Consider the following rhythm-related examples: (i) a system user singing a melody with fast and short rhythmic material might cause the probabilities in Subsystem B26 to change and heavily emphasize the sixteenth note and eighth note options; (ii) a system user singing a waltz with a repetitive pattern of 3 equal rhythms might cause the probabilities in Subsystem B4 to change and heavily emphasize the 3/4 or 6/8 meter options; (iii) a system user singing a song that follows a Verse Chorus Verse form might cause the probabilities in Subsystem B9 to change and heavily emphasize the ABA form option; (iv) a system user singing a melody with a very fast cadence might cause the probabilities in Subsystem B3 to change and heavily emphasize the faster tempo options; and (v) a system user singing a melody with a slowly changing underlying implied harmonic progression might cause the probabilities in Subsystem B11 to change and heavily emphasize the longer chord length options.

In the event that the input material consists of pitches that comprise a minor key, then the pitch-related subsystems (i.e. B5, B7, B17, B19, B20, B27, B29 and B30 illustrated in FIGS. 27B3A, 27B3B and 27B3C) might be more likely to select a minor key(s) and related minor chords and chord progressions or other values that the inputted material might influence. Consider the following pitch-related examples: (i) a system user singing a melody that follows a minor tonality might cause the probabilities in Subsystem B7 to change and heavily emphasize the Minor tonality options; (ii) a system user singing a melody that centers around the pitch D might cause the probabilities in Subsystem B27 to change and heavily emphasize the D pitch option; (iii) a system user singing a melody that follows an underlying implied harmonic progression centered around E might cause the probabilities in Subsystem B17 to change and heavily emphasize the E root note options; (iv) a system user singing a melody that follows a low pitch range might cause the probabilities in the parameter tables in Subsystem B30 to change and heavily emphasize the lower pitch octave options; and (v) a system user singing a melody that follows an underlying implied harmonic progression centered around the pitches D F# and A might cause the probabilities in Subsystem B5 to change and heavily emphasize the key of D option.

In the event that the system user input material follows a particular style or employs particular the controller code options, then the instrumentation subsystems B38 and B39 and controller code subsystem B32 illustrated in FIGS. 27B3A, 27B3B and 27B3C, might be more likely to select certain instruments and/or particular controller code options, respectively. Consider the following examples: (i) a system user singing a melody that follows a Pop style might cause the probabilities in Subsystem B39 to change and heavily emphasize the pop instrument options; and (ii) a system user singing a melody that imitates a delay effect might cause the probabilities in Subsystem B32 to change and heavily emphasis the delay and related controller code options.

Also, in the event that the system user input material follows or imitates particular instruments, and/or methods of playing the same, then the orchestration subsystem B31 illustrated in FIGS. 27B3A, 27B3B and 27B3C might be more likely to select certain orchestration options. Consider the following orchestration-related examples: (i) a system user singing a melody with imitated musical performance(s) of an instrument(s) might cause the probabilities in Subsystem B31 to change and heavily emphasize the orchestration of the piece to reflect the user input; (ii) if a system user is singing an arpeggiated melody, the subsystem B31 might heavily emphasize an arpeggiated or similar orchestration of the piece; (iii) a system user singing a melody with imitated instruments performing different musical functions might cause the probabilities in Subsystem B31 to change and heavily emphasize the musical function selections related to each instrument as imitated by the system user; and (iv) if a system user is alternating between singing a melody in the style of violin and an accompaniment in the style of a guitar, then the Subsystem B31 might heavily emphasize these musical functions for the related or similar instrument(s) of the piece.

Employing the Automated Music Composition and Generation Engine of the Present Invention in Other Applications The Automated Music Composition and Generation Engine of the present invention will have use in many application beyond those described this invention disclosure.

For example, consider the use case where the system is used to provide indefinitely lasting music or hold music (i.e. streaming music). In this application, the system will be used to create unique music of definite or indefinite length. The system can be configured to convey a set of musical experiences and styles and can react to real-time audio, visual, or textual inputs to modify the music and, by changing the music, work to bring the audio, visual, or textual inputs in line with the desired programmed musical experiences and styles. For example, the system might be used in Hold Music to calm a customer, in a retail store to induce feelings of urgency and need (to further drive sales), or in contextual advertising to better align the music of the advertising with each individual consumer of the content.

Another use case would be where the system is used to provide live scored music in virtual reality or other social environments, real or imaginary. Here, the system can be configured to convey a set of musical experiences and styles and can react to real-time audio, visual, or textual inputs. In this manner, the system will be able to "live score" content experiences that do well with a certain level of flexibility in the experience constraints. For example, in a video game, where there are often many different manners in which to play the game and courses by which to advance, the system would be able to accurately create music for the game as it is played, instead of (the traditional method of) relying on pre-created music that loops until certain trigger points are met. The system would also serve well in virtual reality and mixed reality simulations and experiences.

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present invention disclosure.

In alternative embodiments, the automatic music composition and generation system of the present invention can be modified to support the input of conventionally notated musical information such as, for example, notes, chords, pitch, melodies, rhythm, tempo and other qualifies of music, into the system input interface for processing and use in conjunction with other musical experience descriptors provided the system user, in accordance with the principles of the present invention.

For example, in alternative embodiments of the present invention described hereinabove, the system can be realized a stand-alone appliances, instruments, embedded systems, enterprise-level systems, distributed systems, and as an application embedded within a social communication network, email communication network, SMS messaging network, telecommunication system, and the like. Such alternative system configurations will depend on particular end-user applications and target markets for products and services using the principles and technologies of the present invention.

While the preferred embodiments disclosed herein have taught the use of virtual-instrument music synthesis to generate acoustically-realized notes, chords, rhythms and other events specified in automated music compositions, in stark contrast with stringing together music loops in a manner characteristic of prior art systems, it is understood that the automated music composition and generation system of the present invention can be modified to adapt the musical score representations generated by the system, and convert this level of system output into MIDI control signals to drive and control one or more groups of MIDI-based musical instruments to produce the automatically composed music for the enjoyment of others. Such automated music composition and generation systems could drive entire groups of MIDI-controlled instruments such as displayed during Pat Metheny's 2010 Orchestrion Project. Such automated music composition and generation systems could be made available in homes and commercial environments as an alternative to commercially available PIANODISC® and YAMAHA® MIDI-based music generation systems. Such alternative embodiments of the present inventions are embraced by the systems and models disclosed herein and fall within the scope and spirit of the present invention.

These and all other such modifications and variations are deemed to be within the scope and spirit of the present invention as defined by the accompanying Claims to Invention.

What is claimed is:

1. A portable automated music composition and generation system for scoring videos with custom pieces of digital music, said portable automated music composition and generation system comprising:
   a compact housing;
   an automated music composition and generation engine, mounted in said compact housing, and driven by graphical-icon based emotion-type musical experience descriptors and graphical-icon based style type musical experience descriptors selected by a system user during a video scoring process; and
   a computing platform, mounted in said compact housing, and supporting a system user interface operably coupled to said automated music composition and generation engine;
   wherein said computing platform includes
   a processor with program memory for storing a control program, and persistent memory for storing a library of videos and/or other photographic media to be scored by the system user with custom pieces of digital music;
   a touch-screen display panel for displaying a selected video and/or photographic media to be scored by the system user with custom pieces of digital music that have been automatically generated by said automated music composition and generation engine driven by said graphical-icon based emotion-type musical experience descriptors graphical-icon based style-type musical experience descriptors;

a keyboard allowing the system user to select graphical-icon based emotion-type musical experience descriptors and graphical-icon based style-type musical experience descriptors that emotionally and stylistically characterize custom pieces of digital music to be automatically composed and generated by said automated music composition and generation engine, for scoring segmented scenes of the selected video and/or photographic media;

an audio speaker for producing audio representations of custom pieces of digital music automatically composed by said automated music composition and generation engine driven by said graphical-icon based emotion-type musical experience descriptors and said graphical-icon based style-type musical experience descriptors selected by the system user; and a wireless network adapter, disposed within said compact housing, allowing said computing platform to establish wireless communication with one or more devices operably connected to a wireless data communications network;

wherein said automated music composition and generation engine automatically generates custom pieces of digital music for scoring segmented scenes in the selected video and/or photographic media, based on and using said graphical-icon based emotion-type musical experience descriptors and said graphical-icon based style-type musical experience descriptors selected by the system user using said keyboard, and provided to said automated music composition and generation engine;

wherein said touch screen display panel allows the system user to select and load a video and/or photographic media from said library and view segmented scenes of the selected video and/or photographic media, and the system user can then select said graphical-icon based emotion-type musical experience descriptors and said graphical-icon based style-type musical experience descriptors using said keyboard, and supply the selected graphical-icon based emotion-type and style-type musical experience descriptors to said automated music composition and generation engine for use in composing and generating custom pieces of digital music for scoring segmented scenes in the selected video and/or photographic media; and wherein said automated music composition and generation engine, once initiated by the system user, automatically transforms said selected graphical-icon based emotion-type and style-type musical experience descriptors into a set of music-theoretic system operating parameters, which are used by said automated music composition and generation engine to automatically compose and generate custom pieces of digital music for scoring the segmented scenes in said selected video and/or photographic media.

2. The portable automated music composition and generation system of claim 1, wherein said automated music composition and generation engine employs virtual-instrument music synthesis during automated music composition.

3. An automated music composition and generation process supported within a portable music composition and generation system, said automated music composition and generation process comprising the steps of:

(a) providing a graphical-icon supporting system user interface, including a video display, operably connected to an automated music composition and generation engine driven by graphical-icon based emotion-type and style-type musical experience descriptors supplied by a system user, interacting with said graphical-icon supporting system-user interface and selecting said graphical-icon based emotion-type and style-type musical experience descriptors from said graphical-icon supporting system user interface;

(b) a system user accessing said automated music composition and generation engine, and then selecting a video to be scored with custom pieces of digital music composed and generated by said automated music composition and generation engine;

(c) said system user selecting graphical-icon based emotion-type and style-type musical experience descriptors that emotionally and stylistically characterize custom pieces of digital music to be automatically composed and generated by said automated music composition and generation engine, for scoring segmented scenes in the selected video;

(d) said system user initiating said automated music composition and generation engine to compose and generate custom pieces of digital music for the segmented scenes in said selected video, using said graphical-icon based emotion-type and style-type musical experience descriptors selected for the segmented scenes in the selected video;

(e) said portable music composing and generation system combining the composed custom pieces of digital music with the selected video so as to create a video file for display and review by said system user; and (f) reviewing and assessing said video file and making modifications to the selected graphical-icon based emotion-type and style-type musical experience descriptors and providing the modified graphical-icon based emotion-type and style-type musical experience descriptors to said automated music composition and generation engine, and then creating a new video file for display and audio-visual review;

wherein said automated music composition and generation engine, once initiated by the system user, automatically transforms said selected graphical-icon based emotion-type and style-type musical experience descriptors into a set of music-theoretic system operating parameters, which are used by said automated music composition and generation engine to automatically compose and generate custom pieces of digital music for scoring the segmented scenes in said selected video.

4. A portable automated music composition and generation system for scoring videos with custom pieces of digital music, said portable automated music composition and generation system comprising:

a portable housing;

an automated music composition and generation engine, disposed in said portable housing, driven by graphical-icon based musical experience descriptors selected by a system user using said portable automated music composition and composition system;

a manual selection mechanism, integrated with said portable housing, for enabling said system user to manually select said graphical-icon based musical experience descriptors that emotionally and stylistically characterize custom pieces digital music to be automatically composed and generated by said automated music composition and generation engine, for scoring segmented scenes in a video selected by the system user;
a computing platform, disposed in said portable housing, operably connected to said automated music composition and generation engine, for controlling said portable automated music composition and generation system, and having a storage device for storing a video library of videos and custom pieces of digital music generated by said automated music composition and generation engine;
a video display screen, integrated with said portable housing, for displaying videos selected from said video library maintained within said storage device, or on a local or remote video file server connected to an information network, and for displaying segmented scenes in the selected video being scored with said graphical-icon based musical experience descriptors;
wherein the system user uses said manual selection mechanism to select one or more graphical-icon based musical experience descriptors for supply to said automated music composition and generation engine for use in automatically composing and generating custom pieces of digital music for scoring segmented scenes in the selected video; and
an audio transducer for producing audio representations of said custom pieces of digital music automatically composed and generated by said automated music composition and generation engine; and
wherein said automated music composition and generation engine, once initiated by the system user, automatically transforms said selected graphical-icon based musical experience descriptors into a set of music-theoretic system operating parameters, which are used by said automated music composition and generation engine to automatically compose and generate said custom pieces of digital music for scoring segmented scenes in said selected video.

5. The portable automated music composition and generation system of claim 4, wherein said manual selection mechanism comprises at least one of a physical keyboard and a virtual keyboard.

6. The portable automated music composition and generation system of claim 5, wherein said graphical-icon based musical experience descriptors comprises graphical-icon based emotion-type musical experience descriptors and graphical-icon based style-type musical experience descriptors.

7. A portable automated music composition and generation system for producing musically-scored videos, said portable automated music composition and generation system comprising:
a portable housing;
an automated music composition and generation engine, disposed in said portable housing, for use in scoring segmented scenes in a video; and
a system user interface, disposed in said portable housing, including (i) a video display screen for displaying a video selected by a system user and scored with custom pieces of digital music automatically composed and generated by said automated music composition and generation engine, and (ii) a manual selection mechanism, integrated with said portable housing, for use by said system user in selecting graphical-icon based emotion-type and style-type musical experience descriptors that emotionally and stylistically characterize custom pieces of digital music to be automatically composed and generated by said automated music composition and generation engine, for scoring segmented scenes in the video selected by the system user, and providing said graphical-icon based emotion-type and style-type musical experience descriptors to said automated music composition and generation engine for use in automatically composing and generating said custom pieces of digital music;
an audio transducer for producing audio representations of said custom pieces of digital music automatically composed and generated by said automated music composition and generation engine, for scoring segmented scenes in said selected video;
wherein said musically-scored video is then supplied back to the system user by way of said system user interface for audio-visual review on said video display screen and using said audio transducer; and
wherein said automated music composition and generation engine, once initiated by the system user, automatically transforms said selected graphical-icon based emotion-type and style-type musical experience descriptors into a set of music-theoretic system operating parameters, which are used by said automated music composition and generation engine to automatically compose and generate custom pieces of digital music for scoring segmented scenes in said video and producing said musically-scored video.

8. The portable automated music composition and generation system of claim 7, wherein said system user interface, allowing the system user to select and load videos from a video library maintained within a storage device within said portable automated music composition and generation system, or from a local or remote video file server connected to an information network, and the system user can then select said graphical-icon based emotion-type and style-type musical experience descriptors using said manual selection mechanism for supply to said automated music composition and generation engine and subsequent use in automatically composing and generating custom pieces of digital music for scoring segmented scenes in said selected video so as to produce said musically-scored video.

9. The portable automated music composition and generation system of claim 8, wherein said automated music composition and generation engine supports automated virtual-instrument music synthesis driven by said graphical-icon based emotion-type and style-type musical experience descriptors selected by the system user for use in said portable automated music composition and generation system.

* * * * *